US010970843B1

(12) United States Patent
Olsen et al.

(10) Patent No.: US 10,970,843 B1
(45) Date of Patent: Apr. 6, 2021

(54) GENERATING INTERACTIVE CONTENT USING A MEDIA UNIVERSE DATABASE

(71) Applicant: Amazon Technologies, Inc., Seattle, WA (US)

(72) Inventors: Erik Jacob Olsen, Bellevue, WA (US); Christian Robert Cabanero, Seattle, WA (US); Pilarina Estrada, Seattle, WA (US); Matthew George Bell, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 294 days.

(21) Appl. No.: 14/749,543

(22) Filed: Jun. 24, 2015

(51) Int. Cl.
| | |
|---|---|
| *G06T 15/50* | (2011.01) |
| *H04N 21/431* | (2011.01) |
| *G06T 7/00* | (2017.01) |
| *G06T 15/00* | (2011.01) |
| *G06T 15/04* | (2011.01) |
| *G06T 13/40* | (2011.01) |
| *G06T 13/60* | (2011.01) |

(52) U.S. Cl.
CPC ............ *G06T 7/0046* (2013.01); *G06T 13/40* (2013.01); *G06T 13/60* (2013.01); *G06T 15/005* (2013.01); *G06T 15/04* (2013.01); *G06T 15/50* (2013.01); *H04N 21/431* (2013.01); *G06T 2207/10016* (2013.01); *G06T 2207/20092* (2013.01); *G06T 2215/12* (2013.01)

(58) Field of Classification Search
CPC ..................... H04N 21/44008; H04N 21/4725
See application file for complete search history.

(56) References Cited

U.S. PATENT DOCUMENTS

| | | | |
|---|---|---|---|
| 5,261,820 | A | 11/1993 | Slye |
| 5,395,242 | A | 3/1995 | Slye |
| 5,630,043 | A | 5/1997 | Uhlin |
| 5,682,196 | A | 10/1997 | Freeman |
| 5,684,918 | A | 11/1997 | Abecassis |

(Continued)

FOREIGN PATENT DOCUMENTS

| | | |
|---|---|---|
| WO | 2008124941 | 4/2008 |
| WO | 2009101624 | 8/2009 |

OTHER PUBLICATIONS

U.S. Appl. No. 14/500,619, filed Sep. 29, 2014, Christian Robert Cabanero, et al.

(Continued)

*Primary Examiner* — Brian T Pendleton
*Assistant Examiner* — Frank Johnson
(74) *Attorney, Agent, or Firm* — Robert C. Kowert; Kowert, Hood, Munyon, Rankin & Goetzel, P.C.

(57) ABSTRACT

A media universe database is configured to store a plurality of elements of media universe content related to a media universe. An analysis of a digital video is performed. Based at least in part on the analysis, a correspondence is determined between one or more objects in the digital video and respective elements of the media universe content. An interactive digital video is generated based on the digital video. The interactive digital video comprises a plurality of video frames including one or more interactive video frames. The one or more interactive video frames comprise one or more interactive objects corresponding to the elements of media universe content.

20 Claims, 44 Drawing Sheets

(56) References Cited

U.S. PATENT DOCUMENTS

| | | |
|---|---|---|
| 6,173,260 B1 | 1/2001 | Slaney |
| 6,266,068 B1 | 6/2001 | Kang et al. |
| 6,275,806 B1 | 8/2001 | Pertrushin |
| 6,476,802 B1 | 11/2002 | Rose et al. |
| 6,609,253 B1 | 8/2003 | Swix et al. |
| 6,754,905 B2 | 6/2004 | Gordon et al. |
| 7,451,079 B2 | 11/2008 | Oudeyer |
| 7,500,258 B1 | 3/2009 | Eldering |
| 7,606,701 B2 | 10/2009 | Degani et al. |
| 7,803,052 B2 | 9/2010 | Multerer |
| 7,940,914 B2 | 5/2011 | Petrushin |
| 8,078,470 B2 | 12/2011 | Levanon et al. |
| 8,096,863 B2 | 1/2012 | Annunziata |
| 8,308,562 B2 | 11/2012 | Patton |
| 8,645,230 B2 | 2/2014 | Oliver |
| 8,811,673 B1* | 8/2014 | Fleites ............. H04N 21/44008 382/103 |
| 8,907,950 B2 | 12/2014 | Miyata et al. |
| 9,317,778 B2* | 4/2016 | Cordova-Diba ............. G06F 17/30247 |
| 9,538,209 B1* | 1/2017 | Kokenos ............ H04N 21/4316 |
| 9,961,382 B1* | 5/2018 | Dorner ............... H04N 21/4722 |
| 2002/0068525 A1 | 6/2002 | Brown et al. |
| 2003/0218610 A1 | 11/2003 | Mech et al. |
| 2004/0005900 A1* | 1/2004 | Zilliacus ............ H04N 7/17318 455/466 |
| 2004/0021684 A1* | 2/2004 | Millner .......... H04N 21/234318 715/719 |
| 2005/0086690 A1* | 4/2005 | Gilfix .................... H04N 5/445 725/42 |
| 2006/0136581 A1 | 6/2006 | Smith |
| 2006/0259930 A1* | 11/2006 | Rothschild ............. G11B 27/11 725/81 |
| 2007/0024612 A1 | 2/2007 | Balfour |
| 2007/0088674 A1 | 4/2007 | Kawate et al. |
| 2007/0200183 A1 | 8/2007 | Rueb et al. |
| 2008/0131091 A1 | 6/2008 | Mae et al. |
| 2008/0260352 A1 | 10/2008 | Turner |
| 2008/0300700 A1 | 12/2008 | Hammer et al. |
| 2009/0040890 A1 | 2/2009 | Watanabe et al. |
| 2009/0144772 A1* | 6/2009 | Fink ....................... G06Q 30/02 725/42 |
| 2009/0169168 A1 | 7/2009 | Ishikawa |
| 2009/0325138 A1 | 12/2009 | Shuster |
| 2010/0058182 A1 | 3/2010 | Jung |
| 2010/0115455 A1 | 5/2010 | Kim |
| 2011/0001758 A1 | 1/2011 | Chalozin et al. |
| 2011/0041060 A1 | 2/2011 | Chien et al. |
| 2011/0213482 A1 | 2/2011 | Saarela |
| 2011/0064388 A1 | 3/2011 | Brown et al. |
| 2011/0137984 A1 | 6/2011 | Kim et al. |
| 2012/0052476 A1 | 3/2012 | Graesser et al. |
| 2012/0244948 A1 | 3/2012 | Dhillon |
| 2012/0167134 A1 | 6/2012 | Hendricks et al. |
| 2012/0179968 A1 | 7/2012 | Madnick et al. |
| 2012/0183229 A1* | 7/2012 | McDevitt ......... H04N 21/47815 382/218 |
| 2012/0226982 A1 | 9/2012 | Nakanishi et al. |
| 2013/0011121 A1 | 1/2013 | Forsyth et al. |
| 2013/0014155 A1* | 1/2013 | Clarke ............. G06F 17/30026 725/32 |
| 2013/0080926 A1 | 3/2013 | Katakawa |
| 2013/0174195 A1* | 7/2013 | Witenstein-Weaver .................... H04N 21/4722 725/32 |
| 2013/0231999 A1 | 8/2013 | Emrich |
| 2013/0241926 A1 | 9/2013 | Asaria et al. |
| 2013/0251338 A1* | 9/2013 | Abecassis ............ H04N 5/445 386/241 |
| 2014/0129394 A1 | 1/2014 | Oliver |
| 2014/0059595 A1* | 2/2014 | Jacobson ............ H04N 9/8205 725/34 |
| 2014/0101691 A1* | 4/2014 | Sinha .................. G06F 17/3082 725/32 |
| 2014/0171039 A1 | 6/2014 | Bjontegard |
| 2014/0259056 A1* | 9/2014 | Grusd ................ H04N 21/8583 725/34 |
| 2015/0139610 A1 | 5/2015 | Syed et al. |
| 2015/0143410 A1* | 5/2015 | Byers .................. H04N 21/812 725/34 |
| 2015/0245103 A1* | 8/2015 | Conte ............. H04N 21/47815 725/60 |
| 2015/0296250 A1* | 10/2015 | Casper ............... H04N 21/4316 725/34 |
| 2015/0326925 A1* | 11/2015 | Ozkan .................. H04N 21/466 725/36 |
| 2015/0350729 A1* | 12/2015 | Reynolds ......... H04N 21/25891 725/34 |
| 2016/0080794 A1* | 3/2016 | Raman ............... H04N 21/2668 725/28 |
| 2017/0262704 A1* | 9/2017 | Wnuk ............... G06F 17/30247 |
| 2017/0289596 A1* | 10/2017 | Krasadakis ........... H04W 4/029 |
| 2017/0304732 A1* | 10/2017 | Velic ...................... A63F 13/65 |

OTHER PUBLICATIONS

Amazon Web Services, "Amazon AppStream Developer Guide", 2014, pp. 1-195.

"Generations of Game Analytics, Achievements and High Scores", Ben Medler, Eludamos Journal for Computer Game Culture vol. 3, No. 2, 2009, pp. 177-194.

Amar, Nir, et al. "Synthesizing reality for realistic physical behavior of virtual objects in augmented reality applications for smartphones." Virtual Reality (VR), 2013 IEEE. IEEE, 2013, pp. 1-2.

Lok, Benjamin, et al. "Incorporating dynamic real objects into immersive virtual environments." Proceedings of the 2003 symposium on Interactive 30 graphics. ACM, 2003, pp. 31-40.

"Unity Manual", accessed Jun. 27, 2014, pp. 1-32.

Wang, Jue, et al. "Interactive video cutout." ACM Transactions on Graphics (TOG). vol. 24. No. 3. ACM, 2005, pp. 585-594.

Smolic, Aljoscha, et al. "3d video and free viewpoint video-technologies, applications and mpeg standards." Multimedia and Expo, 2006 IEEE International Conference on. IEEE, 2006, pp. 1-56.

Karsten, Muller, et al. "View synthesis for advanced 30 video systems." EURASIP Journal on Image and Video Processing 2008 (2009), pp. 1-11.

Balian, Luca, et al. "Unstructured video-based rendering: Interactive exploration of casually captured videos." ACM Transactions on Graphics (TOG) 29.4 (2010): 87, pp. 1-10.

Smolic, Aljoscha, Hideaki Kimata, and Anthony Vetro. "Development of MPEG standards for 30 and free viewpoint video." Optics East 2005. International Society for Optics and Photonics, 2005, pp. 1-13.

U.S. Appl. No. 14/500,593, filed Sep. 29, 2014, Christian Robert Cabanero, et al.

U.S. Appl. No. 14/500,600, filed Sep. 29, 2014. Christian Robert Cabanero, et al.

U.S. Appl. No. 14/500,580, filed Sep. 29, 2014, Christian Robert Cabanero, et al.

U.S. Appl. No. 14/749,541, filed Jun. 24, 2015, Erik Jacob Olsen, et al.

U.S. Appl. No. 14/749,547, filed Jun. 24, 2015, Erik Jacob Olsen, et al.

U.S. Appl. No. 14/479,548, filed Jun. 24, 2015, Erik Jacob Olsen, et al.

International Search Report and Written Opinion in PCT/US15/19992, dated Jun. 29, 2015, Amazon Technologies, Inc., pp. 1-11.

Wang, Jinjun, et al., "Sports highlight detection from keyword sequences using HMM", Multimedia and Expo, 2004, ICME'04, IEEE International Conference, pp. 1-5, vol. 1.

Ren, et al., "Affective sports highlight detection", 15th European Signal Processing Conference, Sep. 3-7, 2007, pp. 728-732.

Isao Otsuka, et al., "A Highlight Scene Detection and Video Summarization System Using Audio Feature for a Personal Video Recorder", Consumer Electronics, IEEE Transactions on 51.1, Dec. 2005, pp. 112-116.

(56) References Cited

OTHER PUBLICATIONS

Changsheng Xu, et al., "Live Sports Even Detection Based on Broadcast Video and Web-casting Text", Proceedings of the 14th annual ACM international conference on Multimedia, ACM, 2006, pp. 221-230.

Mendi Kaytoue, et al. "Watch me playing, I am a professional: a first study on video game live streaming", Proceedings of the 21st international conference companion on World Wide Web, ACM, 2012, pp. 1-8.

Gifford Cheung, et al., "Starcraft from the stands: understanding the game spectator", Proceedings of the SIGCHI Conference on Human Factors in Computing Systems, ACM, 201, pp. 1-10.

Thomas P. B. Smith, et al. "Live-streaming changes the (video) game." Proceedings of the 11th European conference on Interactive TV and video. ACM, 2013, pp. 131-138.

William A. Hamilton, et al., "Streaming on twitch: fostering participatory communities of play within live mixed media." Proceedings of the SIGCHI Conference on Human Factors in Computing Systems. ACM, 2014, pp. 1-10.

M. A. Anusuya, et al., "Speech Recognition by Machine: A Review", International Journal of Computer Science and Information Security, 2009, pp. 181-205, vol. 6, No. 3.

Frank Dellaert, et al., "Recgonizing Emotion in Speech", IEEE, Spoken Language, 1996, pp. 1-4 Proceedings., Fourth International Conference on. vol. 3.

Santosh K. Gaikwad, et al., "A Review on Speech Recognition Technique", International Journal of Computer Applications, Nov. 2010, pp. 16-24, vol. 10, No. 3.

Kiel Mark Gilleade, et al., "Affective Videogames and Modes of Affectived Gaming: Assist me, Challenge Me, Emote Me", Proceedings of DiGRA 2005 Conference, 2005, pp. 1-7.

Eva Hudlicka, "Affective Game Engines: Motivation and Requirements", Proceeding of the 4th International Conference on Foundations of Digital Games, ACM, Apr. 26-30, 2009, pp. 1-9, Orlando, Florida, USA.

Christian Martyn Jones, et al., "Creating an emotionally reactive computer game responding to affective cues in speech", HCI Proceedings, 2005, pp. 1-2, vol. 2.

Paul P.A.B. Merkx, et al., "Inducing and Measuring Emotion through a Multiplayer First-Person Shooter Computer Game", Proceedings of the Computer Games Workshop, 2007, pp. 1-12.

Alan Murphy, Dr. Sam Redfern. "Utilizing Bimodal Emotion Recognition for Adaptive Artificial Intelligence." International Journal of Engineering Science and Innovative Technology (IJESIT), Jul. 2013, pp. 167-173, vol. 2, Issue 4.

Bjorn Schuller, et al., "Acoustic Emotion Recognition: A Benchmark Comparison of Performances", IEEE, ASRU 2009, pp. 552-557.

Norman Makoto Su, et al., "Virtual Spectating: Hearing Beyond the Video Arcade", Proceedings of the 25th BCS conference on human-computer interaction. British Computer Society, 2011, pp. 269-278.

Thurid Vogt, et al., "Automatic Recognition of Emotions from Speech: A Review of the Literature and Recommendations for Practical Realisation", . Affect and emotion in HCI, LNCS 4868, Springer Berlin Heidelberg, 2008, pp. 75-91.

Greg Wadley, et al., "Towards a Framework for Designing Speech-Based Player Interaction in Multiplayer Online Games", Proceedings of the second Australasian conference on Interactive entertainment. Creativity & Cognition Studios Press, 2005, pp. 1-4.

Amazon Web Services, "Amazon AppStream Developer Guide", Nov. 13, 2013, pp. 1-200.

U.S. Appl. No. 14/318,042, filed Jun. 17, 2014, Gerard Joseph Heinz et al.

U.S. Appl. No. 14/318,026, filed Jun. 27, 2014, Gerard Joseph Heinz et al.

U.S. Appl. No. 14/318,013, filed Jun. 27, 2014, Gerard Joseph Heinz et al.

U.S. Appl. No. 14/318,002, filed Jun. 27, 2014, Gerard Joseph Heinz et al.

U.S. Appl. No. 14/317,984, filed Jun. 27, 2014, Gerald Joseph Heinz et al.

U.S. Appl. No. 14/076,815, filed Nov. 11, 2013, Jonathan Paul Thompson.

U.S. Appl. No. 14/077,180, filed Nov. 11, 2013, Gerard Joseph Heinz.

U.S. Appl. No. 14/077,186, filed Nov. 11, 2013, Gerard Joseph Heinz.

U.S. Appl. No. 14/754,584, filed Jun. 29, 2015, Michael Anthony Willette, et al.

U.S. Appl. No. 14/754,575, filed Jun. 29, 2015, Michael Anthony Willette, et al.

U.S. Appl. No. 14/732,580, filed Jun. 5, 2015, Ethan Zane Evans, et al.

U.S. Appl. No. 14/732,582, filed Jun. 5, 2015, Ethan Zane Evans, et al.

U.S. Appl. No. 14/755,922, filed Jun. 30, 2015, David Hendrik Verfaillie et al.

U.S. Appl. No. 14/755,905, filed Jun. 30, 2015, Michael Anthony Willette et al.

U.S. Appl. No. 14/755,955, filed Jun. 30, 2015, Christopher Paul Dury et al.

U.S. Appl. No. 14/755,934, filed Jun. 30, 2015, Rohit Garg et al.

U.S. Appl. No. 14/755,944, filed Jun. 30, 2015, Robert Harvey Oates.

U.S. Appl. No. 14/755,967, filed Jun. 30, 2015, Patrick Gilmore et al.

U.S. Appl. No. 14/755,974, filed Jun. 30, 2015, Hok Peng Leung et al.

U.S. Appl. No. 14/318,093, filed Jun. 27, 2014. Michael Martin George.

U.S. Appl. No. 14/318,083, filed Jun. 27, 2014, Michael Martin George.

U.S. Appl. No. 14/500,413, filed Sep. 29, 2014, Collin Charles Davis.

U.S. Appl. No. 14/500,451, filed Sep. 29, 2014, Michael Anthony Frazzini.

U.S. Appl. No. 14/500,619, filed Sep. 29, 2014, Christian Robert Cabanero.

U.S. Appl. No. 14/500,593, filed Sep. 29, 2014, Christian Robert Cabanero.

U.S. Appl. No. 14/500,600, filed Sep. 26, 2014, Christian Robert Cabanero.

U.S. Appl. No. 14/500,580, filed Sep. 29, 2014, Christian Robert Cabanero.

U.S. Appl. No. 14/318,117, filed Jun. 27, 2014, Michael Martin George.

* cited by examiner

MU database
300

- asset tracking information
- storylines
- history
- rules
- environments
- characters
- objects
- digital assets
- other sources
⋮

FIG. 3A asset tracking 112 digital assets | MU content

FIG. 3B

MU database
300 base/canon 310
intermediate/non-canon 320
client-specific 330 possible promotion over time

FIG. 3C

GENERATING INTERACTIVE CONTENT USING A MEDIA UNIVERSE DATABASE

BACKGROUND

Various entities may create or control media universes that encompass fictional worlds. Broadly speaking, a fictional world is a (generally) self-consistent setting for works of fiction. Broad categories of fictional worlds may include, but are not limited to, fictionalized versions of the real world, alternate history or alternative reality universes, science fiction universes, and fantasy worlds. A fictional world may be based on one or more works in various media including but not limited to books, short stories, comic books, graphic novels, movies, shows or series distributed via various channels (e.g., television, cable, or web series), cartoons, anime, games, and toys. In addition, new works in various media including but not limited to books, short stories, comic books, graphic novels, movies, shows or series, cartoons, anime, games, and toys may be specifically created with content or storylines set within an existing fictional world.

A fictional world may include its own histories, storylines, environments, locations, civilizations, characters, objects, technologies, flora, fauna, languages, rules, and so on. In many fictional worlds, there is an accepted collection of media, storylines, histories, characters, objects, locations and so on that may be viewed as the canonical content (or canon) of the world. New works may follow the canon to maintain continuity within the world, and may extend the canon with new storylines, characters, and so on. In addition, there may be other non-canonical content (e.g., "fan fiction") based on or set within the fictional world. The collection of all media and other canonical and non-canonical content for a fictional world may be referred to as a media universe.

BRIEF DESCRIPTION OF THE DRAWINGS

FIGS. 3A through 3C graphically illustrate aspects of a media universe database that may be maintained within a media universe system, according to at least some embodiments.

Figure 1:
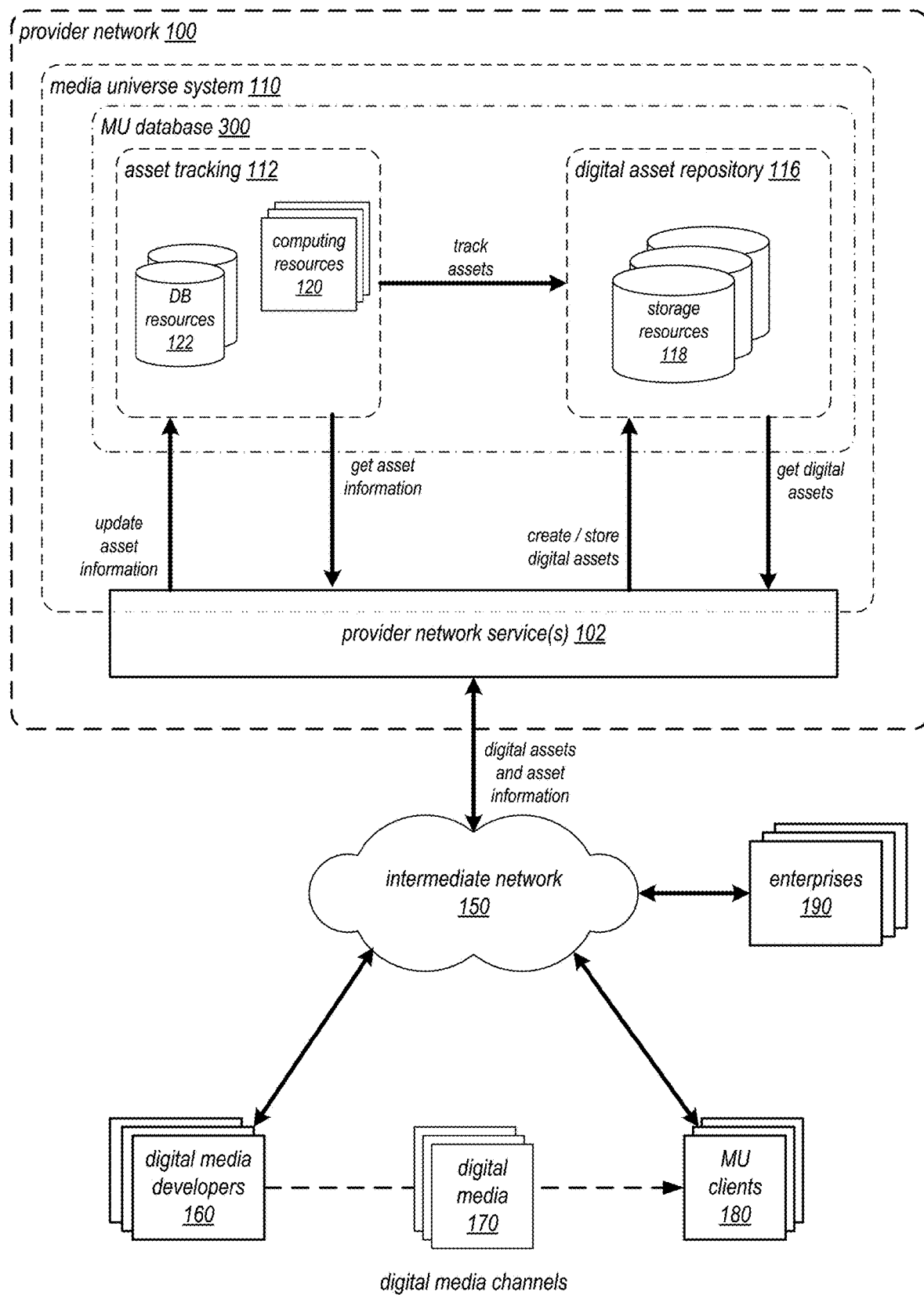
FIG. 1 is a block diagram illustrating a network environment for managing and sharing digital assets in a media universe, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Embodiments of methods and apparatus for managing and sharing digital assets within a media universe are described. In addition, embodiments of methods and apparatus for providing interactive experiences to customers (also referred to as clients or users) of a media universe are described.

Methods, systems, and computer-readable media are described for implementing a custom query of a media universe database. Items of content from a media universe may be displayed in a graphical user interface of a client device. Based on user input to combine items of content, a custom query of the media universe database may be used to dynamically generate additional content that is relevant to all of the items of content in the user-generated combination. The additional content may then be displayed in the graphical user interface.

Methods, systems, and computer-readable media are described for implementing a timeline-based interface for a media universe database. In a graphical user interface of a client device, items of content from a media universe may be displayed at a point in a timeline. As the position on the timeline is changed based on user input, the items of content may also be changed to reflect the different point in time. Entities, their relationships, and graphical representations thereof may change over time.

Methods, systems, and computer-readable media are described for implementing adaptive exploration of a media universe database. As a user interacts with a media universe database over time, an adaptive interface may track the user's interactions. The type and/or presentation of content from the database may be automatically changed based on the user's interaction history, such as to emphasize or present more specific or less familiar content.

Methods, systems, and computer-readable media are described for generating interactive content using a media universe database. Non-interactive video may be automatically analyzed to recognize elements in a media universe database. The non-interactive video may be automatically converted to interactive video in which various objects are associated with elements in the media universe database. Clients may interact with the various objects in the interactive video, e.g., by selecting items and obtaining additional information for the selected items.

A media universe may, for example, include the collection of all media and other canonical and non-canonical content for a fictional world or franchise. Media within a media universe may include but is not limited to books, short stories, comic books, graphic novels, video, movies, shows or series distributed via various channels (e.g., television, cable, or web series), cartoons, anime, games, video games, multiplayer games, toys, animatic shorts, and interactive media.

While media universes are generally described herein in the context of fictional worlds or franchises, media universes may instead or also encompass or contain media and other content related to real-world topics, areas, or categories of interest. As non-limiting examples, a media universe may contain content related to history, for example general historical content or content related to a particular era, war, event, country, person, etc.; content related to a field of art, science, technology, occupation, craft, medicine, etc.; content related to recreation, sports, hobbies, etc.; or in general content related to any real-world topic, area, or category of interest that may have or may generate a corpus of media and other content related to the real-world topic, area, or category of interest. These real-world topics, areas, or categories of interest may be referred to as non-fictional worlds. Thus, a collection of media and other content for a fictional world or for a non-fictional world may be referred to herein as a media universe. For simplicity, a fictional world or non-fictional world that is encompassed by a media universe may be referred to as a media universe (MU) world, or as a world of the media universe.

Much media produced today, including but not limited to video media (movies, television shows or series, etc.) and video games, may be digital media at least partially generated using digital assets including but not limited to two-dimensional (2D) or three-dimensional (3D) digital objects or models. Different entities (e.g., movie or series producers, electronic game producers, etc.) may produce digital media for a media universe using digital assets.

Embodiments of a media universe (MU) system are described that provide a network-based toolset and common repository for the digital assets of a media universe that allows these digital media developers to collaboratively create, manage, and share the digital assets within the media universe. Embodiments of the media universe system may allow digital media developers to focus on their core competencies (filmmaking, game development, etc.) without having to worry about managing their digital assets. In addition, embodiments of the media universe system may enable the developers to more easily create new digital media within the media universe by re-using digital assets created for other media projects or video content without having to re-create the digital assets themselves from scratch. In addition, embodiments of the media universe system may help the developers in maintaining continuity within a media universe by providing a centralized, common source for the digital assets created for the universe, as well as for information about the fictional or non-fictional world encompassed by the media universe. In at least some embodiments, an asset tracking component of the media universe system may maintain an asset tracking database that may, for example, be used to track how the digital assets of the media universe relate to one another over time within the world of the media universe. The asset tracking database and digital asset repository may serve as a centralized continuity database for the world of the media universe. Providing an accessible, scalable, network-based location for the continuity database may enable developers to build interactive experiences for users to explore the world of the media universe, both spatially and temporally.

Figure 12:
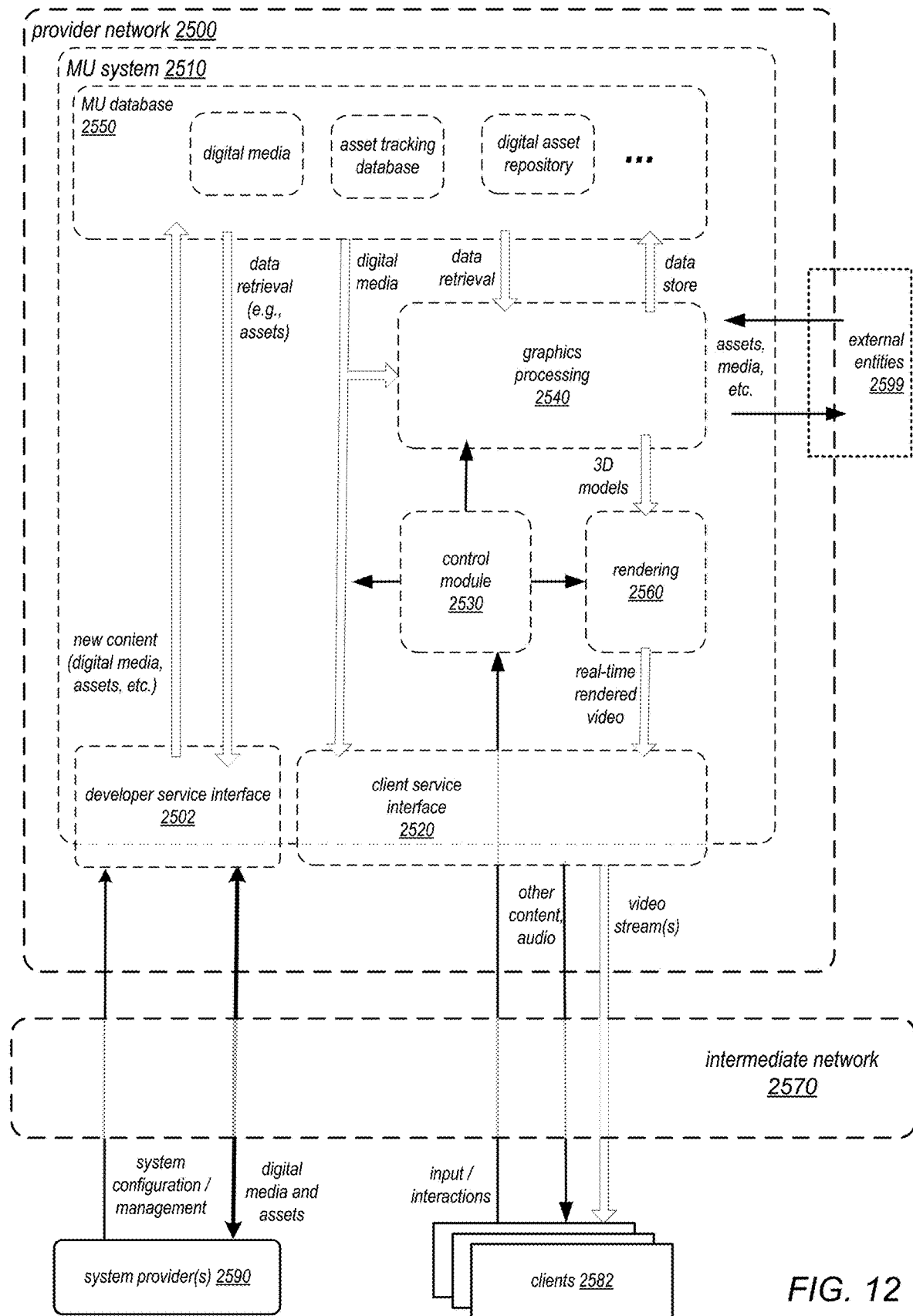
FIG. 12 illustrates an example MU system and environment in which network-based computation resources are leveraged to provide real-time, low-latency rendering and streaming of video content, according to at least some embodiments.
Figure 13A:
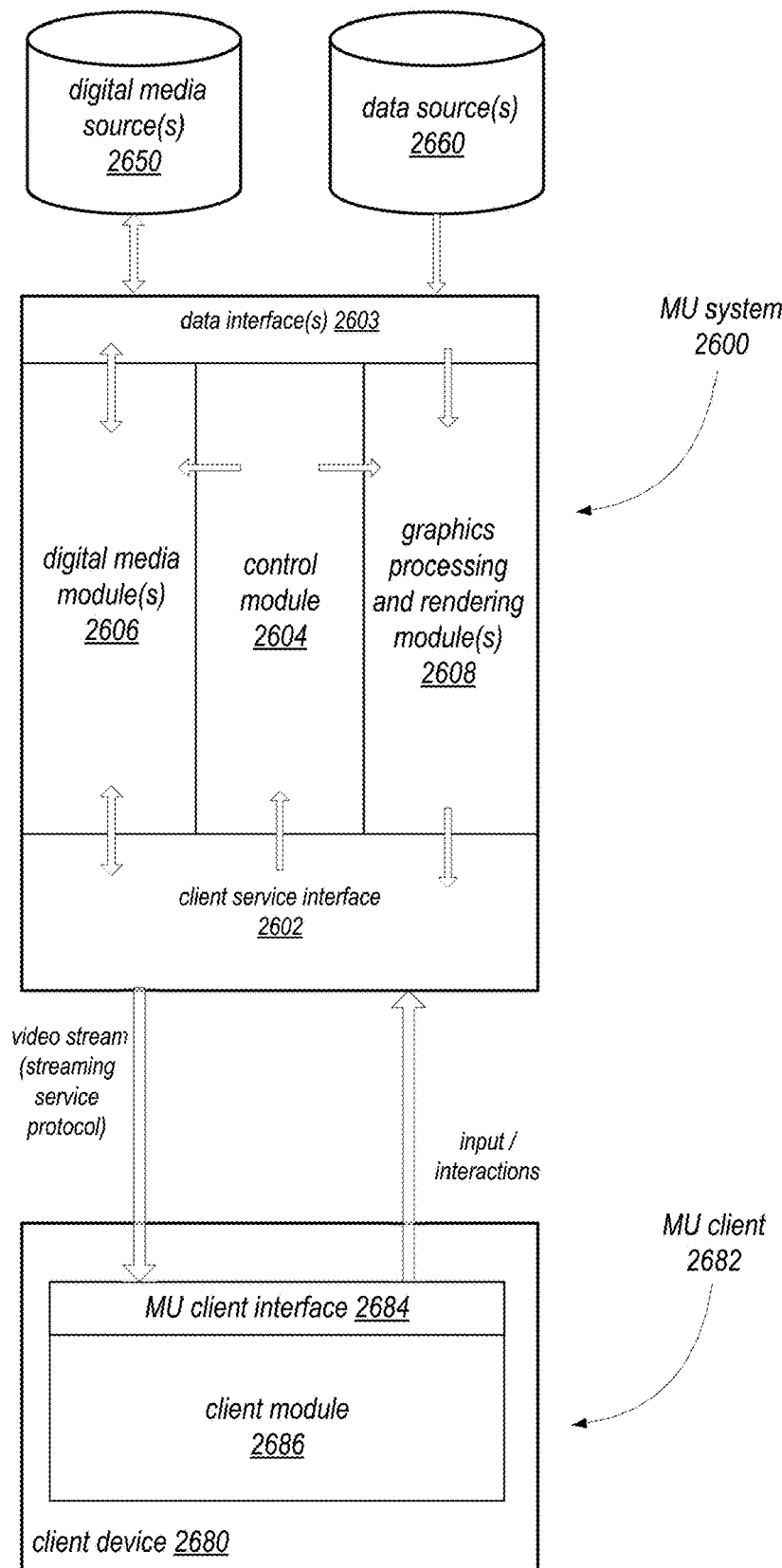
FIG. 13A illustrates an example network-based environment in which a streaming service is used to stream rendered video to clients, according to at least some embodiments.
Figure 14:
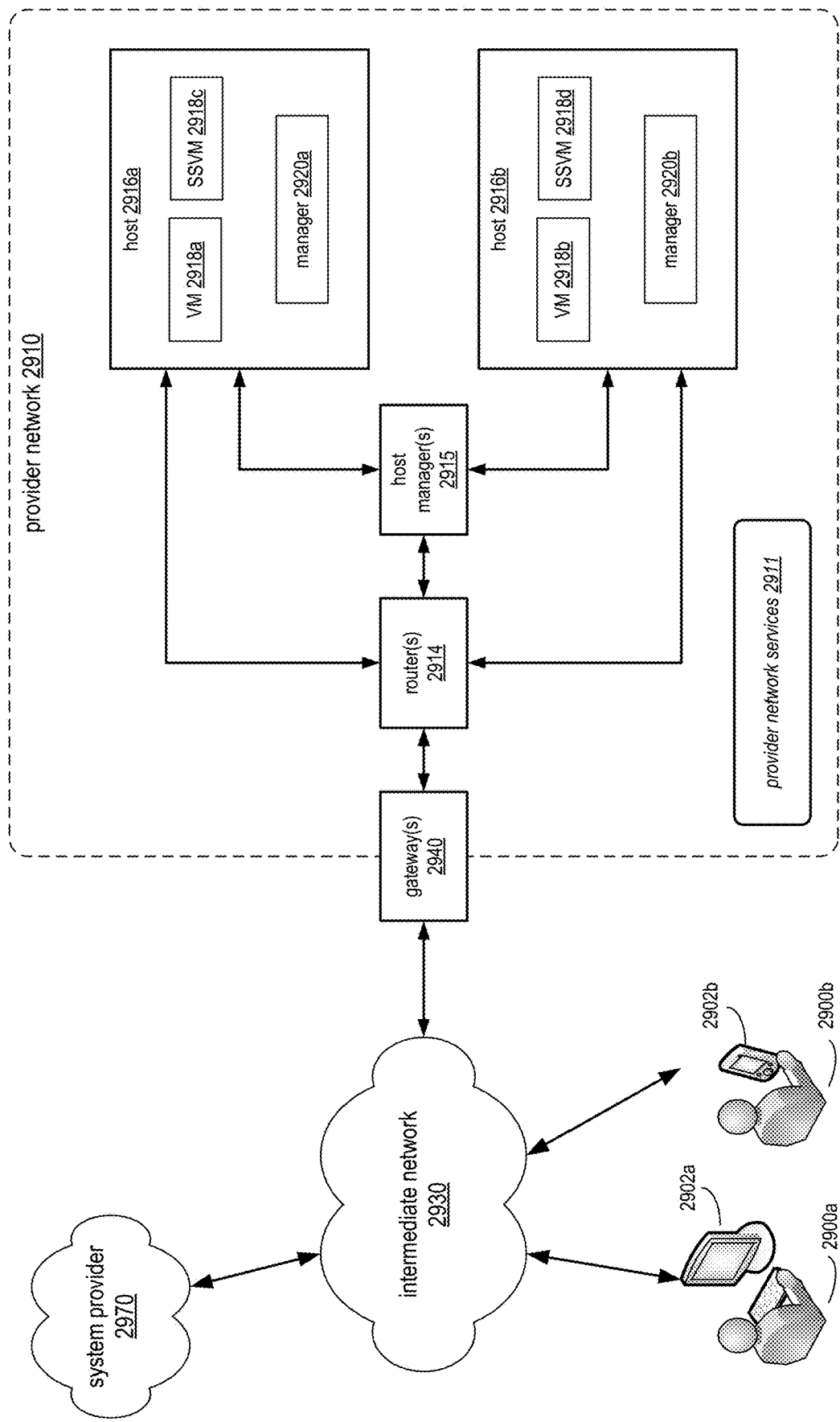
FIG. 14 is a diagram illustrating an example provider network environment in which embodiments as described herein may be implemented.
Figure 28:
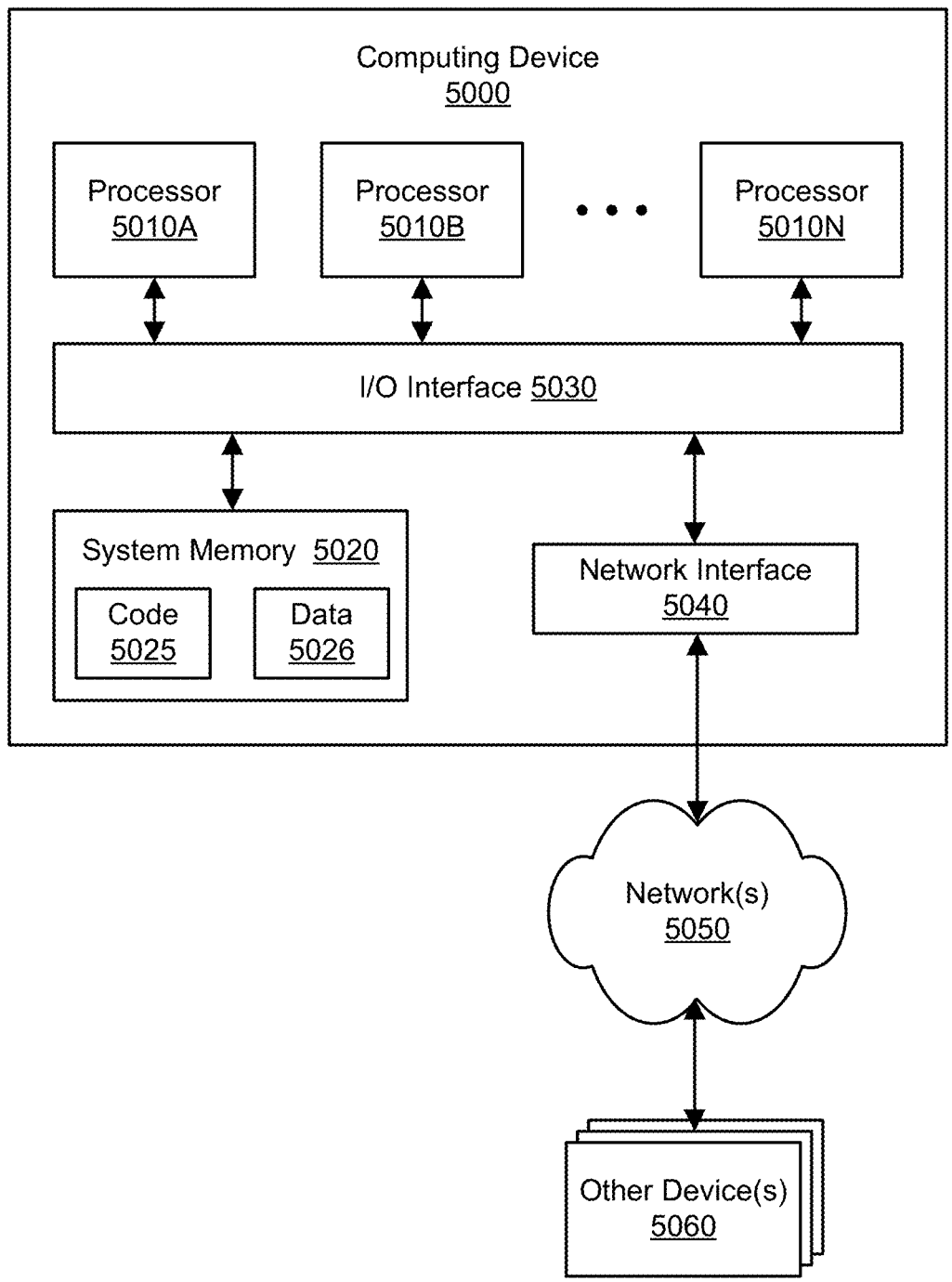
FIG. 28 is a block diagram illustrating an example computer system that may be used in some embodiments.

In at least some embodiments, the digital asset repository and asset tracking database provided by the media universe system may be leveraged to provide interactive experiences with the content of the media universe to customers (also referred to as clients, users, or viewers). In at least embodiments, the media universe system may allow clients, via one or more client services and client interfaces, to access digital media (e.g., video such as movies, games, etc.) for display on the clients' devices. In at least some embodiments, the media universe system may leverage network-based computation resources and services, for example a streaming service, to dynamically generate and render digital content (e.g., video or games) within the game universe for the clients. FIG. 12 illustrates an example MU system and environment in which network-based computation resources are leveraged to provide real-time, low-latency rendering and streaming of video content, according to at least some embodiments. FIG. 13A illustrates an example network-based environment in which a streaming service is used to stream rendered video to clients, according to at least some embodiments. FIG. 14 illustrates an example provider network environment in which embodiments of an MU system as described herein may be implemented. FIG. 28 is a block diagram illustrating an example computer system that may be used in some embodiments.

In some embodiments, the client services and interfaces of the media universe system may allow clients to interact with video being displayed on the clients' devices, responding to the clients' interactions in real- or near-real time to dynamically generate, render, and stream new content for display on the clients' devices. In some embodiments, the client devices may include touch-enabled screens, and the client interactions with the video being displayed on the clients' devices may be or may include touches and/or gestures according to touchscreen technology. In some embodiments, the client interactions may be or may include interactions according to a cursor control device, a keyboard, or other user input devices or technologies. In some embodiments, the client interactions may be or may include voice commands or interactions according to audio and voice command recognition technology of the client device.

In some embodiments, the client services and interfaces of the media universe system may allow clients to select and interact with particular objects being displayed in videos, games, or other media on the clients' devices, responding to the clients' interactions in real- or near-real time to dynamically generate, render, and stream new content related to the selected objects for display on the clients' devices.

In some embodiments, the client services and interfaces of the media universe system may leverage the digital asset repository and asset tracking database to provide contextual information for the content of the media universe to customers. For example, in some embodiments, a client may select a character or object in video being streamed to the client's device to access information about the character or object within the world of the media universe, for example a general character or object description, history, timeline, episodes or movies that the character has appeared in, events within the universe that the character or object has been involved in, and so on. In addition, in some embodiments, the contextual information provided to the client may include information on or tie-ins to products or merchandise (e.g., other digital media, toys, books, clothing, etc.) that are related to the selected character or object. In some embodiments, the client services and interfaces may provide interface methods or information for ordering or otherwise obtaining the indicated products or merchandise. Other information may also be included, such as links to websites, articles, discussion groups, blogs, forums and so on that may discuss the character or object within the context of the world of the media universe.

Note that, in addition to digital assets for 2D or 3D graphical elements such as characters and objects, the repository may also store digital assets for audio such as music, sound effects, voice tracks, etc. In some embodiments, in addition to providing contextual information about visual elements such as characters and objects, the client services and interfaces of the media universe system may leverage the digital asset repository and asset tracking database (or other sources) to provide contextual information about audio elements.

In some embodiments, the client services and interfaces of the media universe system may allow clients to create, customize, or modify digital objects within the media universe, and may allow the clients to store and access the digital objects, for example as digital assets in the digital asset repository. In some embodiments, the media universe system may allow clients to create or customize digital assets (e.g., characters) within one context or digital medium (e.g., within a game), store the digital assets to the repository, and then reuse or insert the clients' digital assets in other contexts or digital media (e.g., within other games or within videos such as movies or episodes). Note that, in addition to digital objects, digital assets may also include audio assets such as music, sound effects, etc. In some embodiments, the client services and interfaces of the media universe system may allow clients to create, customize, or modify audio elements for use within various digital media, and to store the custom audio assets to the repository.

In some embodiments, digital media (e.g., a video or a game) being provided to a client may include "hooks" via which digital assets that belong to or that are targeted at a particular client (or at particular groups of clients) may be inserted into the media. For example, in some embodiments, a client may create or customize one or more digital assets such as characters, weapons, tools, and so on. The client may then specify particular objects within particular digital media content (e.g., a movie) that are to be replaced with the client's digital assets. A new, personalized version of the digital media content may be rendered that includes the client's custom digital assets. In some embodiments, the personalized version of the digital media content may be stored for later viewing by the client, and may be shared with other clients. As another example, a client may customize a particular digital asset used within a video (e.g., a robot that appears in one or more scenes of a movie). During playback of the video to the client's device, the client services may access the client's customized digital assets, for example from the digital asset repository, and insert the digital assets into the video stream at an appropriate "hook". For example, a client's custom object or character (e.g., a custom robot) may be inserted at the location(s) of a default robot that appears in a movie.

In some embodiments, the media universe system may create and maintain identities, profiles and preferences of at least some clients. In some embodiments, different versions of particular digital assets may be maintained in the repository. Particular ones of the digital assets may be matched to particular clients according to the clients' identities, profiles and/or preferences. When streaming video (movies, games, etc.) to the clients' devices, the client services may access particular digital assets from the digital asset repository according to the clients' identities, profiles and/or preferences and insert the digital assets in the video stream at appropriate times and locations. For example, a default beverage can or bottle that appears in a scene may be replaced with a particular brand of beverage targeted at a particular client or group of clients, a default vehicle that appears in one or more scenes of a video or in one or more different videos may be replaced with a particular color, make, and/or model of vehicle, and so on.

In some embodiments, video frame content may be used to define the hooks at which digital assets can be inserted into digital media. A digital video frame may be composed of multiple layers that may be composited together. For example, a digital video frame may include one or more alpha mask layers that may correspond to particular video content and that may be used to insert particular objects rendered from respective digital assets into each frame. In some embodiments, a custom or targeted digital asset may be rendered and dynamically inserted into frames of the video using an alpha mask corresponding to an object in the video that corresponds to the digital asset.

In some embodiments, the client services and interfaces of the media universe system may provide, or may provide access to, a 3D printing service via which clients may obtain physical instances of their created or customized 3D digital assets within the game universe. For example, a client may create a customized version of a character that may appear in at least some digital media (movies, games, etc.) of the media universe; the customized character may be stored as a digital asset (e.g., as a 3D model) in the digital asset repository. As noted above, the customized character may be dynamically rendered into at least some digital media being streamed to the client. In some embodiments, the client services and interfaces may provide interface methods via which the client can access a 3D printing service to order a 3D printing of the character according to a 3D model of the character stored as a digital asset in the repository. The 3D printing service may, for example, be provided by or through a service provider that implements the media universe system, and that provides the client services and interfaces of the media universe system. Alternatively, a client may access a 3D printing service via a different interface (e.g., via a direct interface to the 3D printing service) and specify the client's digital asset in the repository to be printed. The 3D printing service may then access the repository to obtain the 3D model of the character for printing.

In some embodiments, the media universe system, via the client services and interfaces, may allow clients to interactively participate in and affect the world of the media universe. For example, as noted above, clients may create or customize digital assets such as characters, audio, and other objects and upload those digital assets to the digital asset repository. These created or customized digital assets may be rendered or inserted into digital media and streamed to the client. In addition, in some embodiments, a client may selectively insert customized digital assets into locations within digital media using "hooks" as previously described.

In some embodiments, a client's digital assets may also be viewed or accessed by other entities, including digital media developers and other clients. For example, a client's assets may be used in media content that is shared with the client's friends, or within a social network. The client's assets may initially be shared with relatively small groups, and if popular, over time may be shared with larger groups. Over time, the client's digital assets may become part of the "canon" of the media universe, may appear in other digital media within the universe, and may even evolve a storyline and history that may also become part of the canon. As another example, clients may be allowed to vote on or rate digital assets that are shared within groups such as social networks or digital assets that are stored in the repository and exposed to the clients. Highly rated or popular digital assets may, over time, become canon, or may be noticed by developers and used in new digital media based within the world of the media universe. As another example, a digital media developer may view the digital assets in the repository, and may choose to use a client's customized digital asset(s) in digital media being developed for general release to the public.

As another example of how clients may actively participate in and affect the world of the media universe, the media universe may include various multiplayer games that are developed by the digital media developers and that are set within the world of the media universe. These games may vary from tightly scripted games to games that introduce varying amounts of randomness to the game play. A multiplayer game may, for example, be a game in which the players (via in-game characters) attempt to achieve some goal or overcome some obstacle, and may include multiple levels that the players have to overcome. A multiplayer game may, for example, be a game in which the players cooperate to achieve goals or overcome obstacles, or a game in which one or more of the players compete against one or more other players, either as teams or as individuals. Alternatively, a multiplayer game may be a game in which the players may more passively explore and make discoveries within a complex game universe based on the world of the media universe without any particular goals in mind, or a "world-building" multiplayer game in which the players may actively modify their environments within the game universe. The multiplayer games may include everything from relatively simple, two-dimensional (2D) casual games to more complex 2D or three-dimensional (3D) action or strategy games, to complex 3D massively multiplayer online games (MMOGs) such as massively multiplayer online role-playing games (MMORPGs) that may simultaneously support hundreds or thousands of players in a persistent online "world".

In some embodiments, the media universe system may monitor multiplayer game play, and may capture and store game session content, for example digital media clips or video segments of episodes or events (e.g., epic battles) from multiplayer online games in which tens, hundreds, or even thousands of players participate. In some embodiments, at least some of the game session content may be stored as digital assets in the digital asset repository, and information about the content (e.g., a storyline, timeline, etc.) may be stored within the asset tracking database. Some of the game session content that is stored as digital assets may then be integrated into other media within the media universe by digital media developers. For example, portions or all of an epic battle may be used in, or adapted for use in, a book, movie or series set within the world of the media universe. As another example, characters, objects, environments, buildings and so on that are created or modified by players within the game universe may be stored as digital assets to the digital asset repository, with accompanying information stored in the asset tracking database, and may be integrated into other media within the media universe. Thus, storylines and events that occur in a game set within the MU world and that involve multiple (or single, in some cases) clients may become part of the canonical history of the world of the media universe. In addition, characters, objects, environments, and so on that are generated within a game may be integrated into the canon of the media universe.

The above describes examples where a storyline, object, character, setting or event that occurs or appears within a game is integrated into other digital media within the media universe. In some embodiments, scenarios, storylines, objects, characters, events, settings, and so on that occur within other digital media (e.g., within a movie or episode of a series set within the world of the media universe) may be integrated into a game set within the world of the media universe. For example, digital assets including events, settings, characters, objects, and so on from a movie set within the world of the media universe may be stored to the digital asset database and recorded in the asset tracking database, and may be integrated into a game set within the world of the media universe. Clients may then play the game to, for example, participate in an event from the movie, interact with objects or characters from the movie, explore settings from the movie, and so on. In some embodiments, a client's interactions with or participation in content from a movie or other digital media within a game environment may be stored as digital assets for the client to the digital asset repository. When the client plays other digital media (e.g., a movie) to the client's device, the client's digital assets may be inserted at relevant times and into relevant places within the content of the media. For example, if a client participates in a battle from a movie as a character in the game environment, when later watching the movie the client's character from the game may be inserted into the battle scenes, or snippets of fighting scenes from the game involving the client's character may be inserted into the battle scene.

In some embodiments, digital assets may include audio assets such as music, sound effects, etc. In some embodiments, audio assets may be created, customized, or selected by clients for use within digital media provided to the client. In some embodiments, client services of the media universe system may dynamically select particular audio (e.g., music tracks) for particular clients, for example according to client identities, profiles, and/or preferences. In some embodiments, the audio may be digital assets retrieved from the digital asset repository. Alternatively, in some embodiments, audio may be retrieved from a client's personal audio library for insertion into video content.

Figure 11:
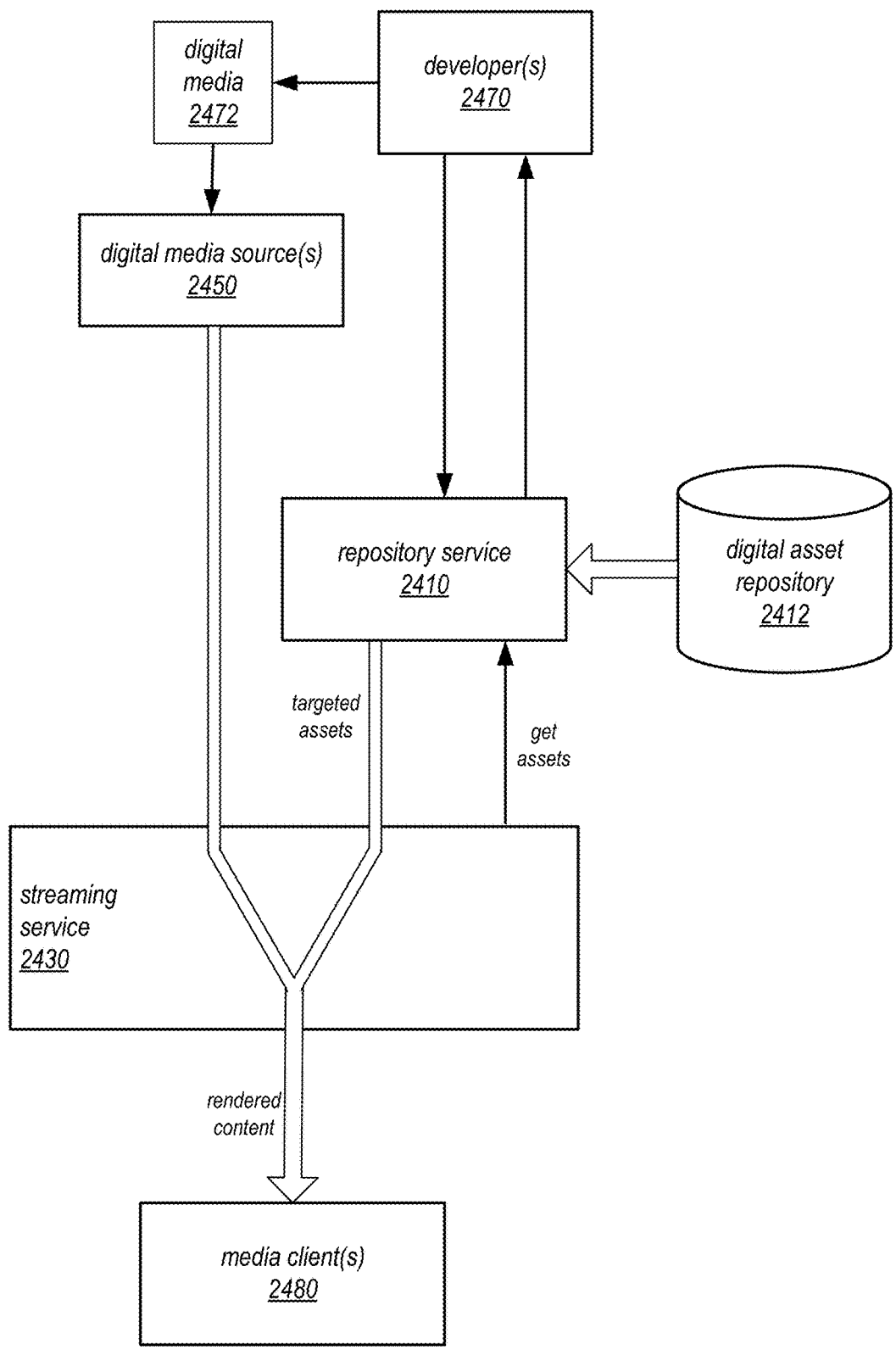
FIG. 11 is a high-level illustration of a repository service, according to at least some embodiments.

While digital assets are generally described as being stored to and retrieved from a digital asset repository maintained by and within a media universe system, in some embodiments at least some digital assets may be stored in and retrieved from other locations or entities. For example, a repository service may maintain an asset repository, and the service may be accessed by the media universe system to store digital assets to and/or obtain digital assets from the repository. FIG. 11 shows an example repository service that may be used in embodiments. As another example, a client or developer may store digital assets to storage owned or otherwise controlled by the client/developer, and the media universe system may access digital assets from the client's or developer's storage.

While embodiments of an MU system are generally described herein as generating two-dimensional (2D) video content for clients to be displayed on the clients' devices, in some embodiments the MU system may instead or in addition generate three-dimensional (3D) video according to one or more 3D video formats as output, for example 3D video that is viewable via 3D-capable displays, virtual reality (VR) goggles or headsets, helmets, and so on.

Media Universe Content and Asset Management

Much media produced today, including but not limited to movies, shorts, cartoons, commercials, television and cable programs, and games, is at least partially generated using two-dimensional (2D) or three-dimensional (3D) computer graphics techniques. For example, modern animated movies are typically generated using various 3D computer graphics techniques as implemented by various 3D graphics applications to generate 3D representations or models of scenes, and then applying 3D-to-2D rendering techniques to render two-dimensional (2D) representations of the 3D scenes. As another example, scenes in some video such as movies may be generated by filming live actor(s) using green- or blue-screen technology, and filling in the background and/or adding other content or effects using one or more 3D computer graphics techniques. Large amounts of 2D or 3D graphics data may be used in generating and rendering scenes for video (e.g., for movies or games) according to computer graphics techniques. Note that this graphics data may be used in 2D or 3D rendering of video content according to different production techniques, for example in producing fully rendered, animated video content according to computer graphics techniques as well as in producing partially rendered video content that involves filming live action using green- or blue-screen technology and filling in the background and/or adding other content or effects using one or more computer graphics techniques. For a given scene, this graphics data may include, but is not limited to, 2D or 3D object model data such as object frames or shapes (e.g., wire frames), wraps for the frames, surface textures and patterns, colors, animation models, and so on, that is used to generate models of objects for the scene; general scene information such as surfaces, vanishing points, textures, colors, lighting sources, and so on; information for global operations or effects in the scenes such as illumination, reflection, shadows, and simulated effects such as rain, fire, smoke, dust, and fog; and in general any information or data that may be used in generating a modeled world for the scene and in rendering 2D representations of the world (e.g., video frames) as video output. Instead of or in addition to generating 2D video as output, three-dimensional (3D) video may be rendered according to one or more 3D video formats and provided as 3D video output.

Within the context of a media universe, while a given entity (e.g., individual, corporation, media studio, etc.) may own or control content of the world of the media universe, for example via copyright or other intellectual property (IP) ownership, various content creators may generate works in various media including but not limited to movies, television shows, cartoons, anime, and games with content or storylines set within the world of the media universe, for example under licensing or other agreements. As noted above, video content may at least be partially generated using two-dimensional (2D) or three-dimensional (3D) computer graphics techniques, and thus using 2D or 3D graphics data. The 2D and/or 3D graphics data that may be used within a media universe may be referred to as digital assets of the media universe. Digital assets within a media universe may include, but are not limited to, 2D or 3D objects or object models, 2D or 3D environments, scenes, textures, backgrounds, etc. Note that digital assets may also include other digital content including but not limited to audio assets such as music, sound effects, etc. Generally speaking, a digital asset may be any digital content that may be used in digital media. Conventionally, there has been no easy method for content creators to collaborate and share digital assets for use in various works (movies, games, etc.) set within the world of a media universe.

Embodiments of methods and apparatus for managing and sharing digital assets within a media universe are described. In some embodiments, a digital asset repository may be provided that contains pre-rendered objects and/or objects that can be accessed and rendered "on the fly" (dynamically) in a virtual world rendered by a media universe (MU) system that leverages network-based computing resources and services. In some embodiments, the repository may be implemented as or by a service that presents an application programming interface (API) or APIs for locating, creating, modifying, uploading, and downloading digital assets. The repository may allow digital media developers and clients to share and re-use digital assets within a media universe that contains digital media (e.g., movies, episodes, games) based within the virtual world, and may help provide continuity of content (or "canon") within the media universe. In some embodiments, the digital media may include hooks, default objects, or blanks that can be filled or replaced with digital assets retrieved from the repository, for example to dynamically customize content for particular viewers or groups of viewers or to target content at particular viewers or groups.

FIG. 1 is a block diagram illustrating a network environment for managing and sharing digital assets in a media universe (MU), according to at least some embodiments. In some embodiments, two or more digital media developers 160 may cooperate to create or modify various digital media 170 (e.g. movies, games, television shows, etc.) set within the world of a media universe for consumption by MU clients 180 via various communications and media channels. While not shown in FIG. 1, in some embodiments, digital media 170 may be stored by media universe system 110 on provider network 100, or may be stored elsewhere on provider network 100, and may be accessed and viewed by clients 180 according to one or more provider network services 102. For example, one digital media developer 160 may be the creator, controller or owner of the intellectual property with respect to the world of the media universe and may produce media such as movies or television series based on or in the world of the media universe, and may through mutual agreement or licensing allow one or more other developers 160 to produce digital media 170 (e.g., games, movies, television shows, etc.) set within the world of the media universe.

In some embodiments, a media universe (MU) system 110 may be implemented in the context of a service provider that provides virtualized resources (e.g., virtualized computing resources 120, virtualized storage resources 118, virtualized database (DB) resources 122, etc.) on a provider network 100 to clients of the service provider. In some embodiments, the MU system 110 may be implemented on the provider network 100, for example as or on a virtualized private network on the provider network 100, and may be accessed by one or more of the digital media developers 160 via one or more provider network services 102, for example to obtain, create, modify, and/or store digital media 170, digital assets, or other MU content. In some embodiments, the MU system 110 may also be accessed by one or more MU clients 180 via provider network services 102, for example to access, create, modify, and/or store digital assets. In some embodiments, the MU system 110 may also be accessed by one or more other enterprises 190 via provider network services 102.

In some embodiments, the MU system 110 may include a digital asset repository 116, for example implemented as or on one or more storage resources 118 according to a storage service 102 of the provider network 100. In some embodiments, the MU system 110 may include an asset tracking 112 component, module, or service that manages and tracks digital assets within the media universe. The asset tracking 112 component may, for example, be implemented on or by one or more computing resources 120 and one or more DB resources 122. Storage resources 118 and/or DB resources 122 may, for example, be implemented via one or more storage services 102 according to one or more storage virtualization technologies that provide flexible storage capacity of various types or classes of storage to clients of the provider network. Computing resources 120 may, for example, be provisioned via one or more virtualized computing services 102 according to hardware virtualization technology that enables multiple operating systems to run concurrently on a host computer, i.e. as virtual machines (VMs) on the host.

In some embodiments, the MU system 110 may be accessed by digital media developers 160 via provider network services 102, for example to locate, store, retrieve, share, or otherwise manage digital assets (e.g., 2D or 3D objects or object models, 2D or 3D environments, scenes, textures, backgrounds, music, sound effects, etc.) in digital asset repository 116. For example, a movie developer 160 may generate digital assets for use in a movie, and store at least some of the digital assets in repository 116 via provider network services 102. A game developer 160 may then locate and download particular ones of the digital assets from the repository 116 for use within a game under development.

In some embodiments, asset tracking 112 may store and manage a database that includes metadata about the digital assets of the media universe stored in repository 116. In addition to general description information (e.g., creator, timestamp, name, type, etc.) for a given digital asset, this metadata may also include contextual, historical, relationship, dimensions, capabilities, locations, timelines, and/or other information for the given asset with respect to the world of the media universe that may be used by developers 160 to maintain continuity and "canon" within the media universe. As a non-limiting example, in a science fiction media universe, a 3D model or models of a particular spaceship may be stored in the repository 116, and asset tracking 112 may store information indicating date of manufacture and date of destruction/decommission (if any) for the spaceship; episodes, movies, games, scenarios, actions, etc. that the spaceship has appeared in; known locations of the spaceship at various times within the MU world's timeline; crews/captains of the spaceship at various times; and in general any information that may be used by developers 160 when selecting assets for use within the scenarios or stories under development. As another example, 2D and/or 3D models or representations of characters within the world of the media universe may be stored in the repository 116, and asset tracking 112 may store contextual, historical, relationship, capabilities, locations, timelines, and/or other information about the characters that may be used by developers 160 when using characters within the scenarios or stories under development. In some embodiments, this asset tracking information may more generally be accessed and used as an information source for the world of the media universe by any developer, writer, or other creative entity that is developing or creating works based within the world of the media universe.

In some embodiments, a developer 160 may update an asset tracking 112 database when uploading a new asset to repository 116 or when modifying an existing asset in repository. For example, if a developer 160 uses a particular asset in a movie, the developer 160 may update the asset tracking 112 database to indicate new information about the asset as used in the movie. For example, if the asset is a 3D model of a spaceship in a science fiction universe, and the spaceship is destroyed in the movie, then the asset tracking 112 database may be updated to indicate that the spaceship was destroyed, as well as how, when and where the spaceship was destroyed. Similarly, information on a character may be updated in the asset tracking 112 database based on the character's use within a movie or within other digital media content.

In some embodiments, the MU system 110 may store digital assets representing many versions, views, or renditions of various characters or objects within the world of the media universe in repository 116, and asset tracking 112 may maintain information describing each of the digital assets. For example, digital assets representing various versions of a particular spaceship in a science fiction universe may be stored in repository 116, with information in asset tracking 112 describing each version. As another example, digital assets representing different views of a given character in an MU world may be stored in repository 116; for example the digital assets may show the character in different costumes, in different positions, at different ages, with different accessories, and so on. In some embodiments, the digital assets for a given object or character maintained in repository 116 may be used in identifying new digital content. For example, a client 180 or developer 160 may create or customize a character or object for the world of the media universe. The media universe system 110 may provide an interface via which the new digital asset may be submitted, and may implement digital asset evaluation technology that may examine the new asset for quality, and that may compare the new asset to digital assets of the world of the media universe stored in the repository 116 for identification and for maintaining continuity. The media universe system 110 may, for example, identify the new digital asset as an acceptable version or rendering of a particular known character or object within the world of the media universe via the examination and comparison. This information may, for example, be used in granting licensing for the digital asset to a client 180 or developer 160, for example licensing to manufacture physical renderings or reproductions of the digital asset, or to provide renderings or reproductions of the digital asset in digital or other media. In some cases, the media universe system 110 may identify a submitted digital asset as an unacceptable rendition of a know character or object, or as unacceptable for other reasons within the world of the media universe, via the examination and comparison, for example due to quality, copyright, or content issues. In these cases, licensing may be denied, the digital asset may be rejected and not stored to repository, or other actions may be taken.

In some embodiments, the MU system 110 may also be accessed by one or more MU clients 180 via provider network services 102, for example to obtain copies of particular digital assets from repository 116 for customization or use in other contexts, or to upload client-created digital assets or client-customized versions of particular digital assets to repository. In some embodiments, the asset tracking 112 database may be updated to indicate the client-created or modified digital assets.

In some embodiments, the asset tracking 112 database may track canonical status of digital assets in repository 116. For example, digital assets that are well-established and well-known within the world and storylines of the media universe may be considered (and marked) as canonical. Other digital assets that have been created within the media universe by developers 160 or clients 180 but that are not necessarily considered to be part of the canonical history and storylines of the universe may be considered non-canonical assets. In some embodiments, digital assets that have been created for or by particular clients 180 may be considered custom or personalized assets (and non-canonical as well) that are generally used only in the context of respective clients' 180 views of the digital media 170 (see, e.g., FIG. 2).

Embodiments of the media universe system 110 may allow digital media developers 160 to focus on their core competencies (filmmaking, game development, etc.) without having to worry about managing their digital assets. In addition, embodiments of the media universe system 110 may enable the developers 160 to more easily create new digital media 170 within the media universe by re-using digital assets created for other media 170 projects without having to re-create the digital assets themselves from scratch. In addition, embodiments of the media universe system 110 may help the developers in maintaining continuity within a media universe by providing a centralized, common source for information about the world of the media universe.

While not shown in FIG. 1, in some embodiments, media universe system 110 may also maintain and store other information about the world of the media universe. As previously mentioned, an MU world may include its own histories, storylines, environments, locations, civilizations, characters, objects, technologies, flora, fauna, languages, rules, and so on. In some embodiments, the media universe system 110 may be used to store database(s) including information of one or more of these aspects of the world of the media universe. Collectively, all of the information stored and maintained by the media universe system 110 regarding the MU world, including the asset tracking 112 database, the digital asset repository 116, and the database(s) or other stores or repositories of histories, storylines, environments, locations, civilizations, characters, objects, technologies, flora, fauna, languages, rules, etc. of the MU world may be referred to as a media universe database, or MU database 300. FIGS. 3A through 3C illustrate example aspects of an MU database 300, according to at least some embodiments. In at least some embodiments, the media universe system 110 and/or provider network services 102 may provide interfaces and methods for viewing, searching, editing, and otherwise maintaining the MU database 300.

In some embodiments, at least some MU clients 180 may be allowed access to at least some digital assets in repository 116, and in some embodiments to at least some other content of the MU database 300. However, in some embodiments, the media universe system 110 may provide methods via which at least some portions or content of the MU database 300 may be secured or hidden, and via which access to some or all of the content in the MU database 300 may be controlled. For example, in at least some embodiments, at least some digital assets in repository 116 may be view-only or read-only for at least some clients 180, or alternatively may be hidden from or inaccessible by at least some clients 180. For example, when one or more developers 160 are developing new digital media 170 for the media universe, and are collaborating and sharing new digital assets via repository 116, the media universe system 110 may provide methods via which these digital assets (and metadata in the asset tracking 112 database) may be secured and hidden from the general public, and only accessed by authenticated and authorized agents of the developers 160.

In some embodiments, the MU system 110 may also be accessed by one or more other enterprises 190 via provider network services 102. Enterprises 190 may, for example, include online merchants, manufacturers, retailers, or the like, or in general any enterprise or entity that may be interested in acquiring digital assets representing content (e.g., characters, objects, etc.) of the media universe, or licensing rights to content of the media universe. An enterprise 190 such as an online merchant or manufacturer may, for example, access MU system 110 to examine or locate digital assets using asset tracking 112, and/or to obtain usage rights including but not limited to licensing rights to manufacture physical renderings or reproductions of a selected digital asset or assets, or combinations of two or more component assets, or to provide renderings or reproductions of the asset(s) in digital media or other media, or to offer the digital assets themselves for sale or use through retail or other channels. In some embodiments, the MU system 110 may implement a digital licensing layer that may, for example, be used to grant potential licensors 190 permission to find and possibly license digital assets for the production of merchandise based on content (e.g., characters or objects) from the world of the media universe.

As previously mentioned, the MU system 110 serves as a central continuity database for the world of the media universe, and may provide tools or methods for maintaining quality of the digital assets (e.g., 2D or 3D models of characters, objects, or other content) in the repository 116. For example, the MU system 110 may implement digital asset evaluation technology that may examine new digital assets to ensure quality, and that may compare new digital assets to existing digital assets of the world of the media universe stored in the repository 116 for identification and for maintaining continuity. Thus, via the MU system 110, an enterprise 190 may obtain high-quality 2D or 3D models of "canonical" characters, objects, or other content from the world of the media universe that may be used to manufacture accurate, quality reproductions or renderings of the content for sale or for other purposes.

Example Use Cases

Two or more digital media developers 160 may collaborate to develop and market digital media 170 (e.g., movies, games, television shows, etc.) within a media universe over a time period. These digital media 170 may require the creation of a large number of 2D and/or 3D digital assets. These digital assets (e.g., characters, objects, vehicles, environments, etc.) may serve as building blocks for the digital media 170. The digital assets within a large media universe may number in the hundreds of thousands, or even in the millions. Conventional systems for managing digital assets generally do not allow for easy collaboration and sharing, resulting in duplicated assets and other inefficiencies.

In embodiments, a service provider, via a provider network 100, services 102, and resources (e.g., computing 120, DB 122, and storage 118 resources) may provide a centralized, scalable digital asset management toolset and digital asset repository for building and sharing 2D and 3D digital assets for use in various digital media 170. A media universe system 110 implemented on the provider network 100 may provide the toolset and a large, scalable, centralized searchable library of digital assets built in collaboration among the media developers 160 according to the toolset. This may allow for more rapid creation and collaboration on digital media 170 such as movies, video games, TV shows, animatic shorts, and interactive media. Further, hosting this large library of digital content on a provider network 100 may facilitate development of other forms of network-based entertainment that leverage the services 102 provided by the service provider to media universe clients 180.

Embodiments of the media universe system 110 may allow digital media developers 160 to co-author digital assets. As a result, everything from characters to objects to 2D or 3D environments may be shared in a secure repository 116. For example, a game developer 160 may find the same model used for an object or vehicle within a movie, and re-use the model for a level in their game under development.

In some embodiments, an asset tracking 112 component of the media universe system 110 may be used to track how all of the digital assets relate to one another over time within the world of the media universe. An asset tracking 112 database and digital asset repository 116, possibly in combination with other information maintained by asset tracking 112 component of system 110, may serve as a centralized continuity database for the world of the media universe. Providing an accessible, scalable, network-based location for the continuity database may enable developers 160 to build interactive experiences for users (e.g., clients 180) to explore the world of the media universe (both spatially and temporally).

Customizing Client Experiences within a Media Universe

Embodiments of methods and apparatus for providing interactive and customized experiences to customers (also referred to as clients, users, viewers, or players) of a media universe are described. Embodiments of a media universe (MU) system may leverage network-based computation resources and services, for example a streaming service, and a digital asset repository or repository service to dynamically provide customized and customizable experiences to clients of a media universe. Clients may create or modify digital assets (e.g., 3D models of characters, objects, etc.), which may be stored to the asset repository. The MU system may dynamically render digital media content of the media universe (e.g., movies, games, etc.) that includes the clients' custom digital assets (characters, objects, backgrounds, etc.) inserted into appropriate locations, and stream the dynamically customized content to respective client devices. Effectively, a client layer of content is overlaid on a base layer of content (e.g., a media universe database) within digital media of the media universe.

Figure 2:
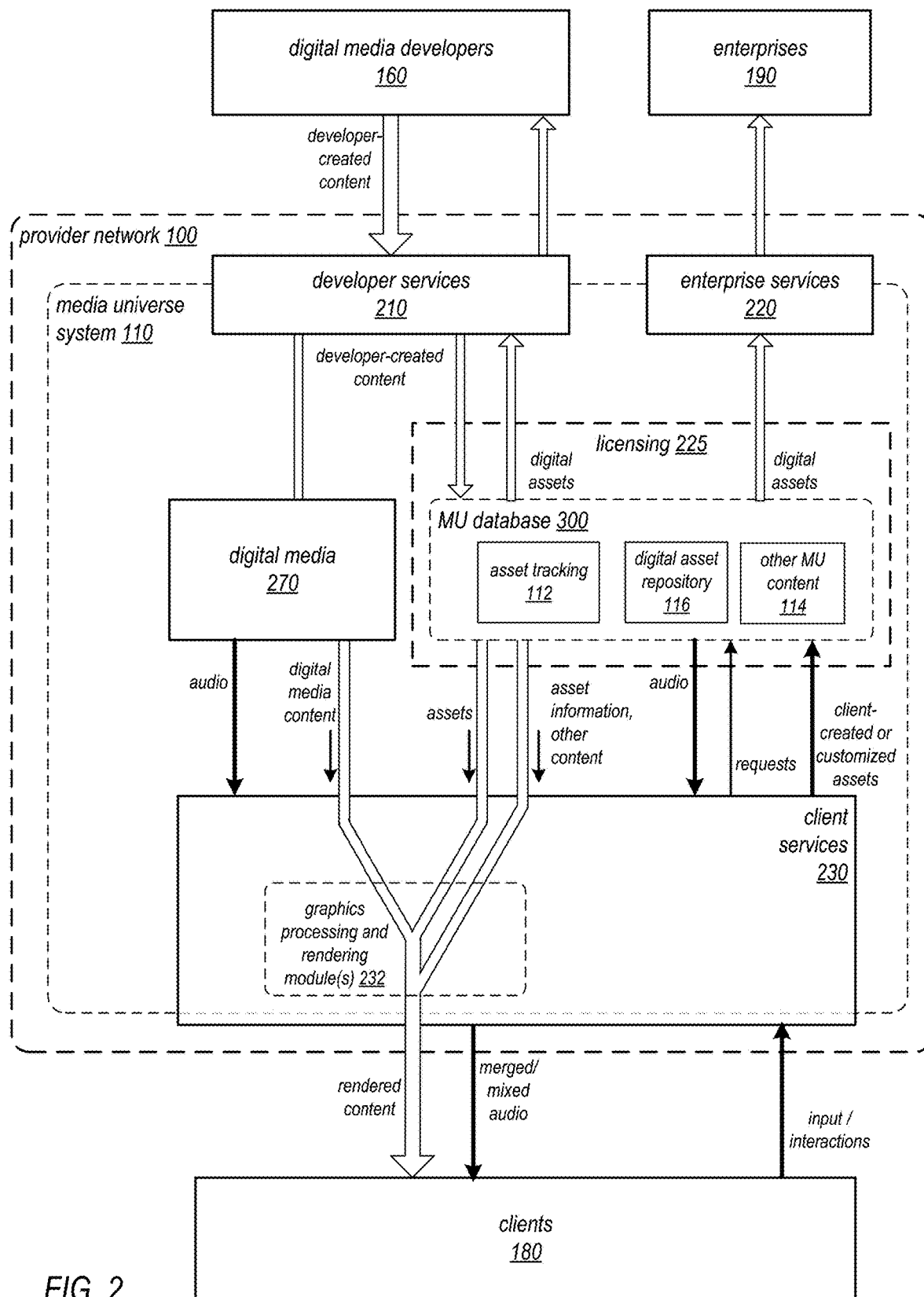
FIG. 2 is a high-level illustration of a media universe (MU) system implemented within a provider network, according to at least some embodiments.

FIG. 2 is a high-level illustration of a media universe (MU) system 110 implemented within a provider network 100, according to at least some embodiments. Digital media developers 160 may leverage developer services 210 to generate digital media 270 (e.g., video, movies, games, television shows, etc.) and to obtain, generate, modify, share, and manage digital assets (e.g., 2D or 3D models of objects, characters, etc.) that may be used within digital media 270. Digital assets may, for example, be maintained according to a digital asset repository 116 and asset tracking 112 database that are part of or maintained within a media universe (MU) database 300 along with other MU content 114, for example as illustrated in FIG. 1. As previously mentioned, the MU system 110 may serve as a central continuity database for the world of the media universe, and may provide tools or methods for maintaining quality of the digital assets. Via the developer services 210, a developer 160 may obtain digital assets such as high-quality, canonical 2D or 3D models of characters, objects, or other content from the world of the media universe that may be used to generate accurate, quality renderings of the content in various digital media. In some embodiments, developer services 210 may implement or leverage a digital asset licensing layer or service 225 that may, for example, be used to grant developers 160 permission to find and possibly license digital assets for the production of digital media that includes or is based on content (e.g., characters or objects) from the world of the media universe.

Digital media clients 180 may leverage client services 230 to access particular digital media 270 for viewing on the clients' devices. Examples of client devices may include, but are not limited to, televisions, set-top boxes coupled to video monitors or televisions, cable boxes, desktop computer systems, laptop/notebook computer systems, multifunction devices, pad/tablet devices, smartphone devices, game consoles, and handheld or wearable video viewing devices. Wearable devices may include, but are not limited to, glasses or goggles, headsets, helmets, and "watches" or the like that are wearable on the wrist, arm, or elsewhere. In addition, in some embodiments, the MU system 110 may generate three-dimensional (3D) digital media according to one or more 3D digital media formats instead of or in addition to 2D digital media, and the client devices may include devices configured to display 3D digital media content instead of or in addition to 2D digital media content, for example 3D glasses, virtual reality (RV) headsets, and 3D-capable display devices. An example computing device that may be used as a client device is illustrated in FIG. 28.

In some embodiments, digital media clients 180 may leverage client services 230 to modify existing or generate new digital assets (e.g., 2D or 3D models of objects, characters, digital audio, etc.) that may be used within digital media 270, and/or to modify or customize existing digital assets (e.g., 2D or 3D models of objects, characters, digital audio, etc.) accessed from a digital asset repository 116. While not shown in FIG. 2, in some embodiments, a design module and design interface may be implemented on the client 180 device via which the client may design, create, and modify digital assets (e.g., 2D or 3D models of objects, characters, digital audio, etc.) for uploading to the media universe system 110. Alternatively, in some embodiments, the design module may be implemented by the media universe system 110 on the provider network 100 to leverage the computational power provided by the provider network-based computation resources, with a design interface to the design module on the client 180 device.

In some embodiments, the design module and interface may allow the client 180 to specify design elements and features for custom digital assets. In some embodiments, the design module and interface may allow the client 180 to design or construct new digital assets from scratch, or to assemble new digital assets from other digital assets obtained from the digital asset repository or from other sources. For example, in some embodiments, the digital asset repository 116 may maintain a collection of parts for objects such as robots, and a client may select parts from the collection and assemble the parts into a custom object (e.g., robot). In some embodiments, the design module and interface may allow the client 180 to further customize a digital asset, for example by painting the asset, scaling the asset up or down, applying stickers or logos to the asset, adding sound effects to the digital asset, and so on. In some embodiments, the design module and interface may allow a client 180 to obtain or capture a 2D or 3D image of the client's face (or of other physical objects) and "wrap" digital assets in the image. For example, a client 180 may wrap a character's head in a 3D image of the client's face.

In some embodiments, the media universe system 110 may provide methods and interfaces via which a client 180 can share assets including custom digital assets with other clients 180. For example, in some embodiments, each digital asset may have metadata specifying access permissions, and the media universe system 110 may allow a client 180 to set access permissions for the client 180's digital assets so that specified other clients 180 or groups of clients 180 can access the digital assets. In some embodiments, the interface may allow the client 180 to set specific levels of permissions (e.g., read, write, copy, delete, etc.) for specific assets, and/or to set specific levels of permissions (e.g., read, write, copy, delete, etc.) for specific other clients 180. In some embodiments, the design module and interface may allow two or more clients 180 to share digital assets, and to cooperate or collaborate in constructing new assets from scratch, assembling new assets from component assets, and/or modifying existing digital assets via the design module and interface.

In some embodiments, MU system 110 may allow a client 180, via client services 230, to access digital media 270 (e.g., video such as movies, games, etc.) for display on the client 180's device. In some embodiments, MU system 110 may leverage network-based computation resources and services, for example a streaming service, to dynamically render digital content (e.g., video or games) for streaming to clients 180. In some embodiments, MU system 110 may leverage network-based computation resources and services, for example a streaming service, to insert digital assets or other digital content, for example client-targeted or client-custom digital assets (models of objects, characters, avatars, etc.), into digital media content and dynamically render and stream targeted or customized digital content to the clients 180. For example, in some embodiments, digital media 270 (e.g., a video or a game) being provided to a client 180 may include "hooks" via which digital assets, for example assets that are targeted at the particular client 180 (or at particular groups of clients 180) or customized by the particular client 180, may be inserted into digital media content. In some embodiments, MU system 110 may implement graphics processing and rendering module(s) 232, for example implemented on network-based computation resources provided by the provider network 100 services, that implement various graphics processing and rendering technology to dynamically merge digital media content from digital media 270 with assets, asset information, and other MU content from MU database 300, and to dynamically render new digital content for streaming to the clients 180.

In some embodiments, in addition to module(s) 232 dynamically merging digital media content from MU database 300 with digital media content from a digital media 270 source, the MU system 110 may include one or more other components or modules that may merge, overlay, mix, or replace digital audio content from a digital media 270 source with digital audio content from MU database 300 (e.g., a client's custom soundtrack, sound effects, etc. that are stored as digital assets in repository 116). In some embodiments, other types of assets or content than graphical and audio content may also be merged or blended by one or more modules and provided to clients(s) 180.

In some embodiments, video frame content may be used to define the hooks at which digital assets can be inserted into digital media. A digital video frame may be composed of multiple layers that are composited together. For example, one or more alpha mask layers may be used to insert particular objects rendered from respective digital assets into each frame. In some embodiments, a custom or targeted digital asset may be rendered and dynamically inserted into frames of the video using an alpha mask corresponding to an object in the video that corresponds to the digital asset.

For example, a client 180 may create or customize a particular digital asset that models an object or character that appears within a video. During playback of the video to the client 180's device, the client services 230 may access the client 180's digital asset from the repository and insert the digital asset in the video stream. As a non-limiting example, a client 180 may assemble a custom version of a robot that appears within the media universe from parts (digital assets) and store the custom robot as a digital asset to the digital asset repository for the media universe. When playing back a video or playing a game that includes the particular robot or a similar robot, the client services 230 may get the custom robot digital asset from the repository, render video including the custom robot, and stream the rendered video to the client 180's device. As another example, particular versions or models of digital assets used in digital media 270 may be determined for and targeted to particular clients 180 or groups of clients 180, for example according to identities, profiles, and/or preferences of the clients 180 generated and maintained by the MU system 110. In some embodiments, information (e.g., preferences, viewing history, shopping history, sex, age, location, and other demographic and historical information) may be collected for or from clients 180 by the MU system 110, or may be accessed from other information sources or providers. This information may be used to generate and maintain client profiles. The client profiles may be accessed by client services 230 according to identities of the client(s) 180 when accessing at least some digital media 270 within the media universe, and used by client services 230 to dynamically and differently render one or more objects in one or more scenes that are targeted at particular clients 180 or client 180 groups according to their respective profiles.

As previously noted, in some embodiments, MU system 110 may allow a client 180 to create custom digital assets and insert the assets into digital media. These custom digital assets may, for example, include characters, robots, or other entities that have a viewpoint within the 3D world of the digital media into which they are inserted. In some embodiments, a client may choose to view digital media (e.g., a movie) from the viewpoint of a digital asset that the client has inserted into the digital media (or from the viewpoint of other digital assets, e.g. characters, within the digital media).

In some embodiments, the video may be differently rendered for the client based on the viewpoint of the digital asset and/or on the type of viewing apparatus, e.g. image sensors or cameras, used by the digital asset. For example, a robot may have a black-and-white imaging system, and viewing a scene from the robot's perspective may cause the video to be rendered in grayscale.

In some embodiments, MU system 110 may allow a client 180, via client services 230, to pause and "step into" a scene in a video (e.g., a movie) to explore the rest of the 3D modeled world "behind the scenes". In at least some embodiments, the MU system 110 may play back video to a client 180, receive user input/interactions within a scene, obtain digital assets from the digital asset repository 116 of MU system 110 in response to the user input/interactions exploring the scene, render new video content of the scene at least in part from the digital assets obtained from the digital asset repository 116, and deliver the newly rendered video content to the respective client 180. Thus, rather than just viewing a pre-rendered scene in a video, a client 180 may pause, step into and explore the scene.

Since dynamically rendering digital media 270 is computationally expensive, at least some embodiments of an MU system 110 may leverage network-based computation resources and services (e.g., a streaming service) to receive user input/interactions within a scene being explored from a client 180 device, responsively generate or update a 3D model from the digital media 270 input and digital assets in response to the user input/interactions, render new video content from the 3D model, and deliver the newly rendered video content as a video stream to the client 180 device in real-time or near-real-time and with low latency. The computational power available through the network-based computation resources, as well as the video and audio streaming capabilities provided through a streaming protocol, may allow the MU system 110 to provide low-latency responses to the client 180's interactions with the 3D world as viewed on the respective client 180 device, thus providing a responsive and interactive exploratory experience to the user. FIG. 12 illustrates an example MU system and environment in which network-based computation resources are leveraged to provide real-time, low-latency rendering and streaming of video content, according to at least some embodiments. FIG. 13A illustrates an example network-based environment in which a streaming service is used to stream rendered video to clients, according to at least some embodiments. FIG. 14 illustrates an example provider network environment in which embodiments of an MU system as described herein may be implemented. FIG. 28 is a block diagram illustrating an example computer system that may be used in some embodiments.

In some embodiments, one or more enterprises 190 (online merchants, manufacturers, retailers, etc.) may leverage enterprise services 220 provided by the media universe system 110 to acquire digital assets representing content (e.g., characters, objects, etc.) of the media universe, or licensing rights to content of the media universe. An enterprise 190 such as an online merchant or manufacturer may, for example, access digital assets via enterprise services 220 to examine or locate particular digital assets, and to obtain usage rights including but not limited to licensing rights to manufacture physical renderings or reproductions of a selected digital asset or assets, or combinations of two or more component assets, or to provide renderings or reproductions of the asset(s) in digital media or other media, or to offer the digital assets themselves for sale or use through retail or other channels.

In some embodiments, enterprise services 220 may implement or leverage a digital asset licensing layer or service 225 that may, for example, be used to grant potential licensors 190 permission to find and possibly license digital assets for the production of merchandise based on content (e.g., characters or objects) from the world of the media universe. Via the enterprise services 220, an enterprise 190 may obtain high-quality, canonical 2D or 3D models of characters, objects, or other content from the world of the media universe that may be used to manufacture accurate, quality reproductions or renderings of the content for sale or for other purposes.

While FIGS. 1 and 2 show digital asset repository 116 and asset tracking 112 as implemented within the MU system 110 and on provider network 100, in some embodiments digital asset repository 116 and/or asset tracking 112 may be implemented at least in part external to media universe system 110 on provider network 100, or external to provider network 100 on one or more other networks. For example, in some embodiments, at least part of digital asset repository 116 may be implemented on one or more networks of digital media developers 160.

Client-Generated Content within a Media Universe

Embodiments of methods and apparatus for generating and leveraging client-generated content within a media universe are described. Embodiments of a media universe (MU) system may leverage network-based computation resources and services, for example a streaming service, and a digital asset repository or repository service to allow clients of a media universe to generate content, and to apply the client-generated content in various digital media of the media universe. Collectively, all of the information stored and maintained by a media universe system regarding an MU world, including but not limited to a digital asset repository and asset tracking database as illustrated in FIGS. 1 and 2, may be referred to as a media universe database, or MU database. The MU database may include a base or canon layer. In some embodiments, one or more other layers including a client layer may be overlaid on the base layer to help provide or enable an immersive client experience.

In some embodiments, clients may participate within the media universe, for example to create customized digital assets including characters and objects, participate in games (e.g., MMOGs) set within the universe using their customized digital assets, and so on. Client-generated content (e.g., customized objects, events or actions within games, etc.) may be dynamically integrated into digital media based within the media universe, for example by leveraging a digital asset repository or repository service to store the client-generated content, and network-based computing resources and services to dynamically insert the content into digital media for streaming to the clients. For example, a client may participate as a character in a battle within a game, and a movie or episode set within the media universe may incorporate scenes from the battle that include the client's character and the character's actions within the game. Client-generated content may be promoted to canon within the MU database, for example by community (e.g., social network) voting, popularity, ratings systems, and so on. For example, a client-designed 3D model of an object or character of the MU world may be promoted from the client's personal layer to an intermediate layer or to the base layer of the MU database if popular, for example among members of a social network. As another example, a scenario played out in a game by a community of players may be promoted to an intermediate layer that is exposed to a wider community of players or views, and over time may be promoted to be a canonical story or part of a canonical storyline within the world of the media universe, and thus may be exposed to all members of the community associated with the media universe.

FIGS. 3A through 3C graphically illustrate aspects of a media universe (MU) database 300 that may be maintained within a media universe system, according to at least some embodiments. FIG. 3A illustrates example content of an MU database 300, according to some embodiments. Referring to FIGS. 1 and 2, in some embodiments, media universe system 110 may maintain and store a large collection of various information about the world of the media universe. For example, an MU world may include its own histories, storylines, environments, locations, civilizations, characters, objects, technologies, flora, fauna, languages, rules, and so on. As another example, works (various digital media such as movies, shows/series, books, and so on) may be associated with the media universe. As another example, studios, actors, directors, writers, producers, composers, musicians, technicians and other persons or entities associated with digital media production may be associated with the media universe. In some embodiments, the media universe system 110 may be used to store database(s) or other data repositories each including information for or about one or more of these aspects or other aspects of the world of the media universe.

Collectively, all of the content, data, and information stored and maintained by the media universe system 110 regarding the world of the media universe, including the asset tracking 112 database, the digital asset repository 116, and the database(s) of histories, storylines, environments, locations, civilizations, characters, objects, technologies, flora, fauna, languages, rules, works, entities, etc. of the world of the media universe (shown as other MU content 114 in FIG. 2) may be referred to as a media universe database, or MU database 300. In some embodiments, the MU database 300 may include indications of or references or links to other sources of content or information about the world of the media universe, such as websites, vendors, and so on. In some embodiments, the media universe system 110 and/or provider network services 102 may provide interfaces and methods for viewing, searching, editing, and otherwise maintaining the various objects, data, and information in the MU database 300.

FIG. 3B illustrates correlating digital assets with other content and information in the MU database 300, according to some embodiments. In some embodiments, an asset tracking 112 component, module or service as shown in FIGS. 1 and 2 may maintain asset tracking information that may be used to associate particular digital assets or groups of assets with other MU content (e.g., particular characters or objects of the MU world, storylines or histories, particular works (e.g., movies, episodes, etc.), particular entities (e.g., actor(s) that have portrayed or voiced a character), and in general to any other information that may be related to a particular digital asset. In some embodiments, the MU database 300 and asset tracking 112 functionality may be used in providing contextual information to clients 180. For example, as illustrated in FIGS. 4A through 4C and 5A through 5C, a client 180 may interact with particular content (e.g., a particular object or character) of digital media being streamed to and displayed on the client's device to manipulate or obtain more information about the content. In some embodiments, the client interactions with the content may, for example, include touches and/or gestures according to touchscreen technology of the client device, and/or voice commands or requests according to audio/voice technology of the client device. The interactions may be processed by client services 230 as illustrated in FIG. 2, which may determine an identity of the content (e.g., a particular character or object of the world of the media universe) that the client 180 is interacting with and query asset tracking 112 to obtain a digital asset corresponding to the content for rendering and/or to obtain information about the particular content for display.

In some embodiments, asset tracking 112 maintains asset tracking information that maps particular digital assets to other MU content and vice versa. For example, asset tracking information describing various 3D models of a character in the world of the media universe may include mappings to other sources of information about, or other MU content related to, the character. The mappings may, for example, include information indicating relationships between characters or objects of the MU world that are modeled by the digital assets and other MU content, for example other digital assets, characters, objects, locations, storylines, and so on. In addition, other MU content may include mappings between various items of MU content that asset tracking 112 may leverage. For example, information about a character in the MU world may indicate actor(s) that have played or voiced the character, media (e.g., books, movies, episodes, etc.) in which the character has appeared, other characters that are associated with or that have appeared with the character in media, objects that are associated with or that have been used by the character. The asset tracking information maintained by asset tracking 112 may be updated in response to new digital media based within the MU world. For example, new characters or objects of the MU world may be added based on a new episode or movie based in the MU world, and relationships of the new characters or objects to other MU content may be established and recorded in the asset tracking information. As another example, new relationships for an existing character or object to other MU content may be determined based on new digital media. Via the asset tracking information and the mappings to other MU content that it maintains, asset tracking 112 may locate and return particular digital assets bases on queries specifying particular MU content, and may locate and return particular MU content based on queries specifying particular digital assets or other MU content.

FIG. 3C graphically illustrates example layers in the MU database 300, according to a least some embodiments. A base layer 310 may include all information, data, assets, and so on that are accepted canon within the media universe. A second layer 320 may include intermediate information, data, digital assets, and so on that are currently non-canonical, that is are not accepted as canon within the universe. However, this layer 320 is a common, shared layer of the database, and is not specific to any particular client. A third layer 330 represents a client's personal data and information within the media universe, for example the client's personal digital assets such as customized avatars, characters, and objects. While FIG. 3C shows three layers of content in the MU database 300, some embodiments may include fewer or more layers. For example, some embodiments may implement only a base layer 310 and a client layer 330, while some embodiments may implement two or more layers between base layer 310 and client layer 330, for example each of these intermediate layers may represent an increasing group size to which digital assets may be promoted.

In some embodiments, when a client interacts with the world of the media universe through the MU system, the client sees a view of the world that has the base layer 310 as the basis, with the intermediate layer 320 overlaid on the base layer, and finally the client's personal content 330 overlaid on the content of the other layers. For example, when the client views a movie or episode within the media universe, the client's customized digital assets may be automatically inserted into appropriate scenes according to hooks that correspond to the digital assets. For example, if the client has created a custom version of a robot that appears in the movie, the client's custom robot may be displayed in place of the default version of the robot.

In some embodiments, two or more clients may share at least some of their personal, client-specific 330 content within the media universe. In these cases, a client sees a view of the world that has the base layer 310 as the basis, with the intermediate layer 320 overlaid on the base layer, and finally the client's personal content 330 and at least some of the client's friends personal content 330. When the client views a movie or episode within the media universe, custom digital assets that the client's friends have shared with the client, as well as the client's customized digital assets, may be automatically inserted into appropriate scenes according to hooks that correspond to the digital assets.

Content in layers 330 and 320 may, over time and through one or more methods, become promoted into or accepted as canon 310 within the MU database 300. For example, clients may create or customize digital assets such as characters and other objects and upload those digital assets to the digital asset repository 116, which is part of the overall MU database 300. Initially, these assets are client-specific 330 and not canon 310. In some embodiments, a client's digital assets may be viewed or accessed by other entities, including digital media developers and other clients. A digital media developer, or other clients, may choose to use a client's digital assets in digital media, for example media being developed by the developers for general release to the public. Over time, the client's digital assets may become part of the non-canonical, but shared layer 320 of the MU database 300, or may be accepted or promoted into the canon 310 within the MU database 300 of the media universe. The client's digital assets may appear in other digital media within the universe, and may even evolve a storyline and history that may also become part of the canon 310. As another example, in some embodiments clients may be allowed to vote on or rate non-canonical digital assets in the repository 116, non-canonical storylines, and so on. Highly rated digital assets or other content may be promoted to canon 310, or may be noticed by developers and used in new digital media based within the world of the media universe, and thus may become part of the accepted canonical history and storyline of the media universe and part of the canon 310 in the MU database 300.

As another example, in some embodiments, the media universe system 110 may monitor multiplayer game play for games within the media universe, and may capture and store game session content, for example digital media clips or video segments of episodes or events (e.g., epic battles) in which tens, hundreds, or even thousands of players participate. In some embodiments, game session content may be stored as digital assets in the digital asset repository 116, and information about the content (e.g., a storyline, timeline, etc.) may be stored within the asset tracking database. Some of the game session content that is stored as digital assets may then be integrated into other media within the media universe by digital media developers. For example, portions or all of an epic battle may be used in, or adapted for use in, a book, movie or series set within the world of the media universe. As another example, characters, objects, environments, buildings and so on that are created or modified within the game universe may be stored as digital assets to the digital asset repository, with accompanying information stored in the asset tracking database, and may be integrated into other media within the media universe. Thus, storylines and events that occur in a game set within the MU world and that involve multiple clients may become part of the canonical history of the world of the media universe, and part of the canon 310 of the MU database 300 as shown in FIGS. 3A through 3C. In addition, characters, objects, environments, and so on that are generated within a game may be integrated into the canon 310 of the media universe.

Example Interactive Experiences

A non-limiting example interactive experience that may be provided to clients 180 of a media universe system 110 that leverages network-based resources and services as illustrated in FIGS. 12 through 14 is an interactive media system based on the media universe system 110 in which clients 180 may interactively explore 3D environments and participate in a base storyline created by a digital media developer, with the digital content rendered and streamed to the clients 180 in real-time. The storyline and environments may evolve and change over time in response to client involvement and interactions. The interactive media may access digital assets from the digital asset repository for use in the dynamically rendered digital content.

Providing Active Content in Digital Media with a Media Universe

Embodiments of methods and apparatus for providing active content in digital media within a media universe are described. Embodiments of a media universe (MU) system may leverage network-based computation resources and services, for example a streaming service, and a digital asset repository or repository service to dynamically provide active content in digital media of the media universe streamed to the client. An asset repository may contain digital assets including but not limited to 2D or 3D models of objects and characters used in the digital media. Client interactions with digital media content via a client interface may be mapped to particular objects, characters, locations, etc. within the media universe according to the digital assets from the repository. For example, masks used in layers when compositing and rendering the digital media content may be mapped to digital assets in the repository that correspond to objects, characters, etc. within the media universe. Most or all content within a rendered scene streamed to a client device may thus be rendered as active content. Clients may interact with the active content to, for example, obtain contextual information about the corresponding objects, manipulate and explore objects, discover hidden content, reveal hidden storylines, order merchandise (e.g., via 3D printing) related to the content, etc. In some embodiments, the client interactions with the content may include touches and/or gestures according to touchscreen technology. In some embodiments, the client interactions may be or may include interactions according to a cursor control device, a keyboard, or other user input devices or technologies. In some embodiments, the client interactions may be or may include voice commands or interactions according to audio and voice command recognition technology of the client device.

Figure 4A:
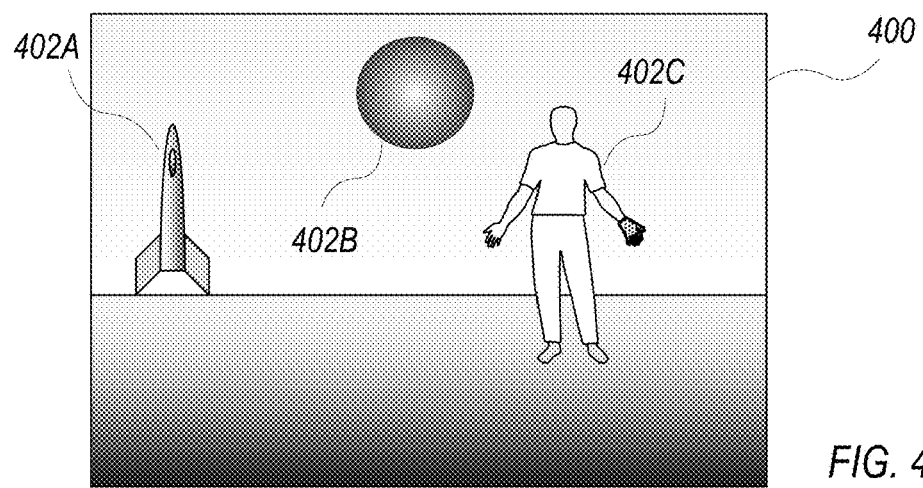
FIGS. 4A through 4C graphically illustrate a method for selecting objects within digital media, according to at least some embodiments.
Figure 4B:
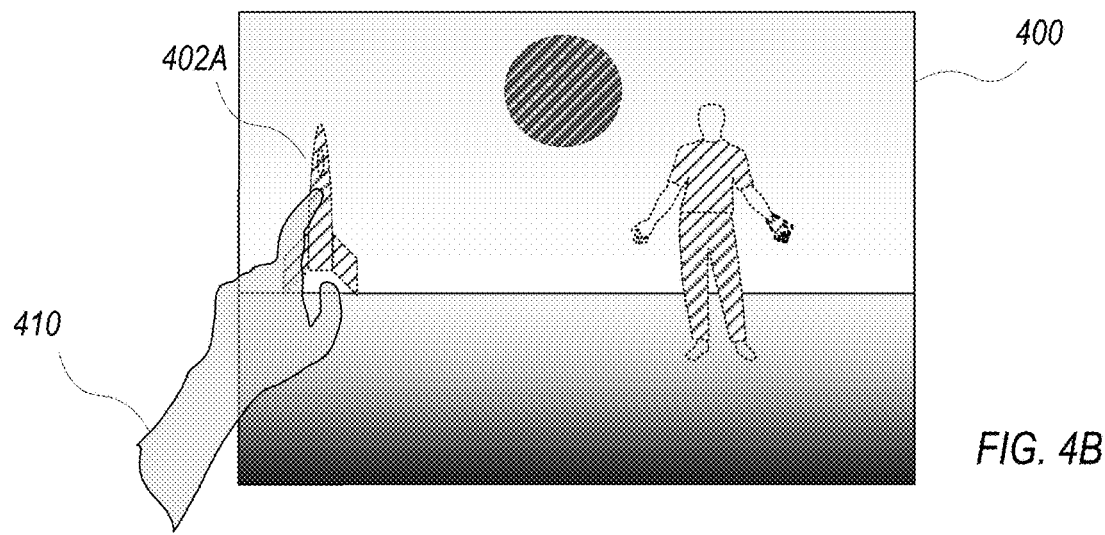
Figure 4C:
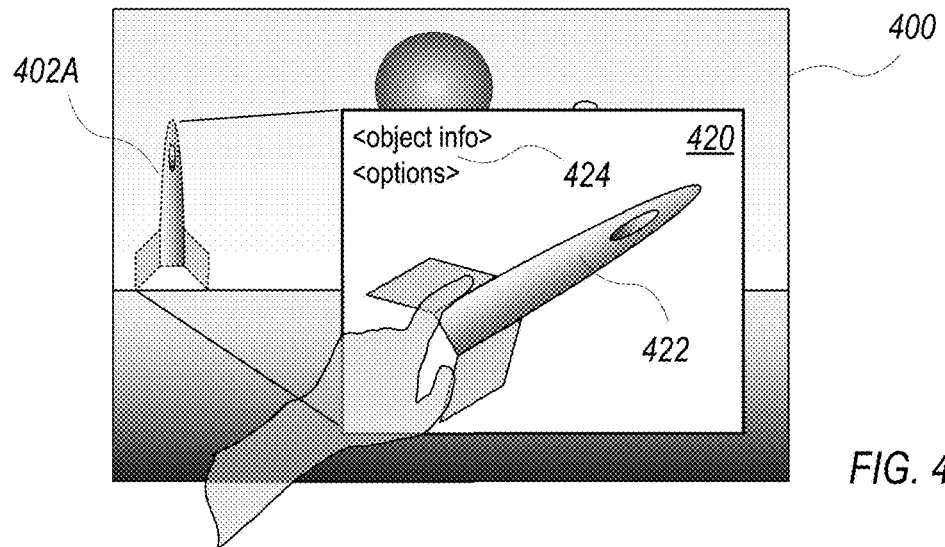

FIGS. 4A through 4C graphically illustrate a method for selecting objects within digital media, according to at least some embodiments. FIG. 4A shows an example scene 400 from digital media (e.g., a movie) being played back to a client device, for example by a media universe (MU) system that leverages network-based resources and services as illustrated in FIGS. 12 through 14. Objects 402A through 402C have been rendered into the scene 400 from digital assets in the digital asset repository. Rendering an object 402 into a scene may involve generating a mask or layer for the object 402 and compositing the rendered object 402 into the scene according to the mask. The client 410 may interact with the scene 400 via an MU client interface as shown in FIG. 13A. For example, the client 410 may pause the video at the scene 400, or may tap or otherwise indicate selection of an object 402 within the scene 400. As shown by the diagonally striped regions in FIG. 4B, in response to the client 410's interaction with the scene 400, the MU system may determine masks for the objects 402 currently within the scene 400 according to the objects' digital assets, and may make regions of the scene 400 corresponding to the objects' masks active regions or "buttons" that are client-selectable to access or interact with the respective object and its corresponding digital asset(s) and other information.

In some embodiments, video frame content may be used to define the masks at which digital assets are located and which may be made into active regions or buttons. A digital video frame may be composed of multiple layers that are composited together. For example, one or more alpha mask layers may be used to insert particular objects rendered from respective digital assets into each frame. In some embodiments, alpha mask layers corresponding to objects in the video that are rendered from particular digital assets may be used to define the regions of a frame that are made active and to associate those regions with particular objects or digital assets in the repository. Once the digital assets are determined, information and data for the digital assets may be retrieved from the repository or from elsewhere in the MU database.

As shown in FIG. 4B, the client 410 has selected object 402A, in this example a rocket ship. As shown in FIG. 4C, in response to client 410 selecting object 402A, an interface 420 may be displayed that provides information and options 424 for the object 402A (e.g., name, description, timeline, dimensions, capabilities, history, storylines, related objects or characters, get more info, purchase, modify, download, print, etc.), and in general any information or data that may be relevant to the selected object 402A, and any action that may be enabled for the selected object 402A. In some embodiments, the interface 420 may be wrapped in a "skin" that reflects an aspect of the world of the media universe, such as a period, location, design, or theme within the world of the media universe. For example, the skin might reflect the design of a spaceship's controls within a space-based science fiction MU world.

In some embodiments, at least part of the information about the object 402A may be provided from an MU database maintained by the MU system. However, in some embodiments, at least part of the information about the object 402A may be obtained from one or more sources external to the MU system. In some embodiments, a graphical model 422 of the object 402A may be dynamically rendered for the object 402A from digital asset(s) obtained from the digital asset repository and displayed. In some embodiments, the interface 420 and the MU system may allow the client 410 to explore and manipulate the model 422 in various ways, for example by rotating, flipping, opening, and even entering an object 402A such as a rocket ship, vehicle, or building to examine the insides or components of the object 402A. The MU system dynamically renders and streams video of the scene 400 including the manipulated model 422 to the client's device.

In some embodiments, other objects or content in scenes of digital media that do not necessarily correspond to digital assets from the repository may also be identified and made into active regions or buttons that the client may select to, for example, obtain information about the objects or content. In some embodiments, alpha masks may be used to identify regions of a scene such as background or objects that do not correspond to and that are not rendered from digital assets in the repository. In some embodiments, these regions may also be made active regions or buttons that the client may select. However, since these regions are not linked to digital assets in the repository, other methods may be used to identify objects or content corresponding to the regions and to locate information corresponding to the identified objects or content.

For example, in some embodiments, metadata may be attached to the frames, or to the alpha masks that are used to identify these regions, and this metadata may be used to identify the objects or content and locate information for the objects or content within the media universe. As another example, in some embodiments, an object in a frame that does not correspond to, or that cannot be directly linked to, a digital asset in the repository may be extracted using the respective mask, and a library or corpus of digital images or objects and/or of digital image or object information may be searched using one or more image matching and/or object recognition techniques to identify an object or type of object that best matches the object from the frame, and to provide information about the object or type of object. In some embodiments, the digital object may be passed to an object recognition service for identification. In some embodiments, metadata from the digital media, frame or alpha mask may be used to guide, narrow or seed the search. For example, the metadata may indicate or suggest that the object is a particular type of object (e.g., a motorcycle, or lamp, or boat), or may indicate size, dimensions, or other relevant physical information about the object. As another example, the metadata may include context information for the object, for example the identity of a fictional world, or a setting, or a location of the object within a world or setting (e.g., Paris, France, or a street or neighborhood, etc.), or the time period that the content or subject of the video is set in (e.g., the years 1900-1930), and so on.

In some embodiments, some objects or content may not be precisely identified. In these cases, a type or category of object or content may be identified, and information about the type or category may be presented to the client. In some embodiments, a list of objects or types of content may be presented from which the client may select individual objects to obtain additional information about.

In some embodiments, content in a scene of digital media that does not correspond to digital assets from the repository may include characters or persons. In some embodiments, the characters or persons may be identified and made into active regions or buttons that the client may select to, for example, obtain information about the particular characters or persons using one or more image matching and/or object recognition techniques. For example, in some embodiments, a facial recognition technique may be used. In some embodiments, a list of potential identifications may be presented from which the client may select individuals to obtain additional information about.

Contextual Information Indexing, Access, and Interactive Integration

In some embodiments of a media universe system 110, the digital asset tracking and repository system as illustrated in FIG. 1, a digital asset licensing layer or service, and other information within the media universe (MU) database may be leveraged to provide a cross-referencing system in which most or all of the media, merchandise, assets, and other content created within the media universe may be indexed. One or more interfaces may be provided via which clients, developers, and other entities may browse and search the MU database 300. In addition, the cross-referencing system or index may be leveraged to provide contextual information about the MU world within the media universe, for example in response to client interactions with content as illustrated in FIGS. 4A through 4C.

In some embodiments, the media universe system 110 may leverage network-based computation resources and services to dynamically render the digital content in real time, for example as illustrated in FIGS. 12 through 14. For example, while watching a movie based within the MU world, clients may pause the action and enter a virtual "movie set" or virtual world where they can take control of the camera and explore the scene or objects within the scene. As a client explores a scene, the scene may be rendered in real-time from the client's viewpoint by the client services 230 on the provider network 100. In some embodiments, a real-time graphics processing and rendering 232 engine provided via the client services 230 may access digital assets from the digital asset repository 116 to render the scene. In some embodiments, the client may select a character or object in the scene to discover and access information, media and/or merchandise within the context of the world of the media universe that are linked, attached, or otherwise associated with the selected character or object. For example, the client may discover and download samples of short videos or book sections that include content based in or related to the world of the media universe and that contain content concerning or related to the selected character or object or may discover and order merchandise related to a selected character or object from the world of the media universe.

In some embodiments, the MU system 110 may provide an interface or interfaces for the various clients (including but not limited to developers, MU clients, and other enterprises as illustrated in FIGS. 1 and 2) to access information about the media universe and the world of the media universe from the MU database 300 and possibly other sources in two or more contexts. For example, one context may be the context of a fictional world in which information about fictional characters, objects, storylines, other media (e.g., other films or episodes, books, short films, etc.) and so on can be explored within the media universe. Another context may be a production or "behind-the-scenes" context where the client can explore information about the production, direction, props, special effects, sets, and other "back lot" information about video media such as movies or series episodes. Another context may be a "real world" context in which, for example, information about actors, directors, crew, locations, and so on can be explored, including but not limited to other movies or shows that the cast and/or crew have worked on, awards that the movie, cast, director, etc. have been nominated for or won, and so on. Another context may be a "merchandise" context in which a client may explore and obtain various merchandise related to the scene, character, object, or other aspect of the world of the media universe.

Figure 5A:
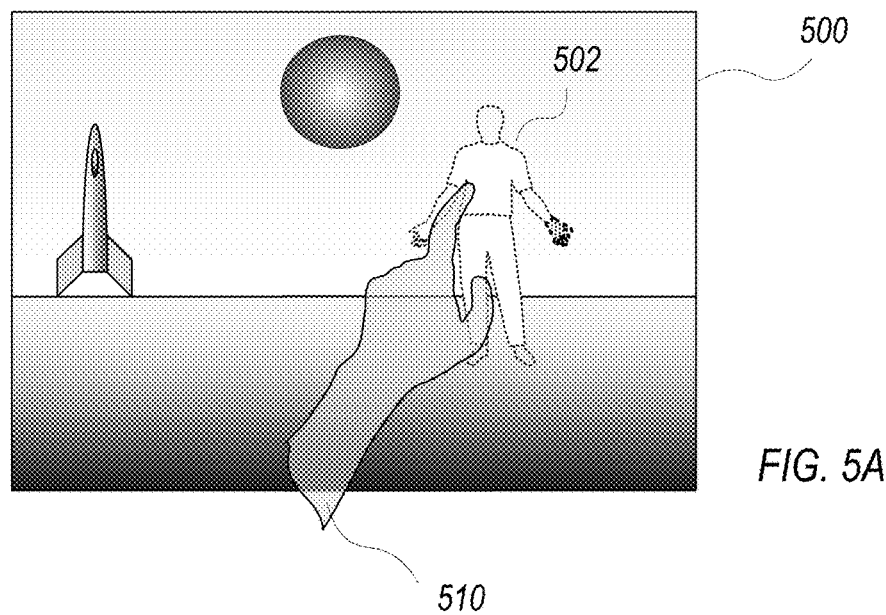
FIGS. 5A through 5C graphically illustrate accessing contextual information within digital media, according to at least some embodiments.
Figure 5B:
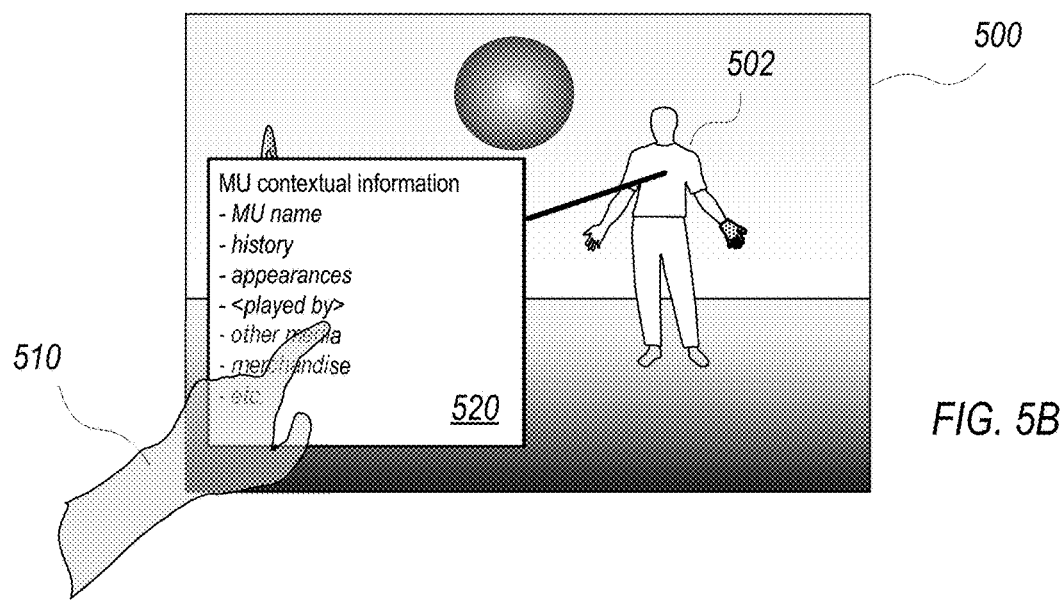
Figure 5C:
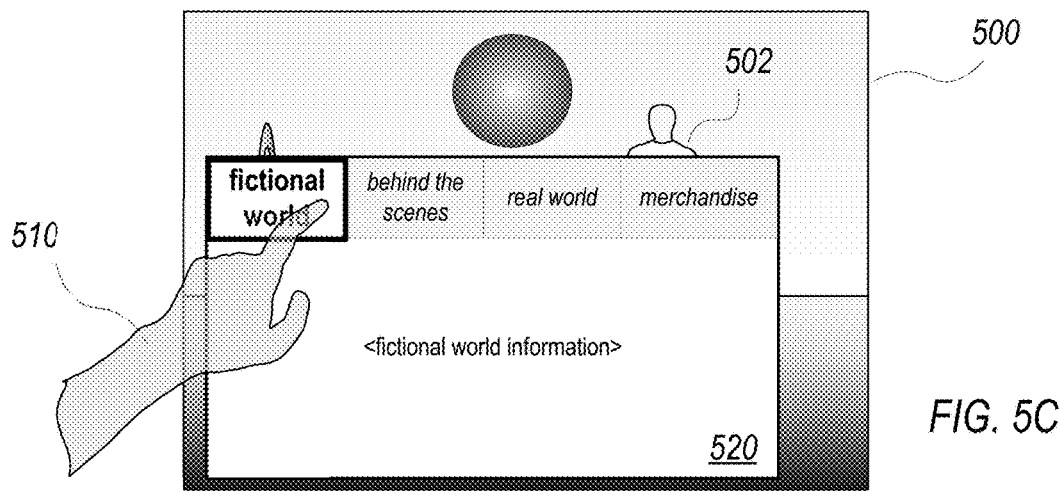

FIGS. 5A through 5C graphically illustrate accessing contextual information within digital media, according to at least some embodiments. FIG. 5A shows an example scene 500 from digital media (e.g., a movie) being played back to a client device, for example by a media universe (MU) system that leverages network-based resources and services as illustrated in FIGS. 12 through 14. FIG. 5A also shows that a client 510 has selected an object 502 within the scene 500, for example according to a method as illustrated in FIGS. 4A and 4B. In this example a character 502 that appears within the scene 500 has been selected. In FIG. 5B, in response to client 510 selecting character 502, an interface 520 may be displayed that provides information and options for the character 502 within the context of the world of the media universe.

In some embodiments, the interface 520 may be wrapped in a "skin" that reflects an aspect of the MU world, such as a period, location, design, or theme within the world of the media universe. For example, the skin might reflect the design of a spaceship's controls within a space-based science fiction MU world, or a racing team's racecar design/color theme within an MU world related to (fictional or real-world) racing. The MU contextual information may include one or more of, but is not limited to, the contextual name of the character, the history of the character within the fictional world, various media in which the character has appeared, actor(s) who have played or voiced the character in the various media, other media related to the currently viewed media that may be related to the character, merchandise that related to this character, other characters or objects with tie-ins to this character, and so on. The information about the character 502 may be extracted from the MU database maintained by the MU system as described above. The client 510 may interact with interface 520 to further explore the displayed, contextual information, to navigate to other information for other digital media, digital assets, objects or characters related to this character 502, to select and obtain merchandise related to this character, and so on. In some embodiments, the client interactions with interface 520 may include touches and/or gestures according to touch-screen technology. In some embodiments, the client interactions may be or may include interactions according to a cursor control device, a keyboard, or other user input devices or technologies. In some embodiments, the client interactions may be or may include voice commands or interactions according to audio and voice command recognition technology of the client device.

FIG. 5C shows that, in some embodiments, in response to client 510 selecting character 502, an interface 520 may be displayed that provides multiple modes or contexts in which contextual information related to the selected character 502 may be viewed and explored. In FIG. 5C, the different modes are shown as different tabs that the client 510 can select. However, note that other user interface methods may be used to allow the client to select between modes for exploring information about selected characters or other objects within a scene. FIG. 5C shows as an example that the "fictional world" context for the character 502 is selected. The "fictional world" context may show information about the character 502 within the world of the media universe such as history, biography, timelines, storylines the character 502 has appeared in, other media (e.g., other films or episodes, books, short films, etc.) that the character has appeared in, and so on. Another context may be a production or "behind-the-scenes" context where the client can explore behind-the-scenes information about the actor that portrays the character during production. Another context may be a "real world" context in which information about the actor can be explored, including but not limited to other movies or shows that the actor has appeared in, awards that the actor has been nominated for or won, and so on. Another context may be a "merchandise" context in which a client may explore and obtain various merchandise related to the fictional character of the world of the media universe.

While FIGS. 5B and 5C show the interface 520 overlaid on the scene 500, in some embodiments the interface 520 may be displayed elsewhere on the screen, on another screen, or even on another device. Also note that, while FIGS. 5A through 5C show methods for accessing contextual information within a media universe by selecting objects within digital media content, in some embodiments other methods may be provided via which clients may access an interface 520 to the contextual information.

Vocal Interactions and Contextual Information

While FIGS. 4A through 4C and 5A through 5C show example client interactions with a scene using touches and gestures on a touch-enabled client device, as previously mentioned, in some embodiments client interactions with content of a scene from digital media (e.g., a movie) being played back to a client device may be or may include voice commands, requests, or other vocal interactions according to audio and voice recognition technology of the client device. In some embodiments, the MU system may process vocal commands or requests to locate and provide contextual information related to the scene content, as illustrated in FIGS. 5A through 5C. In some embodiments, the MU system may leverage contextual information including the context of the scene that the client is interacting with vocally in locating contextual information for the client in the MU database or from other sources.

As an example, a client may voice a request or command such as "What kind of car is that?" or "Show me a detailed view of that car" or "Show me more information about that car" or "Where can I buy that car?" or "How fast is that car going?" Without context, these queries would be hard if not impossible for a database interface to process successfully. The MU system, however, may recognize the context of the particular scene and the particular digital media that the client is viewing and interacting with, and use that context to focus the search of the MU database to vehicles that appear in that digital media and/or scene. The MU system may then present contextual information in response to the query and related to the correct content (e.g., the correct car that appears in the scene), or at least information about content that is determined to be most likely and/or most relevant to the query according to the context of the scene. Note that, in some embodiments, commands and requests may instead or in addition be entered by the client via a textual interface (e.g., a keyboard); the MU system may apply the same or similar techniques in processing the textual queries.

Licensing Digital Assets

An entity that owns or controls intellectual property (IP) of the world of a media universe as described herein may earn revenue through licensing the IP to digital media developers, merchandisers, manufacturers, clients, and so on. However, conventional methods for licensing IP may not scale well, and thus much IP use may be unauthorized, causing considerable loss in revenue. In some embodiments of a media universe system 110, digital asset licensing may be built into or on top of the digital asset tracking and repository system as illustrated in FIGS. 1 and 2, for example as a licensing 225 layer or service as shown in FIG. 2. The digital asset licensing layer or service 225 may at least in part automate the licensing process for digital content. The digital asset licensing layer 225 may, for example, track, store, and maintain licensing information for digital assets in the digital asset repository 116, and may thus serve as a central repository for the licensing information. The digital asset licensing layer 225 may provide one or more interfaces via which the licensing information may be accessed, searched, and updated. The digital asset licensing layer 225 may, for example, be used to grant potential licensors (clients 180, developers 160, other enterprises 190 such as online merchants and manufacturers, etc.) permission to find and possibly license digital assets for the production of digital media or merchandise based within the world of the media universe. In addition to increasing revenue, improved licensing provided by the licensing layer within the media universe system 110 may increase opportunities for digital media developers 160 and other entities 180 or 190 to produce products based within the world of the media universe, which may result in production of a wider selection of entertainment, movie shorts, books, comics, fan fiction that cover backstories for more characters, merchandise for a wider variety of characters, and so on within the media universe.

Referring to FIG. 1, in some embodiments, digital assets for objects or characters within the world of the media universe may be maintained in a digital asset repository 116, and may be used in identifying and licensing new digital content. For example, a client 180 or developer 160 may create or customize a character or object for the MU world. The media universe system 110 may implement digital asset evaluation technology (not shown) that may, for example, examine the new digital asset and compare the new asset to digital assets stored in the repository 116. The media universe system 110 may identify the new digital asset as an acceptable version or rendering of a particular known character or object within the world of the media universe via the examination and comparison. Based on the examination and comparison, a digital asset licensing layer of the media universe system 110 (e.g. licensing 225 as shown in FIG. 2) may grant licensing for the digital asset to the client 180 or developer 160, or to an enterprise 190 such as an online merchant or manufacturer, for example licensing to manufacture physical renderings or reproductions of the digital asset, or to provide renderings or reproductions of the asset in digital media or other media. In some embodiments, the licensing may be limited to a certain number of units, for example 10,000 units. In some embodiments, renderings or reproductions of a newly licensed piece of digital content or physical item may be voted on, rated or otherwise evaluated by various entities, for example users within a social network. If the content or item is poorly rated or unpopular, the licensing may be revoked in at least some cases.

Customizable Merchandise

In some embodiments of a media universe system 110, the digital assets stored in the digital asset tracking and repository system as illustrated in FIG. 1 may be used to market, produce, and sell custom merchandise based on content of the world of the media universe. In some embodiments, most or all of the digital assets created in the media universe may be provided as a form of merchandise that a client may buy. For example, in some embodiments, the media universe system 110 may provide an interactive interface to the digital asset tracking and repository system that may be used by clients to look up their favorite character and how the character appeared in a particular scene of a movie, change the character's pose, and order a customized mug, t-shirt, custom 3D-printed figure, or other merchandise based on the customized character. In some embodiments, client could even build custom dioramas from a collection of customized characters, objects, and environments obtained through the customizable merchandising interface. As another example, in some embodiments a client may customize a vehicle, character, or other object within a game based within the world of the media universe, and then order a custom 3D print of the object.

Client Experience Examples

The following provides non-limiting examples of client experiences within a media universe that may be provided via embodiments of a media universe system 110 that includes a digital asset tracking and repository system as illustrated in FIG. 1 and that leverages network-based computation resources and services as illustrated in FIGS. 12 through 14.

In some embodiments, video (e.g., a movie, short, episode, trailer, etc.) of a storyline or part of a storyline based within the world may be streamed to clients on various client devices. A client may pause the video at a scene via the MU client interface. When paused, the client may interactively control a viewpoint or camera to move around within the scene. Characters and objects that are visible within the client's view may become interactive. The client may manipulate and select objects via the client interface. An object may be selected to explore the object's design, technology, and history via an overlaid interface. For some objects, such as vehicles and buildings, the client may move the viewpoint into the object. Within such an object, a formerly hidden scene that may be part of the storyline of the video may be revealed to the client, with additional characters and objects that may be explored, and additional, formerly hidden parts of the story. Once within such an object, the client may choose to resume play of the video, at which point the revealed scene within the object may be played back to the client device. Thus, the client can gain new perspectives on the action, and can discover formerly concealed conversations, actions, motivations, and other information relating to the storyline.

In embodiments, hundreds or thousands of clients may each use their client device and client interface to independently and differently explore the video content; the MU system may leverage network-based computation resources and services as illustrated in FIGS. 12 through 14 and the digital asset tracking and repository system as illustrated in FIG. 1 to dynamically render and stream client-specific versions of the video, each based at least in part on the respective client's interactions within the video, to the different client devices. Thus, many clients may each independently and interactively experience and explore the storyline and environment within the video, with the MU system dynamically generating and streaming client-specific video content to the clients' devices.

In some embodiments, when viewing a video, a client may select individual elements (e.g., objects or characters) within a scene to explore the selected elements. A context-based interface may be provided where context-specific information about the selected element within the scene and within the context of the world of the media universe may be displayed or discovered. In addition, information about the scene that contains a selected object may be displayed or discovered via the interface. For example, characters, objects (e.g., vehicles), props, and trivia about the current scene may be discovered via the interface. In some embodiments, as clients watch the video, the clients may attach comments and likes to characters, objects, scenes, and so on within the video using the interactive client interface. In some embodiments, the clients' comments and likes may dynamically be shared with and displayed to other clients via the interface.

In some embodiments, an interface may be provided to clients via which the clients can create or customize characters or objects for the MU world. The clients' creations may be added to the digital asset repository as 2D or 3D object models. The MU system may leverage network-based computation resources and services as illustrated in FIGS. 12 through 14 and the digital asset tracking and repository system as illustrated in FIG. 1 to dynamically render and stream personalized versions of digital media content that include the clients' creations to the clients' respective devices. For example, a client may create a custom version of a character or object that appears in a series based in the world of the media universe from scratch, by assembling parts obtained from the digital asset repository, or by modifying a character or object obtained from the digital asset repository. The customized element(s) may be stored to the asset repository. The MU system may dynamically generate and stream personalized versions of episodes from the series in which the client's custom element(s) are dynamically rendered and inserted in place of the default versions of the element(s) that were in the original digital media.

In some embodiments, two or more clients may cooperatively and interactively explore and customize the same digital media content within the world of the media universe. For example two clients, from the same or from different client devices, may each create custom characters and objects for use in the world of the media universe. The clients may then view digital media (e.g., series episodes) based within the MU world into which the clients' custom characters or objects are dynamically inserted in place of default objects. Thus, one client's custom character may be dynamically rendered into a scene of video being viewed as one storyline character, and the client's friend's custom character may be dynamically rendered into the scene as another character.

In some embodiments, the MU system and client interface may allow clients to capture images of scenes within digital media content, for example images of scenes that include the clients' customized characters that are dynamically rendered and inserted into the video content by the MU system. In some embodiments, the MU system and client interface may provide interface elements whereby the clients may order prints of captured scenes onto posters, greeting cards, t-shirts, coffee mugs, and so on. In some embodiments, the MU system and client interface may provide interface elements whereby the clients may order a three-dimensional (3D) print of the captured scene onto a physical object such as a snow globe. In some embodiments, the MU system and client interface may provide interface elements whereby the clients may order a physical, 3D rendering or reproduction of a customized object or character, or combination of two or more objects and/or characters; for example, a 3D printing service may use 3D printing technology to generate a physical rendering or reproduction of a 3D model corresponding to a customized object or character. In some embodiments, clients may even order customized packaging for the 3D-printed physical rendering or reproduction of the 3D model.

In some embodiments, the MU system and client interface may provide methods via which clients may create custom avatars for use within the world of the media universe. For example, a client may be given a choice from a list of base avatars to start with. Once a base avatar is chosen, the client may choose clothing and accessories for the avatar. In some embodiments, the client may generate a textured 3D model of themselves, for example using a camera of a personal device and 3D model capturing and generating technology. The client-generated 3D model may then be superimposed on the client's avatar. The client's custom avatar may be saved as part of the client's profile for use within the media universe. In some embodiments, the MU system and client interface may provide interface elements whereby the clients may order a physical, 3D rendering or reproduction of their avatar; for example, a 3D printing service may use 3D printing technology to generate the rendering or reproduction from a 3D model of the avatar.

In some embodiments, the MU system and client interface may integrate video games based within the world of the media universe with the MU database. For example, a game character that a client creates within a game may be linked into the MU database. As the character changes in the game, and as the character obtains new gear in the game, the MU database is updated. The client may use the functionality of the MU system and client interface as described above to, for example, order physical 3D models of the game character and the characters' gear, obtain posters and other items with printed-on images of the character, insert the client's game character into scenes of other digital media content that the client views, and share the game character with other clients in other contexts than the game.

In some embodiments, the MU system and client interface may allow clients to design and manufacture custom characters or objects based within the world of the media universe. A digital asset licensing layer of the MU system as previously described may be used to grant appropriate licensing to the clients. For example, a client may use their 3D avatar or imported game character, or may select a character figure from an archive of existing character figures in the digital asset repository. Once the client has chosen or designed a figure, the client can create a custom box/ packaging for it. In some embodiments, a licensing layer of the MU system may handle IP licensing for the client. The MU system and client interface may provide interface elements whereby the clients may order a physical, 3D reproduction or rendering of their avatar; for example, a 3D printing service may use 3D printing technology to generate the reproduction or rendering from a 3D model of the avatar. The physical, 3D printed figure may be packaged in the client-designed package, and may be delivered to the client as a custom, licensed collectable figure. The custom figure may be shared with other clients or friends, for example via social media channels, and the other clients may choose to order the packaged custom figure.

Immersive Interactive Experiences

A media universe system 110 that includes a digital asset tracking and repository system as illustrated in FIG. 1 and that leverages network-based computation resources and services as illustrated in FIGS. 12 through 14 may be leveraged to implement immersive interactive experiences for fans or other viewers of or participants in a world of the media universe. Interactive digital media may be implemented via the media universe system 110 that provides interfaces to and allows clients to explore the full content of a media universe (MU) database, including digital media, digital assets, storylines, history, merchandise, and so on. In addition to exploration, the interactive digital media may allow clients to participate in and even create and share content within the media universe.

The MU database may be considered a living database of artifacts, information, and experiences within the world of the media universe. The interactive digital media provided through the media universe system 110 allows clients to interactively explore and participate in a virtual universe and base storyline that may evolve or change based on the client's interactions within the universe. As an example of a client experience within the virtual universe, a client may begin at a starting location within the MU world, and progress along a story line, exploring and learning as they go along according to information dynamically presented to them from within the MU database in response to their actions within the virtual universe. A client may create or modify objects within the virtual universe, and may select, manipulate, and use various objects. As another example, scripted, computer-controlled characters may progress along a storyline within the virtual universe. Another client that is viewing the characters within a scene may choose to participate by taking control of a character/camera and moving virtually through the scene. The linear storyline may then become an immersive experience as clients uncover layers of the story and discover hidden aspects, watching the storyline unfold from different viewpoints and exploring the virtual setting.

These real-time rendered viewing experiences may combine linear storytelling with 3D-interactivity, providing immersive entertainment via the network-based computation resources and services as illustrated in FIGS. 12 through 14 that dynamically render and stream the virtual universe as viewed by the client in real-time at least in part using the digital assets in the asset repository. Multiple, even thousands, of clients may simultaneously participate in the immersive environment of the virtual universe, with different views and portions of the virtual universe and different portions of the overall storyline being rendered and streamed to different ones of the clients in real-time. In some embodiments, one or more viewers may watch the progress of one or more clients within the virtual universe, and may even choose to step into characters and participate themselves. In some embodiments, a client may record their personal, immersive experience or creations within the virtual universe, and may later play back their experience as a video, or share their experiences and/or creations with others. In some embodiments, interfaces may be provided within the virtual universe via which participants or viewers may comment, rate, like, and share content created within the virtual universe. In some embodiments, clients may capture images of customized or personalized scenes within the virtual universe and share the images with others, for example using social media channels.

Media Universe (MU) System Methods

FIGS. 6 through 9 are high-level flowcharts of several methods that may be implemented in a media universe (MU) system environment as illustrated in FIGS. 1 through 5C and 10A through 15, according to various embodiments.

Figure 6:
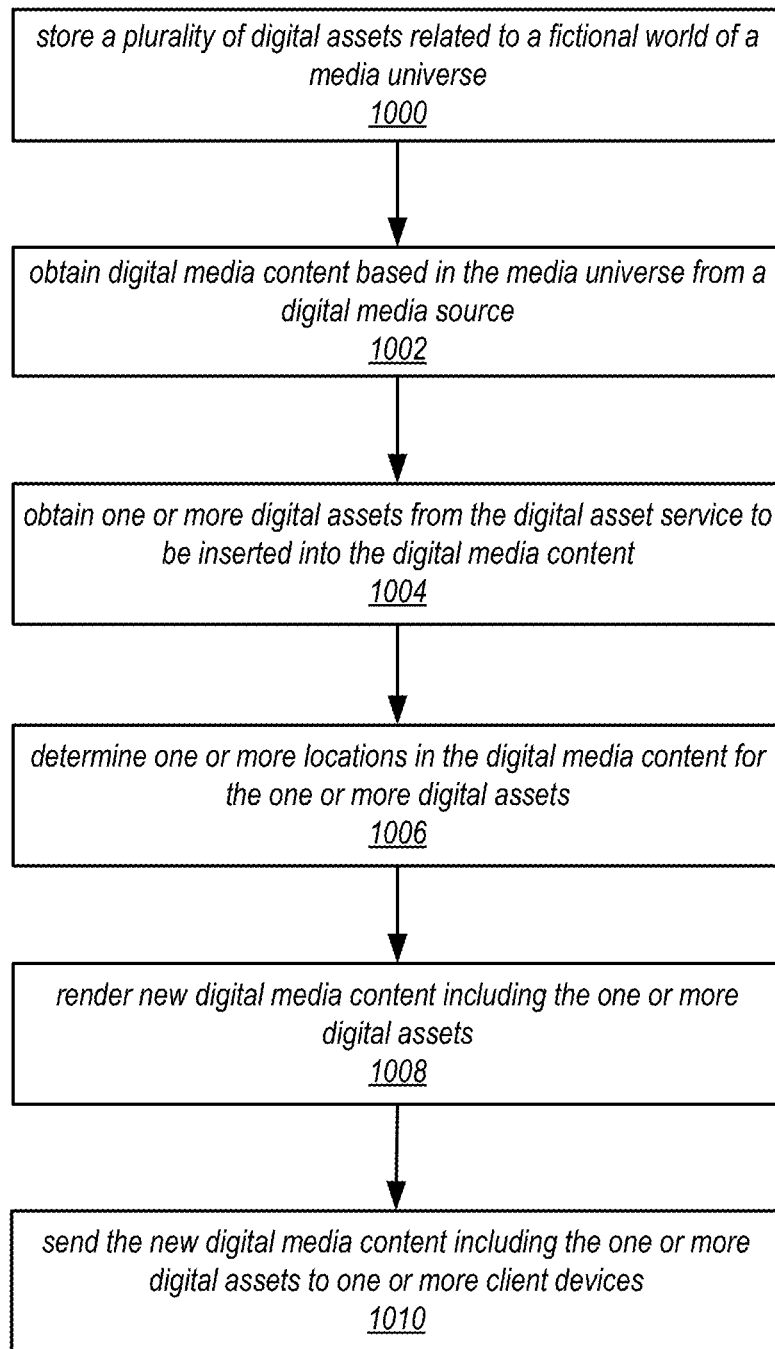
FIG. 6 is a high-level flowchart of a method for dynamically rendering and delivering targeted digital media content to clients of an MU system, according to at least some embodiments.

FIG. 6 is a high-level flowchart of a method for dynamically rendering and delivering targeted digital media content to clients of an MU system, according to at least some embodiments. As indicated at 1000, the MU system may store a plurality of digital assets related to the world of a media universe. In some embodiments, the MU system may store the digital assets using a repository service that includes a digital asset repository that store a plurality of digital assets related to the world of the media universe and an asset tracking database configured to track relationships of the digital assets to each other and to the MU world.

As indicated at 1002, the MU system may obtain digital media content based in the media universe from a digital media source. For example, the digital media content may include or may be a digital film or movie, or episode(s) of a show or series, or the like. As indicated at 1004, the MU system may obtain one or more digital assets from the digital asset repository to be inserted into the digital media content. The digital assets may, for example, include 2D or 3D models of characters and objects based in the world of the media universe, digital audio, pre-rendered scenes, or in general any digital content that may be inserted into digital media. As indicated at 1006, the MU system may determine one or more locations in the digital media content for the one or more digital assets. As indicated at 1008, the MU system may render new digital media content including the one or more digital assets. As indicated at 1010, the MU system may send the new digital media content including the one or more digital assets to one or more client devices, for example by streaming the digital media content via a streaming service.

In some embodiments, to obtain the one or more digital assets from the repository, the MU system may identify a particular client or group of clients associated with the one or more client devices and select the one or more digital assets to be inserted into the digital media content according to the identified client or group of clients. In some embodiments, the one or more digital assets may include at least one digital asset that was customized or created by the particular client. In some embodiments, the one or more digital assets may include at least one digital asset that is targeted at the particular client or group of clients according to client profiles or preferences.

In some embodiments, to obtain the one or more digital assets from the repository, the MU system may receive input from a client device indicating one or more client interactions with digital media content on the client device, and provide input to the repository service indicating the one or more client interactions. In response, the repository service may locate the one or more digital assets in the repository according to the indicated client interactions and provide the one or more digital assets to the MU system, for example to a graphics processing and rendering module for rendering and streaming to the client device.

In some embodiments, the repository service may also maintain mappings between the digital assets and other content of the media universe; particular digital assets may be mapped to particular media universe content. The mappings may, for example, include information indicating relationships between characters or objects of the MU world that are modeled by the digital assets and other MU content, for example other digital assets, characters, objects, locations, storylines, and so on. For example, a digital asset corresponding to a particular character may be mapped to other MU information about the character. In some embodiments, the repository service may be update the mappings in response to new digital media based within the MU world. For example, new characters or objects of the MU world may be added based on a new episode or movie based in the MU world, and relationships of the new characters or objects to other MU content may be established and recorded. As another example, new relationships for an existing character or object to other MU content may be determined based on new digital media.

In some embodiments, the repository service may receive, for example from a graphics processing and rendering module of the MU system, input indicating one or more client interactions with digital media content on a client device. In response, the repository service may determine a particular digital asset in the repository according to the indicated client interactions with the digital media content, determine particular media universe content related to the determined digital asset according to the mappings, and provide the determined media universe content to the graphics processing and rendering module of the MU system. The graphics processing and rendering module may then render additional digital media content including the determined media universe content related to the determined digital asset and stream the additional digital media content to the client device.

Figure 7:
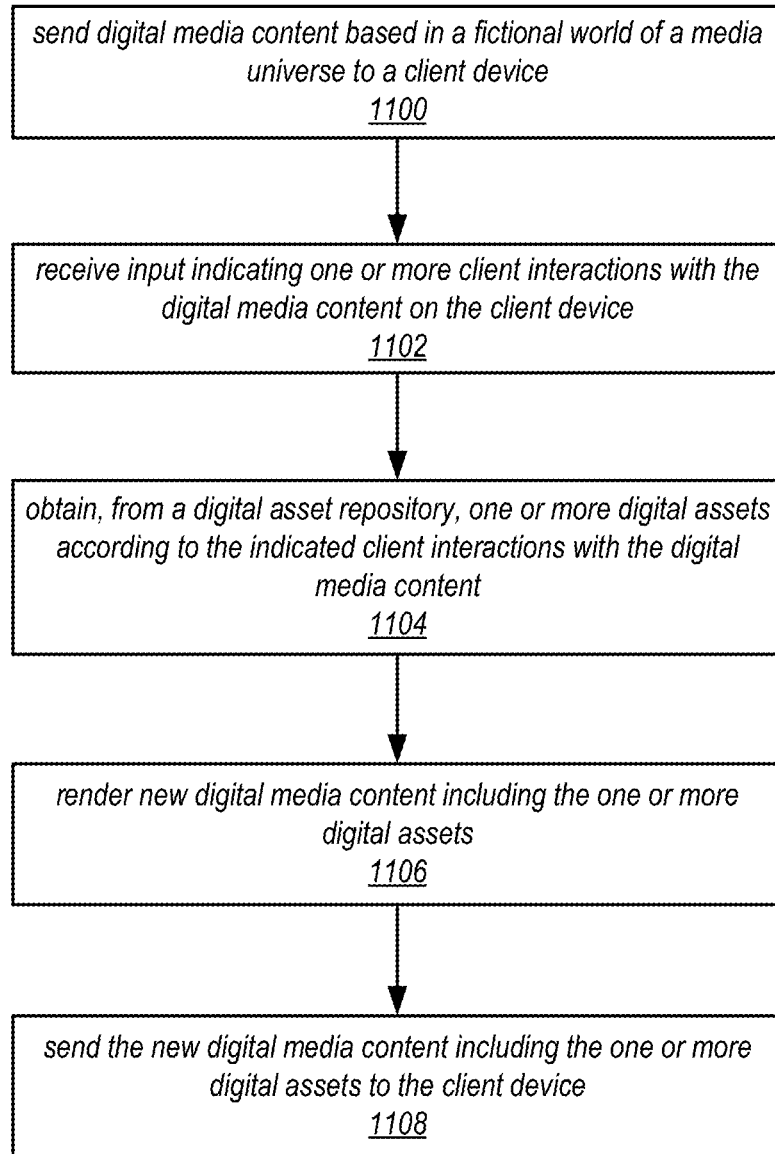
FIG. 7 is a high-level flowchart of a method for dynamically rendering and delivering digital media content to a client of an MU system in response to client interactions with the digital media content, according to at least some embodiments.

FIG. 7 is a high-level flowchart of a method for dynamically rendering and delivering digital media content to a client of an MU system in response to client interactions with the digital media content, according to at least some embodiments. As indicated at 1100, the MU system may send digital media content based in the world of a media universe to a client device. As indicated at 1102, the MU system may receive input indicating one or more client interactions with the digital media content on the client device. As indicated at 1104, the MU system may obtain, from a digital asset repository or service, one or more digital assets according to the indicated client interactions with the digital media content. As indicated at 1106, the MU system may render new digital media content including the one or more digital assets. As indicated at 1108, the MU system may send the new digital media content including the one or more digital assets to the client device.

Figure 8:
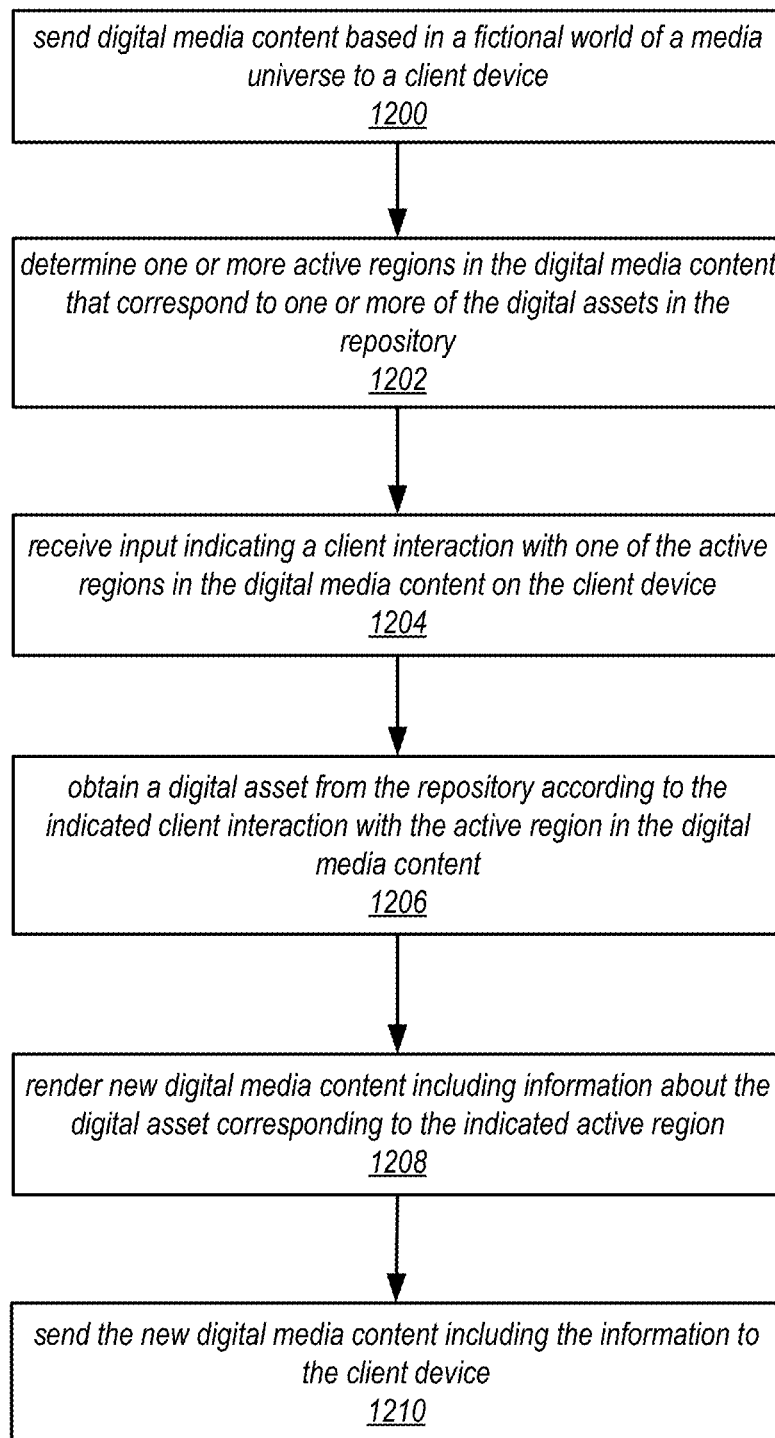
FIG. 8 is a high-level flowchart of a method for implementing active regions within digital media content and dynamically rendering and delivering digital media content to a client of an MU system in response to client interactions with the active regions in the digital media content, according to at least some embodiments.

FIG. 8 is a high-level flowchart of a method for implementing active regions within digital media content and dynamically rendering and delivering digital media content to a client of an MU system in response to client interactions with the active regions in the digital media content, according to at least some embodiments. As indicated at 1200, the MU system may send digital media content based in the world of a media universe to a client device. As indicated at 1202, the MU system may determine one or more active regions in the digital media content that correspond to one or more of the digital assets in the repository. As indicated at 1204, the MU system may receive input indicating a client interaction with one of the active regions in the digital media content on the client device. As indicated at 1206, the MU system may obtain a digital asset from the repository according to the indicated client interaction with the active region in the digital media content. As indicated at 1208, the MU system may render new digital media content including information about the digital asset corresponding to the indicated active region. In some embodiments, the information includes contextual information about the digital asset within the world of the media universe. As indicated at 1210, the MU system may send the new digital media content including the information to the client device.

Figure 9:
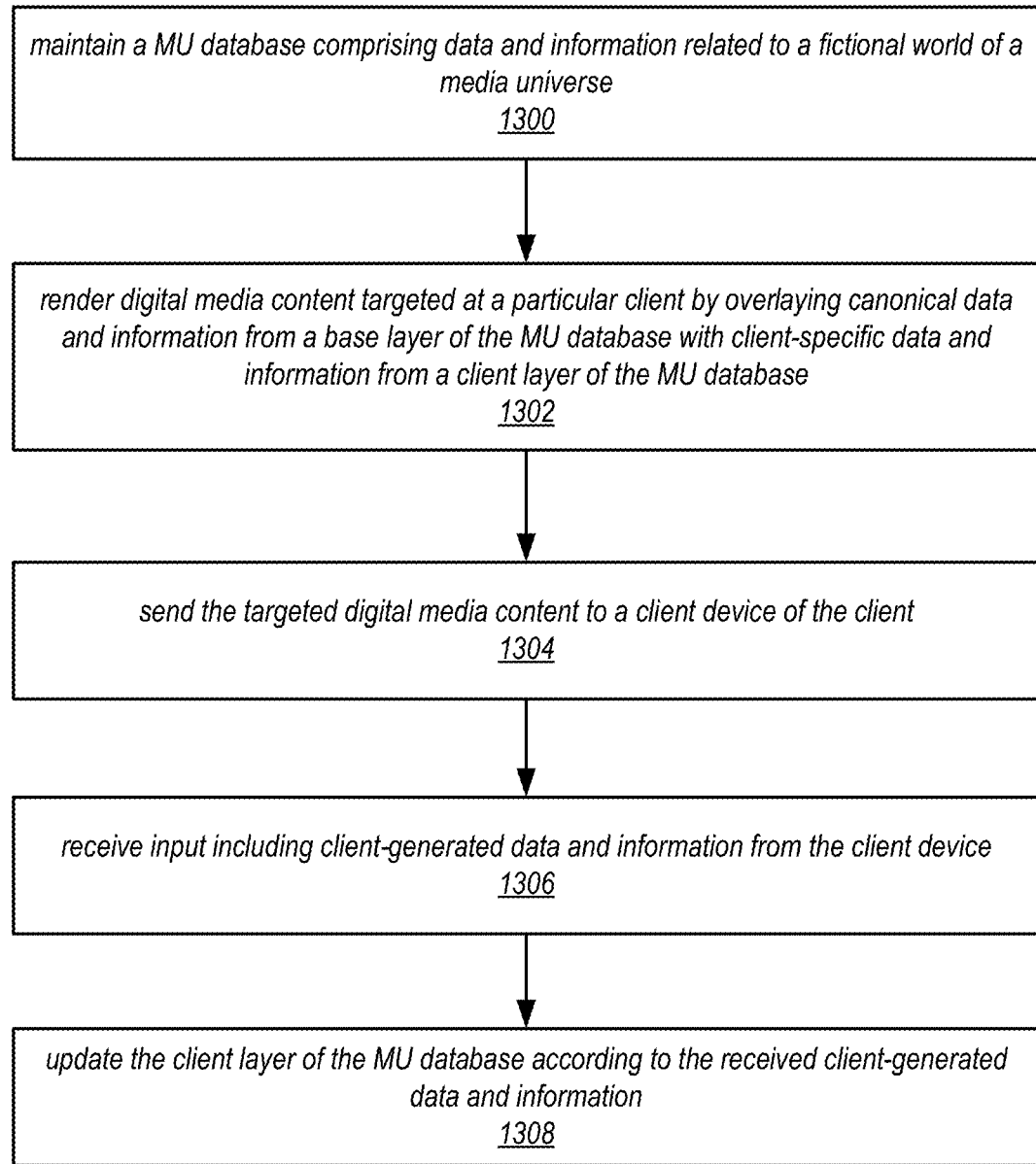
FIG. 9 is a high-level flowchart of integrating client interactions and client-specific data and information into a media universe database including canonical data and information, according to at least some embodiments.

FIG. 9 is a high-level flowchart of integrating client interactions and client-specific data and information into a media universe database including canonical data and information, according to at least some embodiments. As indicated at 1300, the MU system may maintain an MU database comprising data and information related to the world of a media universe. The MU database may include, but is not limited to, a base layer that includes canonical data and information of the MU world that is common to all clients of the MU system and a client layer that includes client-specific data and information for the clients of the MU system. As indicated at 1302, the MU system may render digital media content targeted at a particular client. The digital media content may include canonical data and information from the base layer of the MU database overlaid with client-specific data and information from the client layer of the MU database. As indicated at 1304, the MU system may send the targeted digital media content to a client device of the client. As indicated at 1306, the MU system may receive input including client-generated data and information from the client device. As indicated at 1308, the MU system may update the client layer of the MU database according to the received client-generated data and information. In some embodiments, at least some of the client-specific data and information may be promoted from the client layer of the MU database to the base layer of the MU database so that the information becomes canonical data and information within the media universe that is shared among all clients of the MU system.

Viewing Companion

Figure 10A:
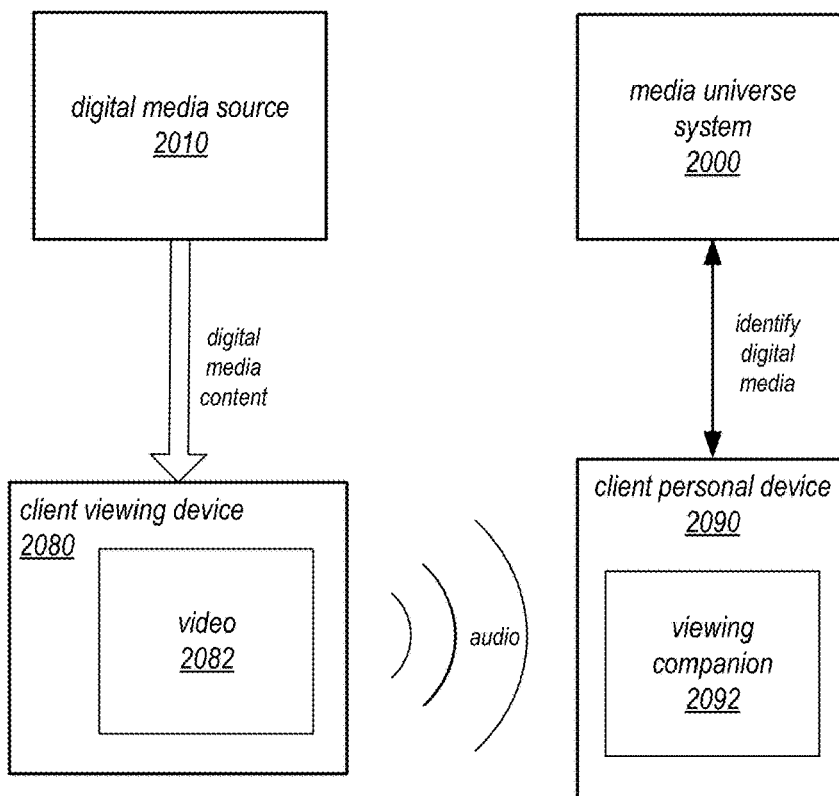
FIGS. 10A and 10B illustrate a viewing companion application or system that may be used with a media universe system, according to at least some embodiments.
Figure 10B:
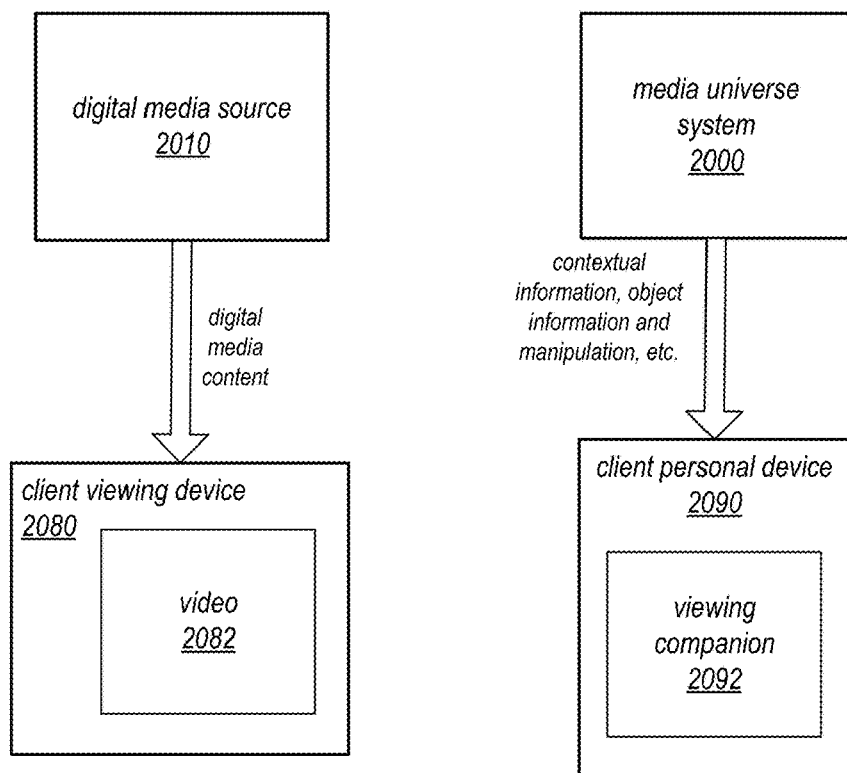

FIGS. 10A and 10B illustrate a viewing companion application or system that may be used with a media universe (MU) system, according to at least some embodiments. As shown in FIG. 10A, a digital media source 2010 may stream or otherwise provide digital media content that displays video 2082 to a client viewing device 2080 for viewing by one or more clients or viewers. For example, client viewing device 2080 may be a home entertainment system, television, computer, laptop, or pad device at which one or more viewers are viewing digital media content obtained from a source 2010 such as streaming video from the Internet, watching cable television, or playing video from a DVD or Blu-Ray disk. As another example, digital media source 2010 and client viewing device 2080 may be a public movie theater at which various viewers are watching a movie. Generally, the digital media content will include audio as well as video, which may be broadcast via a speaker system. The digital media content may, for example, be digital media based in the world of a media universe hosted by a media universe system 2000. In some embodiments, the digital media content may be sourced from or accessible by media universe system 2000. In some embodiments, digital media source 2010 may be a component of or may be coupled to media universe system 2000.

One or more of the viewers of the video 2082 may possess a personal device 2090, for example a laptop/notebook computer system, multifunction device, pad/tablet device, smartphone device, or wearable device (e.g., glasses or goggles, headsets, helmets, watches, etc.). A viewing companion 2092 application or module may be installed on a client's personal device 2090. The viewing companion 2092 may use microphone technology of the device 2090 to detect the audio from the digital media content that is broadcast by device 2080. The viewing companion 2092 may analyze the detected audio to determine the digital media that the audio is from, and to synchronize the audio with the digital media content. For example, the viewing companion 2092 may communicate with the media universe system 2000 via wireless communications, and a service of the media universe system 2000 may match the audio to a movie based within the media universe and to a particular scene in the movie. As shown in FIG. 10B, once the movie/scene is identified, the viewing companion 2092 may obtain contextual information for the digital media content from the media universe for display on the device 2090. The viewing companion 2092 may alert the client that possesses the device 2090 that contextual information about the digital media content that the client is viewing through device 2080 is available on or through the device 2090 for the client to access. In some embodiments, via the viewing companion 2092, the client may view, explore and manipulate objects from the movie, obtain additional information about characters, explore the digital media content in several contextual modes as previously described, and so on.

Off-Screen Content Module

Figure 10C:
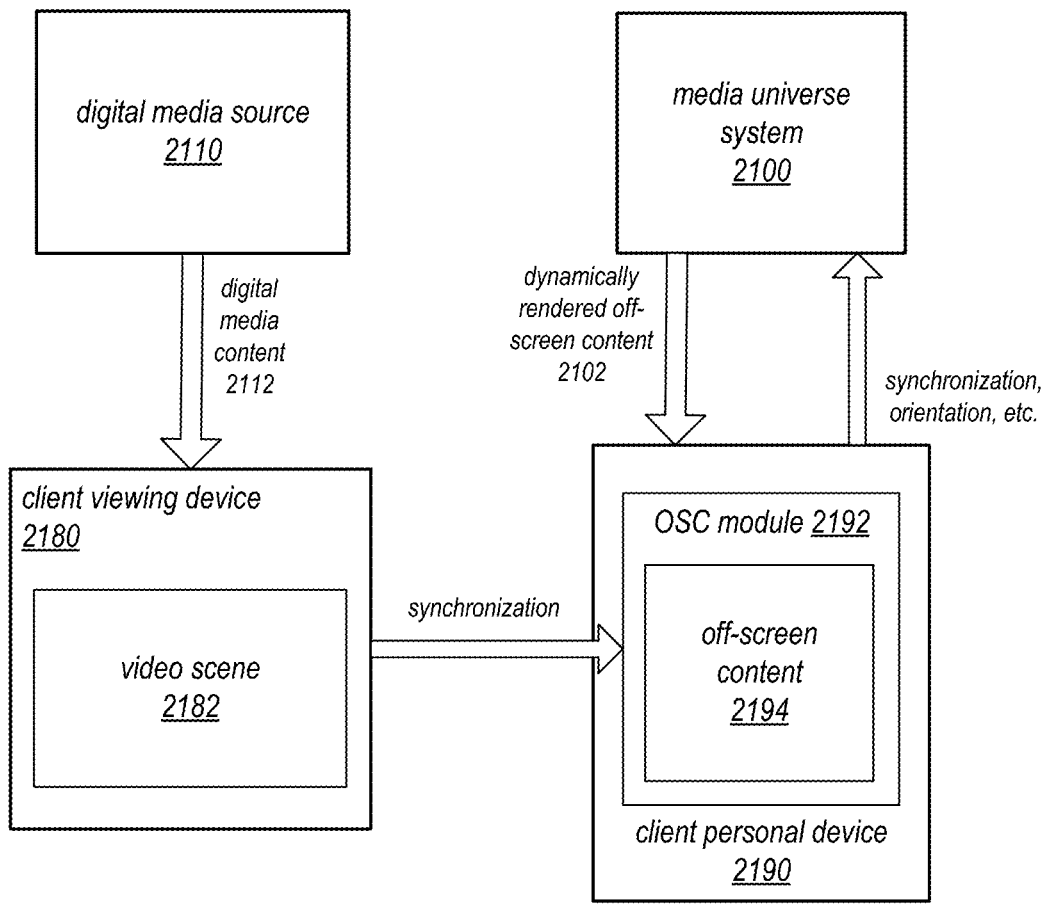
FIGS. 10C through 10E illustrate methods and apparatus for accessing off-screen content of a 3D modeled world in a media universe system, according to at least some embodiments.
Figure 10D:
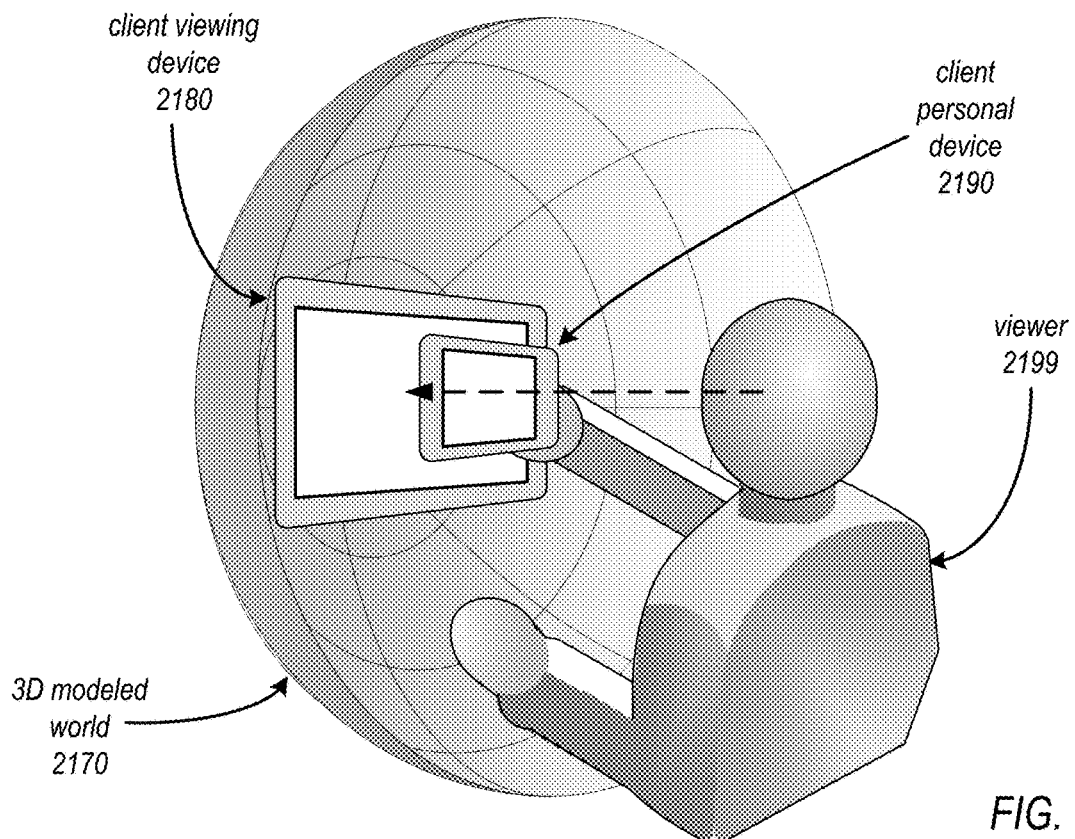
Figure 10E:
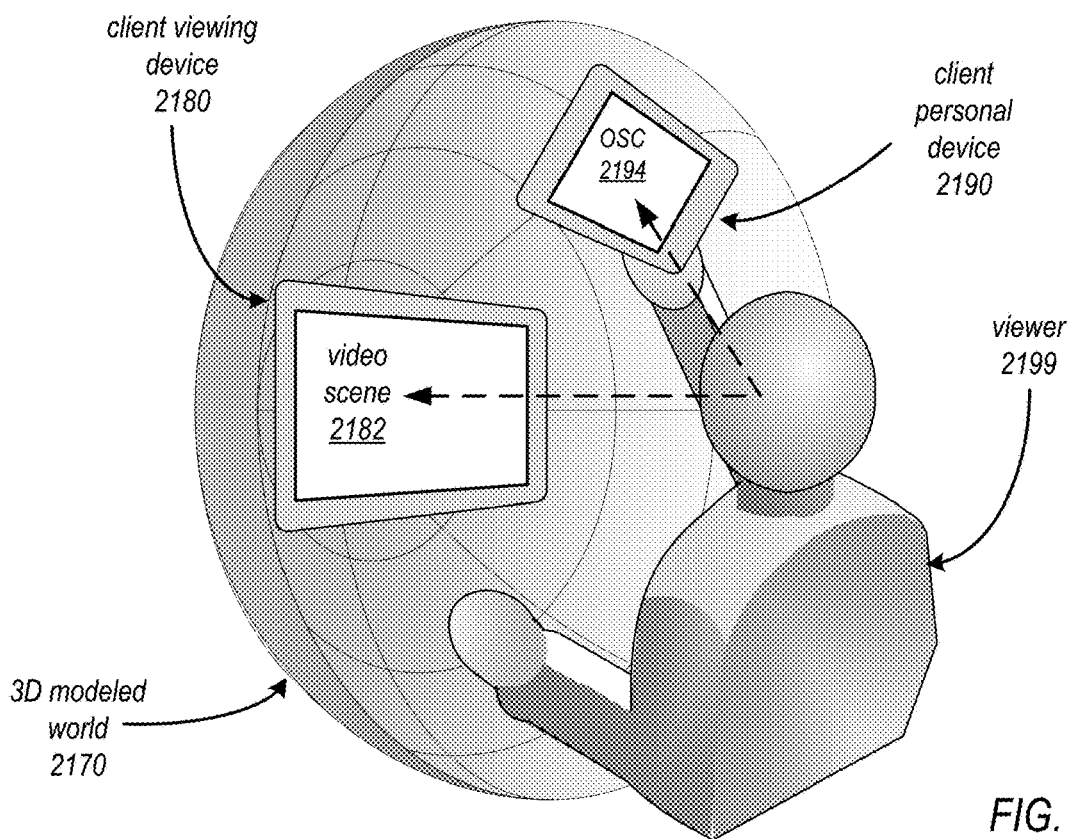

FIGS. 10C through 10E illustrate methods and apparatus for accessing, viewing and interacting with off-screen content of a 3D modeled world in a media universe system or in other video systems that allow users to interact with and explore digital media including but not limited to online game systems, according to at least some embodiments. Embodiments of an off-screen content (OSC) module 2192 for personal devices 2190, including but not limited to multifunction devices, pad, tablet, and smartphone devices, and wearable devices (e.g., glasses or goggles, headsets, helmets, watches, etc.) are described that may allow a user to view and/or interact with off-screen content of a scene being viewed or explored on another device 2180. In some embodiments, the OSC module 2190 may include, but is not limited to, components that enable a user to align or calibrate orientation of device 2190 with device 2180 and to synchronize scene content being displayed on device 2190 with content being streamed to and viewed on device 2180. In some embodiments, the OSC module 2190 may also include interfaces that allow the user to interact with and/or participate in digital media being displayed on device 2180 according to the off-screen view provided on the device 2190.

As shown in FIG. 10C, a digital media source 2010 may stream or otherwise provide digital media content 2112 that may be displayed as video including a video scene 2182 on a client viewing device 2180 for viewing by one or more clients or viewers. For example, client viewing device 2180 may be a home entertainment system, television, computer, laptop, or pad device at which one or more viewers are viewing digital media content 2112 obtained from a source 2110 such as streaming video from the Internet, watching cable television, or playing video from a DVD or Blu-Ray disk. As another example, digital media source 2110 and client viewing device 2180 may be a public movie theater at which various viewers are watching a movie. The digital media content 2112 may, for example, be digital media based in the world of a media universe hosted by a media universe system 2100. Media universe system 2100 may, for example, be an MU system as illustrated in FIG. 1, 2, 12, or 13A. In some embodiments, the digital media content 2112 may be sourced from or accessible by media universe system 2100. In some embodiments, digital media source 2110 may be a component of or may be coupled to media universe system 2100.

A viewer 2199 of the video scene 2182 may possess a personal device 2190, for example a laptop/notebook computer system, pad/tablet device, smartphone device, or wearable device (e.g., glasses or goggles, headsets, helmets, watches, etc.). An off-screen content (OSC) module 2192 may be installed on the personal device 2190. In some embodiments, the OSC module 2192 may act or be used to synchronize the digital media content 2112 being streamed to device 2180 with content on media universe system 2100. In some embodiments, the OSC module 2192 may leverage technology on device 2190 and/or on device 2180 to perform the synchronization with the streamed content. For example, in some embodiments, device 2180 may be a media universe client, for example an MU client 2682 as illustrated in FIG. 13A, and OSC module 2192 may communicate with a client module (e.g., client module 2686 as illustrated in FIG. 13A) on device 2180 to synchronize with the streamed content. As another example, in some embodiments, the OSC module 2192 may detect audio from the streamed digital media content 2112 to synchronize with the streamed content 2112, and may communicate with the media universe system 2100, for example via wireless communications, to synchronize the streamed content 2112 with content on the media universe system 2100 according to the audio. In some embodiments, the OSC module 2192 may intercept or piggyback on a signal (e.g., a WIFI signal) that carries the digital media content 2112 to device 2180 to synchronize with the streamed content 2112. As another example, in some embodiments, the OSC module 2192 may leverage camera, image capture, and image recognition and processing technology of or on device 2190 to detect visual digital media content displayed on device 2180, analyze the visual content, and synchronize with the streamed content 2112 according to the detected visual content. In some embodiments, OSC module 2192 may provide a user interface that enables the viewer 2199 to initiate, control, perform, and/or assist in synchronization with the streamed content 2112. Other methods may be used to synchronize the streamed content 2112 on device 2180, OSC module 2192 on device 2190, and media universe system 2100.

However, in some embodiments, digital media content 2112 being streamed to device 2180 may be sourced from or through media universe system 2100. For example, digital media source 2110 may be, may be a component of, or may be coupled to media universe system 2100. In these embodiments, synchronization of content via OSC module 2192 may not be necessary.

In some embodiments, the OSC module 2192 may leverage technology on device 2190 and/or on device 2180 to calibrate orientation of device 2190 with device 2180. FIG. 10D graphically illustrates calibrating orientation of device 2190 with device 2180, according to some embodiments. For example, in some embodiments, device 2180 may include motion and position sensing technology that may be set or calibrated to an orientation or used to set or calibrate device 2180 to an orientation. In some embodiments, as illustrated in FIG. 10D, the user may simply position device 2190 so that it is oriented with device 2180 (i.e., the two screens are substantially parallel and the centers of the screens are substantially aligned.) As another example, in some embodiments, the OSC module 2192 may leverage camera technology of or on device 2190 to detect visual content displayed on device 2180, and calibrate orientation with device 2180 according to the detected visual content. However, other methods or techniques may be used to calibrate orientation of device 2190 with device 2180. In some embodiments, OSC module 2192 may also obtain or track scene 2182 orientation information with respect to a 3D modeled world 2170 of the digital media content being streamed to device 2180.

As shown in FIG. 10E, once orientation of device 2190 is calibrated with device 2180 and the streamed content 2112 on device 2180 is synchronized (temporally and spatially) with OSC module 2192 on device 2190 and media universe system 2100, the viewer 2199 may interact with and/or participate in digital media (e.g., a video scene 2182) being displayed on device 2180 according to a view of off-screen content (OSC) 2194 provided on the device 2190 by OSC module 2192 and media universe system 2100. In some embodiments, OSC module 2192 may track and communicate orientation or position information for device 2190 with respect to device 2180 to media universe system 2100. In some embodiments, OSC module 2192 may also obtain or track scene 2182 orientation information with respect to 3D modeled world 2170 and provide that scene tracking 2182 information to media universe system 2100.

Media universe system 2100 may, for example, be an MU system as illustrated in FIG. 1, 2, 12, or 13A. Media universe system 2100 may obtain digital assets and/or other MU content related to the 3D modeled world 2170, generate or obtain at least a portion of the 3D modeled world, and render at least a portion of the 3D modeled world according to the synchronization and orientation information being provided by OSC module 2192. The rendered portion corresponds to a portion of the 3D modeled world 2170 currently "covered"

by the device 2190, as shown in FIG. 10E. Media universe system 2100 may stream the dynamically rendered off-screen content 2102 to device 2190; OSC module 2192 may display the content 2102 as OSC content 2194.

Using embodiments of the OSC module 2192, a viewer may point device 2190 to the side, above, below, or even behind relative to device 2180; in response, media universe system 2100 may dynamically render or otherwise obtain off-screen content 2194 corresponding to the location that the device 2190 is being pointed at with respect to a 3D world of the video scene 2182 currently being displayed on another device 2180, and provide (e.g., stream) the dynamically rendered off-screen content to device 2190 for display. In some embodiments, in addition to allowing the viewer 2199 to view off-screen graphical content 2194, audio content of the scene may be provided to the viewer 2199 via device 2190; for example, the viewer 2199 may be able to hear a conversation between two off-screen characters that the viewer 2199 is viewing via the device 2190.

Moving device 2190 may result in new off-screen content 2194 being rendered (if necessary) and streamed by media universe system 2100 according to the new information, and displayed on device 2190. Further, shifting or moving the video scene 2182 being displayed on device 2180 changes the orientation of the 3D world with respect to the current position of device 2190. In some embodiments, this change in orientation may be communicated to media universe system 2100, which may result in new off-screen content 2194 being rendered (if necessary) and streamed to the device 2190 by media universe system 2100 according to the new information, and displayed on device 2190.

In some embodiments, the OSC module 2192 may provide an interface via which the viewer 2199 may interact with the off-screen content of the 3D world of the video scene 2182 currently being displayed on device 2190 to select content, manipulate content, obtain additional information about content, obtain contextual information about content, and so on. In some embodiments, the viewer 2199 may pause the digital media content (e.g., movie) being played to the device 2180 to step into and explore the scene content including the on-screen and off-screen content via the user interface on device 2190. For example, in some embodiments, a viewer 2199 may interact with particular off-screen content (e.g., a particular object or character) of a 3D modeled world 2170 being streamed to and displayed on the viewer's personal device 2190, for example as illustrated in FIGS. 4A through 4C and 5A through 5C, to manipulate and/or obtain more information about the scene content. In some embodiments, the interactions may be processed by client services 230 as illustrated in FIG. 2, which may identify the content (e.g., a particular character or object of the 3D modeled world 2170 based in the media universe) that the viewer 2199 is interacting with and query asset tracking 112 to obtain digital asset(s) corresponding to the content for rendering and/or to obtain information about the particular content for display to the viewer 2199 via device 2190 or device 2180.

In some embodiments, the OSC module 2192 may provide an interface on the viewer 2199's device 2180 via which the viewer 2199 may modify, change, add, and/or edit scene 2182 content or events. For example, in some embodiments, the viewer 2199 may explore on-screen and off-screen content of the scene 2182 using device 2180, may and change one or more of lighting, viewing angle, sound track or sound effects, or other aspects of the scene 2182 via the interface on device 2180 to change the way that that the director and film editor shot and edited the scene. As another example, in some embodiments, the viewer 2199 may change or otherwise manipulate objects in the scene 2182 via the OSC module 2192 on device 2180 in ways that may affect the outcome of the scene 2182. For example, the viewer 2199 may discover a ship coming into a scene 2182 from off-screen via the OSC module 2192, and may change the course, speed, type, or other aspects of the ship, which may impact the outcome of the scene 2182. In some embodiments, the OSC module 2192 and MU system 2100 may allow the viewer 2199 to replay the scene when editing to view the edits, and may also allow the viewer 2199 to record and play back new video of the scene 2182 according to the viewer's modifications and edits of the scene. In some embodiments, the MU system 2100 may allow the viewer 2199 to share the custom video content with other viewers.

In some embodiments, the OSC module 2192 may be integrated with a game system, and may provide an interface via which the viewer (a game player) may interact with off-screen game universe content 2194 (e.g., game characters, other player's avatars, game objects, monsters, etc.) being dynamically rendered for and displayed on device 2190 as described above while the (primary) scene 2182 of the game being played is displayed on device 2180. For example, the interface on OSC module 2192 may allow a player to view, discover and shoot at (or otherwise interact with) game characters, other player's avatars, or other game objects that are to the side, above, below, or even behind the player's character in the current portion of the game universe (i.e., the 3D modeled world 2170 of FIGS. 13D and 13E).

In some embodiments, instead of or in addition to displaying off-screen content 2194 to client personal device 2190, the off-screen content 2194 obtained via OSC module 2192 by pointing device 2190 at an off-screen location relative to client viewing device 2180 may be displayed on client viewing device 2180, or on another device. The off-screen content 2194 may, for example, be displayed in an overlay on video scene 2182 being displayed on device 2180.

In some embodiments, two or more viewers 2199 may access, view, explore, and interact with off-screen content 2194 of a video scene 2182 being displayed on a client viewing device 2180 via respective client devices 2190. In some embodiments, one client device 2190 may be synchronized and oriented with the video scene 2182 on client viewing device 2180 to access, view, and interact with the off-screen content 2194, and the other device(s) 2180 may receive the same content 2194 to allow the respective viewer 2199 to view and/or interact with the content 2194. In some embodiments, each client device 2190 may be synchronized and oriented with the video scene 2182 on client viewing device 2180 to each independently access, view, and interact with different off-screen content 2194.

Figure 10F:
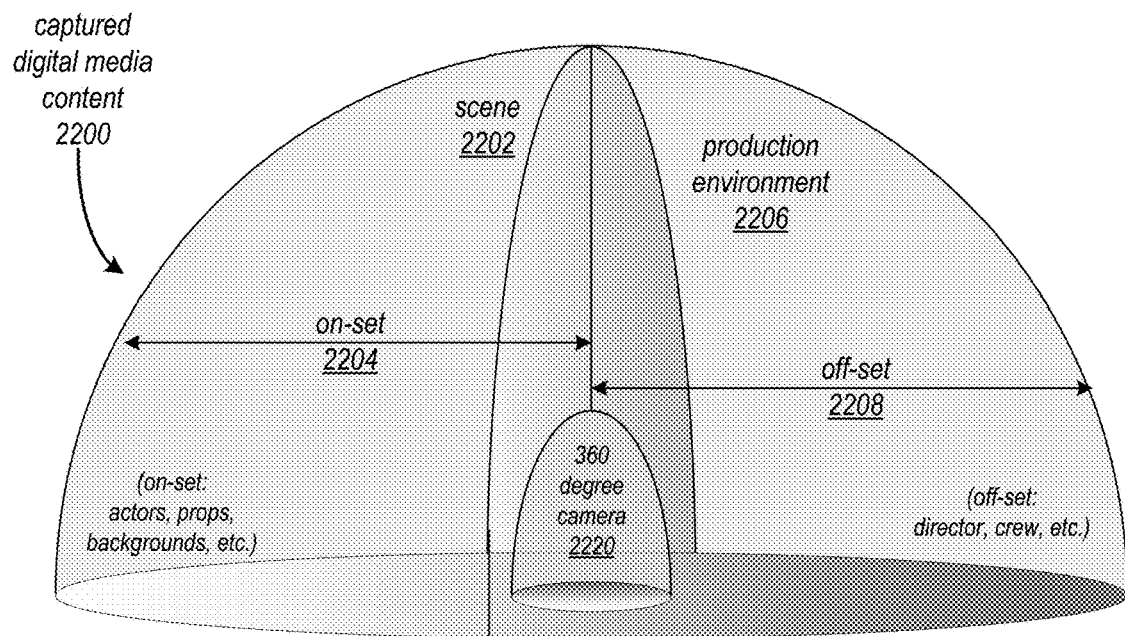
FIGS. 10F and 10G illustrate methods and apparatus for capturing and providing off-set content in a media universe system, according to at least some embodiments.
Figure 10G:
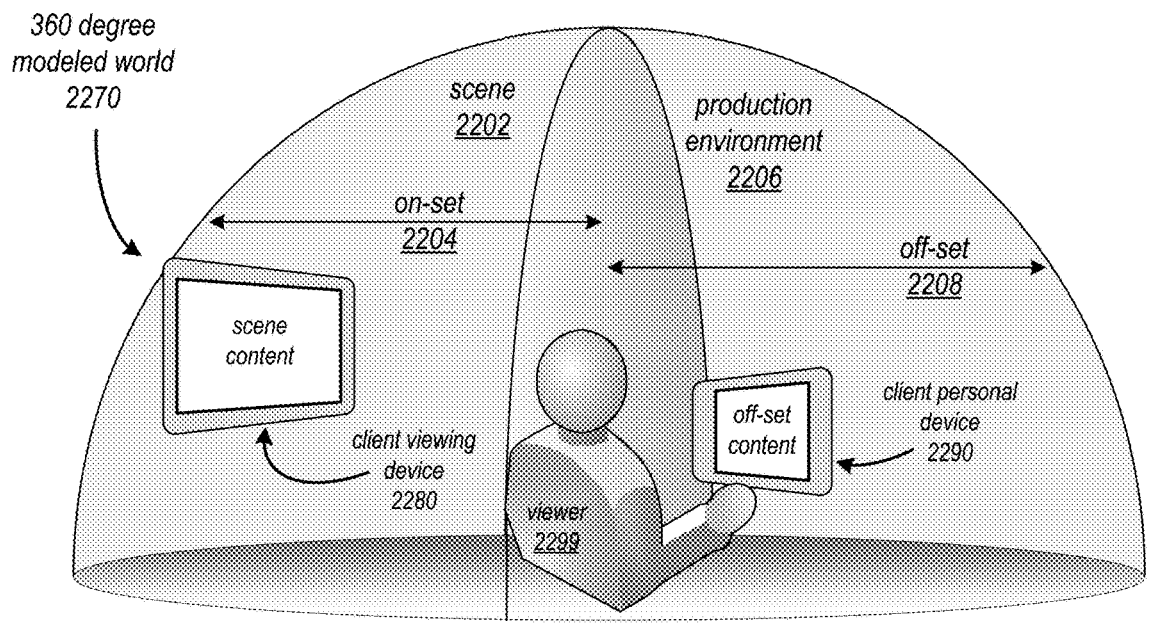

In some embodiments, instead of or in addition to accessing and displaying off-screen content 2194 of a scene 2182 being displayed from digital media content 2112 to client personal device 2190, the off-screen content 2194 obtained via OSC module 2192 by pointing device 2190 at an off-screen location relative to client viewing device 2180 may include off-set content from a production environment in which the scene content was captured. FIGS. 10F and 10G illustrate methods and apparatus for capturing and providing off-set content in a media universe system, according to at least some embodiments. Referring to FIG. 10F, digital media content 2200 (e.g., video, movies, etc.) may be captured by digitally filming a scene 2202 including actors, props, etc. in action on a set or stage, indoors or outdoors, on location or in a studio. The content of the captured scene(s) 2202 may be referred to as scene or on-set 2204 content. Camera technology (e.g., 360-degree camera 2220 technology) may be used to also capture what is happening off-set 2208 within the production environment 2206 when capturing on-set scenes 2202 for the video. The on-set 2204 and off-set 2208 content may be stored as digital media content to a digital media source 2110.

As shown in FIG. 10G, a media universe system 2100 may render 360-degree modeled world 2270 content for the captured digital media including on-set 2204 and off-set 2208 content. An OSC module 2192 (not shown) on a viewer 2299's client personal device 2290 may be used to access, view, pause, explore, and interact with both on-set 2204 and off-set 2208 content provided by the media universe system 2100. In some embodiments, the viewer 2299 may view scene content via client viewing device 2280. The viewer 2299's client personal device 2290 (e.g., a pad, tablet, smartphone, etc.) may be synchronized and oriented with the scene content on client viewing device 2280 to access, view, and possibly interact with off-screen content including on-set 2204 and off-set 2208 content as captured during production. The viewer 2299 may orient or point the device 2290 towards off-screen scene 2202 content to view and interact with the off-screen scene 2202 content, and may also orient or point the device 2290 towards off-set 2206, production environment 2208 content to view what's going on "behind the scenes" during filming of the respective scene. In some embodiments, the viewer 2299 may also interact with the production environment 2208 content via the user interface on device 2290. In some embodiments, the viewer 2299 may pause the digital media content (e.g., movie) being played to the device 2280 to step into and explore the scene content including the on-screen and off-screen scene 2204 content and the off-set 2208, production environment 2206 content via the user interface on device 2290. For example, in some embodiments, the viewer 2299 may select the director to discover more information about the director, or may do the same for other members of the production crew, or other objects that appear in the off-set production 2208 environment. In some embodiments, the interactions with the production environment 2208 content may be processed by client services 230 as illustrated in FIG. 2, which may identify the content (e.g., a particular crew member, particular objects, etc.) that the viewer 2299 is interacting with and query asset tracking 112 to obtain digital asset(s) or other content corresponding to the content to obtain information about the particular production environment 2208 content for display to the viewer 2299 via device 2290 or device 2280.

Multi-Viewer Exploration of a Modeled World

At least some embodiments of a media universe (MU) system, for example an MU system as illustrated in FIGS. 1 and 2, 12, or 13A, may allow multiple viewers to actively participate in exploring digital media content in real-time. FIGS. 10H through 10K graphically illustrate an MU system environment in which multiple viewers may participate in exploring and interacting with a modeled world dynamically rendered by an MU system and streamed to respective client devices, according to at least some embodiments. In some embodiments, a digital media source may stream or otherwise provide digital media content that may be displayed as video including a video scene 2382 on a client viewing device 2380 for viewing by one or more clients or viewers. For example, client viewing device 2380 may be a home entertainment system, television, computer, laptop, or pad device at which one or more viewers 2399 are viewing digital media content obtained from a source such as streaming video from the Internet, watching cable television, or playing video from a DVD or Blu-Ray disk. As another example, the digital media source and client viewing device 2380 may be a public movie theater at which various viewers are watching a movie. The digital media content may, for example, be digital media based in the world of a media universe hosted by an MU system. The MU system may, for example, be an MU system as illustrated in FIG. 1, 2, 12, or 13A. In some embodiments, the digital media content may be sourced from or accessible by the MU system. In some embodiments, the digital media source may be a component of or may be coupled to the MU system.

Figure 10H:
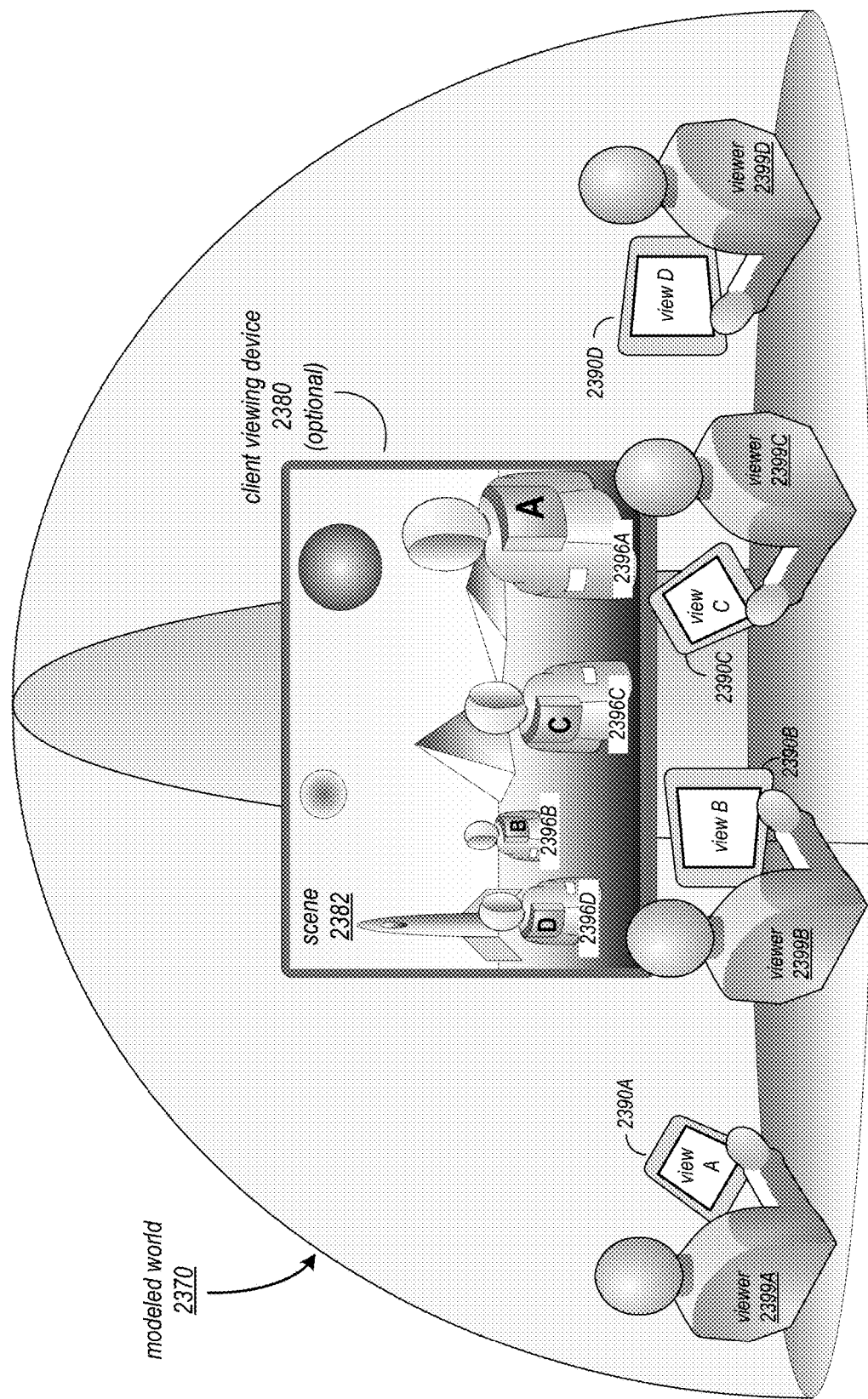
FIGS. 10H through 10K graphically illustrate an MU system environment in which multiple viewers may participate in exploring and interacting with a modeled world dynamically rendered by an MU system and streamed to respective client devices, according to at least some embodiments.

As shown in FIG. 10H, in some embodiments multiple viewers 2399 (four viewers 2399A through 2399D, in this example) may each join in exploring scene 2382 content from digital media (e.g., a movie, or episode of a series) based in the world of the media universe, for example via an MU client module and MU client interface on the viewers' 2399 respective client personal devices 2390A-D (e.g., pads, tablets, smartphones, multifunction devices, wearable devices such as headsets, glasses, goggles, watches, etc.) In some embodiments, for example, a viewer 2399 may pause digital media (e.g., a movie) being played to a viewing device 2380 at a scene 2382, and the viewer 2399 and one or more other viewers 2399 may "step into" the scene 2382 to explore and interact with content of the scene from different viewing angles. The MU system may dynamically generate and render respective views A-D of scene 2382 content for each of the viewers 2399 and stream the rendered content to the respective devices 2390. The scene 2382 content that can be explored, interacted with, and dynamically generated, rendered, and streamed may include on-screen, off-screen, on-set, and/or off-set content as previously described.

In some embodiments, each viewer 2399A-D may independently control a respective avatar 2396A-D in the scene 2382 to explore the modeled world 2370 of the scene 2382 and interact with the scene 2382 content, with each viewer's 2399 respective view A-D of the scene 2382 rendered according to the respective avatar 2396's viewpoint. In some embodiments, at least one viewer 2399's avatar 2396 may be a customized avatar of the respective viewer 2399 stored as a digital asset in an asset repository or by a repository service and retrieved by the MU system to be dynamically rendered into the scene 2382 being explored for the respective viewer 2399, as previously described.

Figure 10I:
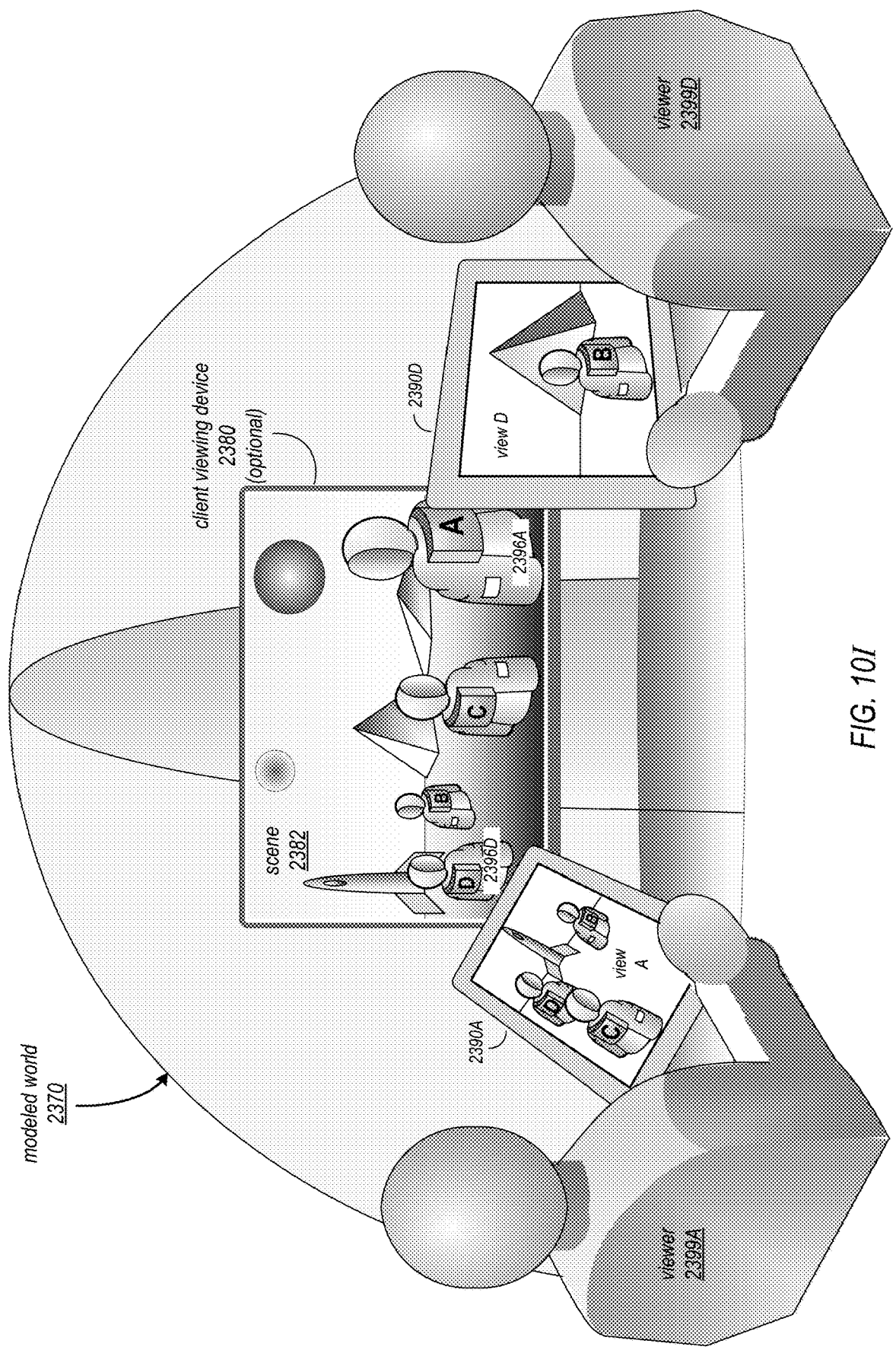

As shown in FIG. 10I, each viewer's 2399 respective view of the scene 2382 may be rendered according to the respective avatar 2396's viewpoint. This example shows that viewer 2399A is viewing the scene 2382 via device 2390A from the viewpoint of avatar 2396A, while viewer 2399D is viewing the scene 2382 via device 2390D from the viewpoint of avatar 2396D. Viewer 2399A can see avatars 2396B, C, and D from the viewpoint of avatar 2396A, and viewer 2399D can see avatar 2396B from the viewpoint of avatar 2396D. In some embodiments, a viewer 2399 may control a respective avatar 2396 to view and interact with (e.g. communicate with) other viewers 2399 via the other viewers' 2399 respective avatars 2396, as well as other dynamically rendered content of the modeled world 2370. Two or more of the viewers 2399 may cooperatively explore the modeled world 2370 via their avatars 2396.

In some embodiments, the content of the modeled world 2370 and scene 2382 which the viewers 2399 are exploring via their avatars 2396 may be or may include content from a movie, episode, or other digital media of the media universe. For example, the viewers 2399 may step into and explore a scene from a movie based in the world of the media universe. The viewers' respective custom avatars 2396 may be retrieved by the MU system from an asset repository and rendered into the scene 2382. Each viewer 2399 may control their respective avatar 2396 to view the content of the modeled world 2370 from different viewpoints or perspectives, may view and interact with other viewers 2399 via their avatars 2396, and may explore and interact with content such as objects, buildings, vehicles, and so on.

In some embodiments, a viewer 2399 may capture "snapshots" or still images of the scene 2382 being viewed, or snapshots of the viewer's avatar 2396 within the scene 2382, or the viewers 2399 may capture group pictures of their avatars 2396 within the scene 2382. For example, viewers 2399 may step into and explore a famous battle scene from a movie based in the world of the media universe using their respective avatars 2396, explore the battle scene by controlling their respective custom avatars 2396 to explore a modeled world 2370 generated by the MU system, and capture snapshots of their avatars within the scene at different locations and from different viewpoints. In some embodiments, the user interface on devices 2180 may provide interface elements and methods via which the viewers 2399 may capture the snapshots, and may also provide interface elements and methods via which the viewers 2399 may order prints and posters of the scene 2382 with the viewers' avatars 2396 in the scene 2382. In some embodiments, the user interface on devices 2180 may also provide interface elements and methods via which the viewers 2399 may order 3D printings of the scene 2382 with the viewers' avatars 2396 and other content (characters, objects, etc.) of the media universe in the scene 2382 from a 3D printing service. In some embodiments, a viewer 2399 may instead or also capture or otherwise obtain video clips of the scene 2382 exploration from the viewpoint of the viewer 2399's avatar 2396, or from one or more other viewpoints (e.g., an eagle eye viewpoint, or wide angle viewpoint).

In some embodiments, as illustrated in FIG. 10H, each viewer 2399 may control movement and orientation of their respective avatar 2396 when exploring the modeled world 2370 of the scene via controls or user interface elements on the viewer's respective device 2390. However, instead of or in addition to controlling avatars 2396 via user controls and interfaces on the devices 2390, in some embodiments the avatars 2396 may be controlled within the virtual world by respective movements of the devices 2390 within the physical world. For example, in some embodiments, a viewer 2399 may point their device 2390 in a direction (up, down, left, right, etc.) to view off-screen content, as described in reference to FIGS. 10C through 10G. As another example, in some embodiments, viewer(s) 2399 may move around with their respective client devices 2390 in an indoor or outdoor physical environment (e.g., a room, hangar, warehouse, theater, field, etc.), and their respective movements may be mapped into a virtual world of the media universe to cause their respective avatars 2396 to correspondingly move in the virtual world, for example as illustrated in FIGS. 10J and 10K.

Figure 10J:
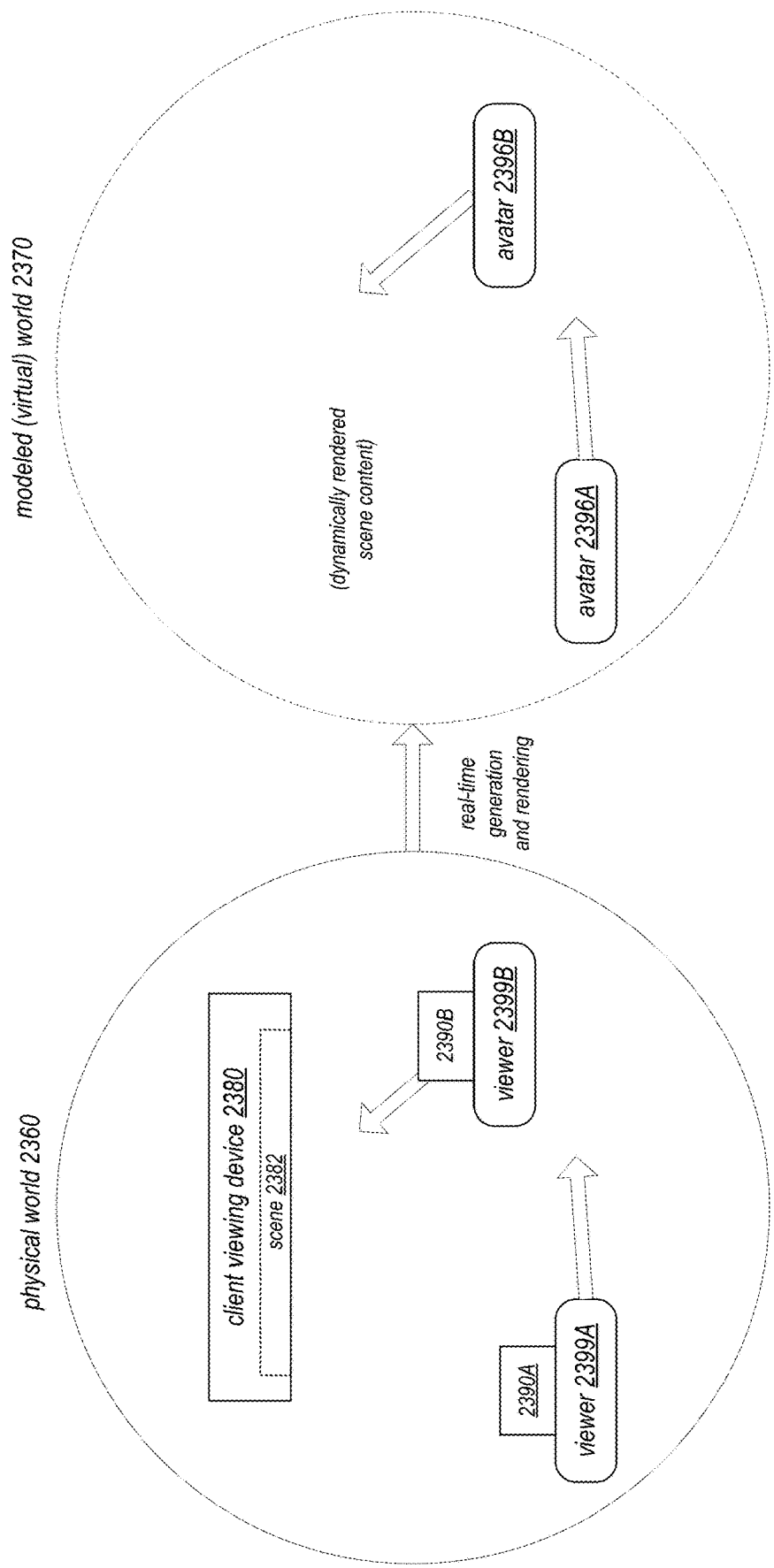
Figure 10K:
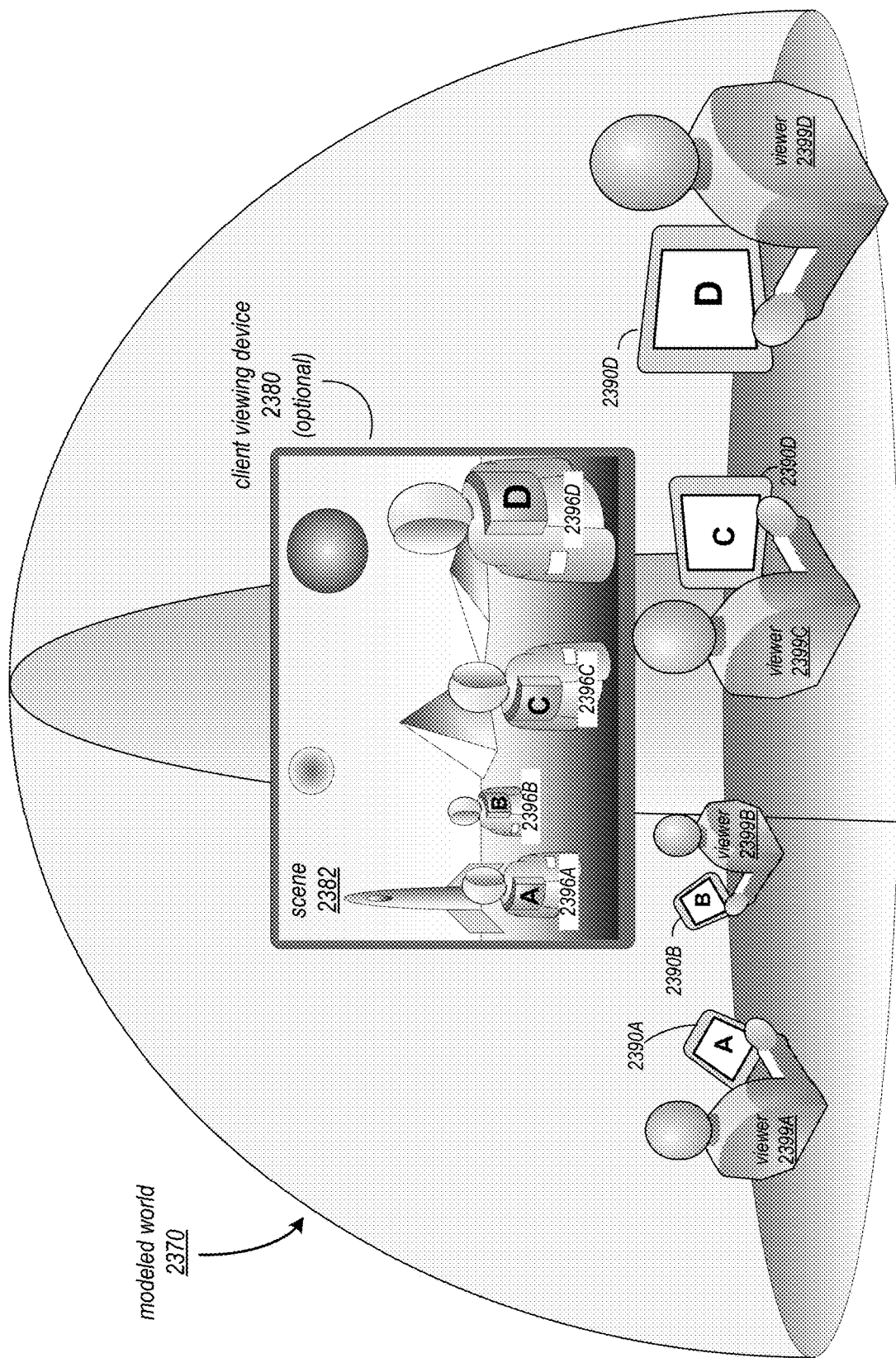

FIGS. 10J and 10K illustrate one or more viewers 2399 dynamically exploring and interacting with a scene by physically moving respective client personal devices 2390, according to some embodiments. Referring to FIG. 10J, in some embodiments, the media universe system may leverage various position tracking, motion detection, and/or motion sensing technologies to determine and track locations, orientations, and movements of the viewers' respective devices 2390 in the physical world 2360 with respect to some point or points in the virtual or modeled world 2370, for example with respect to the client viewing device 2380 or another device coupled to the client viewing device 2380, and/or with respect to each other. In some embodiments, methods and technologies may be leveraged to calibrate and/or orient the devices 2390 with the device 2380 and/or with scene 2382, for example as was described in reference to FIGS. 10D and 10E. In some embodiments, one or more of the devices 2390 may detect relative positions with respect to one or more others of the devices 2390 within the modeled world 2370, and/or with respect to device 2380 and/or scene 2380. In some embodiments, two or more of the devices 2390 may determine respective position, location, orientation with respect to each other, and/or movement and/or communicate position, location, orientation, and/or movement to each other. One or more of the devices 2390 and/or device 2380 may communicate position, location, orientation, and/or movement information for the device(s) 2390 to the MU system. The MU system may dynamically move and/or change orientation of the avatars 2396 in the modeled (virtual) world 2370 and scene 2380 according to the received location, orientation, and/or movement information, generate and render new digital media content for each viewer 2399 according to the current or new viewpoint of the viewer 2399's respective avatar 2396, and stream the newly rendered digital media content to the respective viewers' devices 2390 for display.

FIG. 10J shows as an example an overhead view of two viewers 2399A and 2399B moving with their respective devices 2390A and 2390B within a physical world 2360 environment, for example a room, hall, field, etc, as well as the viewers' corresponding avatars 2396A and 2396B in an overhead view of a modeled (virtual) world 2370. The movements of the devices 2390A and 2390B in the physical world 2360 may be tracked with respect to each other and/or with respect to some other point in the environment 2360, for example device 2380. As the devices 2390A and 2390B are moved, the tracked movements may be provided to an MU system, which may, in response, correspondingly move respective avatars 2396A and 2396B within the modeled (virtual) world 2370. The movements of avatars 2396A and 2396B within the virtual world 2370 are reflected on the viewers' respective devices 2390A and 2390B; each viewer 2399 sees a changing view of the virtual world 2370 from the viewpoint of their respective avatar 2396 as the viewer 2399 moves the respective device 2390 within the physical world 2360. In some embodiments, a display of the scene 2382 including the avatars 2396A and 2396B may also be displayed on a viewing device 2380.

FIG. 10K shows as an example a graphical view of four viewers 2399A-2399D moving with their respective devices 2390A-2390D within a physical world environment, for example a room, hall, field, etc, as well as the viewers' corresponding avatars 2396A-2396D in view of a scene 2382 in a modeled world 2370. The movements of the devices 2390A-2390D in the physical world may be tracked with respect to each other and/or with respect to some other point, for example a device 2380. As respective viewers 2399A-2399D move the devices 2390A-2390D, the tracked movements may be provided to an MU system, which may, in response, correspondingly move respective avatars 2396A-2396D within the modeled world 2370. The movements of avatars 2396A-2396D within the modeled world 2370 are reflected on the viewers' respective devices 2390A-2390D; each viewer 2399 sees a changing view of the modeled world 2370 from the viewpoint of their respective avatar 2396 as the viewer 2399 moves the respective device 2390 within the physical world environment. In some embodiments, displaying the scene 2382 on a viewing device 2380 may be optional.

While FIGS. 10H through 10K show a scene 2382 being explored by viewers 2399 using respective client devices 2390 while also being displayed on a viewing device 2380, in some embodiments the viewers 2399 may step into and explore a scene 2382 using respective client devices 2390 without the scene 2382 being displayed on a separate viewing device 2380. For example, one viewer 2399 may stream a movie to the viewer's respective client device 2390, pause the movie at a scene 2382, step into the scene 2382, and invite one or more other viewers 2399 to step into the scene 2382 using their respective client devices 2390. In some embodiments, viewers 2399 may locally participate in exploring a scene 2382 (e.g., within the same room), or two or more viewers 2399 may remotely participate in exploring a scene 2382 (e.g., from different rooms, houses, cities, or even countries).

In some embodiments, sound and camera technology of the client devices 2390 may be leveraged to capture video or views of the viewers 2399, and/or the voice of the viewers 2399, during the scene 2382 exploration. For example, in some embodiments, a front-facing camera on devices 2390 may be used to capture the viewers' facial expressions, and the viewers' facial gestures may be analyzed, modeled, and applied to the viewers' respective avatars 2396 when interacting with other avatars 2396 and thus with other viewers 2399. For example, when a viewer 2399 makes an angry face, the viewer's avatar 2396 may be rendered with an angry face. In some embodiments, a viewer 2399's voice may be captured by the viewer's device 2390 and output as the voice of the viewer's respective avatar 2396 on other client devices 2390 when interacting with other avatars 2396 and thus with other viewers 2399.

Repository Service for Digital Assets

Embodiments of a repository service are described that may, for example, be used in or with a media universe (MU) system as described herein to manage digital assets within a media universe. However, the repository service may be used in other applications and environments. FIG. 11 is a high-level illustration of a repository service 2410, according to at least some embodiments. In embodiments, digital assets (2D or 3D models, graphical objects, pre-rendered content such as difficult to render scenes, etc.) may be stored in a digital asset repository 2412 according to a repository service 2410 that provides interface(s), for example an application programming interface (API), to other processes, applications, services, and so on (e.g., to developers 2470 and a streaming service 2430 as illustrated in FIG. 11) for storing assets to and retrieving assets from the repository 2412. In some embodiments, the repository service 2410 and repository 2412 may be implemented on computation and storage resources within a provider network environment. FIG. 14 illustrates an example provider network environment in which embodiments of a repository service 2410 and repository 2412 may be implemented. However, repository service 2410 and repository 2412 may be implemented in other network environments in various embodiments. In some embodiments, repository service 2410 and repository may be implemented on separate networks. For example, repository service 2410 may be implemented on a provider network 2910 as illustrated in FIG. 14, and repository 2412 may be implemented on a network external to provider network 2910.

Various entities including but not limited to processes, applications, services, clients, and so on (shown in FIG. 11 as developers 2470) may create digital assets and store the assets to the repository 2412 via the service 2410. While not shown in FIG. 11, in some embodiments, digital assets may be created or customized at media clients 2480 and uploaded to the repository 2412 via service 2410. Various entities including but not limited to processes, applications, services, clients, and so on (e.g., developers 2470 and streaming service 2430 as illustrated in FIG. 11) may obtain assets from the repository 2142 via the service 2410 for insertion into various modeled worlds or other digital media content. For example, movies, games, and so on may be customized with digital assets that are created elsewhere and stored to and fetched from the repository 2412 via the repository service 2410. For example, developers 2470 may create new digital assets and store the digital assets to the repository 2412 via the service 2410, and may also fetch digital assets from the repository 2412 via the service 2410 for insertion into digital media 2472 being developed.

In some embodiments, network-based computation resources and services of a provider network, for example a streaming service 2430, may be leveraged to dynamically generate and render digital content (e.g., video from movies, games, etc.) that includes content rendered at least in part from digital assets retrieved from the repository 2412 via the repository service 2410. Streaming service 2430 may, for example, be implemented in a provider network environment as illustrated in FIG. 14. In some embodiments, streaming service 2430 and repository service 2410 may be on the same network, for example a provider network 2910 as illustrated in FIG. 14. However, in some embodiments, streaming service 2430 and repository service 2410 may be on separate networks.

In some embodiments, for example, a streaming service 2430 may receive digital media content (e.g., video) from a digital media source 2450 (which may be, but is not necessarily, on a provider network) in which digital assets are to be inserted, retrieve the respective digital assets from the repository 2412 via the repository service 2410, render new video content including the rendered digital assets, and stream the newly rendered content to one or more media client 2480 devices. The scalability of and computational power available through the network-based computation and storage resources of the provider network, as well as the video and audio streaming capabilities provided through a streaming protocol of the streaming service 2430, may allow the streaming service 2430 to dynamically render and stream custom digital media content including targeted objects rendered from digital assets obtained through repository service 2410 to tens, thousands, or even millions of clients 2480.

In some embodiments, the streaming service 2430 may fully render the video content before streaming the content to the media client 2480 device(s). However, in some embodiments, the digital assets may be pre-rendered or rendered elsewhere and combined with the input digital media content by the streaming service 2430 prior to streaming to the media client 2480 device(s). In some embodiments, pre-rendered digital media content and pre-rendered digital assets may be streamed to media client 2480 device(s) and combined by a client module or process on the media client 2480 device(s) for display.

Media client 2480 device(s) may include, but are not limited to, televisions, set-top boxes coupled to video monitors or televisions, cable boxes, desktop computer systems, laptop/notebook computer systems, pad/tablet devices, smartphone devices, game consoles, and handheld or wearable video viewing devices. Wearable devices may include, but are not limited to, glasses or goggles headsets, helmets, and "watches" or the like that are wearable on the wrist, arm, or elsewhere. An example computing device that may be used as a client device is illustrated in FIG. 28.

In some embodiments, digital media 2472 (e.g., a video or a game) being provided to a client 2480 may include "hooks" via which digital assets that are targeted at the particular client 2480 (or at particular groups of clients 2480) may be inserted. For example, a client 2480 or developer 2470 may select, create, or customize particular digital asset(s) for use within specified digital media such as a video, and may specify particular digital assets to be inserted at particular hooks within the digital media. During playback of the video to a client 2480's device, the streaming service 2430 may access the custom digital assets from the repository 2412 via the service 2410 and insert the digital assets in the video stream according to the specified hooks. As a non-limiting example, a custom version of a robot may be stored as a digital asset to the digital asset repository 2412 and may be associated with a particular client 2480 or clients 2480. When playing back a video or playing a game that includes a hook for the particular robot or a similar robot, the streaming service 2430 may get the custom robot digital asset from the repository 2412 via the service 2410, render video including the custom robot, and stream the rendered video to the client 2480's device.

As another example, particular versions or models of digital assets used in digital media 2472 may be determined for and targeted to particular clients 2480 or groups of clients 2480, for example according to profiles or preferences of the clients 2480. In some embodiments, information (e.g., preferences, viewing history, shopping history, sex, age, location, and other demographic and historical information) may be collected for or from clients 2480, or may be accessed from other information sources, services, or providers. This information may be used to generate and maintain client profiles. The client profiles may be accessed by streaming service 2430 according to identities of the client(s) 2480 when accessing at least some digital media 2472 within the media universe, and used by streaming service 2430 to retrieve targeted digital assets from repository 2412 via service 2410 to dynamically and differently render one or more objects in one or more scenes that are targeted at particular clients 2480 or client 2480 groups according to their respective profiles.

While not shown in FIG. 11, in some embodiments, metadata for the digital assets may be stored with digital assets in the repository 2412, or may be stored elsewhere. The metadata may include descriptions, dimensions, types, and so on for respective digital assets. When streaming service 2430 requests a digital asset from repository service 2410 according to an API of the service 2410, respective metadata may be provided with the digital asset. The streaming service 2430 may then use this metadata in determining how to render an object from the digital asset for insertion into the scene at the target hook location. In some cases, other parts of a scene may have to be differently rendered (e.g., resized) to accommodate an object rendered from a particular digital asset.

While not shown in FIG. 11, in some embodiments, a digital asset licensing component or layer may be implemented by the repository service 2410. The digital asset licensing component or layer may, for example, be used to grant potential licensors (clients, developers, etc.) permission to find and license digital assets from repository 2412 for the production of digital media 2472, for real-time insertion into digital media 2472 being streamed to clients 2480, and/or for generating merchandise based on or generated from digital assets stored in the repository 2412.

Example Network Environments

Embodiments of systems that implement one or more of the various methods as described herein, for example an example media universe (MU) system 110 as illustrated in FIGS. 1 and 2 and that implements the methods as illustrated in FIGS. 6 through 9, may be implemented in the context of a service provider that provides virtualized resources (e.g., virtualized computing resources, virtualized storage resources, virtualized database (DB) resources, etc.) on a provider network to clients of the service provider, for example as illustrated in FIG. 12. Virtualized resource instances on the provider network 2500 may be provisioned via one or more provider network services, and in some embodiments may be rented or leased to clients of the service provider, for example to an MU system provider 2590 that implements MU system 2510 on provider network 2500. At least some of the resource instances on the provider network 2500 may be computing resources implemented according to hardware virtualization technology that enables multiple operating systems to run concurrently on a host computer, i.e. as virtual machines (VMs) on the host. Other resource instances (e.g., storage resources) may be implemented according to one or more storage virtualization technologies that provide flexible storage capacity of various types or classes of storage to clients of the provider network. Other resource instances (e.g., database (DB) resources) may be implemented according to other technologies.

In at least some embodiments, the provider network 2500, via provider network services, may enable the provisioning of logically isolated sections of the provider network 2500 to particular clients of the service provider as client private networks on the provider network 2500. At least some of a client's resources instances on the provider network 2500 may be provisioned in the client's private network. For example, in FIG. 12, MU system 2510 may be implemented as or in a private network implementation of an MU system provider 2590 that is provisioned on provider network 2500 via one or more of the provider network services.

The provider network 2500, via provider network services, may provide flexible provisioning of resource instances to clients in which virtualized computing and/or storage resource instances or capacity can be automatically added to or removed from a client's configuration on the provider network 2500 in response to changes in demand or usage, thus enabling a client's implementation on the provider network 2500 to automatically scale to handle computation and/or data storage needs. For example, one or more additional computing resources may be automatically added to components or modules of MU system 2510 in response to an increase in the number of MU clients 2582 accessing MU system 2510 to interact with digital media of a media universe as described herein. In some embodiments, if and when usage drops below a threshold, computing and data storage resources that are no longer necessary can be removed.

In at least some embodiments, an MU system provider 2590 (e.g., a digital media developer or developers, or other entity that controls or manages a media universe) may access one or more provider network services of the provider network 2500 via application programming interfaces (APIs) to the services (shown in FIG. 12 as developer service interface 2502) to configure and manage an MU system 2510 on the provider network 2500, the MU system 2510 including multiple virtualized resource instances (e.g., computing resources, storage resources, DB resources, etc.).

Provider network services may include but are not limited to, one or more hardware virtualization services for provisioning computing resource, one or more storage virtualization services for provisioning storage resources, and one or more database (DB) services for provisioning DB resources. In some implementations, an MU system provider 2590 may access two or more of these provider network services via respective APIs to provision and manage respective resource instances in MU system 2510. However, in some implementations, MU system provider 2590 may instead access a single service (e.g., a streaming service) via an API to the service; this service may then interact with one or more other provider network services on behalf of the MU system provider 2590 to provision the various resource instances in the MU system 2510.

In some embodiments, provider network services may include a streaming service for creating, deploying, and managing data streaming applications such as an MU system 2510 on a provider network 2500. Many consumer devices, such as personal computers, tables, and mobile phones, have hardware and/or software limitations that may limit the devices' capabilities to perform 3D graphics processing and rendering of video data in real time. In at least some embodiments, a streaming service may be used to implement, configure, and manage an MU system 2510 that leverages computation and other resources of the provider network 2500 to enable real-time, low-latency 3D graphics processing and rendering of digital media (e.g., movies, videos, games, etc.) on provider network 2500, and that implements a client service interface 2520 (e.g., an application programming interface (API)) for receiving MU client 2582 input and for streaming digital media content including real-time rendered video or game content as well as pre-recorded video to respective MU clients 2582. In at least some embodiments, one or more provider network services of the provider network 2500, for example a streaming service, may manage, for MU system provider 2590, the deployment, scaling, load balancing, monitoring, version management, and fault detection and recovery of the server-side MU system 2510 logic, modules, components, and resource instances. Via the streaming service, the MU system 2510 can be dynamically scaled to handle computational and storage needs, regardless of the types and capabilities of the devices that the MU clients 2582 are implemented on.

In at least some embodiments, at least some of the MU clients 2582 may implement an MU client interface 2684 and client module 2686 as shown in FIG. 13A for communicating user input and interactions to MU system 2510 according to the client service interface 2520, and for receiving and processing video streams and other content received from the client service interface 2520. Referring to FIG. 13A, in at least some embodiments, the streaming service may also be leveraged to develop and build MU client modules 2686 and MU client interfaces 2684 for various operating system (OS) platforms on various types of client devices 2680 (e.g., tablets, smartphones, desktop/notebook computers, etc.).

Referring again to FIG. 12, in at least some embodiments, digital media including but not limited to video content may be streamed from the client service interface 2520 to an MU client 2582 according to a streaming protocol. In at least some embodiments, data including but not limited to user input and interaction may be sent to the client service interface 2520 from the MU client 2582 according to the streaming protocol. In at least some embodiments, the client service interface 2520 may receive digital media content (e.g., rendered video frames) from a video playback module (not shown) and/or from a rendering 2560 module, package the video content according to the streaming protocol, and stream the video according to the protocol to respective MU client(s) 2582 via intermediate network 2570. In at least some embodiments, an MU client interface 2684 of the MU client 2582 may receive a video stream from the client service interface 2520, extract the video content from the streaming protocol, and forward the video to a display component of the respective client device 2680 for display.

Referring to FIG. 12, an MU system provider 2590 may develop and deploy an MU system 2510, leveraging one or more of the provider network services to configure and provision MU system 2510. As shown in FIG. 12, the MU system 2510 may include and may be implemented as multiple functional modules or components, with each module or component including one or more provider network resources (e.g., computing resources, storage resources, database resources, etc.). In this example, MU system 2510 includes a client service interface 2520 component, an MU control module 2530, a graphics processing 2540 module, a graphics rendering 2560 module, and data storage that includes storage resources and database (DB) resources that implement an MU database 2550. Note that an MU system 2510 may include more or fewer components or modules, and that a given module or component may be subdivided into two or more submodules or subcomponents. Also note that two or more of the modules or components as shown can be combined; for example, graphics processing 2540 module and rendering 2560 module may be combined to form a combined graphics processing and rendering module.

One or more computing resources may be provisioned and configured to implement the various modules or components of the MU system 2510. For example client service interface 2520, MU control module 2530, graphics processing 2540 module, and rendering 2560 module may each be implemented as or on one or more computing resources. In some embodiments, two or more computing resources may be configured to implement a given module or component. For example, two or more virtual machine instances may implement an MU control module 2530. However, in some embodiments, an instance of a given module (e.g., an instance of graphics processing 2540 module, or an instance of rendering 2560 module) may be implemented as or on each of two or more computing resource instances. For example, in some implementations, each computing resource instance may be a virtual machine instance that is spun up from a machine image implementing a particular module, for example a graphics processing 2540 module, that is stored on storage resource(s) of the provider network 2500.

In at least some embodiments, computing resources may be specifically provisioned or configured to support particular functional components or modules of the MU system 2510. For example, computing resources of graphics processing 2540 module and/or computing resources of rendering 2560 module may be implemented on devices that include hardware support for 2D and/or 3D graphics functions, for example graphics processing units (GPUs). As another example, the computing resources in a given module may be fronted by a load balancer provisioned through a provider network service that performs load balancing across multiple computing resource instances in the module.

In at least some embodiments, different ones of the computing resources of a given module may be configured to perform different functionalities of the module. For example, different computing resources of graphics processing 2540 module and/or different computing resources of rendering 2560 module may be configured to perform different 2D or 3D graphics processing functions or apply different 2D or 3D graphics techniques. In at least some embodiments, different ones of the computing resources of graphics processing 2540 module and/or rendering 2560 module may be configured with different 2D or 3D graphics applications. As an example of using different graphics processing functions, techniques, or applications, when rendering objects for video content to be displayed, 3D data for an object may be obtained that needs to be processed according to specific functions, techniques, or applications to generate a 3D model of the object and/or to render a 2D representation of the object for display.

Storage resources and/or DB resources may be configured and provisioned for storing, accessing, and managing MU data that collectively forms MU database 2550, the MU data including but not limited to: digital media (pre-recorded video, new video content generated using MU system 2510, movies, television shows, cartoons, etc.); digital assets in a digital asset repository (e.g., 2D and 3D data, 2D and 3D object models, and other 2D or 3D graphics data such as textures, surfaces, and effects, rendered scenes or video segments, etc.); client and client device information (e.g., client profiles, client accounts, client preferences, email addresses, network addresses, etc.); and information and data related to content of the MU database including but not limited to asset tracking information in an asset tracking database. As noted above, storage resources may also store machine images of components or modules of MU system 2510.

As shown in FIG. 12, in at least some embodiments, MU data and content including but not limited to digital media, digital assets, and client information may be accessed from and stored/provided to one or more external entities 2599, which may include sources of or destinations for media, assets, etc. external to MU system 2510 on provider network 2500 or external to provider network 2500.

Example Streaming Service Implementations

FIG. 13A illustrates an example network-based MU system environment in which a streaming service may be used to provide rendered digital media (e.g., video and sound) to MU clients, according to at least some embodiments. In at least some embodiments, an MU environment may include an MU system 2600 and one or more client devices 2680. The MU system 2600 may include or may have access to stores or other sources of digital media of the media universe including but not limited to pre-rendered, pre-recorded video, shown as digital media source(s) 2650. In at least some embodiments, the MU system 2600 may also include or have access to stores or other sources of data and information including but not limited to 2D and 3D graphics data and client information, shown as data source(s) 2660. For example, data sources 2660 may include an asset tracking database and digital asset repository as shown in FIG. 12.

MU system 2600 may include a front-end client service interface 2602 (e.g., an application programming interface (API)) for receiving input from MU clients 2682 and streaming output to MU clients 2682, and backend data interface(s) 2603 for storing and retrieving data including but not limited to game, video, object, digital asset, user/client, and other data and information as described herein. The client service interface 2602 may, for example, be implemented according to a streaming service provided by a provider network 2500 as illustrated in FIG. 12. MU system 2600 may also include digital media module(s) 2606 that may, for example, implement video playback and recording functionality, graphics processing and rendering 2608 module(s), and an MU control module 2604.

In some embodiments, in response to client selection of digital media for playback, digital media 2606 module(s) may obtain pre-rendered, pre-recorded video from a digital media source 2650, process the video as necessary, and stream the pre-recorded video to the respective client device 2680 via client service interface 2602.

In some embodiments, a client 2682 can interactively explore the world of the media universe by interacting with video being played back to the client device 2680. For example, during an event in which the client pauses a video being played back to step into and explore a scene, graphics processing and rendering 2608 module may obtain data (e.g., digital assets) from one or more data sources 2660, generate a modeled world for the scene according to the data, render new video from the modeled world, and stream the real-time rendered video to the respective client device 2680 via client service interface 2602. In some embodiments, the newly rendered video content may be recorded by digital media 2606 module(s) for later playback by or to one or more clients 2682.

In some embodiments, digital media (e.g., a video or a game) being provided to a client 2682 may include "hooks" via which digital assets that belong to or that are targeted at the particular client 2682 (or at particular groups of clients) may be inserted into the digital media. For example, in some embodiments, a client 2682 may create, customize, or modify digital assets for the media universe, and upload the custom digital assets to the MU system 2600 using the client module 2686 and interface 2684. During playback of digital media to the client device 2680, graphics processing and rendering 2608 module may obtain the client's customized digital assets from the digital asset repository, generate a modeled world for the scene including the client's digital assets, render new video from the modeled world, and stream the real-time rendered video to the respective client device 2680 via client service interface 2602. As another example, MU system 2600 may create and maintain profiles and preferences of at least some clients 2682. Different versions of particular digital assets may be maintained in the digital asset repository. Particular ones of the digital assets may be matched to particular clients 2682 according to the clients' profiles and/or preferences. When streaming video (movies, games, etc.) to the client device 2680, graphics processing and rendering 2608 module may obtain digital assets from the digital asset repository or from other sources according to the client 2682's profile or preferences, generate a modeled world for the scene including the digital assets, render new video from the modeled world, and stream the real-time rendered video to the respective client device 2680 via client service interface 2602. In some embodiments, the newly rendered video content can be recorded by digital media 2606 module(s) for later playback by or to one or more clients 2682.

The MU system 2600 may also include an MU control module 2604 that receives input and interactions from an MU client 2682 on a respective client device 2680 via client service interface 2602, processes the input and interactions, and directs operations of digital media 2606 module(s) and graphics processing and rendering 2608 module accordingly. In at least some embodiments, MU control module 2604 may also track operations of digital media 2606 module(s). For example, MU control module 104 may track playback of a given video through digital media 2606 module(s) so that MU control module 2604 can determine which scene is currently being played back to a given client 2682 or client device 2680.

In at least some embodiments, an MU client device 2680 may implement a streaming service client interface as MU client interface 2684. Client 2682 interactions with a video being played back to the client device 2680, for example interactions via touch screen, mouse, keyboard, controller, or other technologies, may be sent from client device 2680 to MU system 2600 according to the interfaces 2684 and 2602. Rather than performing rendering of new 3D content on the client device 2680, 3D graphics processing and rendering 2608 module(s) of MU system 2600 may generate and render new video content for digital media in real-time in response to the user input received from MU client 2680. Client service interface 2602 may stream video content from MU system 2600 to MU client 2682 according to a streaming protocol. At the client device 2680, the MU client interface 2684 receives the streamed video, extracts the video from the stream protocol, and provides the video to the MU client module 2686, which displays the video on the client device 2680.

Example MU Rendering and Streaming Implementations

While FIG. 13A shows a single MU system 2600 and MU client 2682, in some embodiments of an MU system environment, MU system 2600 may support any number of MU clients 2682. In addition, in some embodiments of an MU system environment, two or more instances of MU system 2600 may be implemented to support MU clients 2682. For example, in some embodiments, the MU system 2600 may be a network-based system that leverages network-based computation and storage resources to support tens, hundreds, thousands, or even more MU clients 2682, with many instances of digital media being provided to the MU clients 2682 at any given time. In at least some embodiments, the MU system 2600 may be implemented according to a service provider's provider network technology and environment, for example as illustrated in FIGS. 12 and 14, that may implement one or more services that can be leveraged to dynamically and flexibly provide network-based computation and/or storage resources for the MU system 2600 environment to support fluctuations in demand from the user base. In at least some embodiments, to support increased demand, additional computation and/or storage resources to implement additional instances of one or more of the modules of the MU system 2600 (e.g., graphics processing and rendering modules 2608, control modules 2604, digital media modules 2602, etc.) or other components not shown (e.g., load balancers, routers, etc.) may be allocated, configured, "spun up", and brought on line. When demand decreases, resources that are no longer needed can be "spun down" and deallocated.

Figure 13B:
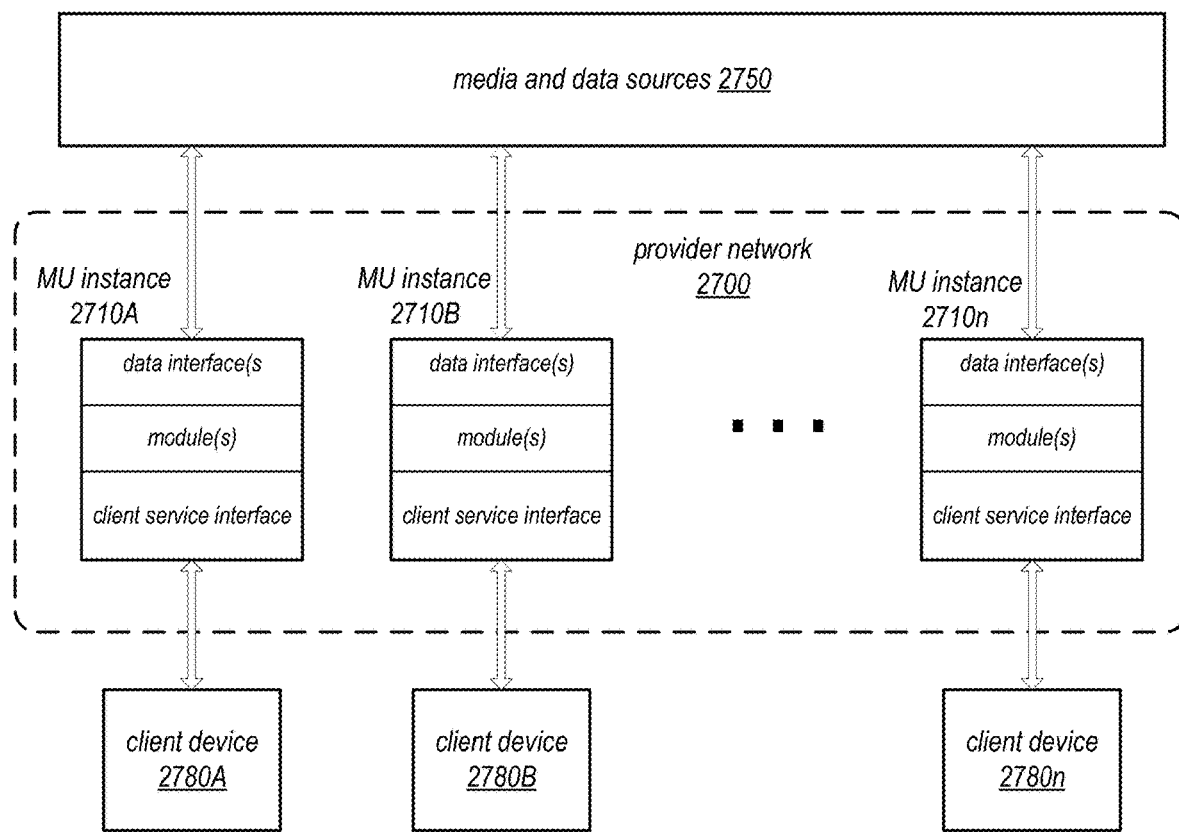
FIG. 13B illustrates rendering and streaming digital media content to clients via multiple MU system instances, according to at least some embodiments.

FIG. 13B illustrates rendering and streaming digital media content to clients via multiple MU system instances, according to some embodiments. In some embodiments, an instance 2710 of an MU system (e.g., MU system 2610 as shown in FIG. 13A) that includes at least the interfaces and modules needed to support a digital media session on a client device 2780 may be allocated to or spun up for each client device 2780 that accesses the MU system environment on a provider network 2700. For example, as shown in FIG. 13B, MU instances 2710A, 2710B . . . 2710n support client sessions on client devices 2780A, 2780B . . . 2780n. Each MU instance 2710 may access digital media, digital assets, or other MU content from media and data sources 2750 to stream digital media content, dynamically render new content at least in part according to user interactions with digital media content on a respective client device 2780, and perform other methods or operations of an MU system as described herein for the respective client device 2780.

In some embodiments, each MU instance 2710 may be instantiated on or as a single computation resource instance on provider network 2700. However, in some embodiments, two or more computation resource instances may implement each MU instance 2710. For example, referring to FIG. 13A, in some embodiments, an MU instance 2710 may include one or more computation resource instances that implement graphics processing and rendering 2608 functionality, one or more computation resource instances that implement digital media 2606 functionality, and one or more computation resource instances that implement interface and control functionality 2602, 2603, and 2604.

Figure 13C:
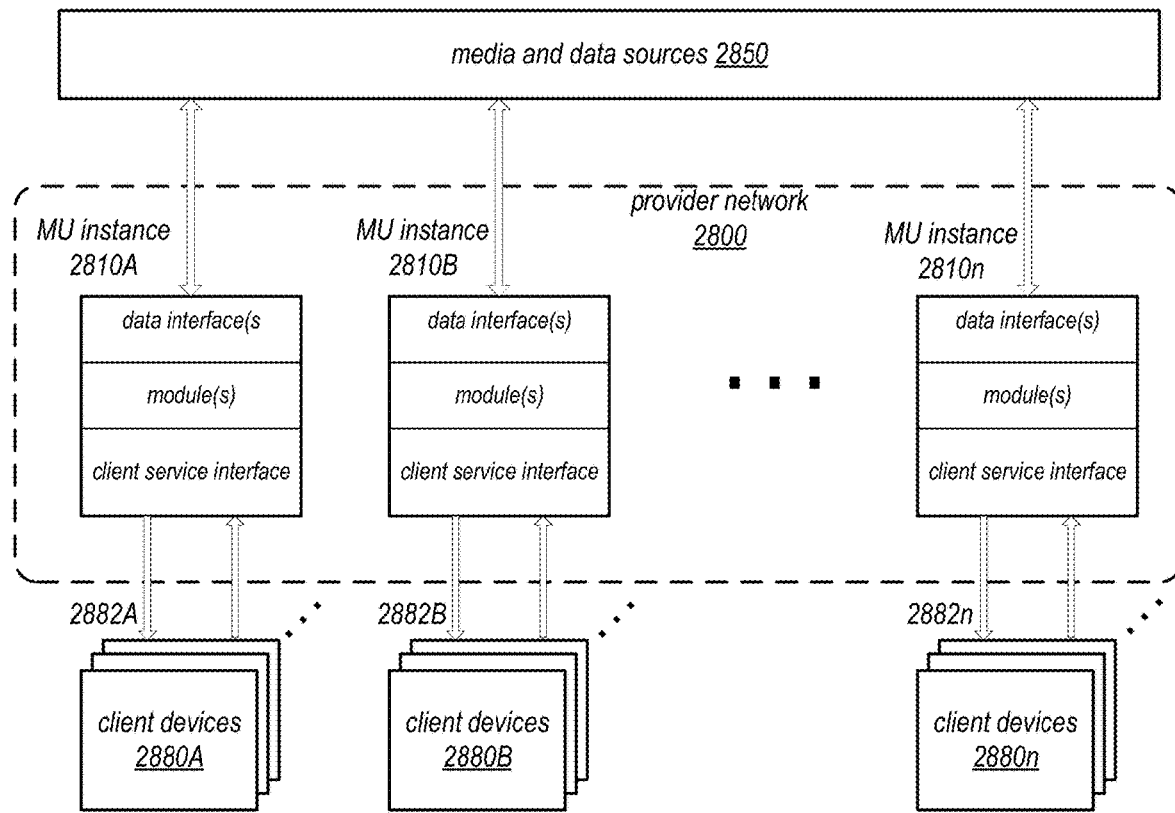
FIGS. 13C and 13D illustrate rendering and streaming digital media content for multiple clients on one MU system instance, according to at least some embodiments.
Figure 13D:
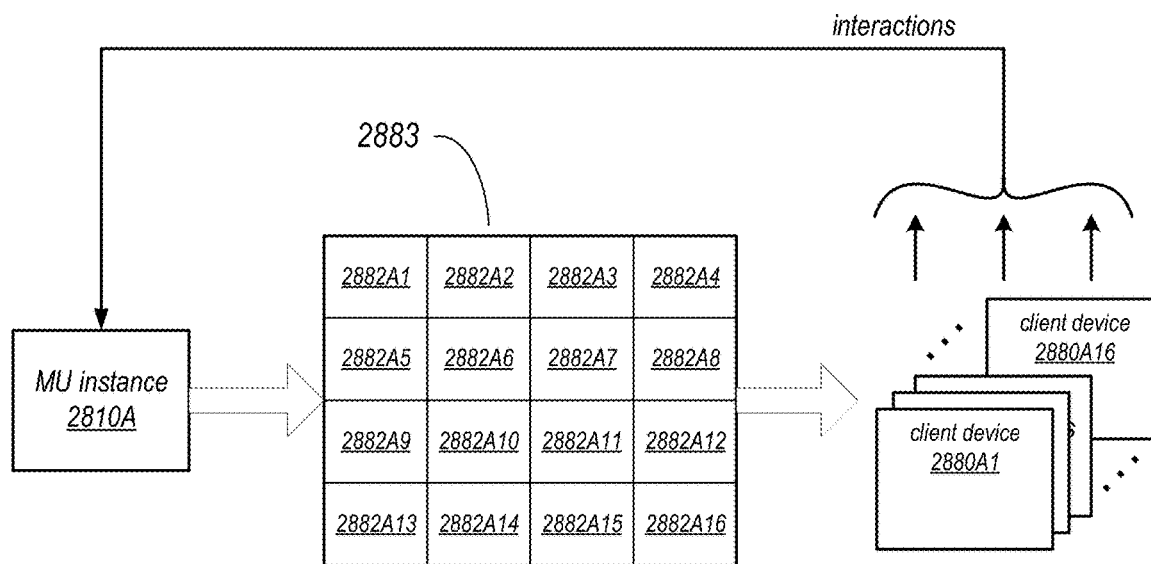

FIGS. 13C and 13D illustrate rendering and streaming digital media content for multiple clients on one MU system instance, according to at least some embodiments. In some embodiments, an instance 2810 of an MU system (e.g., MU system 2610 as shown in FIG. 13A) may include interfaces and modules needed to support a digital media session on multiple client devices 2880. In some embodiments, a new instance 2810 may be allocated or spun up to support one, two, or more client devices 2880 that access the MU system environment on provider network 2800 to access particular digital media, for example a particular video, movie, show, or game session. For example, as shown in FIG. 13C, MU instances 2810A, 2810B . . . 2810n may generate, render, and stream digital media content 2882A, 2882B . . . 2882n to respective groups of client devices 2880A, 2880B . . . 2880n. Each MU instance 2810 may access digital media, digital assets, or other MU content from media and data sources 2850 to stream digital media content, dynamically render new digital media content at least in part according to user interactions with digital media content on respective client devices 2880 in the respective groups, and perform other methods or operations of an MU system as described herein for the client devices 2880 in the respective groups.

FIG. 13D illustrates a method for rendering digital media content for multiple clients on one MU system instance, according to at least some embodiments. In some embodiments, to help provide dynamic, responsive, interactive experiences with digital media content to multiple users on multiple client devices 2880, instead of separately generating 3D models from digital assets and other MU content and separately rendering digital media content 2882 from the models for each client device 2880 to generate separate frames of digital media content 2882 to be separately streamed to each client device 2880, an MU instance 2810 may combine and render digital media content 2882 for multiple client devices 2880 in combined digital media content frames 2883, as shown in FIG. 13D. In some embodiments, each rendered frame 2883 may be sent to each of the client devices 2880 in a respective group. At the client devices 2880, a client module and interface may extract the relevant portion of the frame 2883 for display on the respective device 2880. For example, as shown in FIG. 13D, graphics processing and rendering module(s) of MU instance 2810A may combine, process, and render model(s) or other content for client devices 2880A1-2880A16 as a single frame 2883. In some embodiments, the graphics processing and rendering module(s) may be implemented on one or more computation resources that are specifically configured to support graphics processing and rendering, for example including graphics processing unit(s) (GPU(s)) and/or other graphics processing hardware and software. In some embodiments, rendering is performed on the entire frame 2883 as a single rendering operation or task; however, the content for each target client 2880A is rendered into a separate region of the frame 2883. For example, as shown in FIG. 13D, specific digital media content for client devices 2880A1-2880A16 is rendered in respective regions 2882A1-2882A16 of frame 2883. In some embodiments, MU system client software and/or hardware on each client device 2880A1-2880A16 receives frame(s) 2883, extracts the respective region 2882A, and displays the respective region 2882A on the respective device 2880A. In some embodiments, as illustrated by the arrow from client devices 2880A to MU instance 2810A, clients may interact with digital media content on client devices 2880A as described in this document, for example as illustrated in FIGS. 4A through 9, the interactions may be indicated in input received by MU instance 2810A, and the content in the regions 2882A of frame(s) 2883 may be generated and rendered at least in part according to the interactions received from respective client devices 2880A.

Example Provider Network Environment

Embodiments of media universe (MU) systems and methods as described herein may be implemented in the context of a service provider that provides resources (e.g., computing resources, storage resources, database (DB) resources, etc.) on a provider network to clients of the service provider. FIG. 14 illustrates an example service provider network environment in which embodiments of MU systems may be implemented. FIG. 14 schematically illustrates an example of a provider network 2910 that can provide computing and other resources to users 2900a and 2900b (which may be referred herein singularly as user 2900 or in the plural as users 2900) via user computers 2902a and 2902b (which may be referred herein singularly as computer 2902 or in the plural as computers 2902) via a intermediate network 2930. Provider network 2910 may be configured to provide the resources for executing applications on a permanent or an as-needed basis. In at least some embodiments, resource instances may be provisioned via one or more provider network services 2911, and may be rented or leased to clients of the service provider, for example to an MU system provider 2970. At least some of the resource instances on the provider network 2910 (e.g., computing resources) may be implemented according to hardware virtualization technology that enables multiple operating systems to run concurrently on a host computer (e.g., a host 2916), i.e. as virtual machines (VMs) 2918 on the host.

The computing resources provided by provider network 2910 may include various types of resources, such as gateway resources, load balancing resources, routing resources, networking resources, computing resources, volatile and non-volatile memory resources, content delivery resources, data processing resources, data storage resources, database resources, data communication resources, data streaming resources, and the like. Each type of computing resource may be general-purpose or may be available in a number of specific configurations. For example, data processing resources may be available as virtual machine instances that may be configured to provide various services. In addition, combinations of resources may be made available via a network and may be configured as one or more services. The instances may be configured to execute applications, including services such as application services, media services, database services, processing services, gateway services, storage services, routing services, security services, encryption services, load balancing services, and so on. These services may be configurable with set or custom applications and may be configurable in size, execution, cost, latency, type, duration, accessibility, and in any other dimension. These services may be configured as available infrastructure for one or more clients and can include one or more applications configured as a platform or as software for one or more clients.

These services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources consisting of many processors, large amounts of memory and/or large storage capacity, and small resources consisting of fewer processors, smaller amounts of memory and/or smaller storage capacity. Customers may choose to allocate a number of small processing resources as web servers and/or one large processing resource as a database server, for example.

Provider network 2910 may include hosts 2916a and 2916b (which may be referred herein singularly as host 2916 or in the plural as hosts 2916) that provide computing resources. These resources may be available as bare metal resources or as virtual machine instances 2918a-d (which may be referred herein singularly as virtual machine instance 2918 or in the plural as virtual machine instances 2918). Virtual machine instances 2918c and 2918d are shared state virtual machine ("SSVM") instances. The SSVM virtual machine instances 2918c and 2918d may be configured to perform all or any portion of the media universe (MU) system and methods as described herein. As should be appreciated, while the particular example illustrated in FIG. 14 includes one SSVM 2918 virtual machine in each host, this is merely an example. A host 2916 may include more than one SSVM 2918 virtual machine or may not include any SSVM 2918 virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 14, intermediate network 2930 may, for example, be a publicly accessible network of linked networks and possibly operated by various distinct parties, such as the Internet. In other embodiments, intermediate network 2930 may be a local and/or restricted network, such as a corporate or university network that is wholly or partially inaccessible to non-privileged users. In still other embodiments, intermediate network 2930 may include one or more local networks with access to and/or from the Internet.

Intermediate network 2930 may provide access to one or more client devices 2902. User computers 2902 may be computing devices utilized by users 2900 or other customers of provider network 2910. For instance, user computer 2902a or 2902b may be a server, a desktop or laptop personal computer, a tablet computer, a wireless telephone, a personal digital assistant (PDA), an e-book reader, a game console, a set-top box or any other computing device capable of accessing provider network 2910 via wired and/or wireless communications and protocols. In some instances, a user computer 2902a or 2902b may connect directly to the Internet (e.g., via a cable modem or a Digital Subscriber Line (DSL)). Although only two user computers 2902a and 2902b are depicted, it should be appreciated that there may be multiple user computers.

User computers 2902 may also be utilized to configure aspects of the computing, storage, and other resources provided by provider network 2910 via provider network services 2911. In this regard, provider network 2910 might provide a gateway or web interface through which aspects of its operation may be configured through the use of a web browser application program executing on a user computer 2902. Alternatively, a stand-alone application program executing on a user computer 2902 might access an application programming interface (API) exposed by a service 2911 of provider network 2910 for performing the configuration operations. Other mechanisms for configuring the operation of various resources available at provider network 2910 might also be utilized.

Hosts 2916 shown in FIG. 14 may be standard host devices configured appropriately for providing the computing resources described above and may provide computing resources for executing one or more services and/or applications. In one embodiment, the computing resources may be virtual machine instances 2918. In the example of virtual machine instances, each of the hosts 2916 may be configured to execute an instance manager 2920a or 2920b (which may be referred herein singularly as instance manager 2920 or in the plural as instance managers 2920) capable of executing the virtual machine instances 2918. An instance manager 2920 may be a hypervisor or virtual machine monitor (VMM) or another type of program configured to enable the execution of virtual machine instances 2918 on a host 2916, for example. As discussed above, each of the virtual machine instances 2918 may be configured to execute all or a portion of an application or service.

In the example provider network 2910 shown in FIG. 14, a router 2914 may be utilized to interconnect the hosts 2916a and 2916b. Router 2914 may also be connected to gateway 2940, which is connected to intermediate network 2930. Router 2914 may be connected to one or more load balancers, and alone or in combination may manage communications within provider network 2910, for example, by forwarding packets or other data communications as appropriate based on characteristics of such communications (e.g., header information including source and/or destination addresses, protocol identifiers, size, processing requirements, etc.) and/or the characteristics of the network (e.g., routes based on network topology, subnetworks or partitions, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example provider network 2910 shown in FIG. 14, a host manager 2915 may also be employed to at least in part direct various communications to, from and/or between hosts 2916a and 2916b. While FIG. 14 depicts router 2914 positioned between gateway 2940 and host manager 2915, this is given as an example configuration and is not intended to be limiting. In some cases, for example, host manager 2915 may be positioned between gateway 2940 and router 2914. Host manager 2915 may, in some cases, examine portions of incoming communications from user computers 2902 to determine one or more appropriate hosts 2916 to receive and/or process the incoming communications. Host manager 2915 may determine appropriate hosts to receive and/or process the incoming communications based on factors such as an identity, location or other attributes associated with user computers 2902, a nature of a task with which the communications are associated, a priority of a task with which the communications are associated, a duration of a task with which the communications are associated, a size and/or estimated resource usage of a task with which the communications are associated and many other factors. Host manager 2915 may, for example, collect or otherwise have access to state information and other information associated with various tasks in order to, for example, assist in managing communications and other operations associated with such tasks.

It should be appreciated that the network topology illustrated in FIG. 14 has been greatly simplified and that many more networks and networking devices may be utilized to interconnect the various computing systems disclosed herein. These network topologies and devices should be apparent to those skilled in the art.

It should also be appreciated that provider network 2910 described in FIG. 14 is given by way of example and that other implementations might be utilized. Additionally, it should be appreciated that the functionality disclosed herein might be implemented in software, hardware or a combination of software and hardware. Other implementations should be apparent to those skilled in the art. It should also be appreciated that a host, server, gateway or other computing device may comprise any combination of hardware or software that can interact and perform the described types of functionality, including without limitation desktop or other computers, database servers, network storage devices and other network devices, PDAs, tablets, cell phones, wireless phones, pagers, electronic organizers, Internet appliances, television-based systems (e.g., using set top boxes and/or personal/digital video recorders), game systems and game controllers, and various other consumer products that include appropriate communication and processing capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Custom Query of an MU Database

Methods, systems, and computer-readable media are described for implementing a custom query of a media universe database. Items of content from a media universe may be displayed in a graphical user interface of a client device. Based on user input to combine items of content, a custom query of the media universe database may be used to dynamically generate additional content that is relevant to all of the items of content in the user-generated combination. The additional content may then be displayed in the graphical user interface.

Figure 15A:
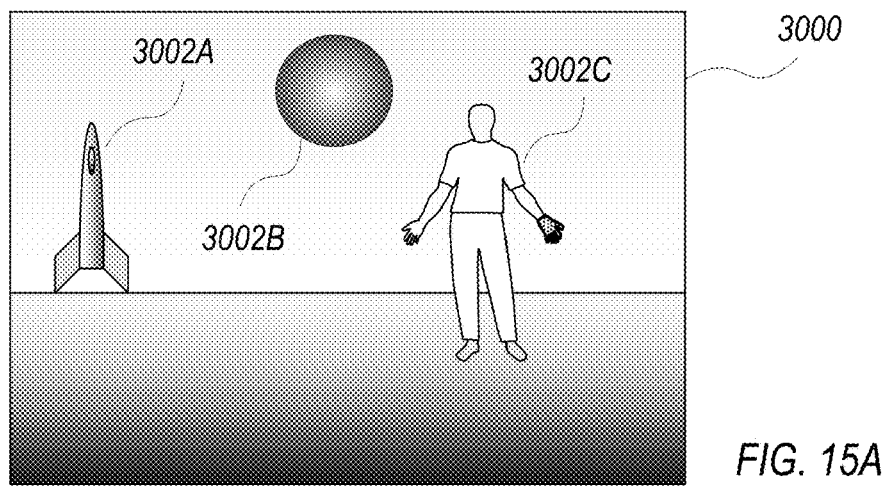
FIGS. 15A through 15I graphically illustrate a method for combining objects to perform a custom query of an MU database, according to at least some embodiments.

FIGS. 15A through 15I graphically illustrate a method for combining objects to perform a custom query of an MU database, according to at least some embodiments. FIG. 15A shows an example scene 3000 from digital media (e.g., a digital video or still image) being displayed on a client device, for example by a media universe (MU) system that leverages network-based resources and services as illustrated in FIGS. 12 through 14. In one embodiment, objects 3002A, 3002B, and 3002C have been rendered into the scene 3000 from digital assets in the digital asset repository. Rendering an object into a scene may involve generating a mask or layer for the object and compositing the rendered object into the scene according to the mask. The client 3010 may interact with the scene 3000 via an MU client interface as shown in FIG. 13A. For example, if the scene 3000 is a frame of a digital video, then client 3010 may pause the video at the scene or may tap or otherwise indicate selection of an object within the scene. As shown by the diagonally striped regions in FIG. 15B, in response to the client 3010's interaction with the scene 3000, the MU system may determine masks for the objects 3002A-3002C currently within the scene 3000 according to the objects' digital assets, and the MU system may make regions of the scene corresponding to the objects' masks active regions or "buttons" that are client-selectable to access or interact with the respective object and its corresponding digital asset(s) and other information.

In some embodiments, video frame content may be used to define the masks at which digital assets are located and which may be made into active regions or buttons in the scene 3000. A digital video frame may be composed of multiple layers that are composited together. For example, one or more alpha mask layers may be used to insert particular objects rendered from respective digital assets into each frame. In some embodiments, alpha mask layers corresponding to objects in the video that are rendered from particular digital assets may be used to define the regions of a frame that are made active and to associate those regions with particular objects or digital assets in the repository. Once the digital assets are determined, information and data for the digital assets may be retrieved from the repository or from elsewhere in the MU database.

In some embodiments, other objects or content in scenes of digital media that do not necessarily correspond to digital assets from the repository may also be identified and made into active regions or buttons that the client may select to, for example, obtain information about the objects or content. In some embodiments, alpha masks may be used to identify regions of a scene such as background or objects that do not correspond to and that are not rendered from digital assets in the repository. In some embodiments, these regions may also be made active regions or buttons that the client may select. However, since these regions are not linked to digital assets in the repository, other methods may be used to identify objects or content corresponding to the regions and to locate information corresponding to the identified objects or content.

For example, in some embodiments, metadata may be attached to the frames, or to the alpha masks that are used to identify these regions, and this metadata may be used to identify the objects or content and locate information for the objects or content within the media universe. As another example, in some embodiments, an object in a frame that does not correspond to, or that cannot be directly linked to, a digital asset in the repository may be extracted using the respective mask, and a library or corpus of digital images or objects and/or of digital image or object information may be searched using one or more image matching and/or object recognition techniques to identify an object or type of object that best matches the object from the frame, and to provide information about the object or type of object. In some embodiments, the digital object may be passed to an object recognition service for identification. In some embodiments, metadata from the digital media, frame or alpha mask may be used to guide, narrow or seed the search. For example, the metadata may indicate or suggest that the object is a particular type of object (e.g., a motorcycle, or lamp, or boat), or may indicate size, dimensions, or other relevant physical information about the object. As another example, the metadata may include context information for the object, for example the identity of a fictional world, or a setting, or a location of the object within a world or setting (e.g., Paris, France, or a street or neighborhood, etc.), or the time period that the content or subject of the video is set in (e.g., the years 1900-1930), and so on.

In some embodiments, content in a scene of digital media that does not correspond to digital assets from the repository may include characters or persons. In some embodiments, the characters or persons may be identified and made into active regions or buttons that the client may select to, for example, obtain information about the particular characters or persons using one or more image matching and/or object recognition techniques. For example, in some embodiments, a facial recognition technique may be used. In some embodiments, a list of potential identifications may be presented from which the client may select individuals to obtain additional information about.

Figure 15B:
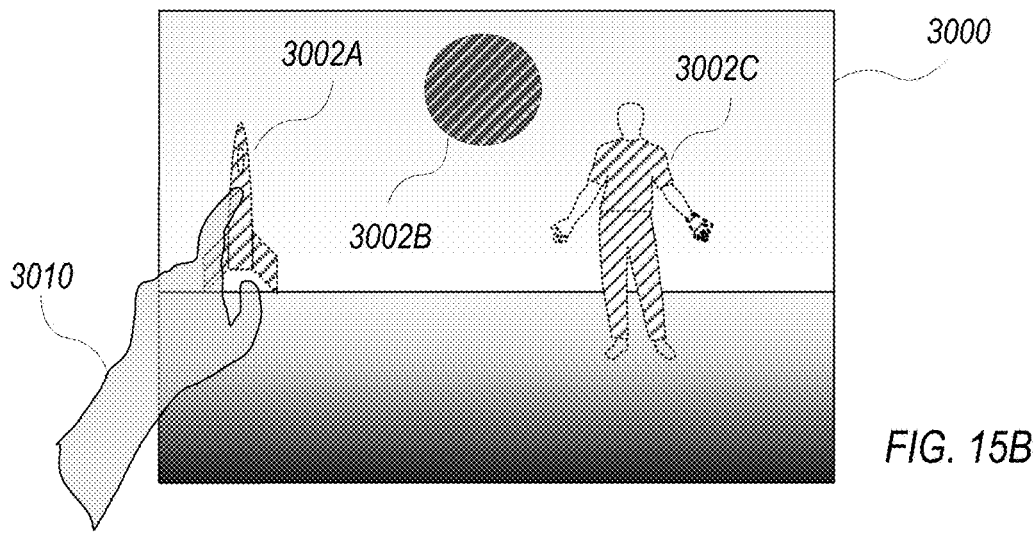

As shown in FIG. 15B, the client 3010 has selected object 3002A, which in this example represents a rocket ship from the world of the media universe. In one embodiment, the client 3010 may select object 3002A by using a mouse, trackpad, touch-capable display, or other suitable input device to click on the object 3002A for a suitable length of time. As discussed above with respect to FIG. 4A through 4C and FIG. 5A through 5C, in this manner the client 3010 may obtain related information and options for the object 3002A (e.g., name, description, timeline, dimensions, capabilities, history, storylines, related objects or characters, get more info, purchase, modify, download, print, etc.), and in general any information or data that may be relevant to the selected object 3002A, and any action that may be enabled for the selected object 3002A.

Figure 15C:
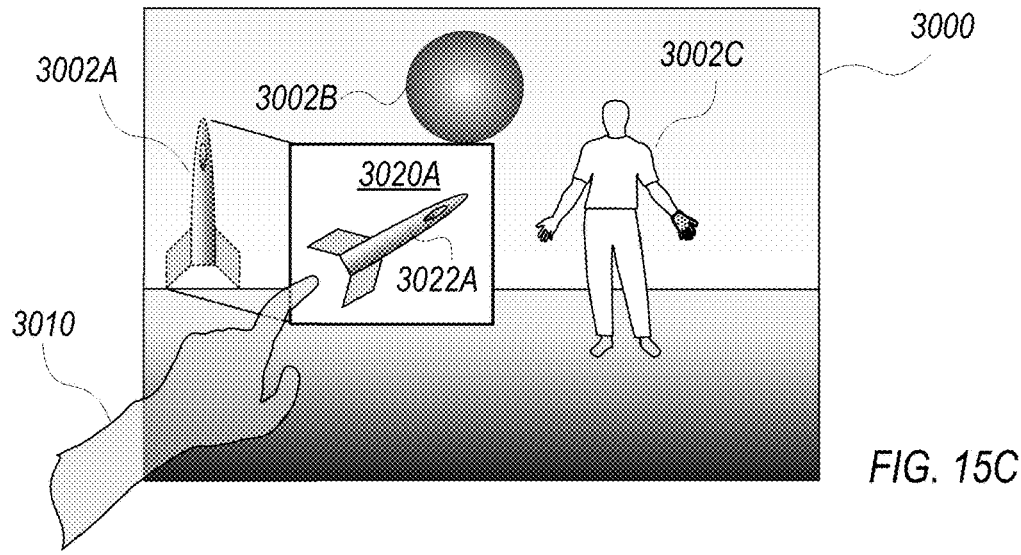

In one embodiment, if the click is held for a sufficient length of time (e.g., longer than the length of time for displaying the related information and options), then as shown in FIG. 15C, a graphical icon 3020A or "card" may be displayed that represents the object 3002A. The icon 3020A may include a graphical depiction 3022A of the object 3002A, and the graphical depiction may be sourced from the MU database 300. In one embodiment, the icon 3020A may also include a textual label that identifies the object 3002A. Using user input entered through a suitable input device, the icon 3020A may be movable in the interface in which the scene 3000 is presented.

Figure 15D:
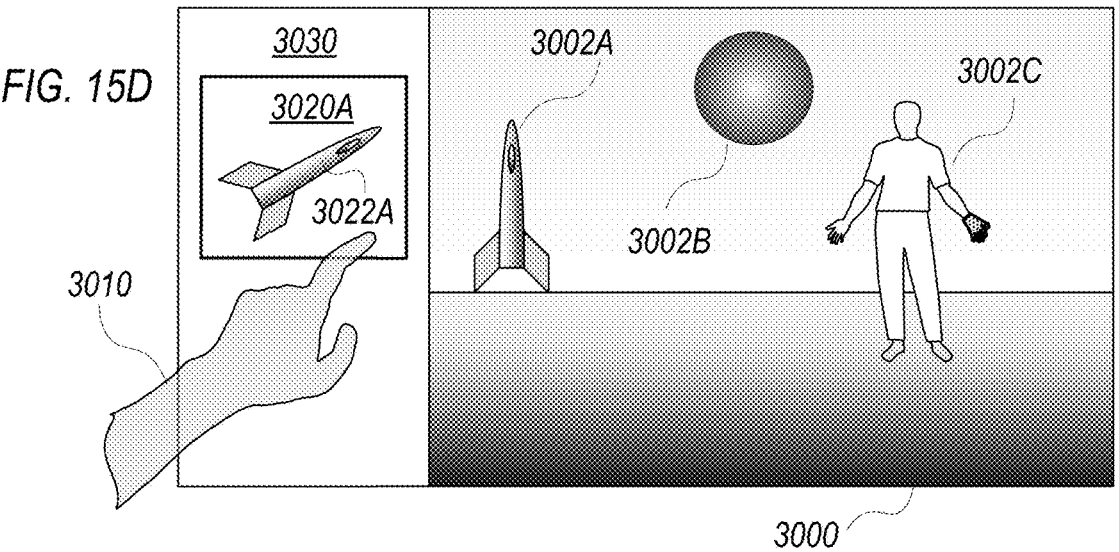

As shown in FIG. 15D, the graphical icon 3020A may be moved to a dedicated region 3030 of the interface. For example, the client 3010 may use a drag-and-drop functionality to move the icon 3020A into the dedicated region 3030 and leave it there. The dedicated region 3030 may represent a "shelf" for storage of graphical icons (e.g., icon 3020A) that represent objects in one or more scenes (e.g., scene 3000). In one embodiment, the dedicated region 3030 may be displayed only when the first graphical icon is generated in response to user input. In one embodiment, the dedicated region 3030 may be displayed adjacent to the scene 3000 at substantially any time. The dedicated region 3030 may be displayed inside the boundaries of the scene 3000 (e.g., in a floating window) or outside the boundaries of the scene 3000 (e.g., to the left, right, top, or bottom of the scene).

Figure 15E:
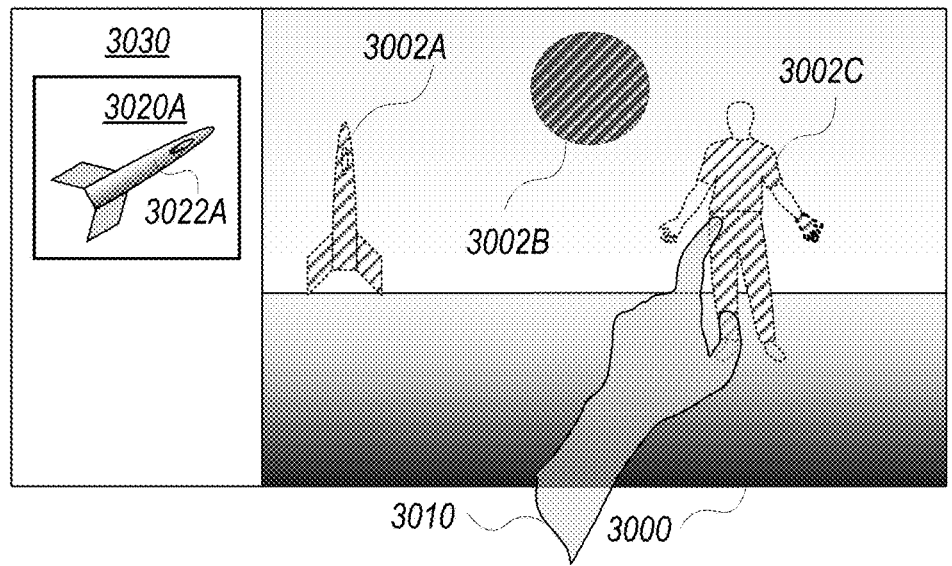

As shown in FIG. 15E, the client 3010 has now selected object 3002C, which in this example represents a humanoid character from the world of the media universe. In one embodiment, the client 3010 may select object 3002C by using a mouse, trackpad, touch-capable display, or other suitable input device to click on the object 3002C for a suitable length of time. As discussed above with respect to FIG. 4A through 4C and FIG. 5A through 5C, in this manner the client 3010 may obtain related information and options for the object 3002C (e.g., name, description, timeline, dimensions, capabilities, history, storylines, related objects or characters, get more info, purchase, modify, download, print, etc.), and in general any information or data that may be relevant to the selected object 3002C, and any action that may be enabled for the selected object 3002C.

Figure 15F:
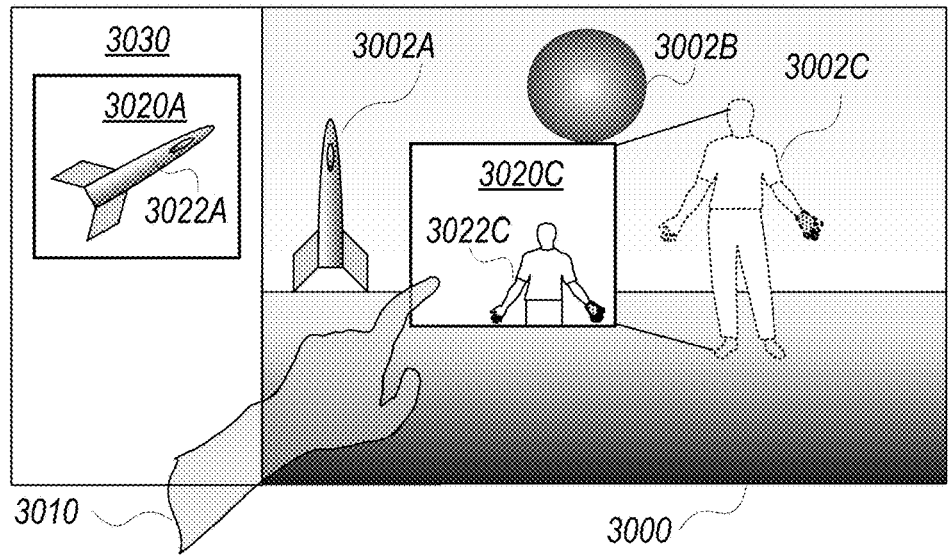
Figure 15G:
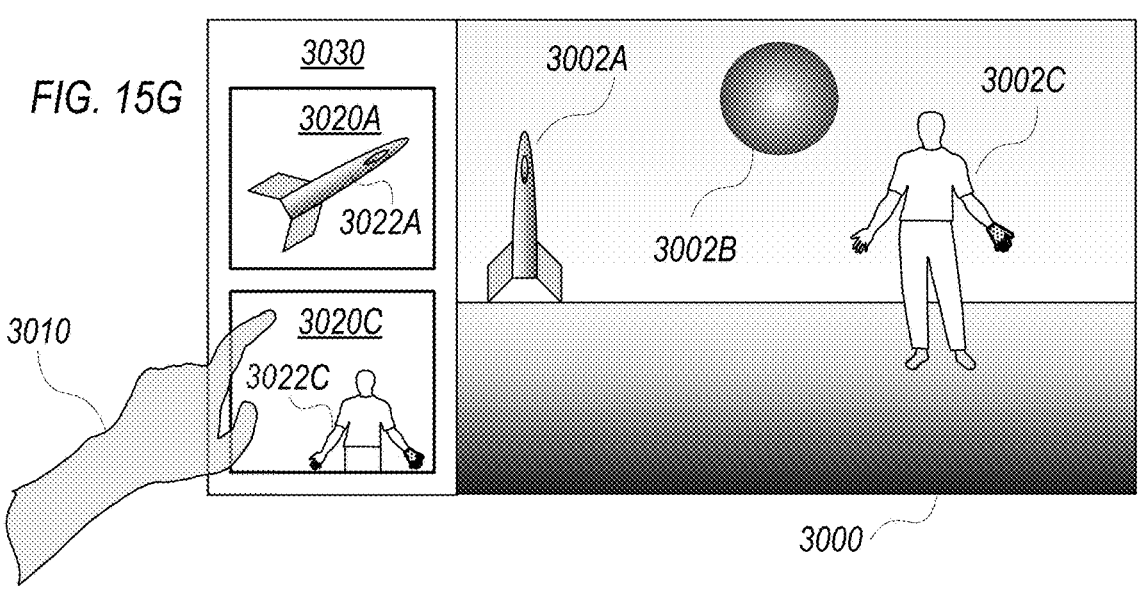

In one embodiment, if the click is held for a sufficient length of time (e.g., longer than the length of time for displaying the related information and options), then as shown in FIG. 15F, a graphical icon 3020C or "card" may be displayed that represents the object 3002C. The icon 3020C may include a graphical depiction 3022C of the object 3002C, and the graphical depiction may be sourced from the MU database 300. In one embodiment, the icon 3020C may also include a textual label that identifies the object 3002C. Using user input entered through a suitable input device, the icon 3020C may be movable in the interface in which the scene 3000 is presented. As shown in FIG. 15G, the graphical icon 3020C may be moved to the dedicated region 3030 of the interface. For example, the client 3010 may use a drag-and-drop functionality to move the icon 3020C into the dedicated region 3030 and leave it there. In the example shown in FIG. 15G, the dedicated region now stores icons 3020A and 3020C. In one embodiment, the client 3010 may use any of the graphical icons (e.g., icons 3020A and/or 3020C) in the dedicated region 3030 as "bookmarks," such that the client 3010 may return to one of the graphical icons to obtain information and/or actions regarding the object represented by the icon.

Figure 15H:
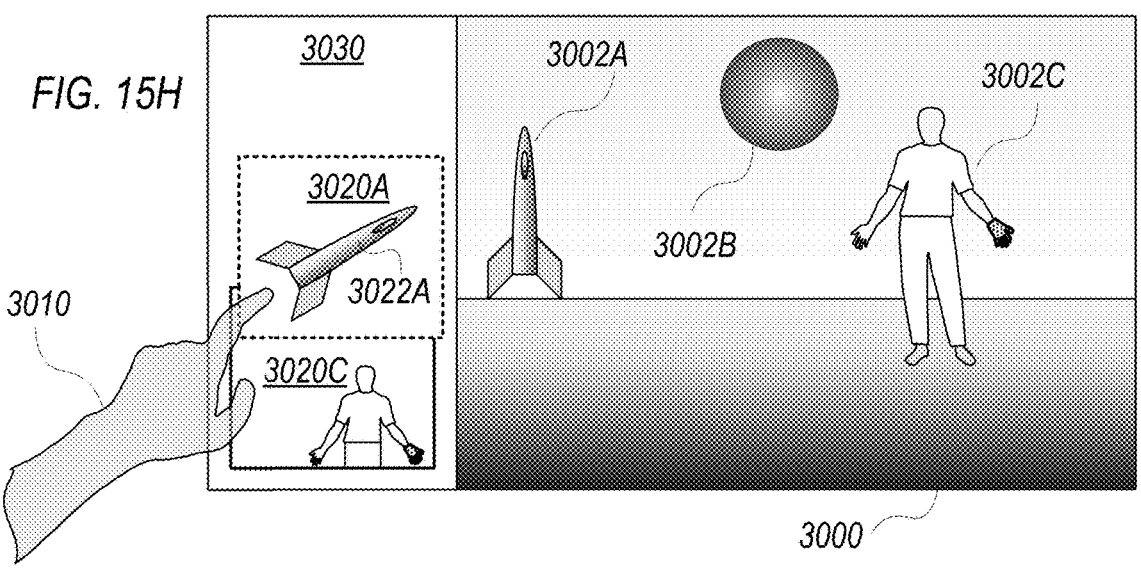
Figure 15I:
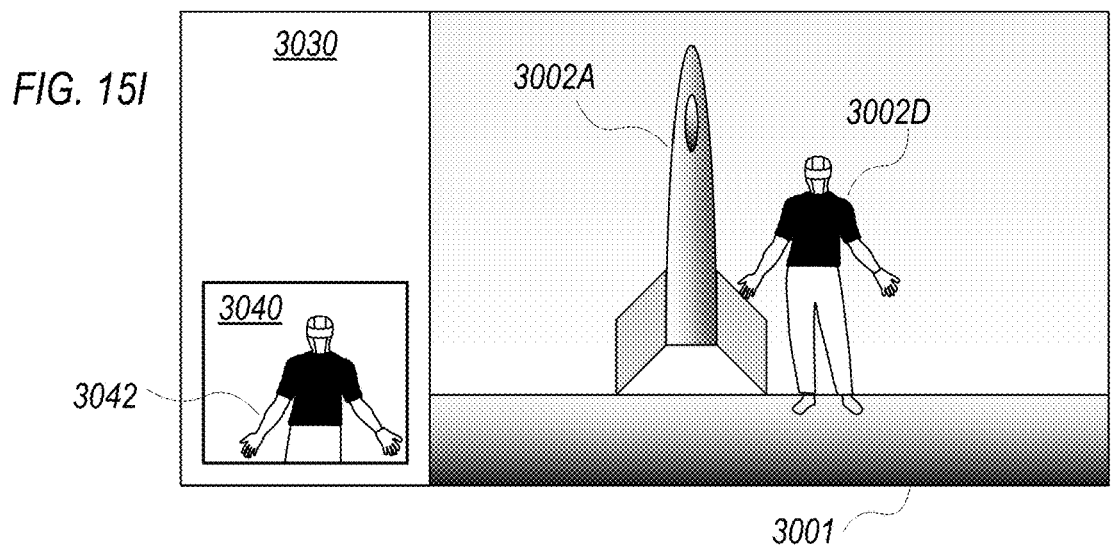

In one embodiment, the client 3010 may combine two or more of the graphical icons to generate a custom query of the MU database 300. As shown in FIG. 15H, the client 3010 is moving (e.g., using a drag-and-drop functionality) the graphical icon 3020A onto the graphical icon 3020C. As shown in FIG. 15I, a new graphical icon 3040 has been created to represent the client-generated combination of the icons 3020A and 3020C. The icon 3040 includes a graphical depiction 3042 that is relevant to both of the objects in the combination (e.g., a depiction of the character 3002C in his capacity as the pilot 3002D of the ship 3002A), and the graphical depiction 3042 may be sourced from the MU database 300. In one embodiment, the icon 3040 may also include a visual indicator (such as a "stack" of cards or icons) that the particular icon represents a combination. In a similar manner, an icon for a combination may be further combined with other icons representing single objects or other combinations.

The user input to combine the icons may be sent from the client device to the MU system (if they are implemented using separate systems), and the MU system may perform a custom query of the MU database 300 to obtain additional information that is relevant to both of the objects 3002A and 3002C represented by the respective icons 3020A and 3020C. For example, in response to the combination of objects, the MU system may supply an additional scene 3001 in which the ship 3002A and a version of character 3002D (e.g., the same character 3002C but in a different context, role, or capacity) are included but not the other object 3002B. The additional scene 3001 may represent a still image, a frame of a digital video, or an informational page. The additional scene 3001 may be retrieved from the MU database 300 using the custom query if its metadata indicates that it is relevant to both of the objects in the combination. In one embodiment, the custom combination represented by the icon 3040 may be generated dynamically and then stored in the MU database 300, and the icon 3040 may be retrieved and presented to one or more additional clients for viewing and/or combination with other icons. In one embodiment, the additional scene 3001 may be generated dynamically and then stored in the MU database 300, and the stored scene 3001 may be retrieved and presented to one or more additional clients.

In one embodiment, the MU database 300 may be queried for additional content that represents an overlap or intersection of the two or more objects. For example, if the client-generated combination is based on a particular character and a particular location, then the MU database 300 may be queried for additional content in which both the particular character and the particular location are tagged or otherwise represented. If the client-generated combination also includes a particular event, then the MU database 300 may be queried for additional content in which the particular character, the particular location, and the particular event are tagged or otherwise represented. The additional content may include plain text, hypertext, media objects (e.g., images, video, audio), user interface elements (e.g., controls), executable and/or interpretable program code, and/or other suitable forms of content. The additional content may represent characters from the world of the media universe, items from the world of the media universe, concepts from the world of the media universe, events from the world of the media universe, and/or other elements from the world of the media universe. The additional content may include a dynamically generated page (e.g., a hypertext page or other structured format including text, hypertext, images, video, and/or audio) that includes particular elements of media universe content that are relevant to all of the two or more objects in the client-generated combination. The additional content may be dynamically generated based at least in part on a template. The template may be selected from a set of potential templates based at least in part on one or more categories assigned to the content items in the client-generated combination. The additional content may be sent to the client device for display on the client device, e.g., in a user interface for displaying and/or interacting with content from the MU database 300.

Figure 16A:
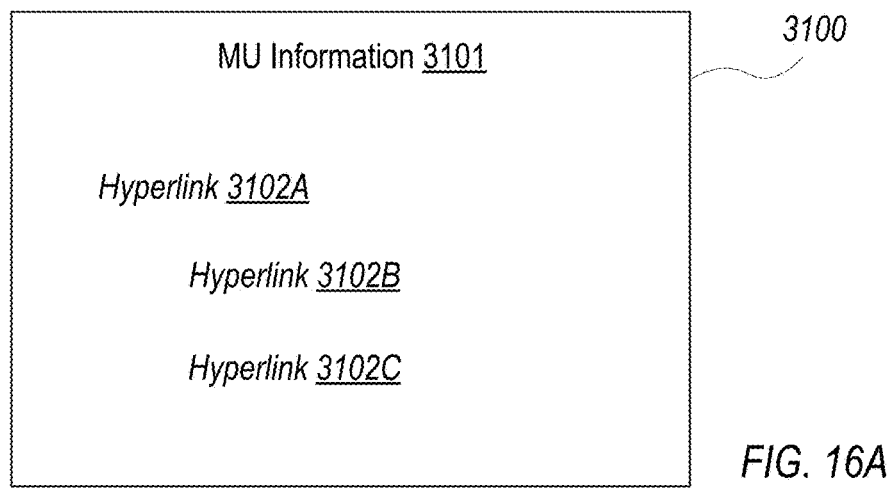
FIGS. 16A through 16I graphically illustrate a method for combining hyperlinks to perform a custom query of an MU database, according to at least some embodiments.

FIGS. 16A through 16I graphically illustrate a method for combining hyperlinks to perform a custom query of an MU database, according to at least some embodiments. FIG. 16A shows an example interface 3100 for MU content being displayed on a client device, for example by a media universe (MU) system that leverages network-based resources and services as illustrated in FIGS. 12 through 14. In one embodiment, hyperlinks 3102A, 3102B, and 3102C have been included in a page of MU information 3101. The page of MU information 3101 may be a web page, hypertext page, or other structured format that includes text, hypertext, images, video, and/or audio. The page of MU information 3101 may be devoted to describing a particular topic, such as one or more characters, items, concepts, or events from the world of the media universe. The page of MU information 3101 may include elements of content sourced from the MU database 300. In one embodiment, the page of MU information 3101 may be generated dynamically, e.g., based on a template. The hyperlinks 3102A-3102C may have textual descriptions or labels (e.g., for characters, items, concepts, or events from the world of the media universe) and may represent links to additional pages of MU information. In one embodiment, the client 3010 may enter suitable user input (e.g., a click on a mouse, trackpad, or touch-capable display) to go to one of the hyperlinks and cause the corresponding page of additional information to be displayed in the interface 3100.

Figure 16B:
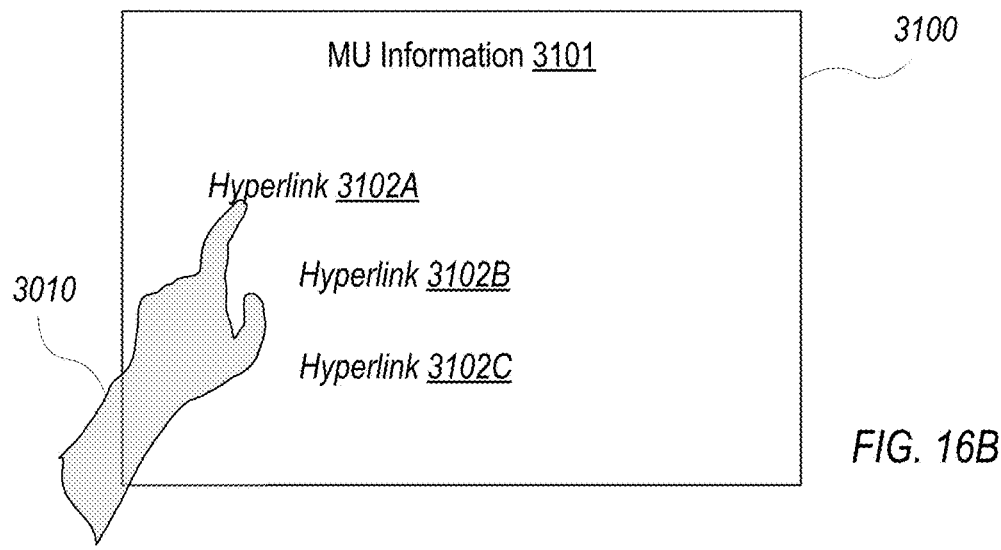

As shown in FIG. 16B, the client 3010 has selected hyperlink 3102A, which in this example corresponds to a particular rocket ship from the world of the media universe. In one embodiment, the client 3010 may select hyperlink 3102A by using a mouse, trackpad, touch-capable display, or other suitable input device to click on the hyperlink 3102A for a suitable length of time. As discussed above with respect to FIG. 4A through 4C and FIG. 5A through 5C, in this manner the client 3010 may obtain related information and options for the hyperlink 3102A (e.g., name, description, timeline, dimensions, capabilities, history, storylines, related hyperlinks or characters, get more info, purchase, modify, download, print, etc.), and in general any information or data that may be relevant to the selected hyperlink 3102A, and any action that may be enabled for the selected hyperlink 3102A.

Figure 16C:
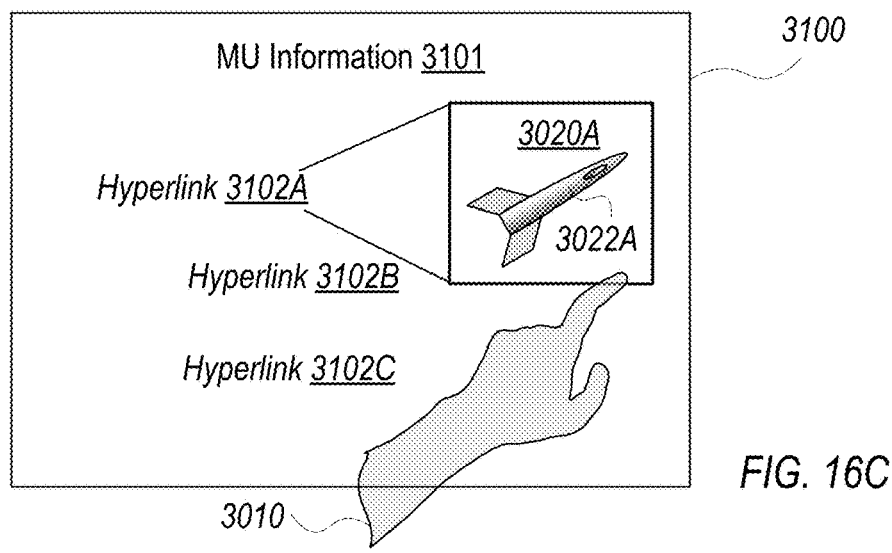

In one embodiment, if the click is held for a sufficient length of time (e.g., longer than the length of time for displaying the related information and options), then as shown in FIG. 16C, a graphical icon 3020A or "card" may be displayed that represents the hyperlink 3102A. The icon 3020A may include a graphical depiction 3022A of the hyperlink 3102A, and the graphical depiction may be sourced from the MU database 300. In one embodiment, the icon 3020A may also include a textual label that identifies the hyperlink 3102A. Using user input entered through a suitable input device, the icon 3020A may be movable in the interface 3100 is presented.

Figure 16D:
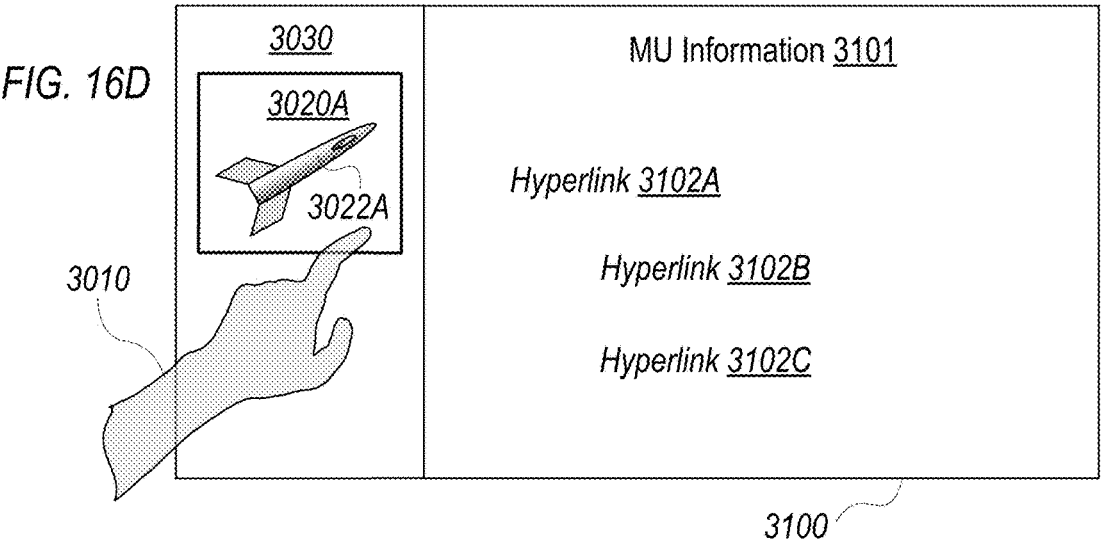

As shown in FIG. 16D, the graphical icon 3020A may be moved to a dedicated region 3030 of the interface 3100. For example, the client 3010 may use a drag-and-drop functionality to move the icon 3020A into the dedicated region 3030 and leave it there. The dedicated region 3030 may represent a "shelf" for storage of graphical icons (e.g., icon 3020A) that represent hyperlinks in one or more scenes (e.g., scene 3100). In one embodiment, the dedicated region 3030 may be displayed only when the first graphical icon is generated in response to user input. In one embodiment, the dedicated region 3030 may be displayed at substantially any time. The dedicated region 3030 may be displayed inside the boundaries of the MU information 3101 (e.g., in a floating window) or outside the boundaries of the MU information 3101 (e.g., to the left, right, top, or bottom of the primary region of the interface 3100).

Figure 16E:
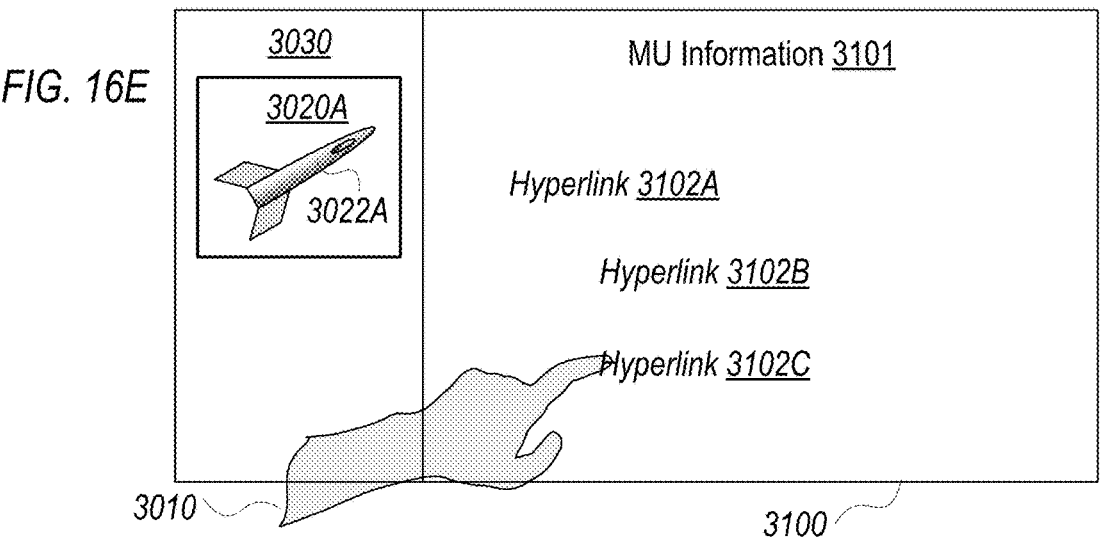

As shown in FIG. 16E, the client 3010 has now selected hyperlink 3102C, which in this example represents a humanoid character from the world of the media universe. In one embodiment, the client 3010 may select hyperlink 3102C by using a mouse, trackpad, touch-capable display, or other suitable input device to click on the hyperlink 3102C for a suitable length of time. As discussed above with respect to FIG. 4A through 4C and FIG. 5A through 5C, in this manner the client 3010 may obtain related information and options for the hyperlink 3102C (e.g., name, description, timeline, dimensions, capabilities, history, storylines, related hyperlinks or characters, get more info, purchase, modify, download, print, etc.), and in general any information or data that may be relevant to the selected hyperlink 3102C, and any action that may be enabled for the selected hyperlink 3102C.

Figure 16F:
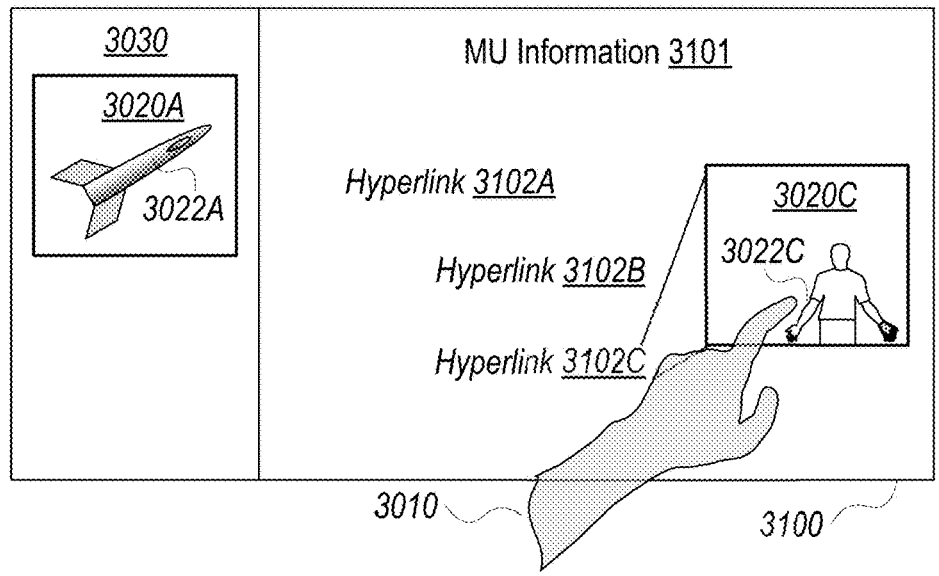
Figure 16G:
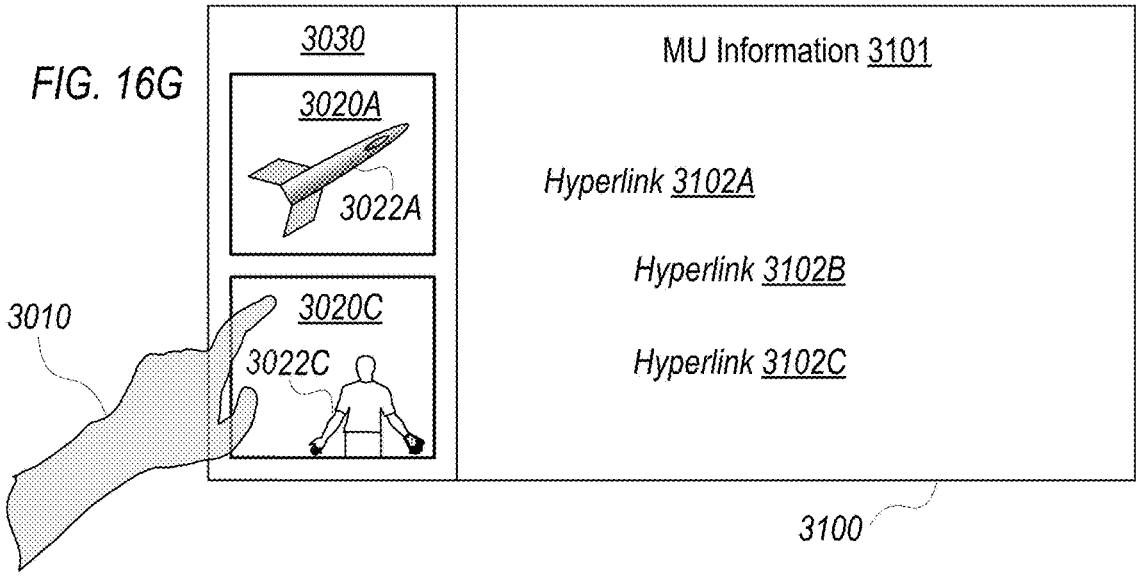

In one embodiment, if the click is held for a sufficient length of time (e.g., longer than the length of time for displaying the related information and options), then as shown in FIG. 16F, a graphical icon 3020C or "card" may be displayed that represents the hyperlink 3102C. The icon 3020C may include a graphical depiction 3022C of the hyperlink 3102C, and the graphical depiction may be sourced from the MU database 300. In one embodiment, the icon 3020C may also include a textual label that identifies the hyperlink 3102C. Using user input entered through a suitable input device, the icon 3020C may be movable in the interface in which the scene 3100 is presented. As shown in FIG. 16G, the graphical icon 3020C may be moved to the dedicated region 3030 of the interface 3100. For example, the client 3010 may use a drag-and-drop functionality to move the icon 3020C into the dedicated region 3030 and leave it there. In the example shown in FIG. 16G, the dedicated region now stores icons 3020A and 3020C. In one embodiment, the client 3010 may use any of the graphical icons (e.g., icons 3020A and/or 3020C) in the dedicated region 3030 as "bookmarks," such that the client 3010 may return to one of the graphical icons to obtain information and/or actions regarding the hyperlink represented by the icon.

Figure 16H:
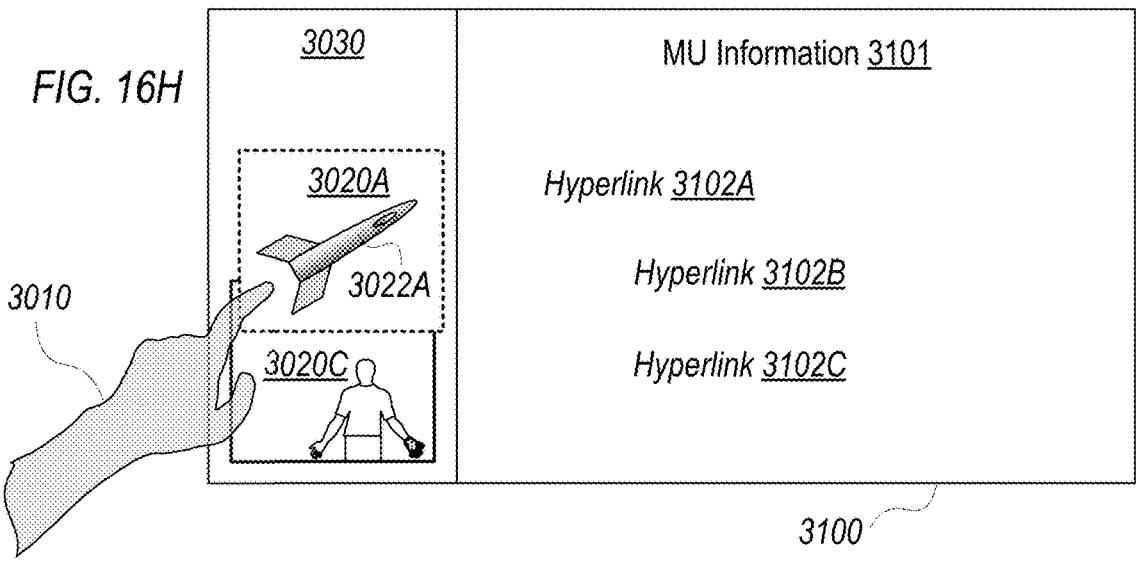
Figure 16I:
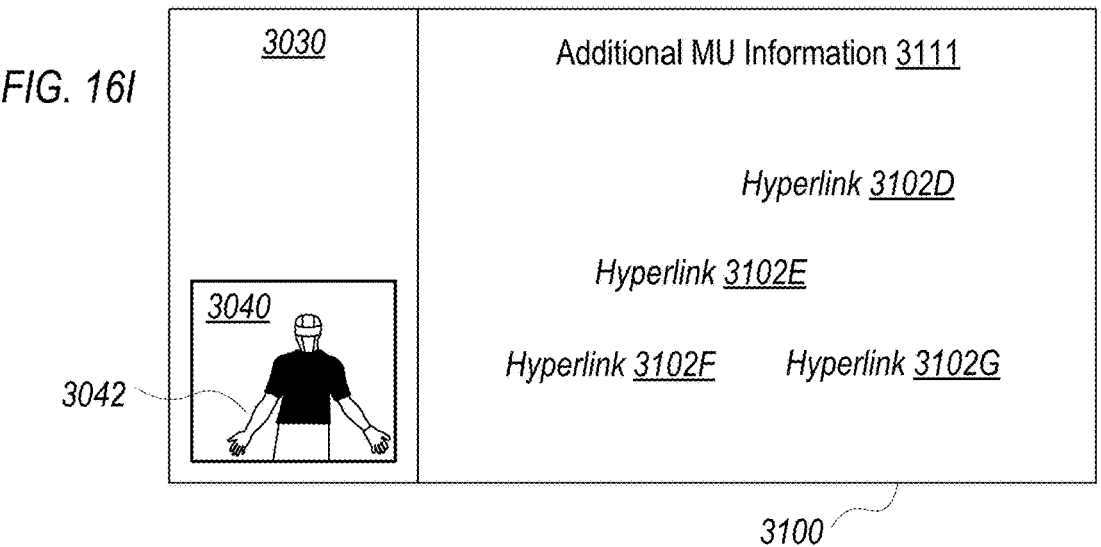

In one embodiment, the client 3010 may combine two or more of the graphical icons to generate a custom query of the MU database 300. As shown in FIG. 16H, the client 3010 is moving (e.g., using a drag-and-drop functionality) the graphical icon 3020A onto the graphical icon 3020C. As shown in FIG. 16I, a new graphical icon 3040 has been created to represent the client-generated combination of the icons 3020A and 3020C. The icon 3040 includes a graphical depiction 3042 that is relevant to both of the hyperlinks in the combination (e.g., a depiction of the character 3002C in his capacity as the pilot 3002D of the ship 3002A), and the graphical depiction 3042 may be sourced from the MU database 300. In one embodiment, the icon 3040 may also include a visual indicator (such as a "stack" of cards or icons) that the particular icon represents a combination. In a similar manner, an icon for a combination may be further combined with other icons representing single hyperlinks or other combinations.

The user input to combine the icons may be sent from the client device to the MU system (if they are implemented using separate systems), and the MU system may perform a custom query of the MU database 300 to obtain additional information that is relevant to both of the hyperlinks 3102A and 3102C represented by the respective icons 3020A and 3020C. For example, in response to the combination of hyperlinks, the MU system may supply an additional page of MU information 3111 that includes additional elements of content relevant to both the ship 3102A and the character 3102C. The additional MU information 3111 may be retrieved from the MU database 300 using the custom query if its metadata indicates that it is relevant to both of the hyperlinks in the combination. The page of additional MU information 3111 may be a web page, hypertext page, or other structured format that includes text, hypertext, images, video, and/or audio. The page of additional MU information 3111 may be devoted to describing a particular topic, such as one or more characters, items, concepts, or events from the world of the media universe. In one embodiment, the page of additional MU information 3111 may be generated dynamically, e.g., based on a template. The hyperlinks 3102D, 3102E, 3102F, and 3102G in the additional information 3111 may have textual labels or descriptions (e.g., for characters, items, concepts, or events from the world of the media universe) and may represent links to additional pages of MU information. In one embodiment, the custom combination represented by the icon 3040 may be generated dynamically and then stored in the MU database 300, and the icon 3040 may be retrieved and presented to one or more additional clients for viewing and/or combination with other icons. In one embodiment, the additional information 3111 may be generated dynamically and then stored in the MU database 300, and the stored information 3111 may be retrieved and presented to one or more additional clients.

In one embodiment, the MU database 300 may be queried for additional content that represents an overlap or intersection of the two or more hyperlinks. For example, if the client-generated combination is based on a particular character and a particular location, then the MU database 300 may be queried for additional content in which both the particular character and the particular location are tagged or otherwise represented. If the client-generated combination also includes a particular event, then the MU database 300 may be queried for additional content in which the particular character, the particular location, and the particular event are tagged or otherwise represented. The additional content may include plain text, hypertext, media objects (e.g., images, video, audio), user interface elements (e.g., controls), executable and/or interpretable program code, and/or other suitable forms of content. The additional content may represent characters from the world of the media universe, items from the world of the media universe, concepts from the world of the media universe, events from the world of the media universe, and/or other elements from the world of the media universe. The additional content may include a dynamically generated page (e.g., a hypertext page or other structured format including text, hypertext, images, video, and/or audio) that includes particular elements of media universe content that are relevant to all of the two or more hyperlinks in the client-generated combination. The additional content may be dynamically generated based at least in part on a template. The template may be selected from a set of potential templates based at least in part on one or more categories assigned to the content items in the client-generated combination. The additional content may be sent to the client device for display on the client device, e.g., in a user interface for displaying and/or interacting with content from the MU database 300.

Figure 17:
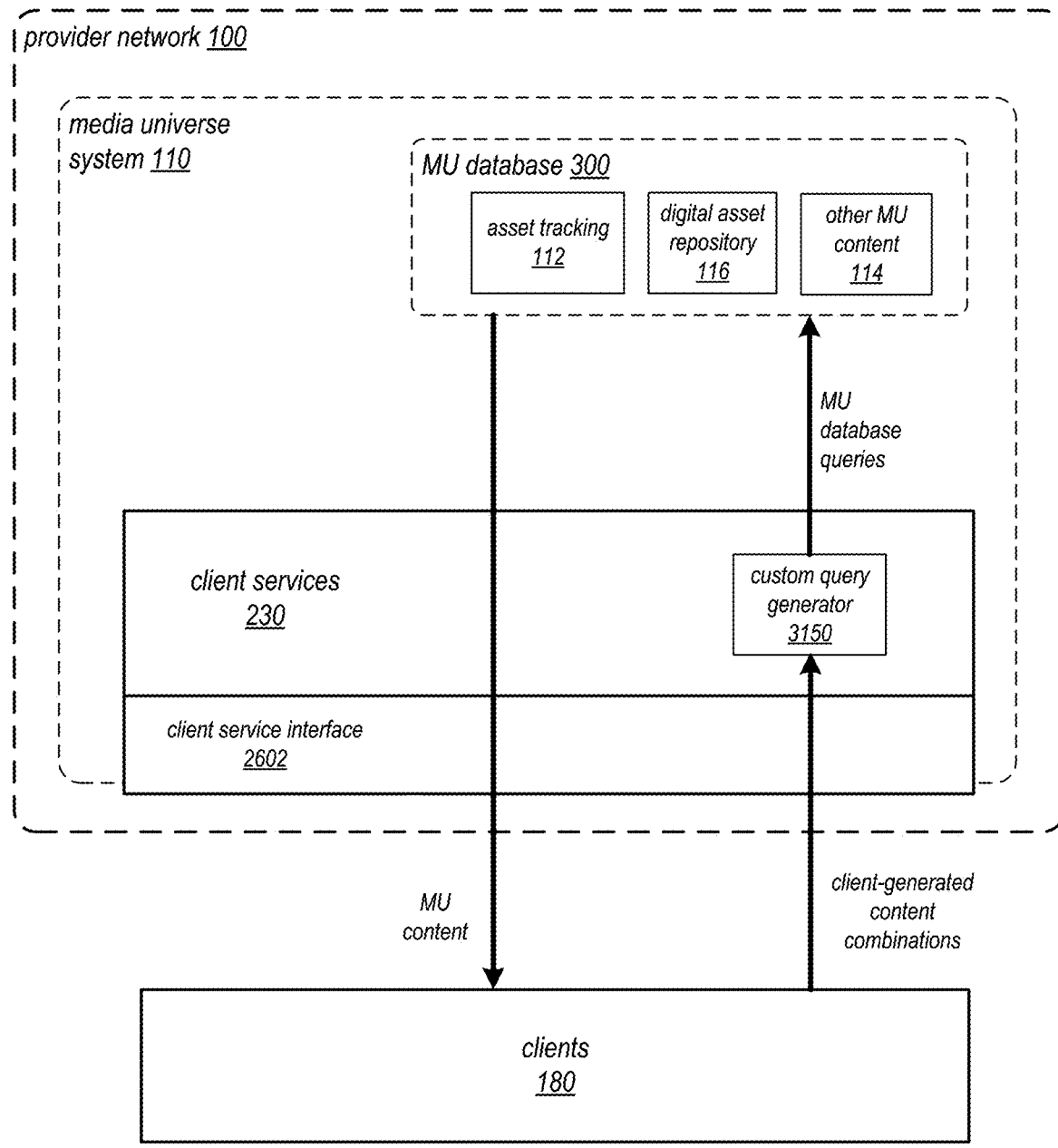
FIG. 17 is a high-level illustration of an MU system configured to perform custom queries based on client-generated content combinations, according to at least some embodiments.

FIG. 17 is a high-level illustration of an MU system 110 configured to perform custom queries based on client-generated content combinations, according to at least some embodiments. As discussed above with respect to FIG. 2, the MU system 110 may be implemented within a provider network 100. Digital assets may be maintained according to a digital asset repository 116 and asset tracking database 112 that are part of or maintained within a media universe (MU) database 300 along with other MU content 114. As previously mentioned, the MU system 110 may serve as a central continuity database for the world of the media universe. In some embodiments, the MU system 110 may allow one or more clients 180, via client services 230 and client service interface 2602, to access digital media (e.g., video, images, audio, games, and informational pages) for display on client devices. In some embodiments, the MU system 110 may leverage network-based computation resources and services, for example a streaming service, to dynamically render digital content (e.g., video or games) for streaming to clients 180. In some embodiments, the MU system 110 may implement graphics processing and rendering module(s) 232, for example implemented on network-based computation resources provided by the provider network 100 services, that implement various graphics processing and rendering technology to dynamically provide digital media content based on with assets, asset information, and other MU content from MU database 300.

An MU database 300 may store a plurality of elements of media universe content related to a world of a media universe. The MU database 300 may also store data indicative of relationships of the elements of the media universe content to each other. In one embodiment, the MU database 300 may represent the relationships of a particular entity using subjects, predicates, and objects. The subjects and the objects may represent particular elements of media universe content, and the predicates may indicate relationships of respective subjects to respective objects. The MU system 110 may implement a variety of operations to perform a custom query of the MU database 300 based on a client-generated combination of elements of content. Accordingly, the MU system 110 may include a custom query generator 3150. Based on client input representing client-generated content combinations, the custom query generator 3150 may supply MU database queries to the MU database 300. The MU database may supply MU content responsive to the custom queries to the client 180.

Figure 18:
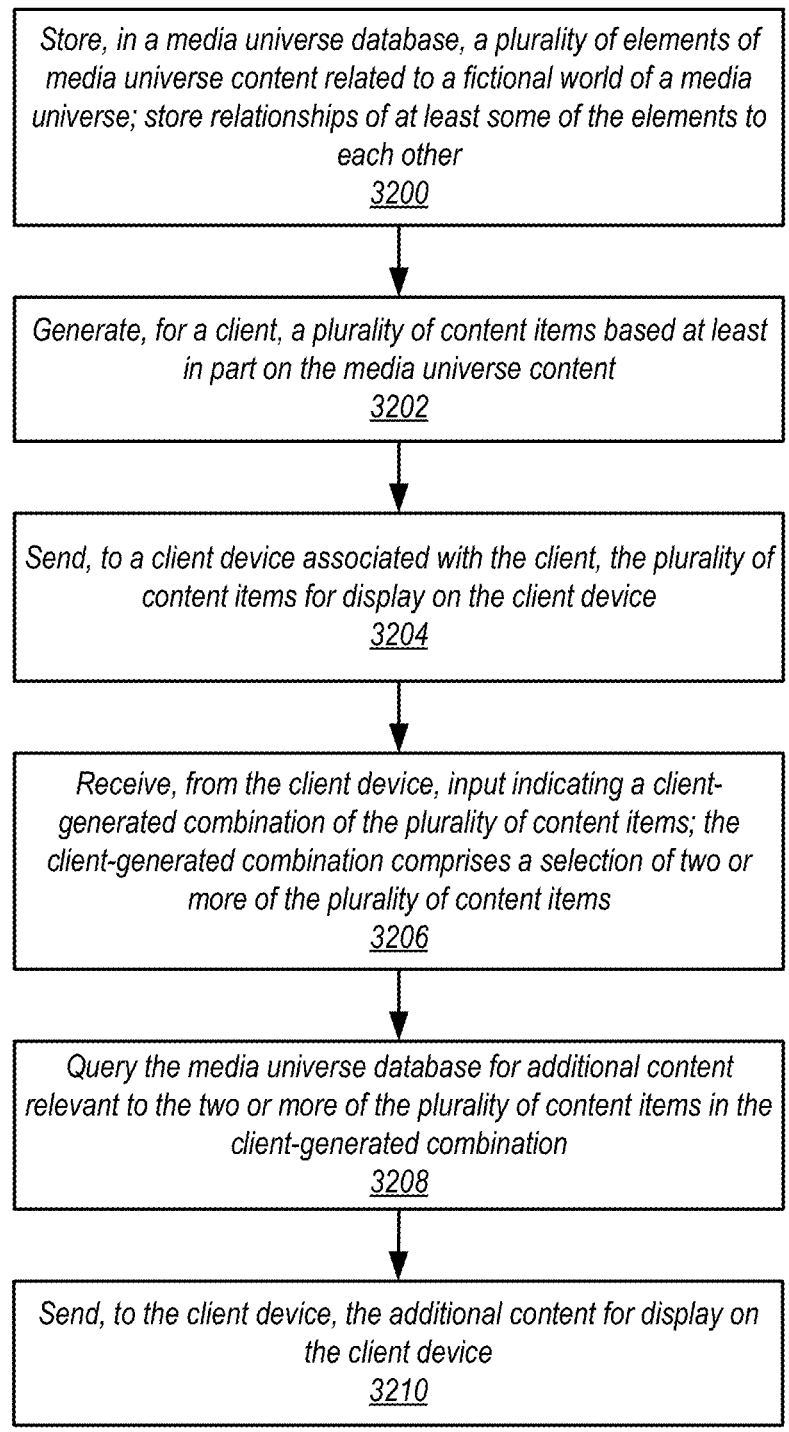
FIG. 18 is a high-level flowchart of a method for performing a custom query of an MU database based on a client-generated content combination, according to at least some embodiments.

FIG. 18 is a high-level flowchart of a method for performing a custom query of an MU database based on a client-generated content combination, according to at least some embodiments. As shown in 3200, an MU database (e.g., MU database 300) may store a plurality of elements of media universe content related to a world of a media universe. The MU database may also store data indicative of relationships of the elements of the media universe content to each other. In one embodiment, the MU database may represent the relationships of a particular entity using subjects, predicates, and objects. The subjects and the objects may represent particular elements of media universe content, and the predicates may indicate relationships of respective subjects to respective objects. As shown in 3202 to 3210, a variety of operations may be performed to implement a custom query of the MU database based on a client-generated combination of elements of content. In one embodiment, aspects of the operations shown in 3202 to 3210 may be performed by suitable components of an MU system (e.g., MU system 110), such as a client service module (e.g., client services module 230) and/or client service interface (e.g., client service interface 2602), that interact with one or more client devices. For example, the client service module may generate content based on the MU database, the content may be sent to a client device via the client service interface, and input from the client device may also be received by the MU system via the client service interface.

As shown in 3202, a plurality of content items may be generated for a client. The content items may be generated based at least in part on the media universe content in the MU database. For example, elements of the media universe content may be selected, combined, and/or otherwise transformed to generate the content items for the client. The content items may include plain text, hypertext, media objects (e.g., images, video, audio), user interface elements (e.g., controls), executable and/or interpretable program code, and/or other suitable forms of content. The content items may represent characters from the world of the media universe, items from the world of the media universe, concepts from the world of the media universe, events from the world of the media universe, and/or other elements from the world of the media universe. The content items may be generated based on input from the client, e.g., input entered into a user interface for displaying and/or interacting with content from the MU database. As shown in 3204, the content items may be sent to a client device associated with the client. The content items may be displayed on the client device, e.g., in the user interface for displaying and/or interacting with content from the MU database.

As shown in 3206, input may be received from the client device. The input may indicate a client-generated combination of the content items. The client-generated combination may include a selection of two or more of the content items. In one embodiment, using the user interface for displaying and/or interacting with content from the MU database, a user may interact with still images, video frames, and/or hypertext pages in order to generate graphical icons corresponding to content items represented in the still images, video frames, and/or hypertext pages. For example, using an input device such as a mouse or trackpad or touch-capable screen, the user may click and hold on a particular image region or hypertext link in order to generate a graphical icon corresponding to a particular content item. The graphical icons may represent characters from the world of the media universe, items from the world of the media universe, concepts from the world of the media universe, events from the world of the media universe, and/or other elements from the world of the media universe. The graphical icons may be obtained from the MU database. The graphical icons may be displayed on the client device and placed in a dedicated region of a graphical user interface in response to user input representing one or more interactions with corresponding content items. The user may then combine individual ones of the graphical icons (e.g., using a drag-and-drop functionality of the user interface) to produce new graphical icons that represent a client-generated combination of content items.

As shown in 3208, the MU database may be queried for additional content relevant to the two or more content items in the client-generated combination. The query may be referred to as a custom query. In one embodiment, the MU database may be queried for additional content that represents an overlap or intersection of the two or more content items. For example, if the client-generated combination is based on a particular character and a particular location, then the MU database may be queried for additional content in which both the particular character and the particular location are tagged or otherwise represented. If the client-generated combination also includes a particular event, then the MU database may be queried for additional content in which the particular character, the particular location, and the particular event are tagged or otherwise represented. The additional content may include plain text, hypertext, media objects (e.g., images, video, audio), user interface elements (e.g., controls), executable and/or interpretable program code, and/or other suitable forms of content. The additional content may represent characters from the world of the media universe, items from the world of the media universe, concepts from the world of the media universe, events from the world of the media universe, and/or other elements from the world of the media universe. The additional content may include a dynamically generated page (e.g., a hypertext page or other structured format including text, hypertext, images, video, and/or audio) that includes particular elements of media universe content that are relevant to all of the two or more content items in the client-generated combination. The additional content may be dynamically generated based at least in part on a template. The template may be selected from a set of potential templates based at least in part on one or more categories assigned to the content items in the client-generated combination. As shown in 3210, the additional content may be sent to the client device for display on the client device, e.g., in the user interface for displaying and/or interacting with content from the MU database.

Timeline-Based Interface for an MU Database

Methods, systems, and computer-readable media are described for implementing a timeline-based interface for a media universe database. In a graphical user interface of a client device, items of content from a media universe may be displayed at a point in a timeline. As the position on the timeline is changed based on user input, the items of content may also be changed to reflect the different point in time. Entities, their relationships, and graphical representations thereof may change over time.

Figure 19A:
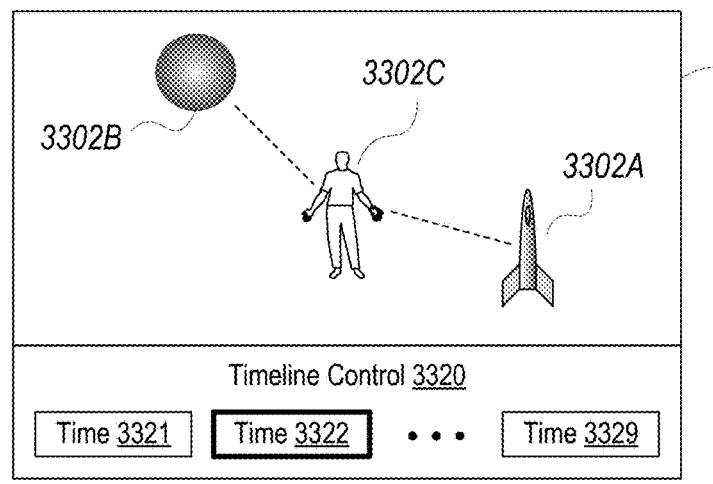
FIGS. 19A through 19E graphically illustrate a method for using a timeline-based interface for an MU database, according to at least some embodiments.

FIGS. 19A through 19E graphically illustrate a method for using a timeline-based interface for an MU database, according to at least some embodiments. FIG. 19A shows an example of a timeline-based interface 3300 being displayed on a client device, for example by a media universe (MU) system that leverages network-based resources and services as illustrated in FIGS. 12 through 14. The MU database 300 may store a plurality of elements of media universe content related to a world of a media universe. The MU database 300 may also store data indicative of relationships of the elements of the media universe content to each other. In one embodiment, the MU database 300 may represent the relationships of a particular entity using subjects, predicates, and objects. The subjects and the objects may represent particular elements of media universe content, and the predicates may indicate relationships of respective subjects to respective objects.

In one embodiment, objects 3302A, 3302B, and 3302C have been generated for display in the interface 3300 based on digital assets and/or other content of the MU database 300. The objects 3302A-3302C may represent items of content from the MU database 300 and may be generated based at least in part on the media universe content in the MU database. For example, elements of the media universe content may be selected, combined, and/or otherwise transformed to generate the objects 3302A-3302C. As shown in FIG. 19A, the objects 3302A-3302C include graphical representations. However, it is contemplated that the objects 3302A-3302C may include, reference, or make available various data types such as plain text, hypertext, media objects (e.g., images, video, audio), user interface elements (e.g., controls), executable and/or interpretable program code, and/or other suitable forms of content. The objects 3302A-3302C may represent characters from the world of the media universe, items from the world of the media universe, concepts from the world of the media universe, events from the world of the media universe, and/or other elements from the world of the media universe.

A timeline control 3320 may be displayed in a suitable region of the interface 3300. The timeline control 3320 may include a timeline visualization that shows a selected point in time on a timeline in a world of the media universe. The timeline control 3320 may be shown or hidden based on input from the client 3010. For example, the timeline 3320 may be visible at all times or may be displayed only when the client 3010 moves a cursor over a particular region of the interface 3300. In one embodiment, the timeline control may permit the user to change points on the timeline with suitable user input. For example, the user interface control for the timeline may be implemented as a slider control or widget, and the user may move the location of an indicator on the slider to change the current time on the timeline. Alternatively, the user may select from a set of available points in time using other types of interface controls.

The objects 3302A-3302C may be set at a particular point in time on the timeline in the media universe. As shown in the example of FIG. 19A, the objects 3302A-3302C are set at a particular time 3322 on the timeline, and the timeline control 3320 may indicate that currently selected point in time is the time 3322. The objects 3302A-3302C may be generated from the MU database 300 based on the currently selected point in time. In one embodiment, each of the objects 3302A-3302C may be tagged or otherwise associated with the time 3322 (or with a window of time that includes the particular point in time) in the MU database 300. The objects 3302A-3302C may include graphical representations of particular characters, items, concepts, locations, events, and/or other suitable content elements at the particular point in time 3322. The objects 3302A-3302C may include graphical representations of a plurality of relationships between a particular item and a set of additional items at the particular point in time 3322. The object 3302C may represent a central object in the interface 3300, and the other objects 3302A and 3302B may represent objects that have relationships with the central object at the point in time 3322. The relationships with the central object 3302C may be visually indicated using a hub-and-spoke model. In one embodiment, different types of relationships may be represented using different visual indicators. Alternatively, the client 3010 may interact with the interface 3300 to obtain information about the relationship between two objects.

In one embodiment, the client 3010 may select an object in the interface 3300 by using a mouse, trackpad, touch-capable display, or other suitable input device to click on the object for a suitable length of time. As discussed above with respect to FIG. 4A through 4C and FIG. 5A through 5C, in this manner the client 3010 may obtain related information and options for the object (e.g., name, description, timeline, dimensions, capabilities, history, storylines, related objects or characters, get more info, purchase, modify, download, print, etc.), and in general any information or data that may be relevant to the selected object, and any action that may be enabled for the selected object.

Figure 19B:
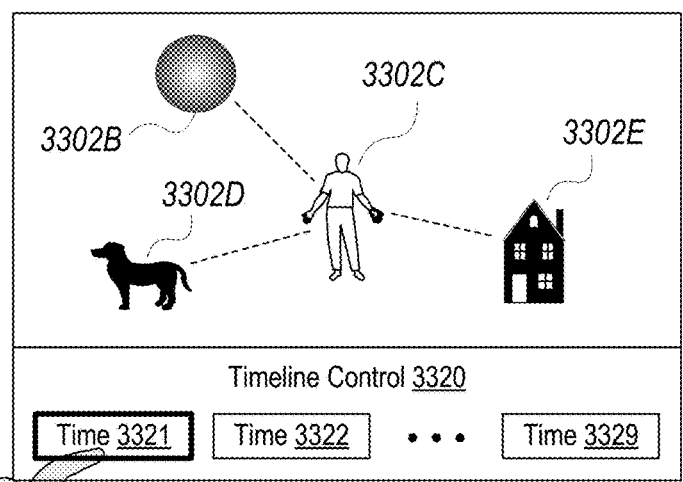

As shown in the example of FIG. 19B, the client 3010 has changed the current time on the timeline from time 3322 to earlier time 3321. As a result, objects 3302B, 3302C, 3302D, and 3302E have been generated for display in the interface 3300 based on digital assets and/or other content of the MU database 300. The objects 3302B-3302E are set at a particular time 3321 on the timeline, and the timeline control 3320 may indicate that currently selected point in time is the time 3321. The objects 3302B-3302E may be generated from the MU database 300 based on the currently selected point in time. In one embodiment, each of the objects 3302B-3302E may be tagged or otherwise associated with the time 3321 (or with a window of time that includes the particular point in time) in the MU database 300. The objects 3302B-3302E may include graphical representations of particular characters, items, concepts, locations, events, and/or other suitable content elements at the particular point in time 3321. The objects 3302B-3302E may include graphical representations of a plurality of relationships between a particular item and a set of additional items at the particular point in time 3321. The object 3302C may again represent a central object in the interface 3300, and the other objects 3302B, 3302D, and 3302E may represent objects that have relationships with the central object at the point in time 3321. The relationships with the central object 3302C may again be visually indicated using a hub-and-spoke model.

Figure 19C:
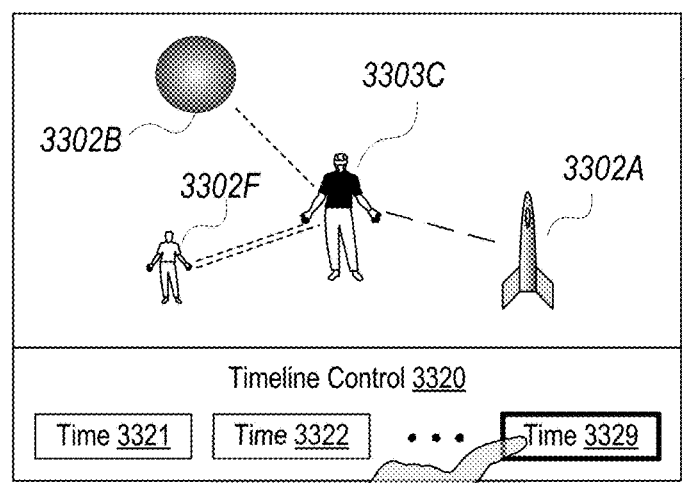

As shown in the example of FIG. 19C, the client 3010 has changed the current time on the timeline to later time 3329. As a result, objects 3302A, 3302B, 3303C, and 3302F have been generated for display in the interface 3300 based on digital assets and/or other content of the MU database 300. The objects 3302A, 3302B, 3303C, and 3302F are set at a particular time 3329 on the timeline, and the timeline control 3320 may indicate that currently selected point in time is the time 3329. The objects 3302A, 3302B, 3303C, and 3302F may be generated from the MU database 300 based on the currently selected point in time. In one embodiment, each of the objects 3302A, 3302B, 3303C, and 3302F may be tagged or otherwise associated with the time 3329 (or with a window of time that includes the particular point in time) in the MU database 300. The objects 3302A, 3302B, 3303C, and 3302F may include graphical representations of particular characters, items, concepts, locations, events, and/or other suitable content elements at the particular point in time 3329. The objects 3302A, 3302B, 3303C, and 3302F may include graphical representations of a plurality of relationships between a particular item and a set of additional items at the particular point in time 3329. The object 3303C may represent a central object in the interface 3300 corresponding to the object 3302C from the earlier points in time, and the other objects 3302A, 3302B, and 3302F may represent objects that have relationships with the central object at the point in time 3329. The relationships with the central object 3303C may again be visually indicated using a hub-and-spoke model. Different types of relationships may be visually indicated in different ways. As shown in FIG. 19C, for example, different types of dotted lines may represent the different types of relationships between the central object 3303C and the peripheral objects 3302A, 3302B, and 3302F. Additionally, information describing or characterizing the types of relationships may be presented to the user 3010 in any suitable manner, potentially including textual indicators, graphical indicators, and/or contextual information displayed based on user input.

As the time is changed in the timeline control 3320, the type and/or presentation of content in the interface 3300 may be changed accordingly. As shown in FIGS. 19A through 19C, the items that have a relationship with the central item 3302C may change over time, and the objects displayed in the interface 3300 may be changed accordingly. Additionally, the relationship between one object and another object may change from one point in time to another point in time. As shown in FIG. 19C, for example, the appearance of the dotted line between character 3303C and object 3302C may be changed relative to an earlier point on the timeline to indicate a different relationship. Furthermore, the appearance of a particular object may change from one point in time to another point in time. As shown in FIGS. 19A and 19C, for example, the appearance of the character represented by objects 3302C and 3303C has changed from time 3322 to time 3329.

Figure 19D:
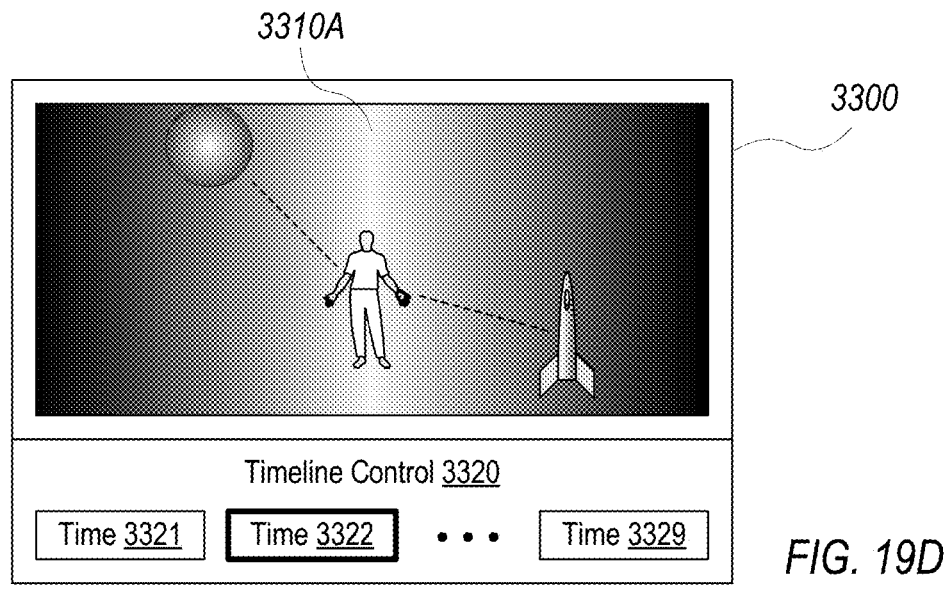
Figure 19E:
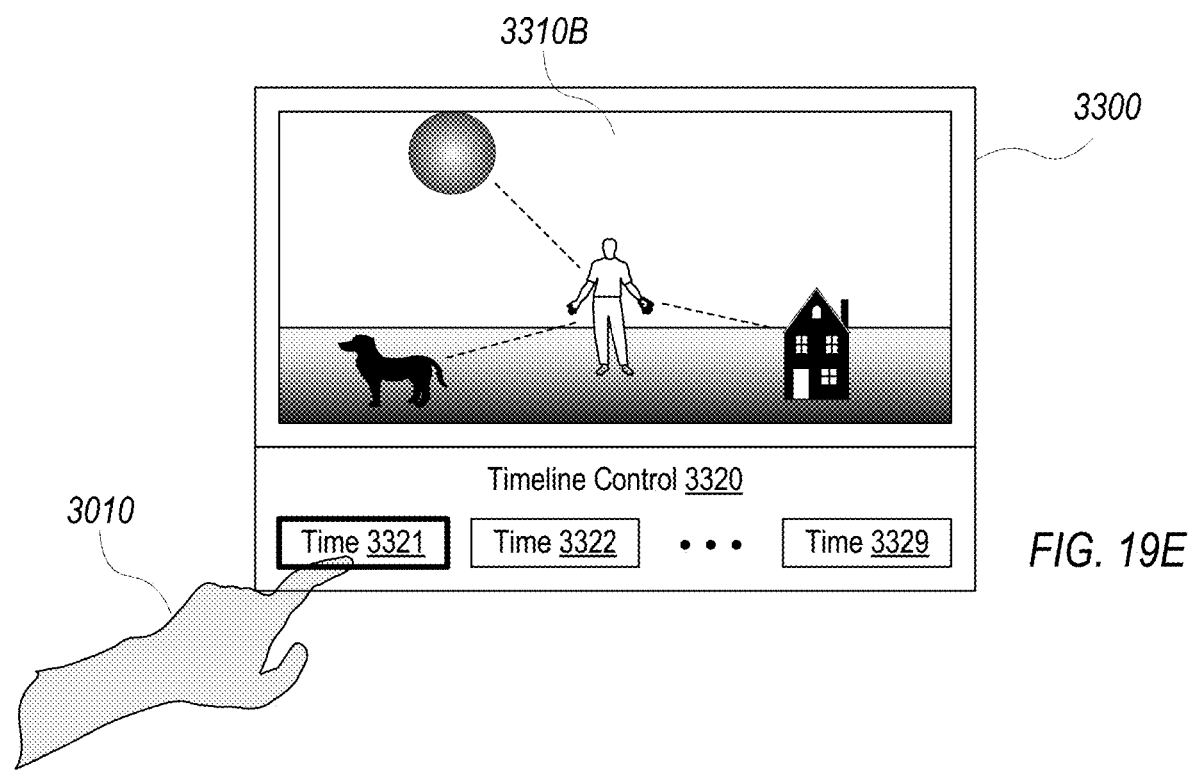

In general, any suitable element of the interface 3300 may change at different points on the timeline. In some embodiments, the interface 3300 may be wrapped in a "skin" that reflects an aspect of the world of the media universe, such as a period, location, design, or theme within the world of the media universe. Aspects of the skin, including one or more background images, background audio tracks, and/or user interface controls may also differ based on the change on the timeline. As shown in FIG. 19D, at the point in time 3322, the interface 3300 may include a background image 3310A. The background image 3310A may be obtained from the MU database 300 and may be tagged or otherwise associated with the particular point in time 3322 in the media universe database. As shown in FIG. 19E, at the earlier point in time 3321, the interface 3300 may include a different background image 3310B. The background image 3310B may be obtained from the MU database 300 and may be tagged or otherwise associated with the particular point in time 3321 in the media universe database. Additionally, the type and/or appearance of user interface controls or other components of the interface 3300 may change over time.

In one embodiment, the selection and/or presentation of MU content may be changed along dimensions other than time. For example, the selection and/or presentation of MU content may be changed (in a manner similar to that shown in FIGS. 19A through 19E) based on a dimension of age, location, size, group membership, or any other suitable value.

In one embodiment, the various elements of content in the interface 3300 may be presented as part of a page (e.g., a hypertext page or other structured format including text, hypertext, images, video, and/or audio) that includes particular elements of media universe content that are relevant to the corresponding point in time. The page may be dynamically generated based at least in part on a template. The template may be selected from a set of potential templates based at least in part on one or more categories assigned to the content items, such as the central content item.

Figure 20:
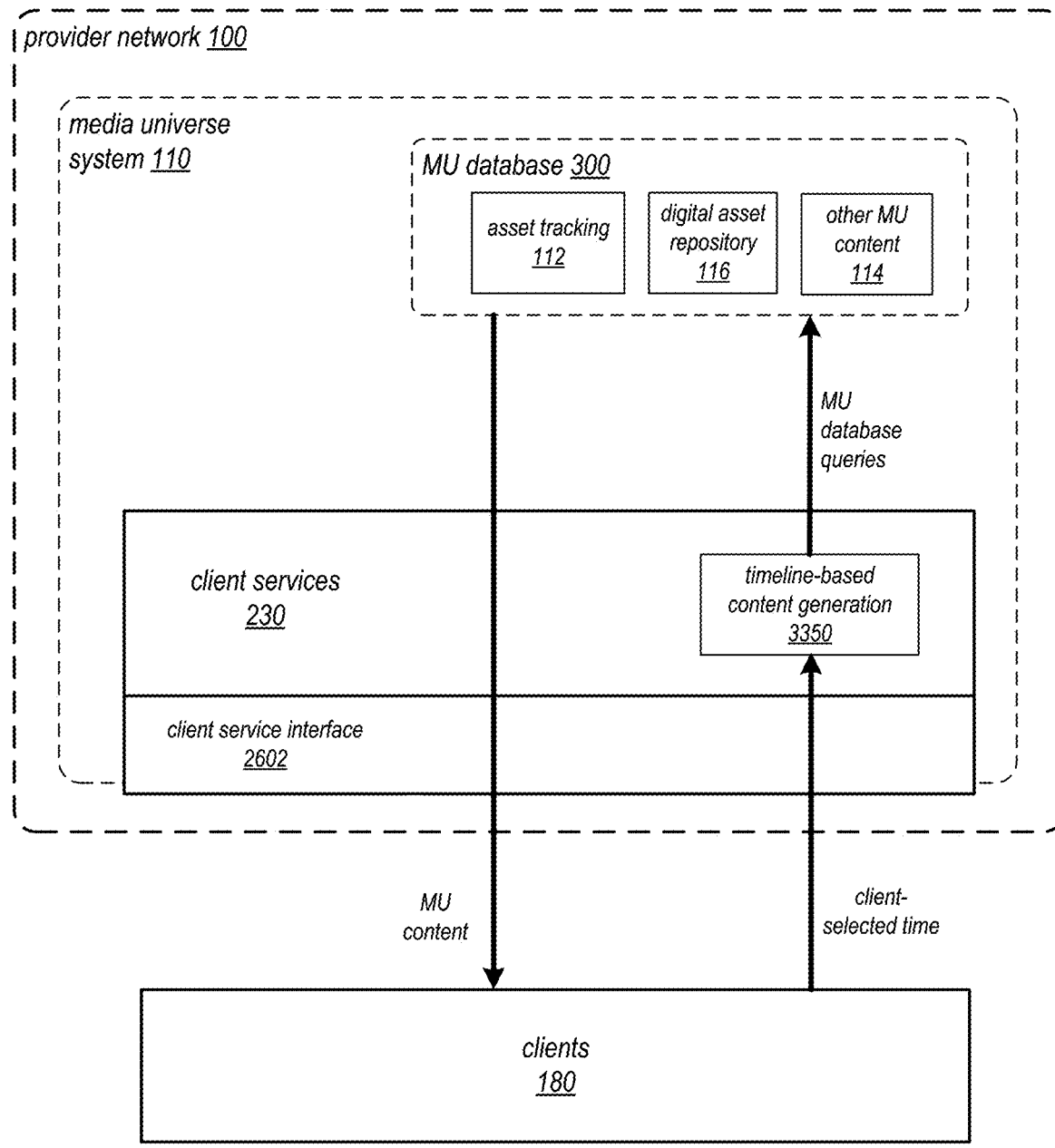
FIG. 20 is a high-level illustration of an MU system configured to perform timeline-based content generation, according to at least some embodiments.

FIG. 20 is a high-level illustration of an MU system configured to perform timeline-based content generation, according to at least some embodiments. As discussed above with respect to FIG. 2, the MU system 110 may be implemented within a provider network 100. Digital assets may be maintained according to a digital asset repository 116 and asset tracking database 112 that are part of or maintained within a media universe (MU) database 300 along with other MU content 114. As previously mentioned, the MU system 110 may serve as a central continuity database for the world of the media universe. In some embodiments, the MU system 110 may allow one or more clients 180, via client services 230 and client service interface 2602, to access digital media (e.g., video, images, audio, games, and informational pages) for display on client devices. In some embodiments, the MU system 110 may leverage network-based computation resources and services, for example a streaming service, to dynamically render digital content (e.g., video or games) for streaming to clients 180. In some embodiments, the MU system 110 may implement graphics processing and rendering module(s) 232, for example implemented on network-based computation resources provided by the provider network 100 services, that implement various graphics processing and rendering technology to dynamically provide digital media content based on with assets, asset information, and other MU content from MU database 300.

An MU database 300 may store a plurality of elements of media universe content related to a world of a media universe. The MU database 300 may also store data indicative of relationships of the elements of the media universe content to each other. In one embodiment, the MU database 300 may represent the relationships of a particular entity using subjects, predicates, and objects. The subjects and the objects may represent particular elements of media universe content, and the predicates may indicate relationships of respective subjects to respective objects. The MU system 110 may implement a variety of operations to perform a query of the MU database 300 based on a client-selected point in time on a timeline. Accordingly, the MU system 110 may include a functionality or module for timeline-based content generation 3350. Based on client input representing a client-selected time on a timeline, the timeline-based content generation 3350 may supply MU database queries to the MU database 300 for content tagged or otherwise associated with particular points in time in the timeline of the world of the media universe. The MU database 300 may supply MU content responsive to the timeline-based queries to the client 180.

Figure 21:
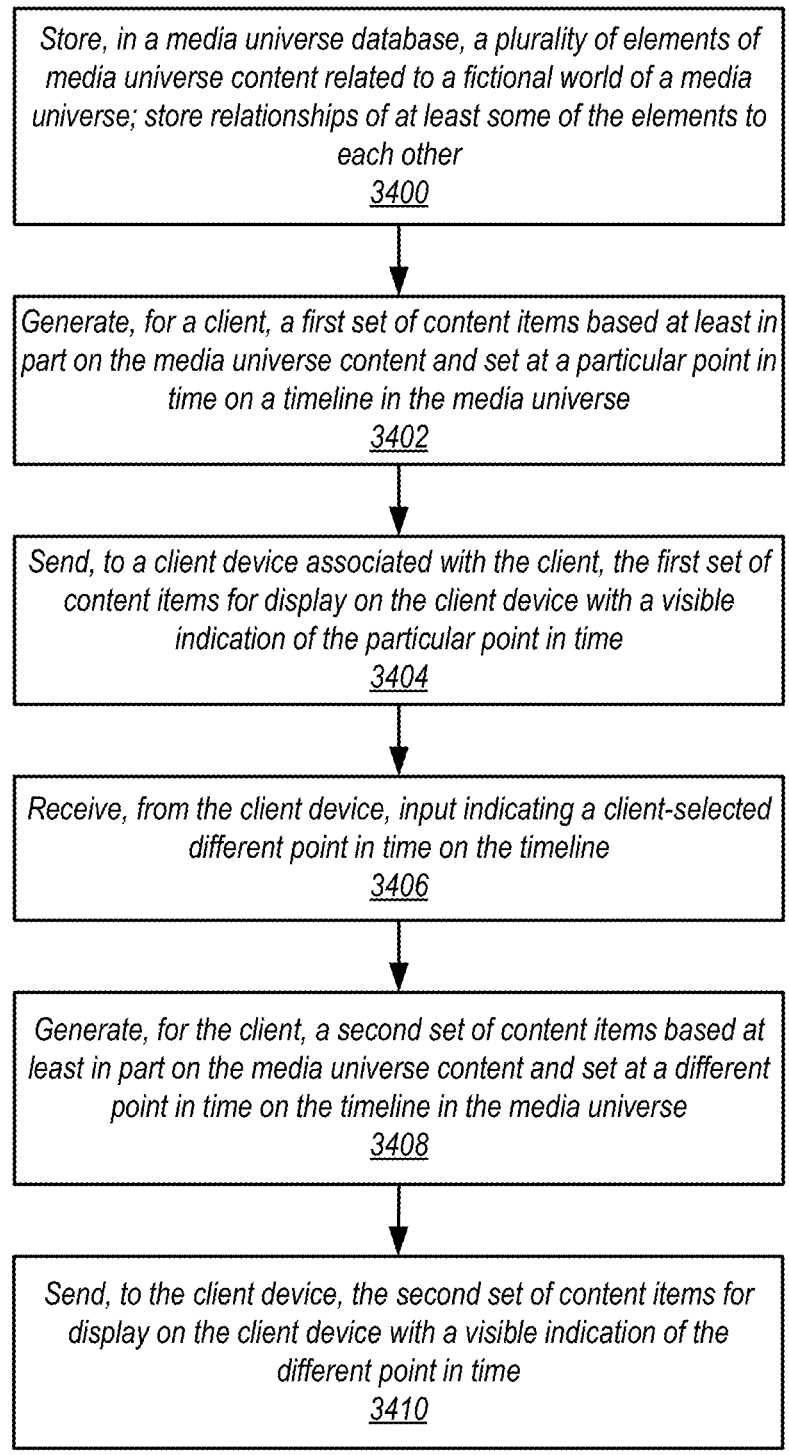
FIG. 21 is a high-level flowchart of a method for using a timeline-based interface for an MU database, according to at least some embodiments.

FIG. 21 is a high-level flowchart of a method for using a timeline-based interface for an MU database, according to at least some embodiments. As shown in 3400, an MU database (e.g., MU database 300) may store a plurality of elements of media universe content related to a world of a media universe. The MU database may also store data indicative of relationships of the elements of the media universe content to each other. In one embodiment, the MU database may represent the relationships of a particular entity using subjects, predicates, and objects. The subjects and the objects may represent particular elements of media universe content, and the predicates may indicate relationships of respective subjects to respective objects. As shown in 3402 to 3410, a variety of operations may be performed to implement a timeline-based interface for an MU database. In one embodiment, aspects of the operations shown in 3402 to 3410 may be performed by suitable components of an MU system (e.g., MU system 110), such as a client service module (e.g., client services module 230) and/or client service interface (e.g., client service interface 2602), that interact with one or more client devices. For example, the client service module may generate content based on the MU database, the content may be sent to a client device via the client service interface, and input from the client device may also be received by the MU system via the client service interface.

As shown in 3402, a first set of content items may be generated for a client. The content items may be generated based at least in part on the media universe content in the MU database. For example, elements of the media universe content may be selected, combined, and/or otherwise transformed to generate the content items for the client. The content items may include plain text, hypertext, media objects (e.g., images, video, audio), user interface elements (e.g., controls), executable and/or interpretable program code, and/or other suitable forms of content. The content items may represent characters from the world of the media universe, items from the world of the media universe, concepts from the world of the media universe, events from the world of the media universe, and/or other elements from the world of the media universe. The first set of content items may be set at a particular point in time on a timeline in the media universe. In one embodiment, each of the first set of content items may be tagged or otherwise associated with the particular point in time (or with a window of time that includes the particular point in time) in the MU database. The content items may be generated based on input from the client, e.g., input entered into a user interface for displaying and/or interacting with content from the MU database.

As shown in 3404, the first set of content items may be sent to a client device associated with the client. At least some of the first set of content items may be displayed on the client device, e.g., in the user interface for displaying and/or interacting with content from the MU database. In one embodiment, at least some of the first set of content items may be displayed on the client device with a visible indication of the particular point in time. For example, at least some of the first set of content items may be displayed along with a timeline visualization that shows the particular point in time. In one embodiment, the timeline visualization may include a user interface control that permits the user to change points on the timeline with suitable user input. For example, the user interface control for the timeline may be implemented as a slider control or widget, and the user may move the location of an indicator on the slider to change the current time on the timeline. Alternatively, the user may select from a set of available points in time using other types of interface controls. As shown in 3406, input may be received from the client device. The input may indicate a client-selected different point of time on the timeline.

As shown in 3408, a second set of content items may be generated for the client. The second set of content items may be set at the client-selected different point in time on the timeline in the media universe. In one embodiment, each of the second set of content items may be tagged or otherwise associated with the client-selected different point in time (or with a window of time that includes the different point in time) in the MU database. The second set of content items may be generated based at least in part on the media universe content in the MU database. For example, elements of the media universe content may be selected, combined, and/or otherwise transformed to generate the second set of content items for the client. The second set of content items may include plain text, hypertext, media objects (e.g., images, video, audio), user interface elements (e.g., controls), executable and/or interpretable program code, and/or other suitable forms of content. The second set of content items may represent characters from the world of the media universe, items from the world of the media universe, concepts from the world of the media universe, events from the world of the media universe, and/or other elements from the world of the media universe. The second set of content items may be generated based on input from the client, e.g., input entered into a user interface for displaying and/or interacting with content from the MU database.

In one embodiment, both the first and second sets of content items may include a central content item (e.g., a character, item, concept, event, or other suitable item), and the first and second sets of content items may include different sets of content items in relation to the central content item at the different points in time. In other words, at least one of the content items in the second set may correspond to at least one of the content items in the first set. The relationships with the central content item may be visually indicated using any suitable technique, such as a hub-and-spoke model. The content items in the first set may differ from the content items in the second set based on the differing relationships with the central character at the different points in time. The appearance of any of the content items, including the central content item, may differ between the first set and the second set. One or more background images, background audio tracks, or user interface controls may also differ based on the change on the timeline. In one embodiment, both the first and second sets of content items may be presented as part of a page (e.g., a hypertext page or other structured format including text, hypertext, images, video, and/or audio) that includes particular elements of media universe content that are relevant to the corresponding point in time. The page may be dynamically generated based at least in part on a template. The template may be selected from a set of potential templates based at least in part on one or more categories assigned to the content items, such as the central content item.

As shown in 3410, the second set of content items may be sent to the client device associated with the client. At least some of the second set of content items may be displayed on the client device, e.g., in the user interface for displaying and/or interacting with content from the MU database. In one embodiment, at least some of the second set of content items may be displayed on the client device with a visible indication of the client-selected different point in time. For example, at least some of the second set of content items may be displayed along with a timeline visualization that shows the client-selected different point in time.

Adaptive Exploration of an MU Database

Methods, systems, and computer-readable media are described for implementing adaptive exploration of a media universe database. As a user interacts with a media universe database over time, an adaptive interface may track the user's interactions. The type and/or presentation of content from the database may be automatically changed based on the user's interaction history, such as to emphasize or present more specific or less familiar content.

Figure 22A:
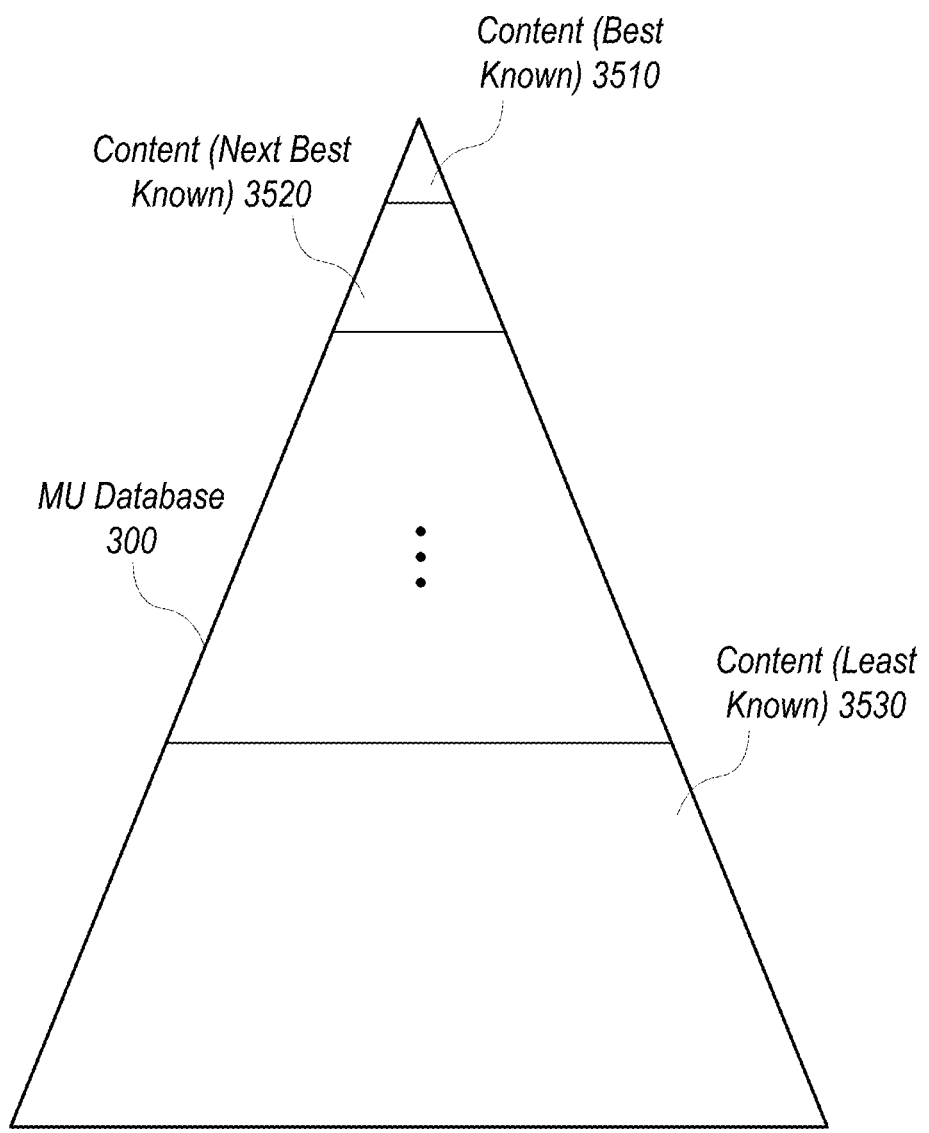
FIGS. 22A and 22B are high-level illustrations of an MU database configured to store elements of MU content that are classified according to familiarity or specificity, according to at least some embodiments.

FIG. 22A is a high-level illustration of an MU database configured to store MU content in a plurality of tiers of specificity or familiarity, according to at least some embodiments. An MU database 300 may store media universe content related to a world of a media universe. As shown for purposes of illustration and example in FIG. 22A, different categories of MU content 3510, 3520, and 3530 may be stored in the MU database 300. However, it is contemplated that the MU database 300 may store MU content in any suitable configuration. At least some of the MU content may be classified by specificity or familiarity in the MU database 300. Items of MU content classified as less specific (or more familiar or more generic) may generally be considered more introductory, better-known, and/or less obscure among a target audience for the MU database 300, and items of MU content classified as more specific (or less familiar or less generic) may generally be considered more advanced, lesser-known, and/or more obscure for the target audience. Any suitable number and configuration of categories, classifications, or tiers may be used to represent the specificity or obscurity of MU content. In one embodiment, the classifications, categories, or tiers, and the elements assigned thereto, may vary for different subsets of the target audience, e.g., by age or locale.

As shown for purposes of illustration and example in FIG. 22A, the MU database 300 may include categories or tiers of MU content from the best known content 3510 to the next best known content 3520 through the least known content 3530. The different categories 3510-3530 may include individual items of content and/or arrangements of content. From the best known to the least known, the amount of MU content may generally increase from tier to tier. Using the adaptive exploration interface discussed herein, particular users may be exposed to increasingly specific or obscure content (or arrangements of content) from the MU database 300 over time. In this manner, the adaptive exploration interface may seek to impart a sense of progression or mastery to individual users based on their interaction history.

Figure 22B:
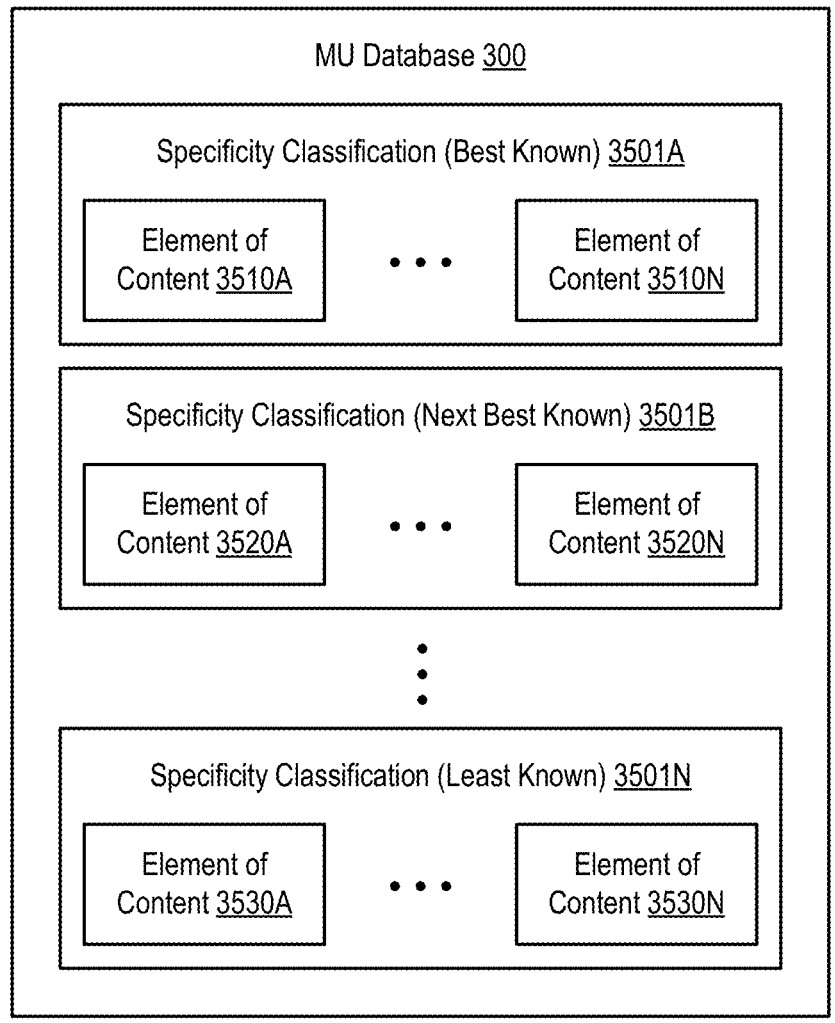

FIG. 22B is a high-level illustration of an MU database configured to store elements of MU content that are classified according to specificity, according to at least some embodiments. An MU database 300 may store a plurality of elements of media universe content related to a world of a media universe. As shown for purposes of illustration and example in FIG. 22B, elements of content 3510A through 3510N, 3520A through 3520N, and 3530A through 3530N may be stored in the MU database 300. However, it is contemplated that the MU database 300 may store elements of content of any suitable number, type, and configuration. At least some of the elements of media universe content may be classified by specificity in the MU database 300. Items classified as less specific (or more generic) may generally be considered better-known and less obscure among a target audience for the MU database 300, and items classified as more specific (or less generic) may generally be considered lesser-known and more obscure for the target audience. Any suitable number and configuration of classifications or tiers may be used to represent the specificity or obscurity of items of content. In one embodiment, the classifications and the elements assigned thereto may vary for different subsets of the target audience, e.g., by age or locale.

As shown for purposes of illustration and example in FIG. 22B, the MU database 300 may include specificity classifications 3501A and 3501B through 3501N. Classification 3501A may generally represent elements of content that are best known to a target audience. Classification 3501B may generally represent elements of content that are next best known to a target audience. Classification 3501N may generally represent elements of content that are least known to a target audience. Elements of content 3510A through 3510N may be classified or categorized in classification 3501A, elements of content 3520A through 3520N may be classified or categorized in classification 3501B, and elements of content 3530A through 3530N may be may be classified or categorized in classification 3501N. The various elements of content may be classified in the corresponding specificity classifications based on any suitable information, including community input (e.g., from a set of users). Any suitable technique may be used to associated various elements of content may be classified in the corresponding specificity classifications in the MU database 300, such per-element metadata representing the specificity classification and stored with each element for which a classification has been assigned.

Figure 23A:
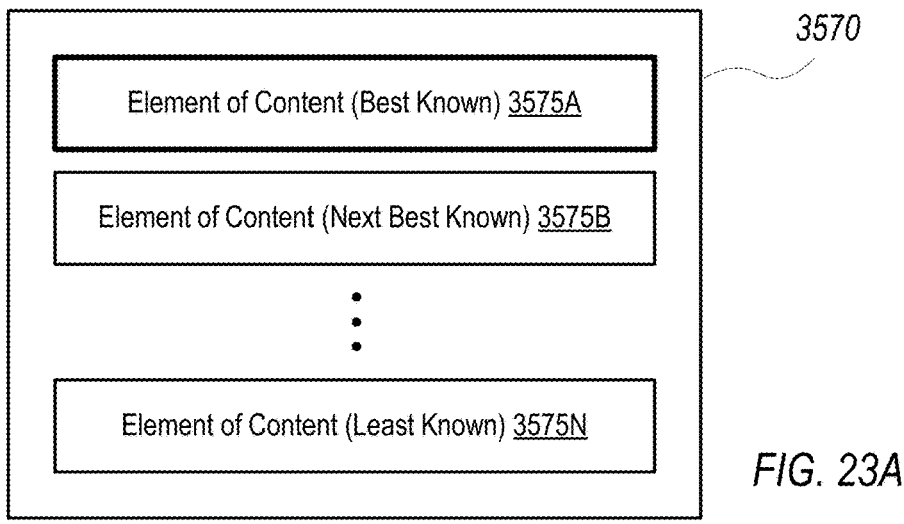
FIGS. 23A through 23C graphically illustrate an adaptive exploration interface for an MU database, according to at least some embodiments.
Figure 23B:
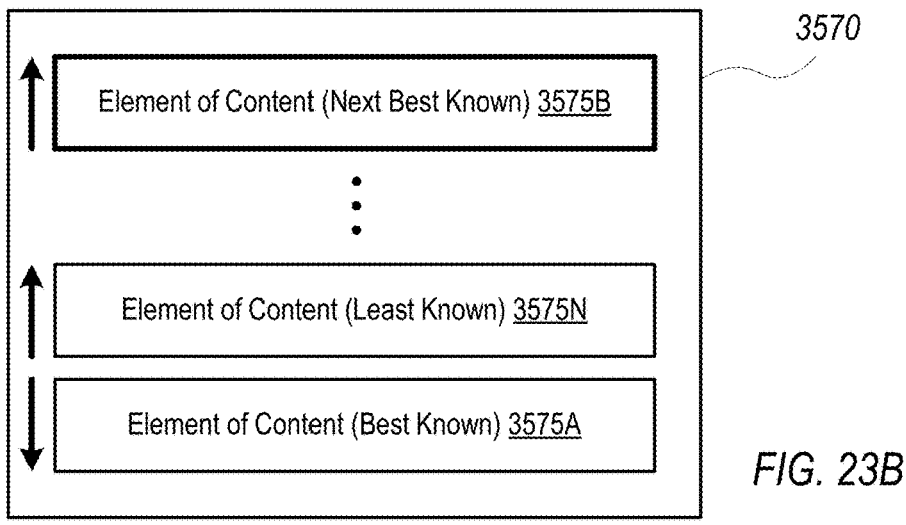
Figure 23C:
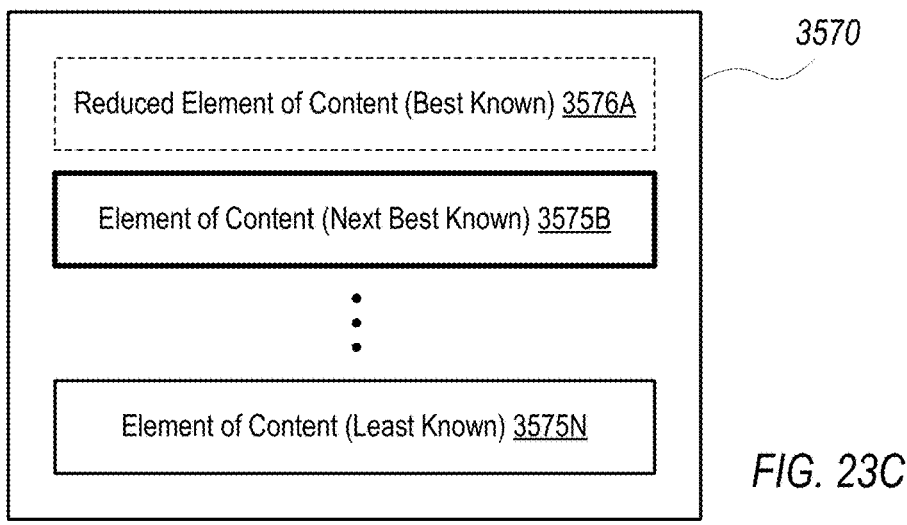

FIGS. 23A through 23C graphically illustrate an adaptive exploration interface for an MU database, according to at least some embodiments. FIG. 23A shows an example interface 3570 for MU content being displayed on a client device, for example by a media universe (MU) system that leverages network-based resources and services as illustrated in FIGS. 12 through 14. In one embodiment, elements of MU content 3575A and 3575B through 3575N have been included in a page of MU information that is presented in the adaptive exploration interface 3570. The page of MU information may be a web page, hypertext page, or other structured format that includes text, hypertext, images, video, and/or audio. The page of MU information may be devoted to describing a particular topic, such as one or more characters, items, concepts, or events from the world of the media universe. The page of MU information may include elements of content sourced from the MU database 300, including elements 3575A-3575N. In one embodiment, the page of MU information may be generated dynamically, e.g., based on a template.

As shown in the example of FIG. 23A, elements of content 3575A-3575N from multiple specificity classifications may be presented to a particular client in the adaptive exploration interface 3570. For example, the interface 3570 may include a best known element of content 3575A, a next-best-known element of content 3575B, and a least-known element of content 3575N. However, the elements of content 3575A-3575N may be arranged, configured, or positioned based on the client interaction history. The initial arrangement of elements in the adaptive exploration interface 3570 may present the best-known element of content 3575A in the most prominent location (e.g., at the top of the page), the next-best-known element of content 3575B in the next most prominent location (e.g., directly beneath the element 3575A), and the least-known element of content 3575N in the least prominent location (e.g., at the bottom of the page). In one embodiment, the best-known element of content 3575A may also be emphasized using one or more techniques other than location or position, such as the use of bold-faced text, color, contrast, size, scaling, and so on. In general, the position or presentation style of any of the elements of content 3575A-3575N may reflect a difference in emphasis for a particular client based on the interaction history for that particular client. The selection of the elements of content 3575A-3575N may also vary for a particular client based on the interaction history for that particular client.

FIG. 23B represents an example of a later presentation of the adaptive exploration interface 3570 for the same client, e.g., after the client has been presented with and/or viewed at least a portion of the elements of content 3575A-3575N as arranged in FIG. 23A. For example, FIG. 23B may represent a subsequent browsing session for the same client who previously browsed in the session represented in FIG. 23A. In one embodiment, the selection of the elements of content 3575A-3575N may be changed in the subsequent session for the particular client based on the interaction history for that particular client. In one embodiment, the position or presentation style of any of the elements of content 3575A-3575N may be changed in the subsequent session for the particular client to reflect a difference in emphasis for a particular client based on the interaction history for that particular client. For example, the best-known element of content 3575A may be repositioned (e.g., lower on the page) to reflect its lesser emphasis. As also shown in the example of FIG. 23B, the next-best-known element of content 3575B and the least-known element of content 3575N may be repositioned (e.g., higher on the page) to reflect a greater emphasis. Additionally, the next-best-known element of content 3575B may also be emphasized using one or more techniques other than location or position, such as the use of bold-faced text, color, contrast, size, scaling, and so on.

FIG. 23C represents another example of a later presentation of the adaptive exploration interface 3570 for the same client, e.g., after the client has been presented with and/or viewed at least a portion of the elements of content 3575A-3575N as arranged in FIG. 23A. For example, FIG. 23C may represent a subsequent browsing session for the same client who previously browsed in the session represented in FIG. 23A. As illustrated in FIG. 23C, the best-known element of content 3575A may be replaced by a reduced version 3576B in subsequent presentations of the adaptive interface 3570. In one embodiment, the reduced version 3576B of the best-known element of content 3575A may include an abridged or summarized textual presentation. In one embodiment, the reduced version 3576B may include fewer multimedia objects (e.g., images, videos, audio files) and/or multimedia objects that are reduced in dimensions or duration in comparison to the original element of content 3575A. In one embodiment, the reduced version 3576B may represent a hyperlink to the original element of content 3575A. The hyperlink may have a textual description or label (e.g., for characters, items, concepts, or events from the world of the media universe) and may represent a link to the best-known element of content 3575A. In one embodiment, the client may enter suitable user input (e.g., a click on a mouse, trackpad, or touch-capable display) to interact with the reduced version 3576B to expand the reduced version to the full version 3575A. The reduced version 3576A may remain in the same position relative to the other elements of content or may instead be repositioned (e.g., lower on the page) to reflect its lesser emphasis.

Figure 24:
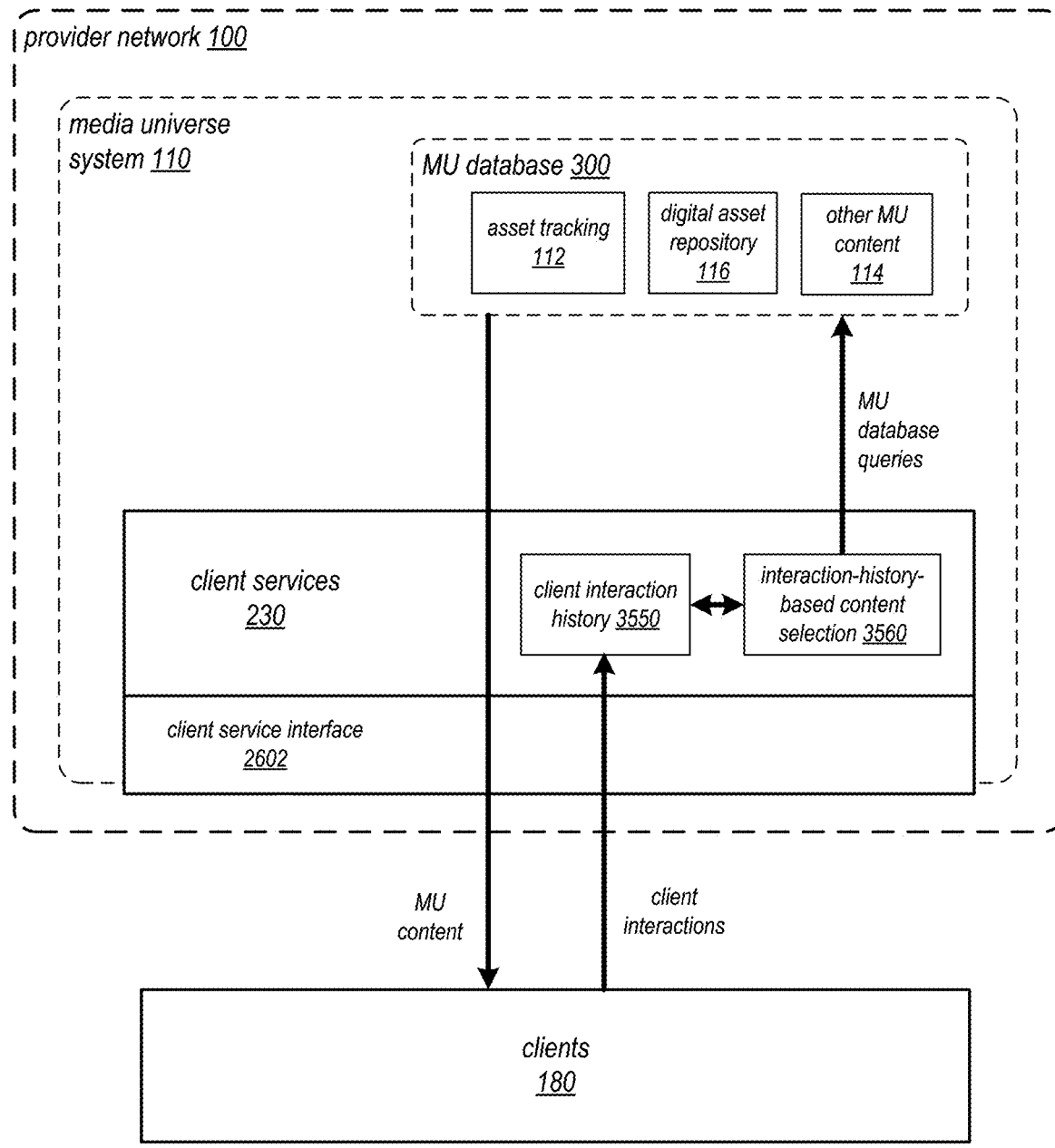
FIG. 24 is a high-level illustration of an MU system configured to perform adaptive exploration of an MU database based on client interaction history, according to at least some embodiments.

FIG. 24 is a high-level illustration of an MU system configured to perform adaptive exploration of an MU database based on client interaction history, according to at least some embodiments. As discussed above with respect to FIG. 2, the MU system 110 may be implemented within a provider network 100. Digital assets may be maintained according to a digital asset repository 116 and asset tracking database 112 that are part of or maintained within a media universe (MU) database 300 along with other MU content 114. As previously mentioned, the MU system 110 may serve as a central continuity database for the world of the media universe. In some embodiments, the MU system 110 may allow one or more clients 180, via client services 230 and client service interface 2602, to access digital media (e.g., video, images, audio, games, and informational pages) for display on client devices. In some embodiments, the MU system 110 may leverage network-based computation resources and services, for example a streaming service, to dynamically render digital content (e.g., video or games) for streaming to clients 180. In some embodiments, the MU system 110 may implement graphics processing and rendering module(s) 232, for example implemented on network-based computation resources provided by the provider network 100 services, that implement various graphics processing and rendering technology to dynamically provide digital media content based on with assets, asset information, and other MU content from MU database 300.

An MU database 300 may store a plurality of elements of media universe content related to a world of a media universe. The MU database 300 may also store data indicative of relationships of the elements of the media universe content to each other. In one embodiment, the MU database 300 may represent the relationships of a particular entity using subjects, predicates, and objects. The subjects and the objects may represent particular elements of media universe content, and the predicates may indicate relationships of respective subjects to respective objects. The MU system 110 may implement a variety of operations to perform queries of the MU database 300 based on the interaction histories for particular clients. Accordingly, the MU system 110 may include a functionality or module for maintaining client interaction history 3350 and a functionality or module for interaction-history-based content selection 3360. Based on the interaction history for a particular client as maintained by the client interaction history functionality 3350, the interaction-history-based content selection 3360 may supply MU database queries to the MU database 300 for content suitable for a client with a particular interaction history. The MU database 300 may supply MU content responsive to the interaction-history-based queries to the clients 180.

Figure 25:
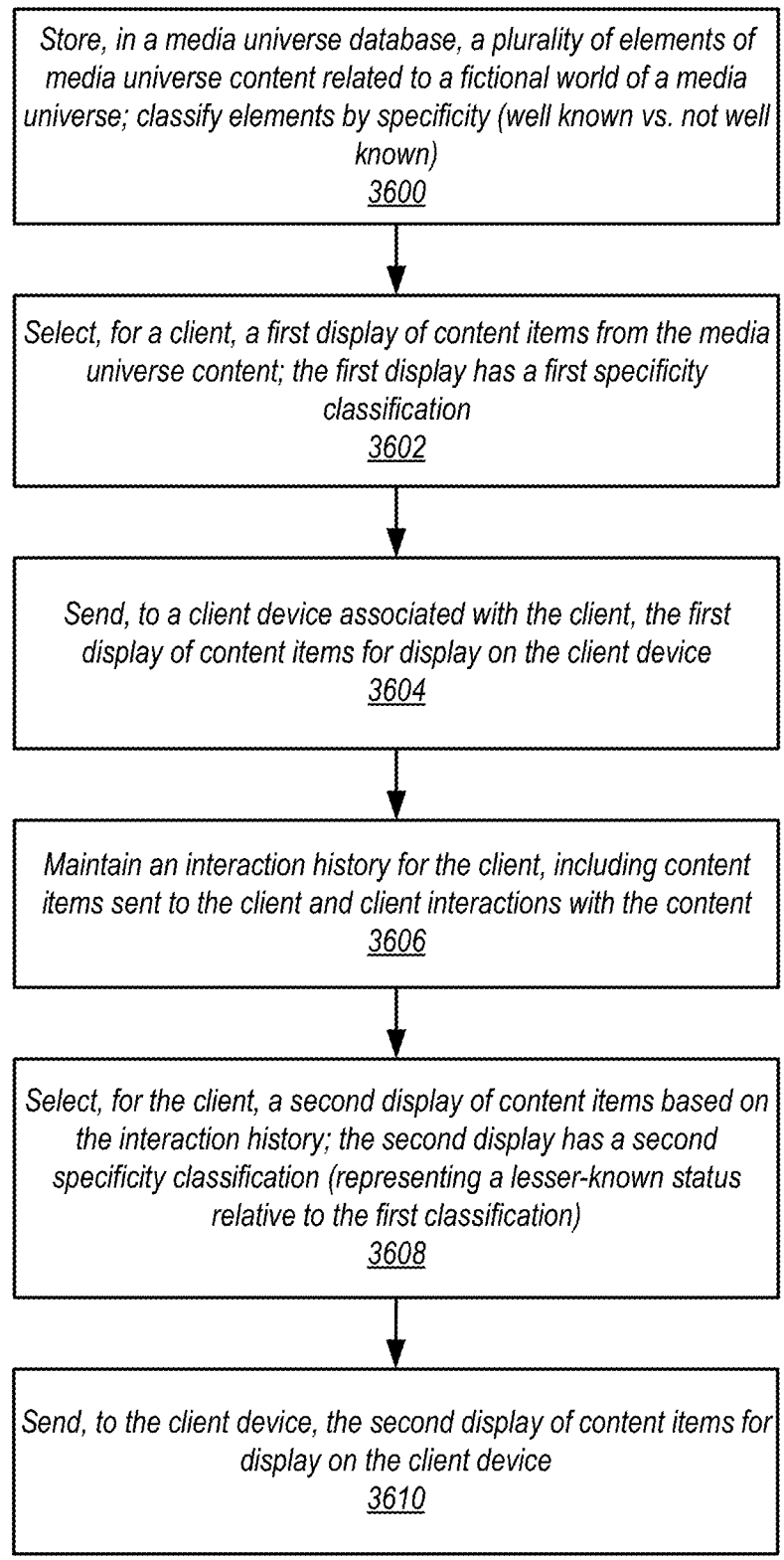
FIG. 25 is a high-level flowchart of a method for performing adaptive exploration of an MU database based on client interaction history, according to at least some embodiments.

FIG. 25 is a high-level flowchart of a method for performing adaptive exploration of an MU database based on client interaction history, according to at least some embodiments. As shown in 3600, an MU database (e.g., MU database 300) may store a plurality of elements of media universe content related to a world of a media universe. At least some of the elements of media universe content may be classified by specificity in the MU database. Items classified as less specific (or more generic) may generally be better-known and less obscure among a target audience for the MU database, and items classified as more specific (or less generic) may generally be lesser-known and more obscure for the target audience. Any suitable number and configuration of classifications or tiers may be used to represent the specificity or obscurity of items of content. As shown in 3602 to 3610, a variety of operations may be performed to implement adaptive exploration of an MU database based on client interaction history. In one embodiment, aspects of the operations shown in 3602 to 3610 may be performed by suitable components of an MU system (e.g., MU system 110), such as a client service module (e.g., client services module 230) and/or client service interface (e.g., client service interface 2602), that interact with one or more client devices. For example, the client service module may generate content based on the MU database, the content may be sent to a client device via the client service interface, and input from the client device may also be received by the MU system via the client service interface.

As shown in 3602, a first display of content items may be selected for a client. The first display of content items may have a first specificity classification. The first display of content items may include a first set of individual content items, and the individual content items may reflect one or more specificity classifications. The specificity classification for the first display may reflect the selection and/or arrangement of the individual content items. The first display of content items may be selected and/or generated based at least in part on the media universe content in the MU database. For example, elements of the media universe content may be selected, combined, and/or otherwise transformed to generate the content items for the client. The content items may include plain text, hypertext, media objects (e.g., images, video, audio), user interface elements (e.g., controls), executable and/or interpretable program code, and/or other suitable forms of content. The content items may represent characters from the world of the media universe, items from the world of the media universe, concepts from the world of the media universe, events from the world of the media universe, and/or other elements from the world of the media universe. The content items may be generated based on input from the client, e.g., input entered into a user interface for displaying and/or interacting with content from the MU database. For example, if the user enters input to seek information for a particular character, then the first display of content items may generally relate to that particular character, but at the first specificity classification. As shown in 3604, the first display of content items may be sent to a client device associated with the client. At least a portion of the first display of content items may be displayed on the client device, e.g., in the user interface for displaying and/or interacting with content from the MU database. The user interface may represent an adaptive exploration interface.

As shown in 3606, an interaction history may be maintained for the client. The interaction history for the client may be initialized at any suitable point, e.g., when the client first obtains media universe content through the adaptive exploration interface. The interaction history for the client may be updated or altered at any suitable point, e.g., when content items are selected for the client, sent to the client, and/or displayed on a client device associated with the client. The interaction history for the client may also be updated or altered based on the receipt of user input representing one or more user interactions by the client, e.g., to browse content elements, follow links to related content elements, and other suitable interactions. Accordingly, the interaction history may include an indication that the first display of content items were selected for the client, sent to the client device, and/or displayed on the client device. Additionally, the interaction history may include data indicative of one or more user interactions with the first display of content items. Input representing the user interactions may be entered using the adaptive exploration interface and received from the client device. Any suitable techniques may be used to capture, organize, and store the interaction history for a client. Any suitable techniques may be used to identify interactions associated with a particular client, e.g., by clients registering for accounts to use the adaptive exploration interface or by using one or more cookies to identify an instance of a browser program in which the adaptive exploration interface is loaded.

As shown in 3608, a second display of content items may be selected for the client based at least in part on the interaction history for the client. The second display of content items may have a second specificity classification. The second display of content items may include a second set of individual content items, and the individual content items may reflect one or more specificity classifications. The second set of content items may vary from the first set, and the second set may include at least some of the same items as the first set. The specificity classification for the second display may reflect the selection and/or arrangement of the individual content items. The second specificity classification may indicate that the selection and/or arrangement of content items in the second set reflects content that is generally lesser-known, less generic, more specific, and/or more obscure than the first display having the first specificity classification. For example, the second set may include one or more descriptions of entities that are more detailed and more specific than corresponding descriptions in the first set, and/or the second set may include one or more images that are lesser known than corresponding images in the first set. As another example, the second display may include a different position, location, size, or emphasis for one or more individual items of content in comparison to the first display. The second display of content items and/or second specificity classification may be selected for the client based on the interaction history indicating that the client has previously been presented with the content items in the first display. The second display of content items may be selected and/or generated based at least in part on the media universe content in the MU database. For example, elements of the media universe content may be selected, combined, and/or otherwise transformed to generate the second display of content items for the client. The second display of content items may include plain text, hypertext, media objects (e.g., images, video, audio), user interface elements (e.g., controls), executable and/or interpretable program code, and/or other suitable forms of content. The second display of content items may represent characters from the world of the media universe, items from the world of the media universe, concepts from the world of the media universe, events from the world of the media universe, and/or other elements from the world of the media universe. The second display of content items may be generated based on input from the client, e.g., input entered into the user interface for displaying and/or interacting with content from the MU database. For example, if the user enters input to seek information for a particular character, then the second display of content items may generally relate to that particular character, but at the second specificity classification.

As shown in 3610, the second display of content items may be sent to the client device associated with the client. At least a portion of the second display of content items may be displayed on the client device, e.g., in the user interface for displaying and/or interacting with content from the MU database. The interaction history for the client may be updated to include an indication that the second display of content items were selected for the client, sent to the client device, and/or displayed on the client device. Additionally, the interaction history for the client may be updated to include data indicative of one or more user interactions with the second display of content items.

Based on the interaction history for the client, the position and/or appearance of any of the content items may differ between the first set and the second set. One or more background images, background audio tracks, or user interface elements may also differ based on the interaction history for the client. For example, the images and/or user interface elements may change in appearance, presentation, and/or "feel" based on the interaction history for the client. In one embodiment, the first or second set of content items may be presented as part of a page (e.g., a hypertext page or other structured format including text, hypertext, images, video, and/or audio) that includes particular elements of media universe content that generally share a specificity classification. The page may be dynamically generated based at least in part on a template. The template may be selected from a set of potential templates based at least in part on one or more categories assigned to the content items.

In one embodiment, product recommendations for goods and/or services may be selected or otherwise generated for the client based on the interaction history for the client. For example, if the interaction history tends to indicate that the client has an interest in a particular element of media universe content, then one or more products corresponding to that particular element of media universe content may be recommended for the client. The product recommendations may be presented to the client in the adaptive exploration interface and/or as part of an independent interface, e.g., in a "recommended items" section of an online merchant. In one embodiment, the product recommendations may include affiliate links to online merchants.

Generating Interactive Content Using an MU Database

Methods, systems, and computer-readable media are described for generating interactive content using a media universe database. Non-interactive video may be automatically analyzed to recognize elements in a media universe database. The non-interactive video may be automatically converted to interactive video in which various objects are associated with elements in the media universe database. Clients may interact with the various objects in the interactive video, e.g., by selecting items and obtaining additional information for the selected items.

Figure 26A:
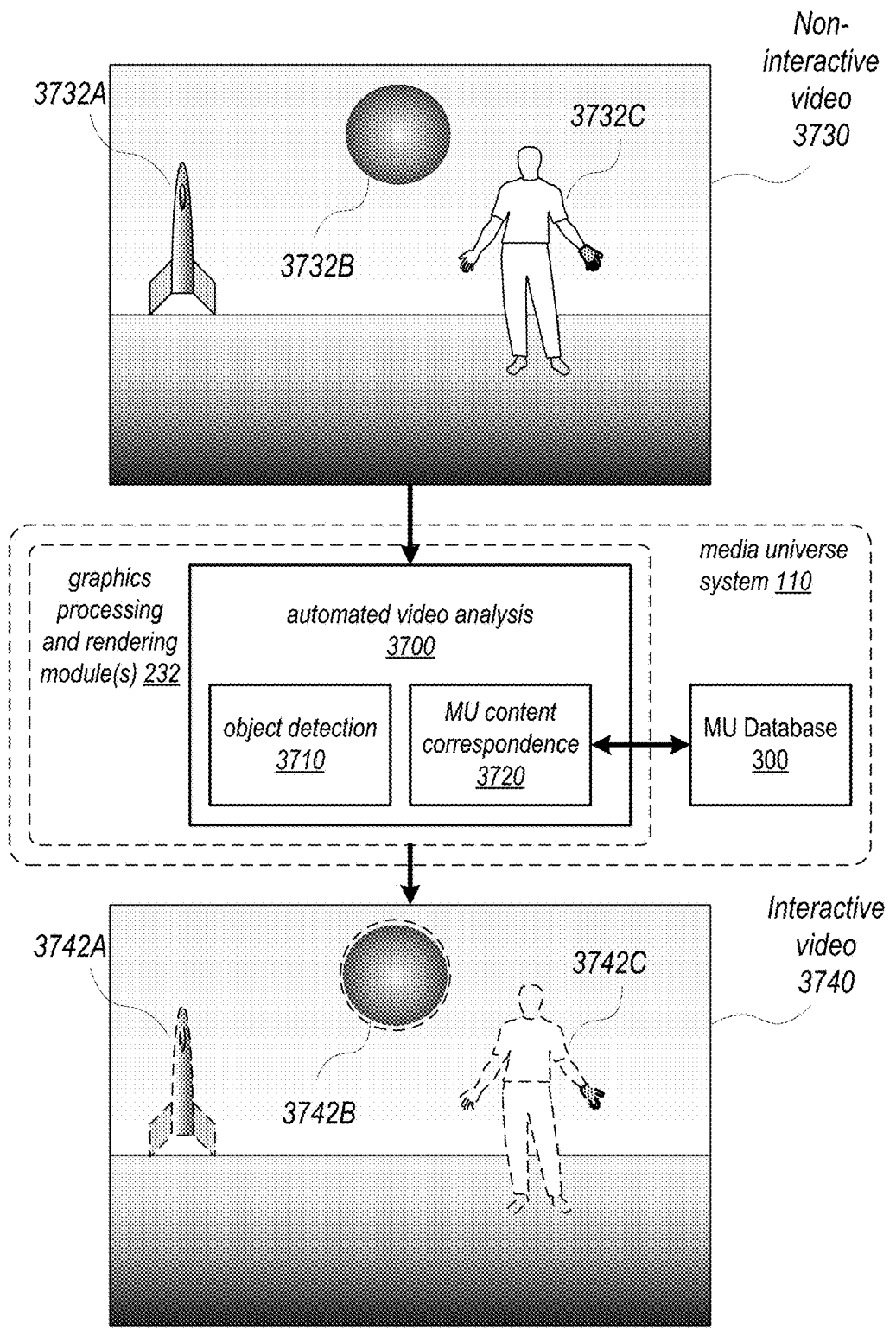
FIG. 26A is a high-level illustration of an automated video analysis module configured to generate interactive video with MU content correspondence, according to at least some embodiments.

FIG. 26A is a high-level illustration of an automated video analysis module configured to generate interactive video with MU content correspondence, according to at least some embodiments. As discussed above with respect to FIG. 2, digital assets (including digital video) may be maintained according to a digital asset repository 116 and asset tracking database 112 that are part of or maintained within a media universe (MU) database 300 along with other MU content 114. As previously mentioned, the MU system 110 may serve as a central continuity database for the world of the media universe. In some embodiments, the MU system 110 may allow one or more clients 180, via client services 230 and client service interface 2602, to access digital media (e.g., video, images, audio, games, and informational pages)

for display on client devices. In some embodiments, the MU system 110 may leverage network-based computation resources and services, for example a streaming service, to dynamically render digital content (e.g., video or games) for streaming to clients 180. In some embodiments, the MU system 110 may implement graphics processing and rendering module(s) 232, for example implemented on network-based computation resources provided by the provider network 100 services, that implement various graphics processing and rendering technology to dynamically provide digital media content based on with assets, asset information, and other MU content from MU database 300.

An MU database 300 may store a plurality of elements of media universe content related to a world of a media universe. The MU system 110 may implement a variety of operations to generate interactive video based on the MU database 300. Accordingly, the MU system 110 may include a functionality or module for automated video analysis 3700. The automated video analysis 3700 may include a functionality or module for object detection 3710 and a functionality or module for MU content correspondence 3720.

Using the automated video analysis 3700, an automated analysis of digital video 3730 may be performed. The digital video 3730 may also be referred to as a source video. As shown in FIG. 26A, the source video 3730 may be a non-interactive video that includes a plurality of non-interactive video frames. The automated analysis may implement the object detection 3710 using any suitable object detection techniques, schemes, or algorithms. In one embodiment, one or more frames in the source video 3730 may be analyzed to identify one or more objects in the frames. As shown for purposes of illustration and example, a particular frame or set of frames in the source video 3730 may include objects such as objects 3732A, 3732B, and 3732C that may be identified using the object detection 3710. Each of the identified objects 3732A-3732C may be located in a respective region of one or more frames. In one embodiment, the automated analysis 3700 may include analyzing a plurality of consecutive frames in order to isolate a moving object against a relatively static background or to isolate a relatively static object against a moving background. In one embodiment, techniques for edge detection may be used to isolate objects against backgrounds and/or other objects. In one embodiment, a mask or other region for an identified object may include a complex shape that corresponds to an outline of the underlying object.

Using the MU content correspondence 3720, a correspondence may be determined between the one or more objects identified in the digital video and respective elements of media universe content in the MU database 300. For example, a particular object in one or more frames in the digital video, such as a character or item, may be determined to correspond to a particular character or item in the MU database. The corresponding element in the MU database may be determined based on a comparison of the object in the digital video to a set of digital assets representing, for example, 2D or 3D images of a particular character or item. The correspondence may be determined based on a match to a digital asset that is not necessarily exact but is suitably close within a predetermined tolerance.

Using the graphics processing and rendering module 232, an interactive digital video 3740 may be generated based on the automated video analysis 3700. The interactive digital video 3740 may include a plurality of video frames including one or more interactive video frames and potentially one or more non-interactive video frames. The one or more interactive video frames may include one or more interactive objects corresponding to the elements of media universe content as determined using the MU content correspondence 3720. As shown for purposes of illustration and example, a particular frame or set of frames in the interactive video 3740 may include interactive objects such as objects 3742A, 3742B, and 3742C that correspond to the respective non-interactive objects 3732A, 3732B, and 3732C in the source video 3730. Each of the interactive objects 3742A, 3742B, and 3742C may be located in a respective region of one or more interactive frames. The interactive digital video 3740 may generally include the visual information from the source video 3730 but with added regions of interactivity in one or more interactive frames. The interactive digital video 3740 may be generated such that the regions of interactivity in the one or more interactive frames include or reference additional program code and/or data beyond the original pixels or other visual information of the corresponding frames in the source video. The additional program code and/or data in the one or more interactive frames may permit a user to interact with the interactive digital video, e.g., to modify interactive objects, obtain supplemental information related to interactive objects from the MU database 300, or otherwise alter the presentation of the interactive video.

The interactive digital video 3740 may be sent to a client for display on a client device associated with the client. The user may use suitable controls to play the video 3740, pause the video, fast-forward the video, rewind the video, move to different frames in the video, or otherwise control playback of the video. In one embodiment, when the user pauses the digital video 3740 on an interactive frame, one or more regions corresponding to one or more interactive objects 3742A, 3742B, and 3742C may be highlighted relative to non-interactive regions of the frame. In one embodiment, playback of the video may be paused automatically if the user clicks on an interactive frame. The user may initiate interaction with these highlighted regions of interactivity by clicking on them using a mouse, trackpad, or touch-capable display. For example, by interacting with the video 3740 in this manner, the user may modify interactive objects (e.g., to swap one object for another). As another example, the user may obtain supplemental information related to interactive objects from the MU database. In one embodiment, a timeline of frames in the video may include indications of frames that have interactive objects.

User input representing one or more user interactions with the one or more interactive objects 3742A, 3742B, and 3742C may be sent from the client device to the MU system, and the MU system may respond appropriately. For example, one or more supplemental elements of media universe content may be selected from the MU database 300 based at least in part on the one or more user interactions with the one or more interactive objects 3742A, 3742B, and 3742C, and the one or more supplemental elements of media universe content may be sent to and displayed on the client device. As another example, one or more product recommendations may be selected for the client based at least in part on the one or more user interactions with the one or more interactive objects 3742A, 3742B, and 3742C, and the product recommendations may correspond to individual elements of media universe content in the MU database 300.

Figure 26B:
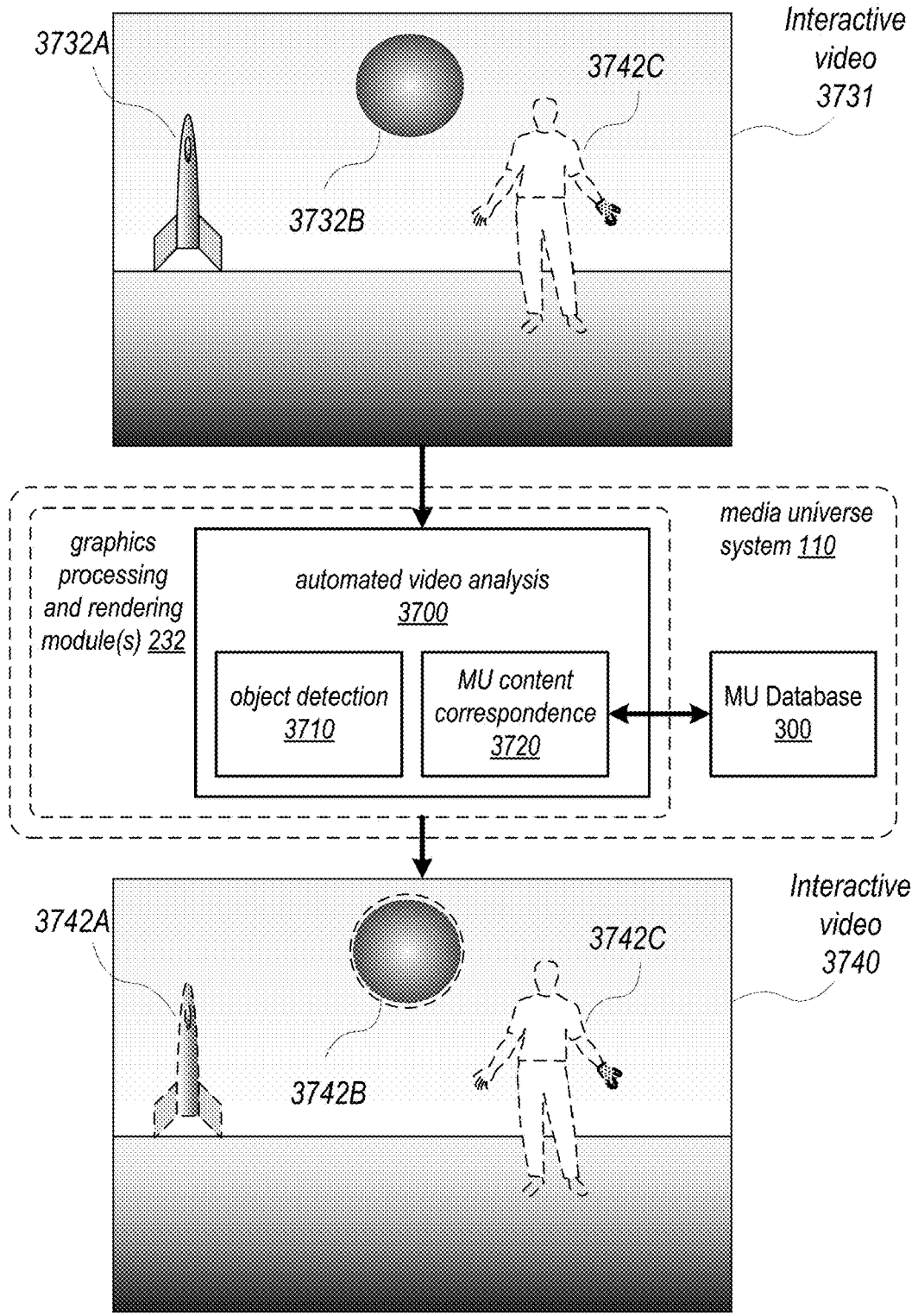
FIG. 26B is a high-level illustration of an automated video analysis module configured to generate further interactive video with MU content correspondence, according to at least some embodiments.

FIG. 26B is a high-level illustration of an automated video analysis module configured to generate further interactive video with MU content correspondence, according to at least some embodiments. The source video 3731 may already include some interactivity, e.g., by including one or more interactive regions in one or more interactive frames as previously identified by a source of the video or by using the system shown in FIG. 26A. Using the automated video analysis 3700, an automated analysis of the interactive digital video 3731 may be performed. As discussed above with reference to FIG. 26A, the automated analysis may implement object detection 3710 and MU content correspondence 3720 to identify one or more objects in one or more frames in the source video 3731. As shown for purposes of illustration and example, a particular frame or set of frames in the source video 3731 may include objects such as non-interactive objects 3732A and 3732B as well as interactive object 3742C. The non-interactive objects 3732A and 3732B may be identified using the object detection 3710. Using the MU content correspondence 3720, a correspondence may be determined between the non-interactive objects 3732A and 3732B identified in the source video 3731 and respective elements of media universe content in the MU database 300. Using the graphics processing and rendering module 232, an interactive digital video 3740 may be generated based on the automated video analysis 3700. The generated video 3740 may include newly interactive regions for the newly determined objects 3732A and 3732B, and the video 3740 may also retain the existing interactivity for the object 3742C.

In one embodiment, clients may interact with the interactive regions in the video 3740 to, for example, obtain contextual information about the corresponding objects, manipulate and explore objects, discover hidden content, reveal hidden storylines, order merchandise (e.g., via 3D printing) related to the content, etc. In some embodiments, the client interactions with the video 3740 may include touches and/or gestures according to touchscreen technology. In some embodiments, the client interactions may be or may include interactions according to a cursor control device, a keyboard, or other user input devices or technologies. In some embodiments, the client interactions may be or may include voice commands or interactions according to audio and voice command recognition technology of the client device. Further examples of client interactions with interactive video were discussed previously with respect to FIGS. 4A through 4C and FIGS. 5A through 5C.

In some embodiments, the graphics processing and rendering module 232 may add interactivity to videos based on additional sources of analysis. For example, a supplier of a source video may also supply metadata for a frame or set of frames that indicates a correspondence of an object or region to an element of content in the MU database 300. For example, masks used in layers when compositing and rendering the digital video may be mapped to digital assets in the repository that correspond to objects, characters, and other items within the media universe. In this manner, content within a rendered scene streamed to a client device may thus be rendered as active content.

In one embodiment, the MU system may monitor user input to all regions of the digital video 3740, e.g., user clicks on non-interactive regions as well as user clicks on interactive regions. In some circumstances, the MU system may decide to add interactive objects to a digital video (e.g., an interactive or non-interactive video) based on user input with respect to non-interactive regions. The decision to add the interactive objects may be based on user input from a plurality of users. For example, if a sufficient number of users click on a non-interactive region of a digital video, the MU system may automatically analyze the non-interactive region, determine one or more corresponding elements of media universe content, and generate an interactive video 3740 with interactivity in the previously non-interactive region.

Figure 27:
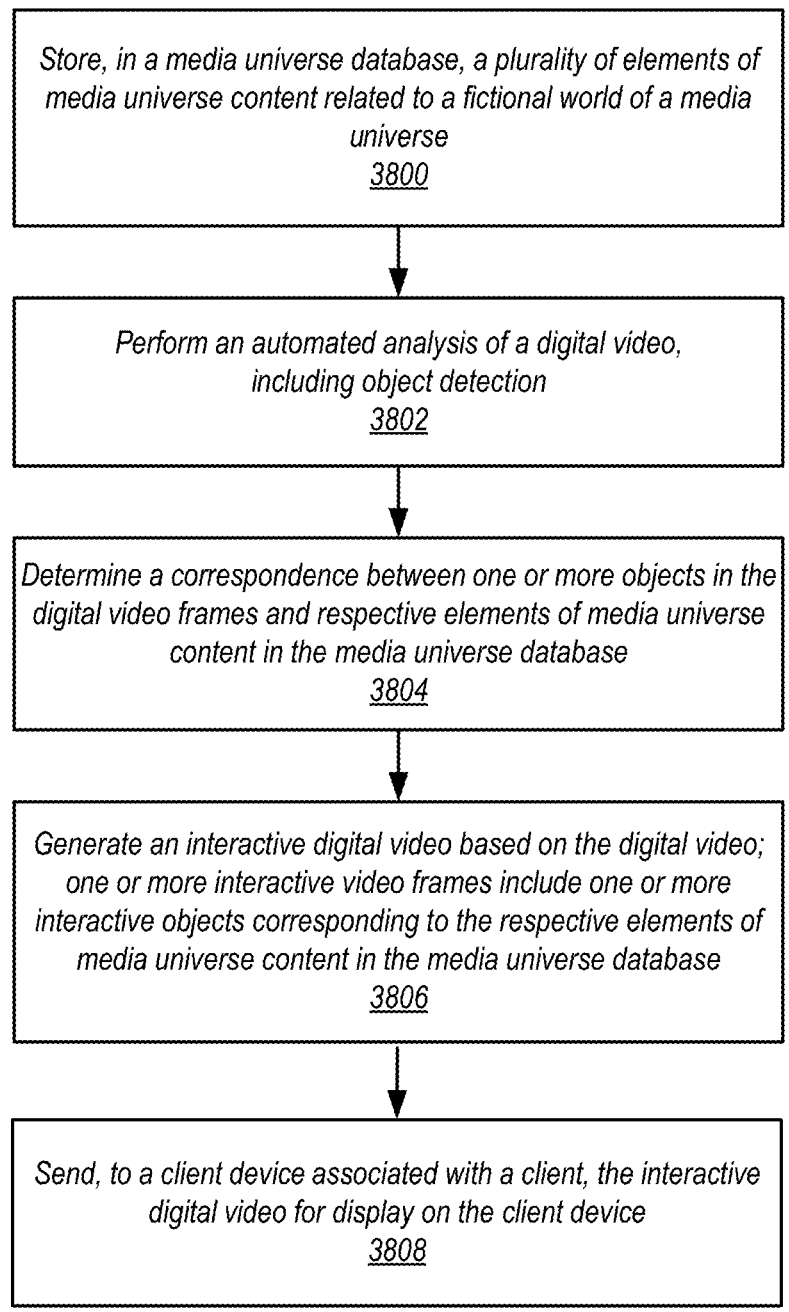
FIG. 27 is a high-level flowchart of a method for converting non-interactive content to interactive content, according to at least some embodiments.

FIG. 27 is a high-level flowchart of a method for converting non-interactive content to interactive content, according to at least some embodiments. As shown in 3800, an MU database (e.g., MU database 300) may store a plurality of elements of media universe content related to a world of a media universe. As shown in 3802 to 3808, a variety of operations may be performed to implement automated video analysis to generate interactive video using an MU database. In one embodiment, aspects of the operations shown in 3802 to 3808 may be performed by suitable components of an MU system (e.g., MU system 110), such as a graphics processing and rendering module (e.g., graphics processing and rendering module 232), a client service module (e.g., client services module 230), and/or client service interface (e.g., client service interface 2602), that may interact with one or more client devices. For example, the graphics processing and rendering module may generate interactive video, the interactive video may be sent to a client device via the client service interface of the client service module, and input representing user interaction with the interactive video may also be received by the MU system via the client service interface.

As shown in 3802, an automated analysis of digital video may be performed. The digital video may also be referred to as a source video. The automated analysis may include object detection using any suitable object detection techniques, schemes, or algorithms. In one embodiment, one or more frames in the digital video may be analyzed to identify one or more objects in the frames. Each of the identified objects may be located in a respective region of one or more frames. In one embodiment, the automated analysis may include analyzing a plurality of consecutive frames in order to isolate a moving object against a relatively static background or to isolate a relatively static object against a moving background. In one embodiment, techniques for edge detection may be used to isolate objects against backgrounds and/or other objects. In one embodiment, the source video may be a non-interactive video that includes a plurality of non-interactive video frames. In one embodiment, the source video may already include some interactivity, e.g., by including one or more interactive regions in one or more interactive frames as previously identified by a source of the video or using the method shown in FIG. 27.

As shown in 3804, a correspondence may be determined between the one or more objects identified in the digital video and respective elements of media universe content in the MU database. The correspondence may be determined based at least in part on the automated analysis. For example, a particular object in one or more frames in the digital video, such as a character or item, may be determined to correspond to a particular character or item in the MU database. The corresponding element in the MU database may be determined based on a comparison of the object in the digital video to a set of digital assets representing, for example, 2D or 3D images of a particular character or item. The correspondence may be determined based on a match to a digital asset that is not necessarily exact but is suitably close within a predetermined tolerance.

As shown in 3806, an interactive digital video may be generated based on the digital video analyzed in 3802. The interactive digital video may include a plurality of video frames including one or more interactive video frames and potentially one or more non-interactive video frames. The one or more interactive video frames may include one or more interactive objects corresponding to the elements of media universe content as determined in 3804. Each of the interactive objects may be located in a respective region of one or more interactive frames. The interactive digital video may generally include the visual information from the source video but with added regions of interactivity in one or more interactive frames. The interactive digital video may be generated such that the regions of interactivity in the one or more interactive frames include or reference additional program code and/or data beyond the original pixels or other visual information of the corresponding frames in the source video. The additional program code and/or data in the one or more interactive frames may permit a user to interact with the interactive digital video, e.g., to modify interactive objects, obtain supplemental information related to interactive objects from the MU database, or otherwise alter the presentation of the interactive video.

As shown in 3808, the interactive digital video may be sent to a client for display on a client device associated with the client. The user may use suitable controls to play the video, pause the video, fast-forward the video, rewind the video, move to different frames in the video, or otherwise control playback of the video. In one embodiment, when the user pauses the digital video on an interactive frame, one or more regions corresponding to one or more interactive objects may be highlighted relative to non-interactive regions of the frame. In one embodiment, playback of the video may be paused automatically if the user clicks on an interactive frame. The user may initiate interaction with these highlighted regions of interactivity by clicking on them using a mouse, trackpad, or touch-capable display. For example, by interacting with the video in this manner, the user may modify interactive objects (e.g., to swap one object for another). As another example, the user may obtain supplemental information related to interactive objects from the MU database. In one embodiment, a timeline of frames in the video may include indications of frames that have interactive objects. User input representing one or more user interactions with the one or more interactive objects may be sent from the client device to the MU system, and the MU system may respond appropriately. For example, one or more supplemental elements of media universe content may be selected from the MU database based at least in part on the one or more user interactions with the one or more interactive objects, and the one or more supplemental elements of media universe content may be sent to and displayed on the client device. As another example, one or more product recommendations may be selected for the client based at least in part on the one or more user interactions with the one or more interactive objects, and the product recommendations may correspond to individual elements of media universe content in the MU database.

In one embodiment, the MU system may monitor user input to all regions of the digital video, e.g., user clicks on non-interactive regions as well as user clicks on interactive regions. In some circumstances, the MU system may decide to add interactive objects to a digital video (e.g., an interactive or non-interactive video) based on user input with respect to non-interactive regions. The decision to add the interactive objects may be based on user input from a plurality of users. For example, if a sufficient number of users click on a non-interactive region of a digital video, the MU system may automatically analyze the non-interactive region as shown in 3802, determine one or more corresponding elements of media universe content as shown in 3804, and generate an interactive video with interactivity in the previously non-interactive region as shown in 3806.

Illustrative System

In at least some embodiments, a computer system that implements a portion or all of one or more of the technologies described herein may include a general-purpose computer system that includes or is configured to access one or more computer-readable media. FIG. 28 illustrates such a general-purpose computing device 5000. In the illustrated embodiment, computing device 5000 includes one or more processors 5010 (e.g., processors 5010A and 5010B through 5010N) coupled to a system memory 5020 via an input/output (I/O) interface 5030. Computing device 5000 further includes a network interface 5040 coupled to I/O interface 5030.

In various embodiments, computing device 5000 may be a uniprocessor system including one processor 5010 or a multiprocessor system including several processors 5010 (e.g., two, four, eight, or another suitable number). Processors 5010 may include any suitable processors capable of executing instructions. For example, in various embodiments, processors 5010 may be general-purpose or embedded processors implementing any of a variety of instruction set architectures (ISAs), such as the x86, PowerPC, SPARC, or MIPS ISAs, or any other suitable ISA. In multiprocessor systems, each of processors 5010 may commonly, but not necessarily, implement the same ISA.

System memory 5020 may be configured to store program instructions and data accessible by processor(s) 5010. In various embodiments, system memory 5020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 5020 as code (i.e., program instructions) 5025 and data 5026.

In one embodiment, I/O interface 5030 may be configured to coordinate I/O traffic between processor 5010, system memory 5020, and any peripheral devices in the device, including network interface 5040 or other peripheral interfaces. In some embodiments, I/O interface 5030 may perform any necessary protocol, timing or other data transformations to convert data signals from one component (e.g., system memory 5020) into a format suitable for use by another component (e.g., processor 5010). In some embodiments, I/O interface 5030 may include support for devices attached through various types of peripheral buses, such as a variant of the Peripheral Component Interconnect (PCI) bus standard or the Universal Serial Bus (USB) standard, for example. In some embodiments, the function of I/O interface 5030 may be split into two or more separate components, such as a north bridge and a south bridge, for example. Also, in some embodiments some or all of the functionality of I/O interface 5030, such as an interface to system memory 5020, may be incorporated directly into processor 5010.

Network interface 5040 may be configured to allow data to be exchanged between computing device 5000 and other devices 5060 attached to a network or networks 5050, such as other computer systems or devices as illustrated in FIG. 1, for example. In various embodiments, network interface 5040 may support communication via any suitable wired or wireless general data networks, such as types of Ethernet network, for example. Additionally, network interface 5040 may support communication via telecommunications/telephony networks such as analog voice networks or digital fiber communications networks, via storage area networks such as Fibre Channel SANs, or via any other suitable type of network and/or protocol.

In some embodiments, system memory 5020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 5000 via I/O interface 5030. A non-transitory computer-readable storage medium may also include any volatile or non-volatile media such as RAM (e.g. SDRAM, DDR SDRAM, RDRAM, SRAM, etc.), ROM, etc, that may be included in some embodiments of computing device 5000 as system memory 5020 or another type of memory. Further, a computer-readable medium may include transmission media or signals such as electrical, electromagnetic, or digital signals, conveyed via a communication medium such as a network and/or a wireless link, such as may be implemented via network interface 5040. Portions or all of multiple computing devices such as that illustrated in FIG. 28 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices, and is not limited to these types of devices.

Various embodiments may further include receiving, sending, or storing instructions and/or data implemented in accordance with the foregoing description upon a computer-readable medium. Generally speaking, a computer-readable medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-readable medium may also include transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. In various of the methods, the order of the steps may be changed, and various elements may be added, reordered, combined, omitted, modified, etc. Various of the steps may be performed automatically (e.g., without being directly prompted by user input) and/or programmatically (e.g., according to program instructions).

Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:
1. A system, comprising:
one or more computing devices configured to implement a media universe system comprising:
a media universe database configured to store a plurality of elements of media universe content related to a media universe; and
a graphics processing and rendering module implemented by one or more hardware processors and memory and configured to:
receive indications of user input from a plurality of users to one or more non-interactive regions included in a non-interactive digital video, wherein the one or more non-interactive regions include one or more non-interactive objects, wherein the non-interactive digital video comprises a plurality of non-interactive video frames, wherein each of the plurality of non-interactive video frames comprises a plurality of regions that includes the one or more non-interactive regions;
determine whether the one or more non-interactive regions received the user input from a quantity of the plurality of users that satisfies a threshold number of users;
based on a determination that the quantity of the plurality of users satisfies the threshold number of users, perform an automated analysis of the one or more non-interactive regions of the non-interactive digital video, the automated analysis comprising object detection performed on the one or more non-interactive regions of the non-interactive digital video, wherein the automated analysis comprises a comparison of the one or more non-interactive objects included in the non-interactive video frames to the elements of media universe content in the media universe database;
based at least in part on the automated analysis, determine a correspondence between the one or more non-interactive objects in the non-interactive video frames and the elements of media universe content in the media universe database; and
generate an interactive digital video based on the non-interactive digital video, wherein the interactive digital video comprises a plurality of video frames including one or more interactive video frames, wherein the one or more interactive video frames comprise one or more interactive objects corresponding to the elements of media universe content in the media universe database.

2. The system as recited in claim 1, wherein the media universe system further comprises a client service module and client service interface, the client service module is implemented by one or more hardware processors and memory and configured to:
send, via the client service interface to a client device, at least a portion of the interactive digital video; and
receive, via the client service interface from the client device, user input representing one or more user interactions with the one or more interactive objects in at least one of the interactive video frames displayed on the client device.

3. The system as recited in claim 2, wherein the one or more user interactions with the one or more interactive objects are entered at the client device while the interactive digital video is paused on the client device, and wherein individual ones of the interactive objects are highlighted relative to non-interactive regions while the interactive digital video is paused on the client device.

4. The system as recited in claim 2, wherein the client service module is further configured to:

send, via the client service interface to the client device, one or more supplemental elements of media universe content from the media universe database, wherein the one or more supplemental elements of media universe content are selected from the media universe database based at least in part on the one or more user interactions with the one or more interactive objects, and wherein the one or more supplemental elements of media universe content are displayed on the client device.

5. The system as recited in claim 2, wherein the client service module is further configured to:

send, via the client service interface to the client device, one or more product recommendations, wherein the one or more product recommendations are selected based at least in part on the one or more user interactions with the one or more interactive objects, wherein the product recommendations correspond to elements of media universe content in the media universe database, and wherein the one or more product recommendations are displayed on the client device.

6. The system as recited in claim 1, wherein the graphics processing and rendering module is further configured to:

based on a plurality of user interactions from the plurality of users with one or more non-interactive regions of the interactive digital video, generate information associated with adding one or more additional interactive objects to the interactive digital video in the one or more non-interactive regions.

7. A computer-implemented method, comprising:

performing, by a system implemented on one or more computing devices:

receiving indications of user input from a plurality of users to one or more non-interactive regions included in a non-interactive digital video, wherein the one or more non-interactive regions include one or more non-interactive objects, wherein the non-interactive digital video comprises a plurality of non-interactive video frames, wherein each of the plurality of non-interactive video frames comprises a plurality of regions that includes the one or more non-interactive regions;

determining whether the one or more non-interactive regions received the user input from a quantity of the plurality of users that satisfies a threshold number of users;

based on a determination that the quantity of the plurality of users satisfies the threshold number of users, performing an analysis of the digital video to identify one or more non-interactive objects included in the digital video on the one or more non-interactive regions of the digital video, wherein the analysis comprises a comparison of the one or more non-interactive objects in the digital video to a plurality of elements of content in a database;

based at least in part on the analysis, determining a correspondence between the one or more non-interactive objects in the digital video and respective ones of the plurality of elements of content stored in the database; and generating an interactive digital video based on the digital video, wherein the interactive digital video comprises a plurality of video frames including one or more interactive video frames, wherein the one or more interactive video frames comprise one or more interactive objects corresponding to elements of content.

8. The method as recited in claim 7, further comprising:

sending, to a client device, at least a portion of the interactive digital video; and receiving, from the client device, user input representing one or more user interactions with the one or more interactive objects in at least one of the interactive video frames displayed on the client device.

9. The method as recited in claim 8, wherein the one or more user interactions with the one or more interactive objects are entered at the client device while the interactive digital video is paused on the client device, and wherein individual ones of the interactive objects are highlighted relative to non-interactive regions while the interactive digital video is paused on the client device.

10. The method as recited in claim 8, further comprising:

sending, to the client device, one or more supplemental elements of content from the database, wherein the one or more supplemental elements of media universe content are selected from the database based at least in part on the one or more user interactions with the one or more interactive objects, and wherein the one or more supplemental elements of content are displayed on the client device.

11. The method as recited in claim 8, further comprising:

sending, to the client device, one or more product recommendations, wherein the one or more product recommendations are selected based at least in part on the one or more user interactions with the one or more interactive objects, wherein the product recommendations correspond to the elements of content in the database, and wherein the one or more product recommendations are displayed on the client device.

12. The method as recited in claim 7, further comprising:

based on a plurality of user interactions from the plurality of users with one or more non-interactive regions of the interactive digital video, generating information associated with adding one or more additional interactive objects to the interactive digital video in the one or more non-interactive regions.

13. The method as recited in claim 7, wherein the analysis comprises:

detecting the one or more non-interactive objects in the digital video using an object detection algorithm, comprising distinguishing the one or more non-interactive objects from a background and identifying boundaries of the one or more non-interactive objects in a plurality of video frames.

14. A non-transitory computer-readable storage medium storing program instructions that, when executed on one or more computers, cause the one or more computers to implement:

maintaining a media universe database configured to store a plurality of elements of media universe content related to a media universe;

determining whether one or more non-interactive regions included in a video frame of a non-interactive digital video comprising a plurality of regions received user input from a quantity of a plurality of users that satisfies a threshold number of users, wherein the one or more non-interactive regions include one or more non-interactive objects;

based on a determination that the quantity of the plurality of users satisfies the threshold number of users, performing an analysis of the non-interactive digital video to identify the one or more non-interactive objects in the non-interactive digital video on the one or more non-interactive regions of the non-interactive digital video, wherein the analysis comprises a comparison of the one or more non-interactive objects in the non-interactive digital video to elements of media universe content in the media universe database;

based at least in part on the analysis, determining a correspondence between the one or more non-interactive objects in the non-interactive digital video and respective ones of the elements of media universe content in the media universe database; and generating an interactive digital video based on the non-interactive digital video, wherein the interactive digital video comprises a plurality of video frames including one or more interactive video frames, wherein the one or more interactive video frames comprise one or more interactive objects corresponding to the elements of media universe content.

15. The non-transitory computer-readable storage medium as recited in claim 14, wherein the program instructions, when executed on the one or more computers, cause the one or more computers to implement:

sending, to a client device associated with a client, at least a portion of the interactive digital video; and receiving, from the client device associated with the client, user input representing one or more user interactions with the one or more interactive objects in at least one of the interactive video frames displayed on the client device.

16. The non-transitory computer-readable storage medium as recited in claim 15, wherein the one or more user interactions with the one or more interactive objects are entered at the client device while the interactive digital video is paused on the client device, and wherein the interactive objects are highlighted relative to non-interactive regions while the interactive digital video is paused on the client device.

17. The non-transitory computer-readable storage medium as recited in claim 15, wherein the program instructions, when executed on the one or more computers, cause the one or more computers to implement:

sending, to the client device associated with the client, one or more supplemental elements of media universe content from the media universe database, wherein the one or more supplemental elements of media universe content are selected from the media universe database based at least in part on the one or more user interactions with the one or more interactive objects, and wherein the one or more supplemental elements of media universe content are displayed on the client device.

18. The non-transitory computer-readable storage medium as recited in claim 15, wherein the program instructions, when executed on the one or more computers, cause the one or more computers to implement:

sending, to the client device associated with the client, one or more product recommendations, wherein the one or more product recommendations are selected based at least in part on the one or more user interactions with the one or more interactive objects, wherein individual ones of the product recommendations correspond to the elements of media universe content in the media universe database, and wherein the one or more product recommendations are displayed on the client device.

19. The non-transitory computer-readable storage medium as recited in claim 14, wherein the program instructions, when executed on the one or more computers, cause the one or more computers to implement:

based on a plurality of user interactions from the plurality of users with one or more non-interactive regions of the interactive digital video, generating information related to adding one or more additional interactive objects to the interactive digital video in the one or more non-interactive regions.

20. The non-transitory computer-readable storage medium as recited in claim 14, wherein the analysis comprises:

detecting the one or more non-interactive objects in the digital video using an object detection algorithm, comprising distinguishing the one or more non-interactive objects from a background and identifying boundaries of the one or more non-interactive objects in a plurality of video frames.

* * * * *